(12) United States Patent
Karunamuni et al.

(10) Patent No.: US 11,360,644 B2
(45) Date of Patent: Jun. 14, 2022

(54) DEVICES, METHODS, AND GRAPHICAL USER INTERFACES FOR INTERACTING WITH USER INTERFACE OBJECTS AND PROVIDING FEEDBACK

(71) Applicant: Apple Inc., Cupertino, CA (US)

(72) Inventors: Chanaka G. Karunamuni, San Jose, CA (US); Marcos Alonso Ruiz, Oakland, CA (US); Michael T. Turner, San Jose, CA (US); Mohammed N. Jisrawi, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/138,629

(22) Filed: Dec. 30, 2020

(65) Prior Publication Data

US 2021/0117053 A1 Apr. 22, 2021

Related U.S. Application Data

(63) Continuation of application No. 16/574,033, filed on Sep. 17, 2019, now Pat. No. 10,908,783.
(Continued)

(51) Int. Cl.
*G06F 3/0482* (2013.01)
*G06F 3/04883* (2022.01)
(Continued)

(52) U.S. Cl.
CPC .......... *G06F 3/0482* (2013.01); *G06F 3/0486* (2013.01); *G06F 3/04845* (2013.01); *G06F 3/04883* (2013.01)

(58) Field of Classification Search
None
See application file for complete search history.

(56) References Cited

U.S. PATENT DOCUMENTS

2010/0127995 A1\* 5/2010 Rigazio ............... G06F 3/04886
345/173
2012/0062604 A1\* 3/2012 Lobo ................... G06F 3/04883
345/684
(Continued)

FOREIGN PATENT DOCUMENTS

| AU | 2018100429 A | 4/2018 |
| CN | 108334227 A | 7/2018 |

OTHER PUBLICATIONS

Notice of Allowance, dated Apr. 24, 2020, received in U.S. Appl. No. 16/574,033, 8 pages.
(Continued)

*Primary Examiner* — Toan H Vu
(74) *Attorney, Agent, or Firm* — Morgan, Lewis & Bockius LLP

(57) ABSTRACT

In response to a substantially stationary input directed to a user interface object on a first user interface: if the input does not meet an input threshold, the device, after detecting an end of the input, replaces display of the first user interface with a second user interface corresponding to the user interface object; if the input meets the input threshold and does not meet a greater, second input threshold, the device displays, after detecting the end of the input, a first respective user interface region that includes information corresponding to the user interface object overlaying a portion of the first user interface; and if the input meets the greater, second input threshold, the device displays, prior to detecting the end of the input, the first respective user interface region that includes information corresponding to the user interface object overlaying a portion of the first user interface.

63 Claims, 164 Drawing Sheets

Related U.S. Application Data

(60) Provisional application No. 62/855,986, filed on Jun. 1, 2019, provisional application No. 62/756,560, filed on Nov. 6, 2018.

(51) Int. Cl.
*G06F 3/04845* (2022.01)
*G06F 3/0486* (2013.01)

(56) References Cited

U.S. PATENT DOCUMENTS

| | | |
|---|---|---|
| 2012/0136737 A1 | 5/2012 | Lippolis |
| 2014/0145991 A1 | 5/2014 | Tamai et al. |
| 2014/0317547 A1* | 10/2014 | Bi ................ G06F 3/04883 715/773 |
| 2015/0143273 A1* | 5/2015 | Bernstein ........... G06F 3/04842 715/767 |
| 2015/0301733 A1* | 10/2015 | Acevedo ............. G06F 3/0488 715/771 |
| 2016/0062541 A1 | 3/2016 | Anzures et al. |
| 2016/0334880 A1* | 11/2016 | Favre ................ G06K 9/00335 |
| 2017/0168711 A1* | 6/2017 | Temple ............. G06F 3/04886 |
| 2017/0220245 A1* | 8/2017 | Ding .................. G06F 3/04883 |
| 2017/0358181 A1 | 12/2017 | Moussette et al. |
| 2018/0188906 A1 | 7/2018 | Carter |

OTHER PUBLICATIONS

Notice of Allowance, dated Oct. 19, 2020, received in U.S. Appl. No. 16/574,033, 8 pages.

Invitation to Pay Additional Fees, dated Feb. 3, 2020, received in International Patent Application No. PCT/US2019/053119, which corresponds with U.S. Appl. No. 16/574,033, 26 pages.

International Search Report and Written Opinion, dated Apr. 1, 2020, received in International Application No. PCT/US2019/053119, which corresponds with U.S. Appl. No. 16/574,033, 29 pages.

* cited by examiner

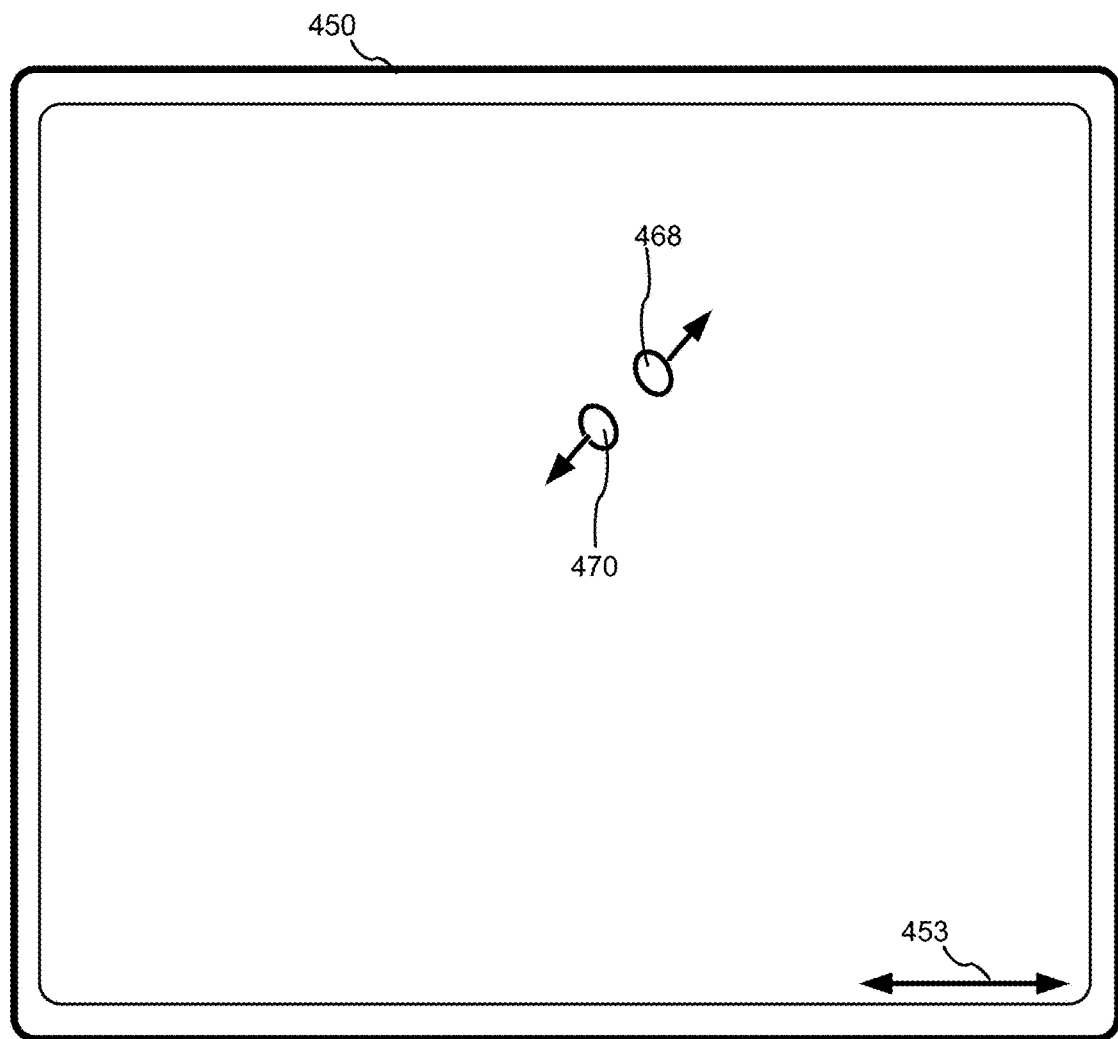
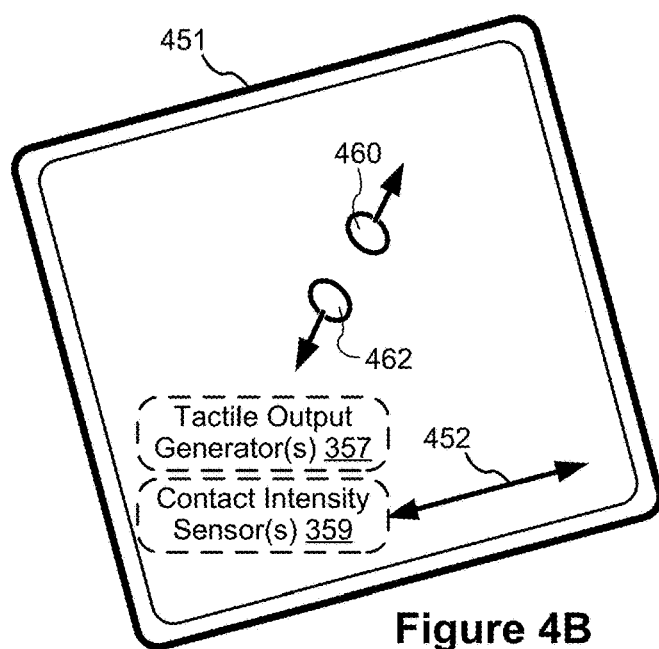
Figure 4B

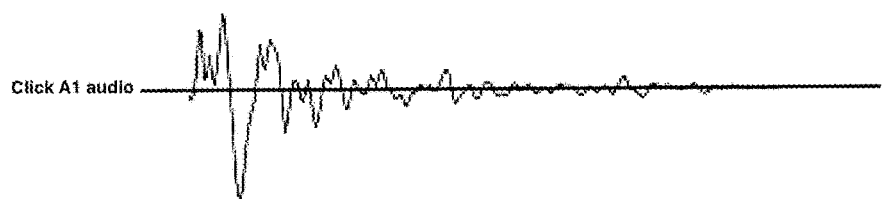
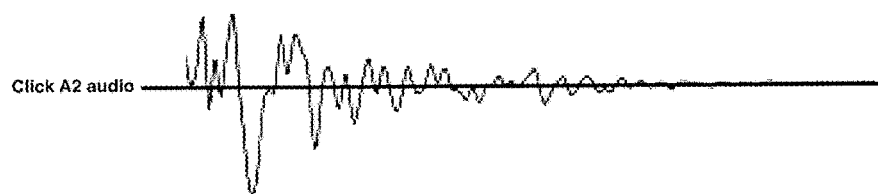
Figure 4H
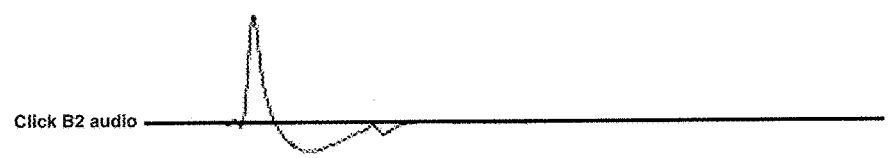
Figure 4I
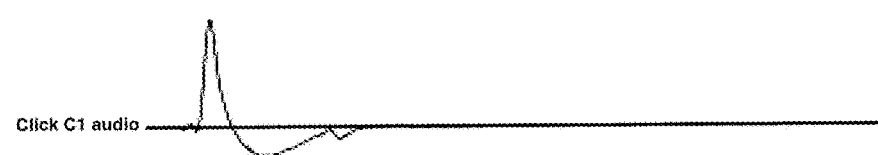
Figure 4J

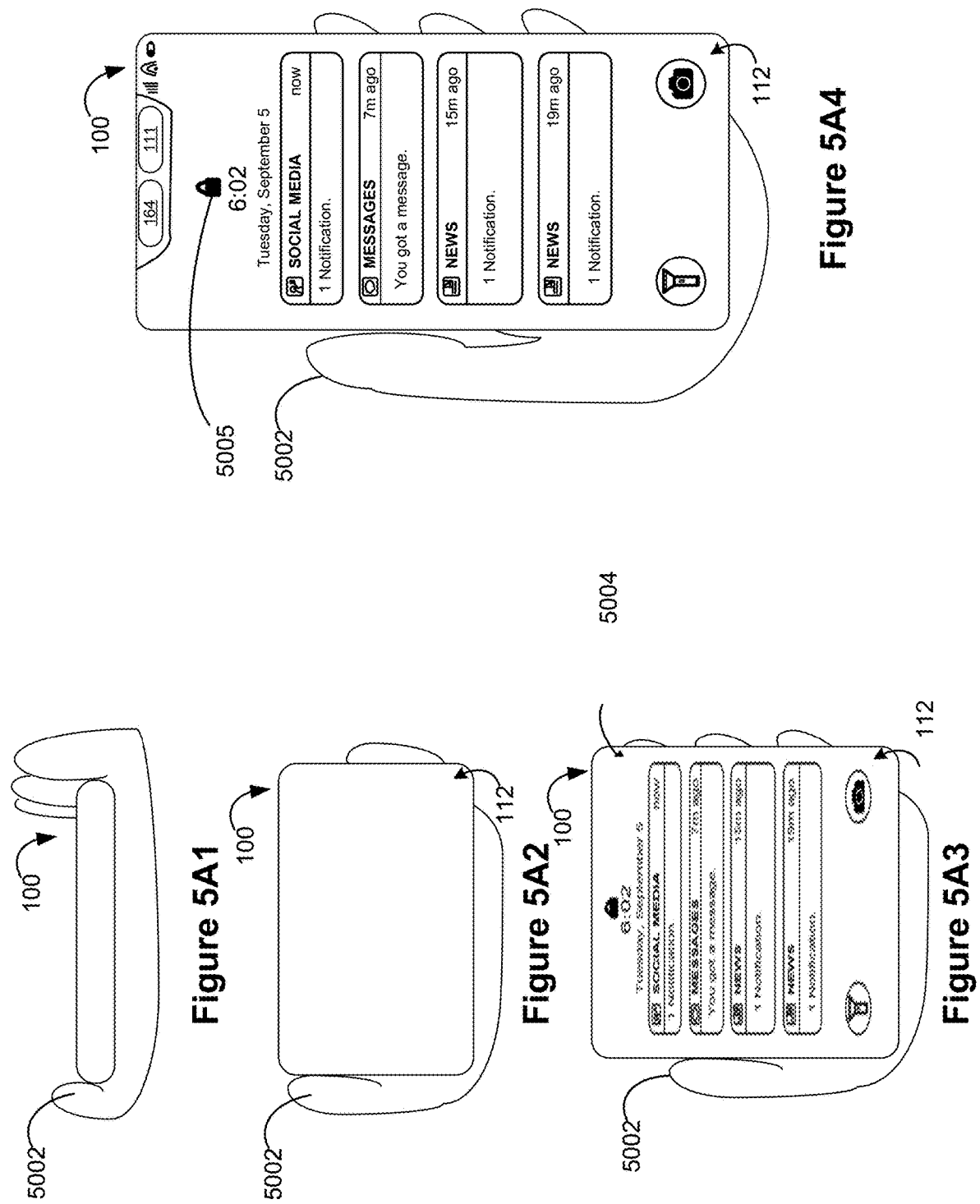

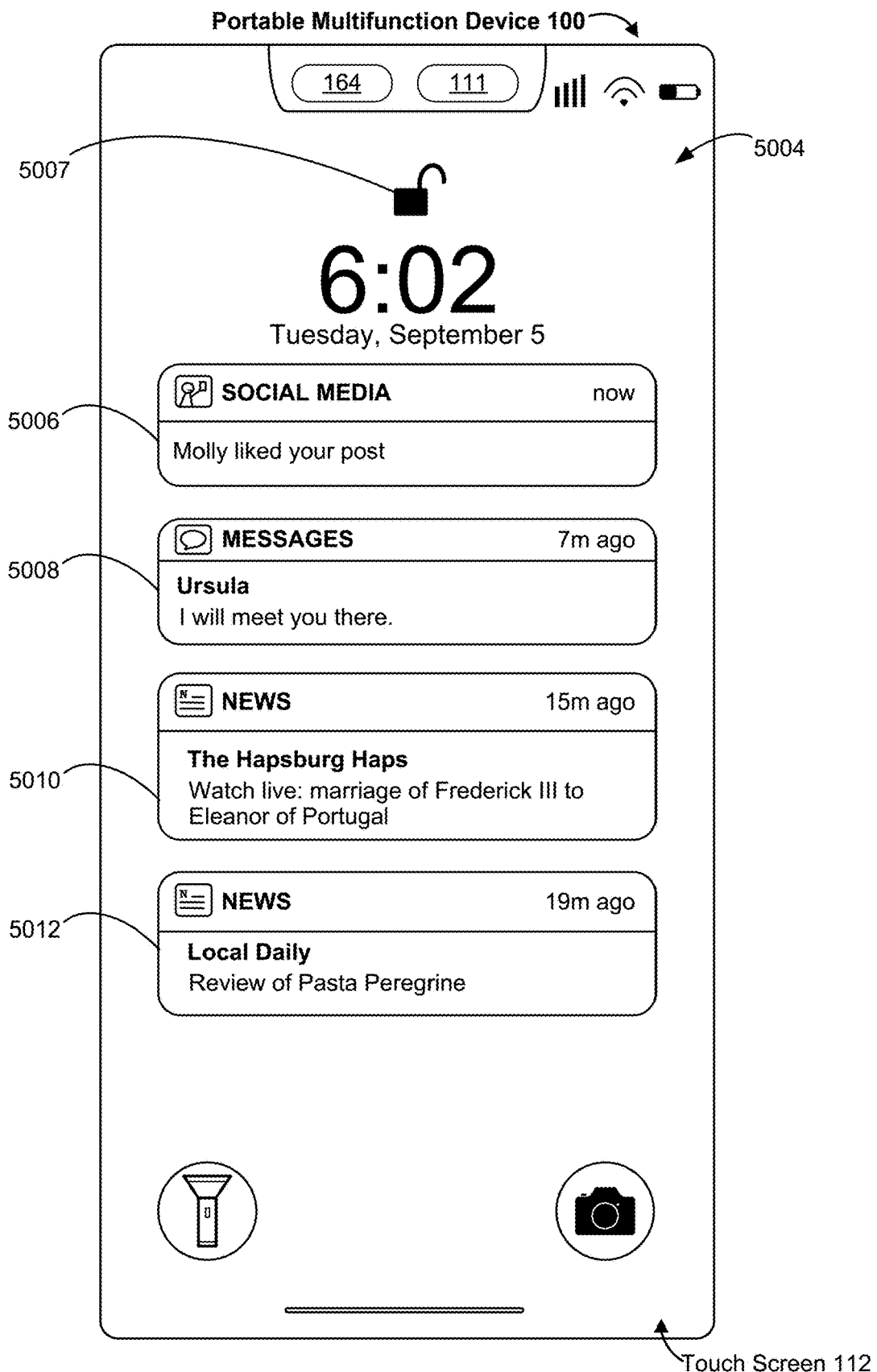
Figure 5A5

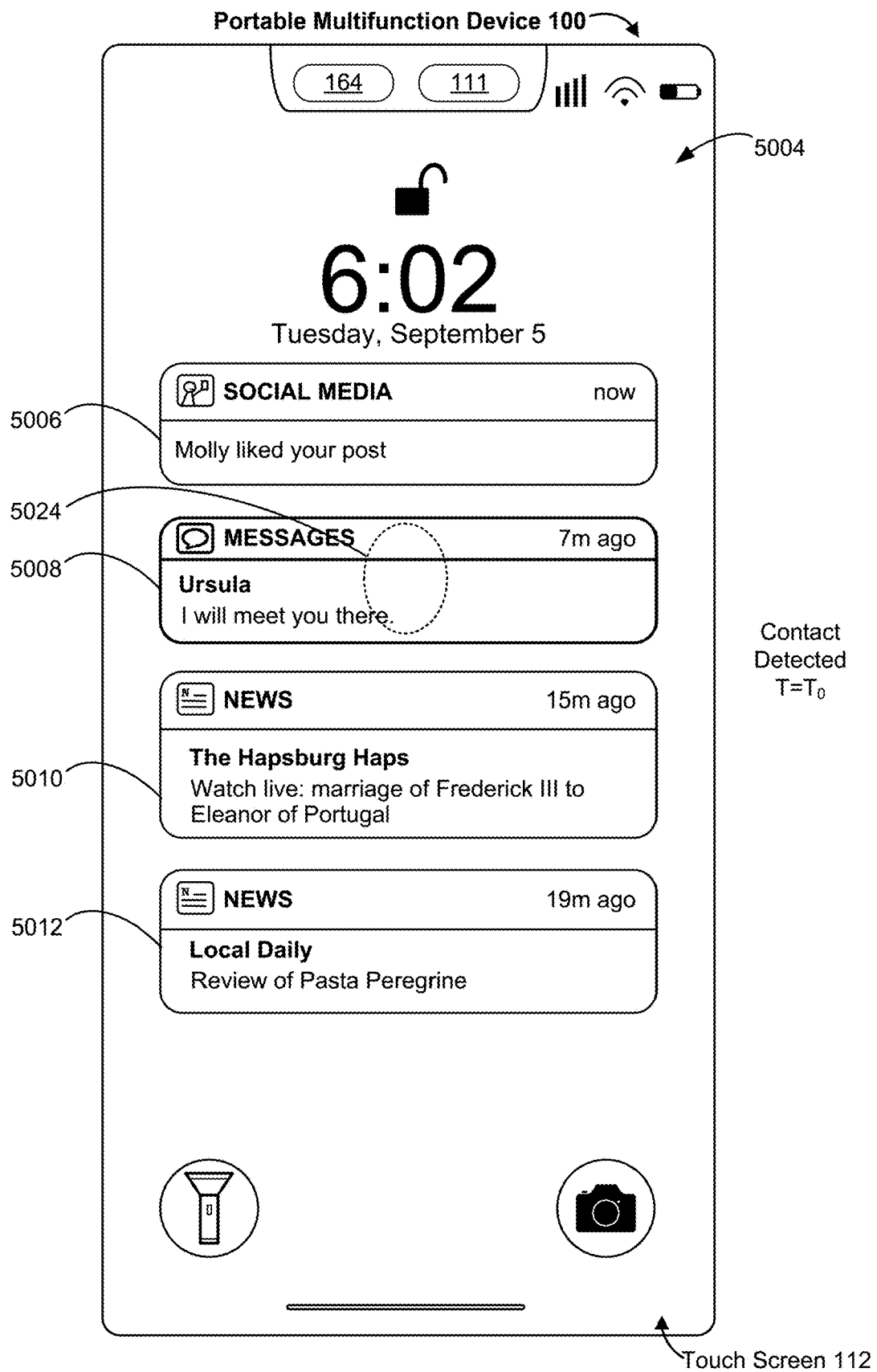
Figure 5A6

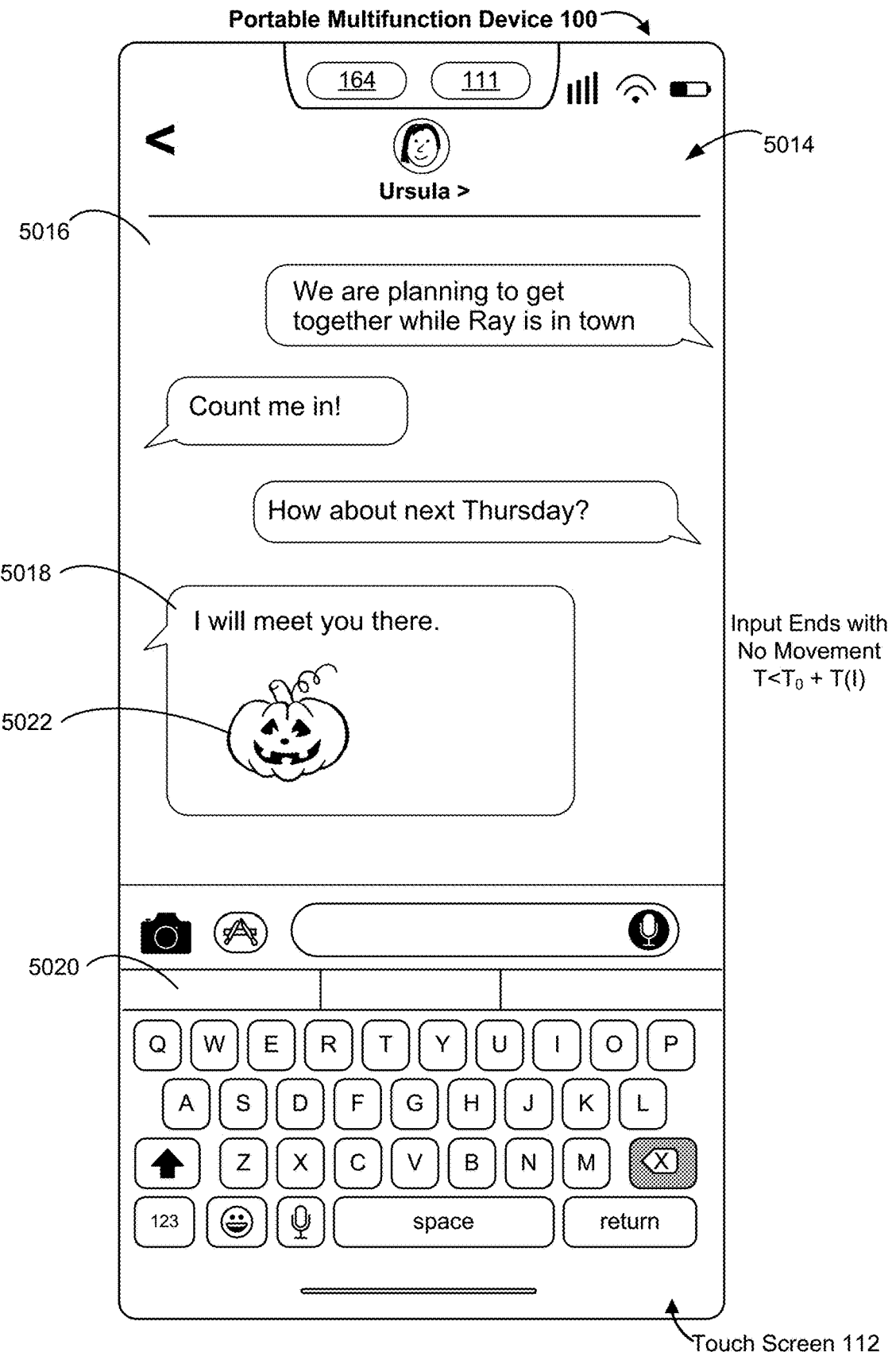
Figure 5A7 (Continues from 5A6)

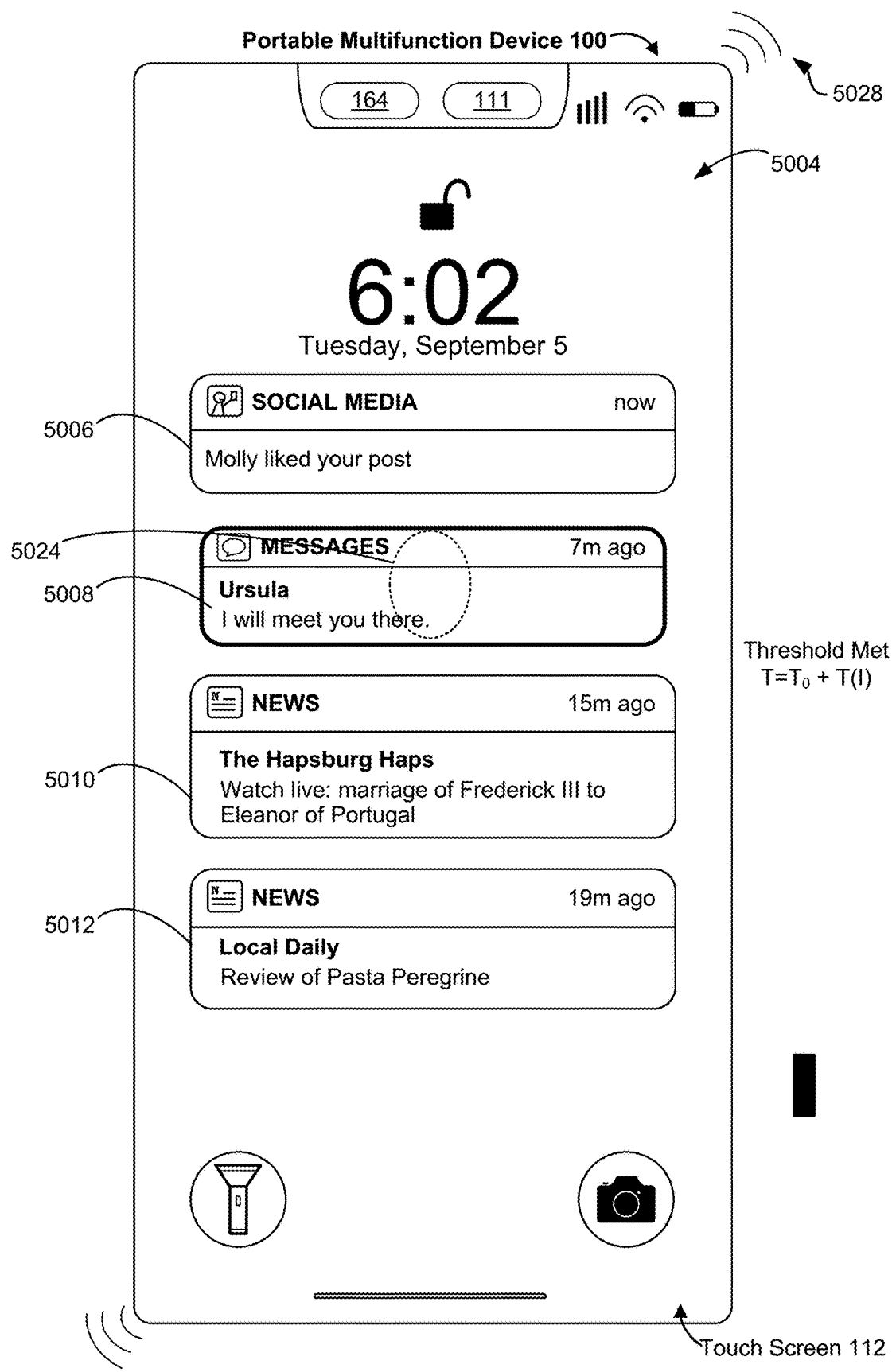
Figure 5A8 (Continues from 5A6)

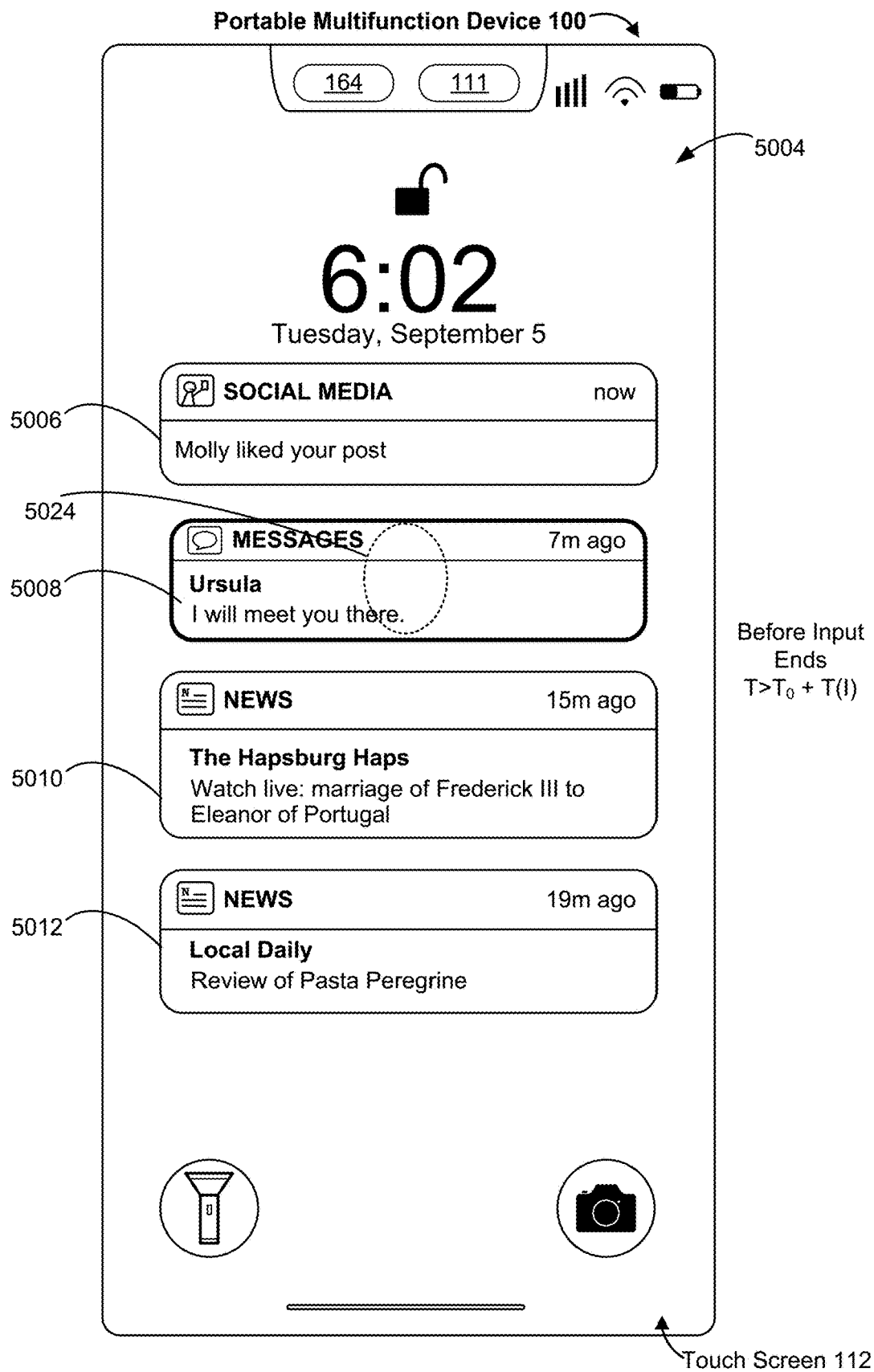
Figure 5A9

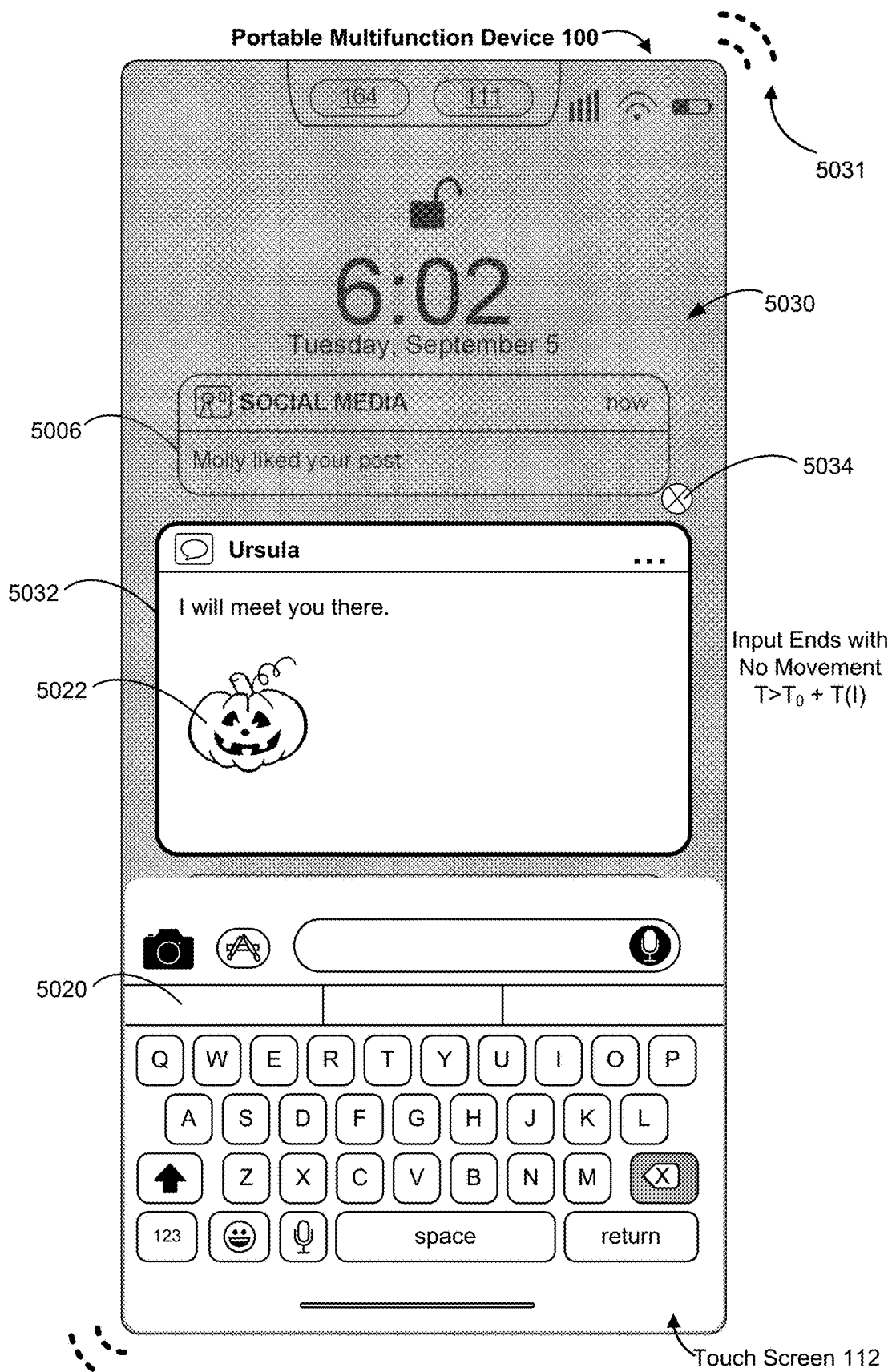
Figure 5A10 (Continue from 5A8 or 5A9)

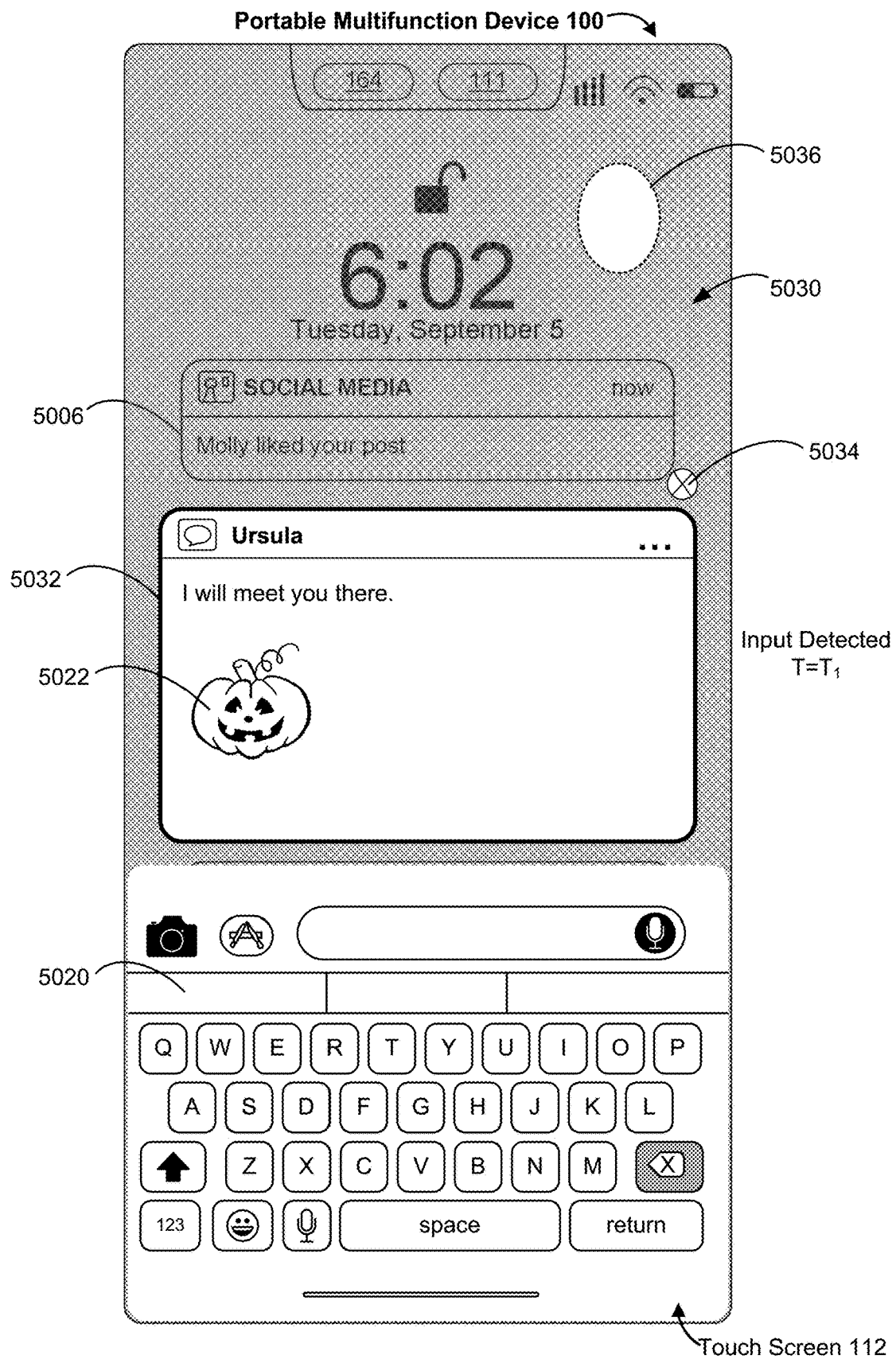
Figure 5A11

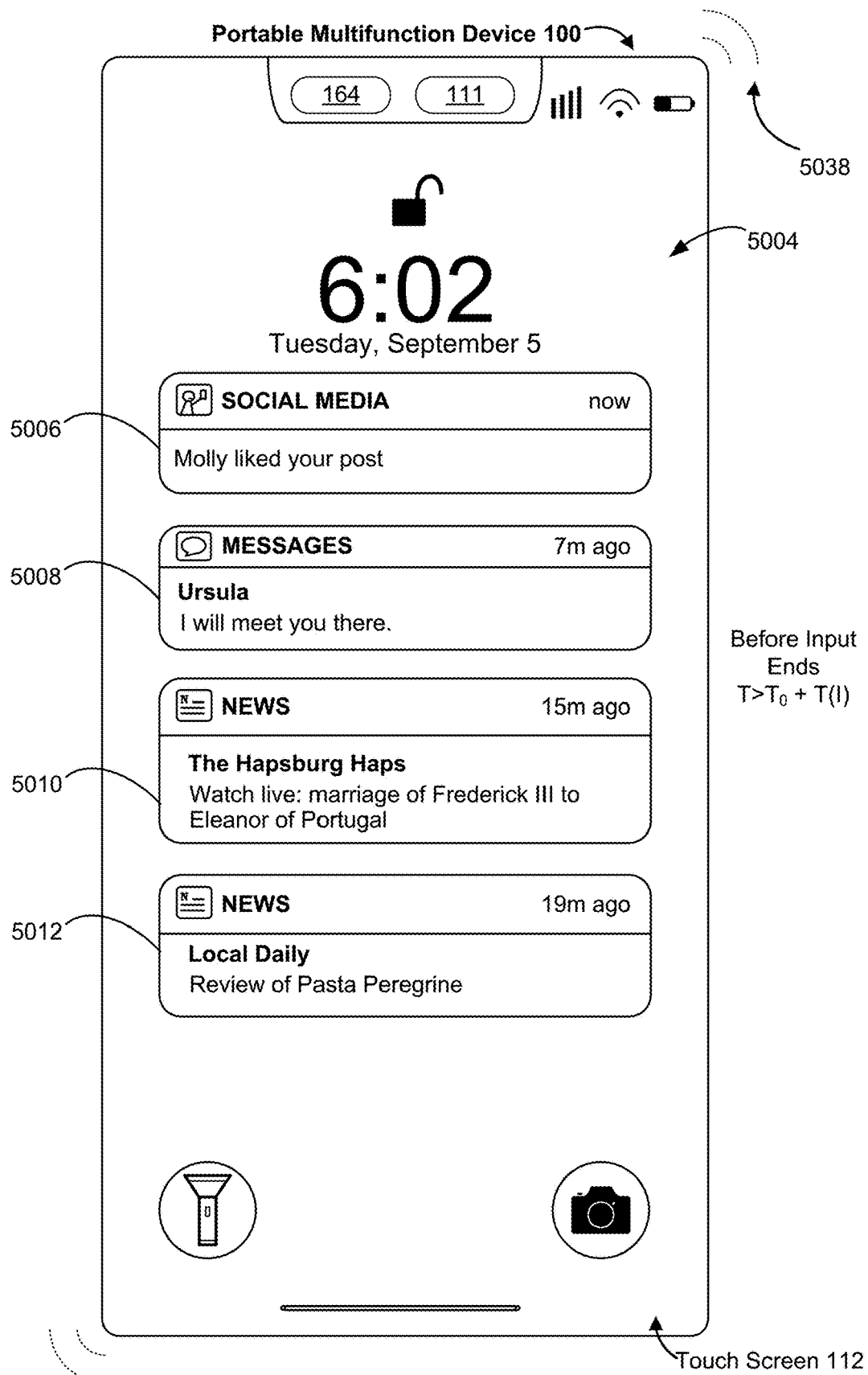
Figure 5A12

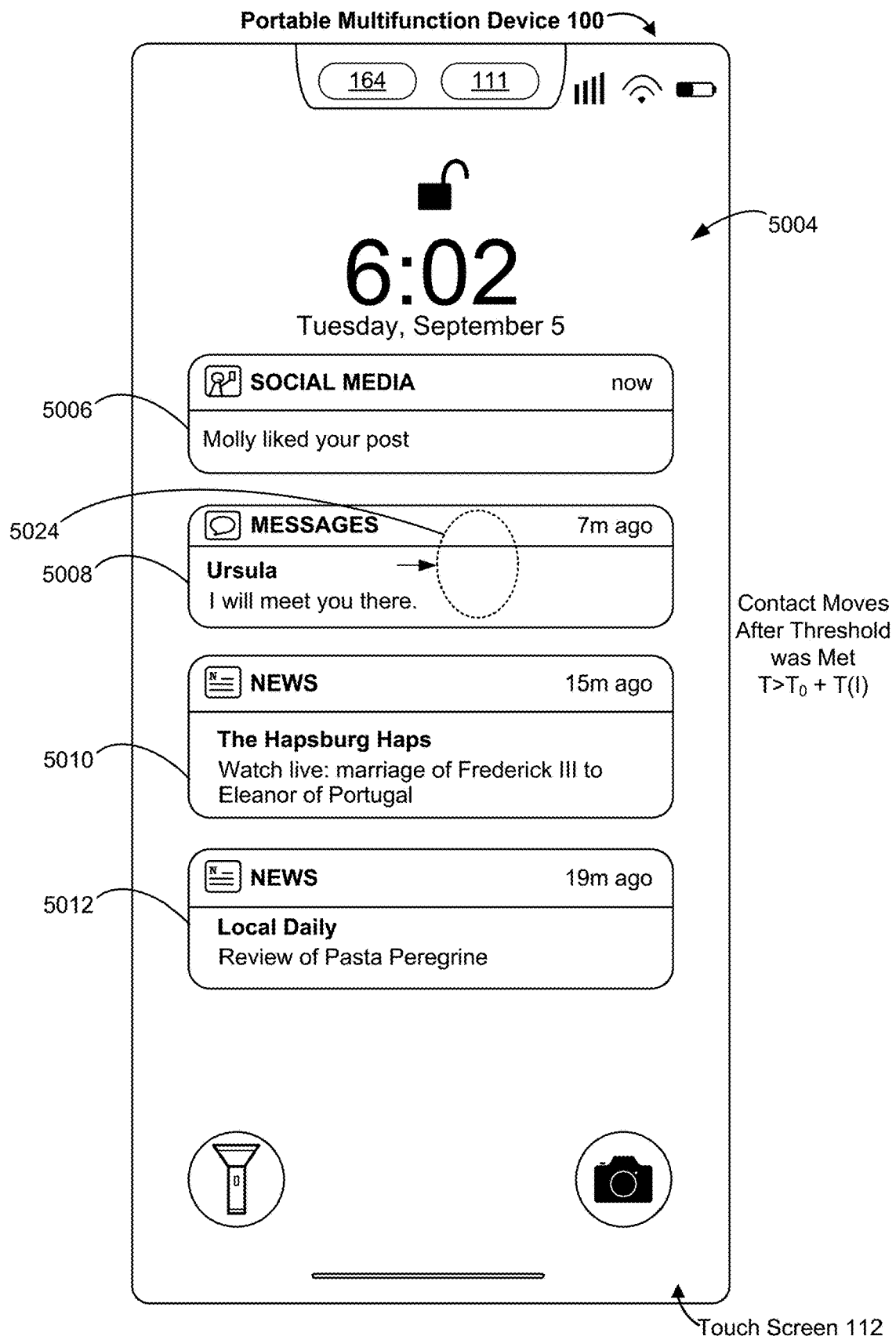
Figure 5A13 (Continue from 5A8 or 5A9)

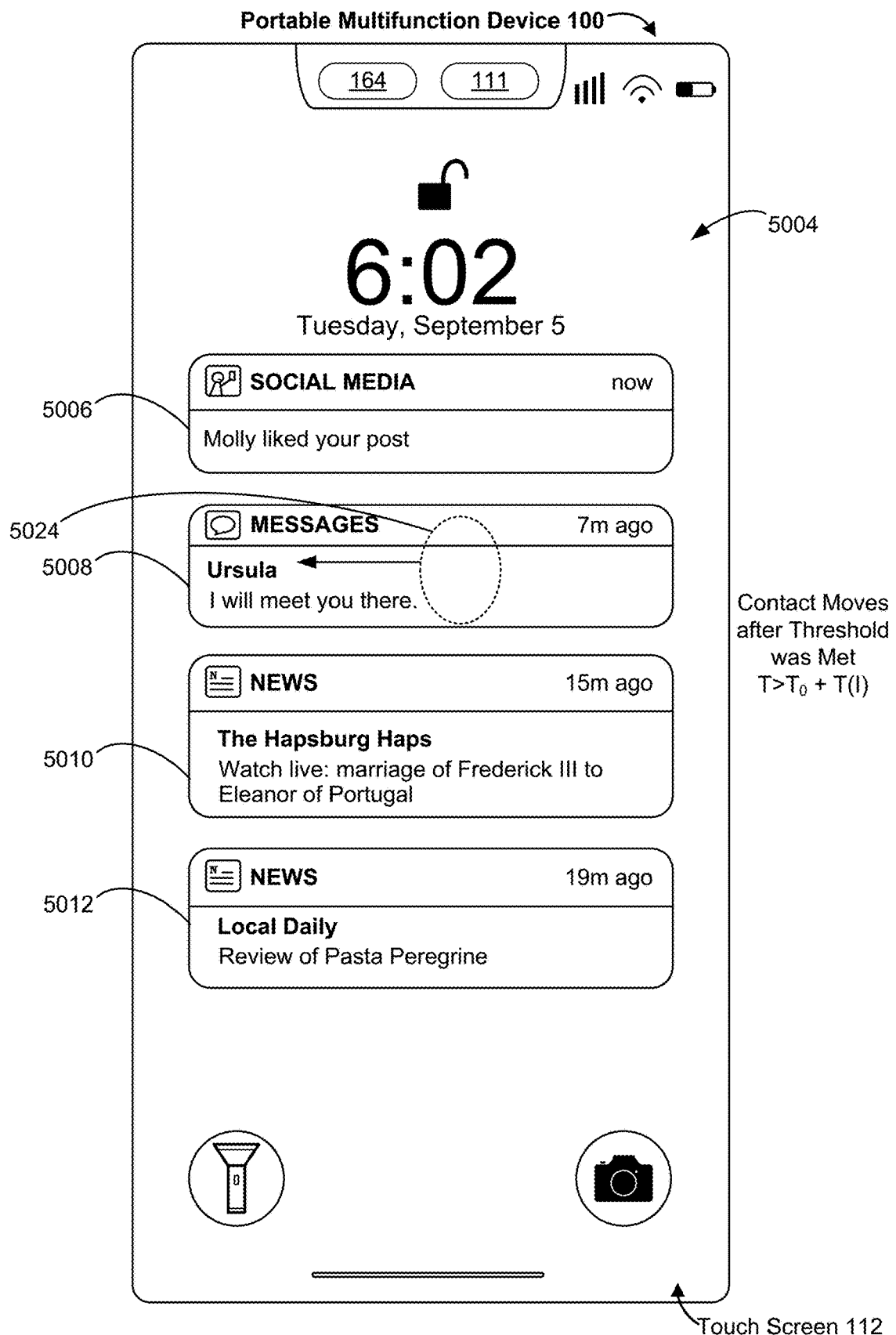
Figure 5A14 (Continue from 5A6)

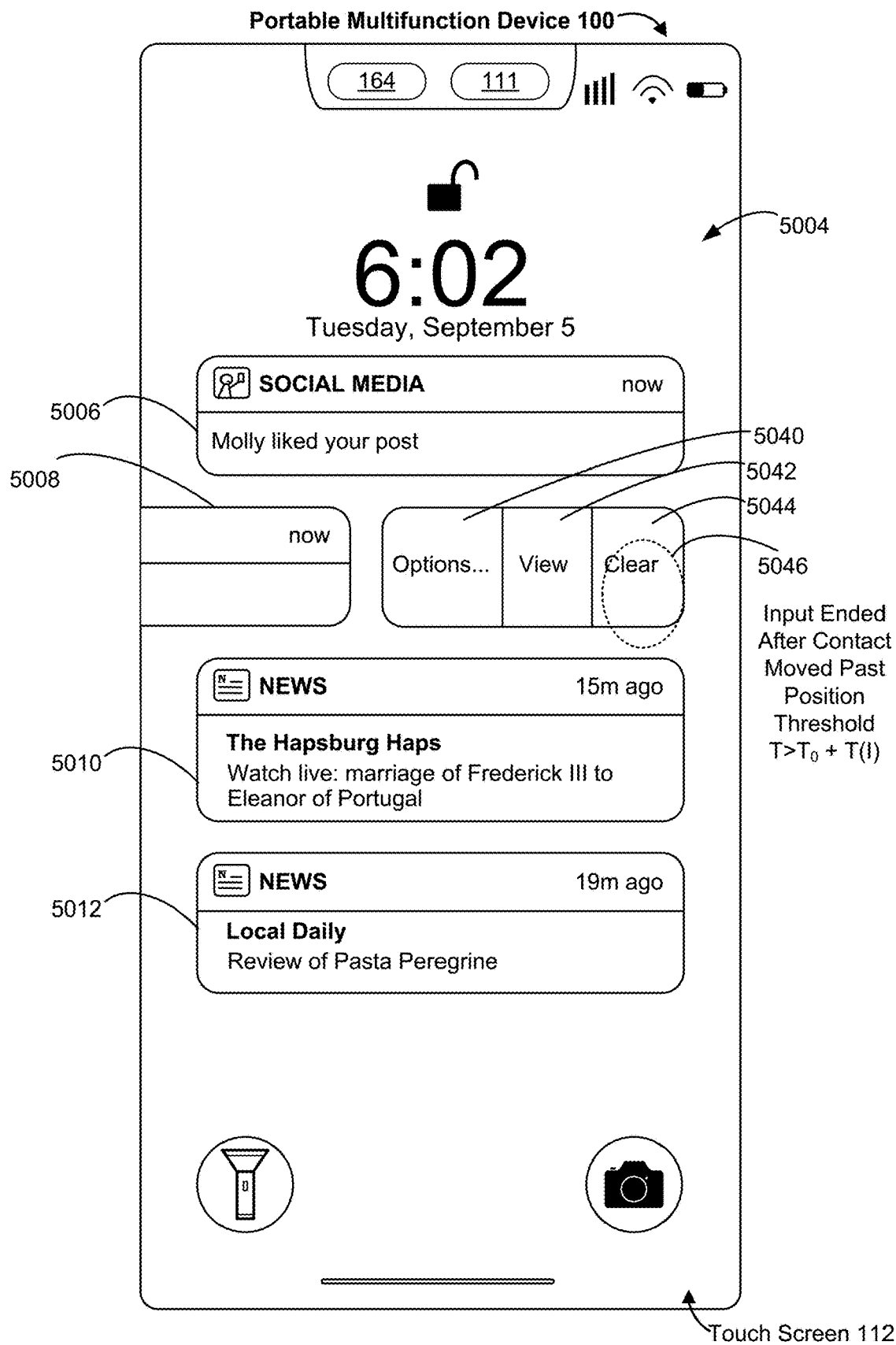
Figure 5A15

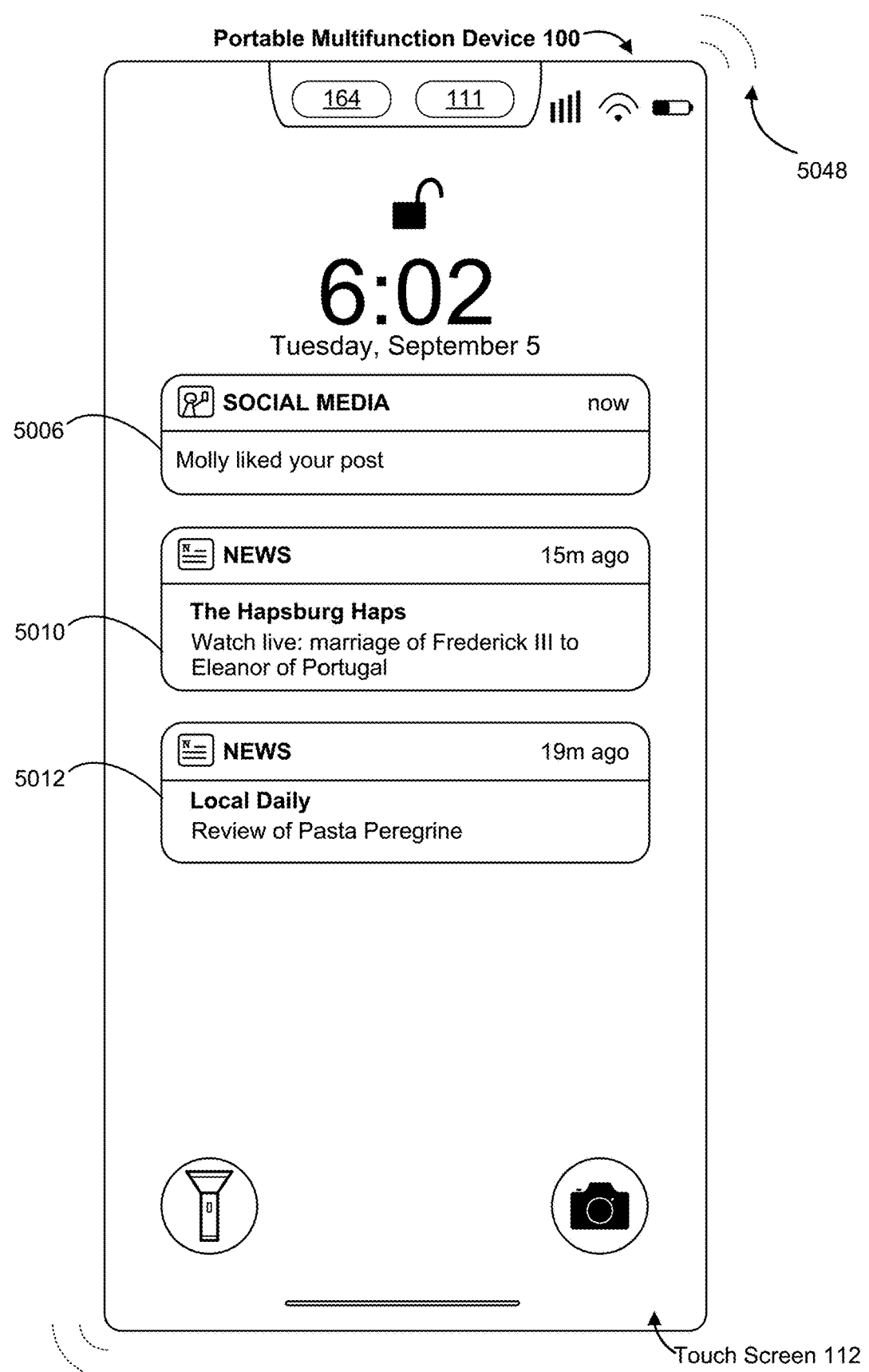
Figure 5A16

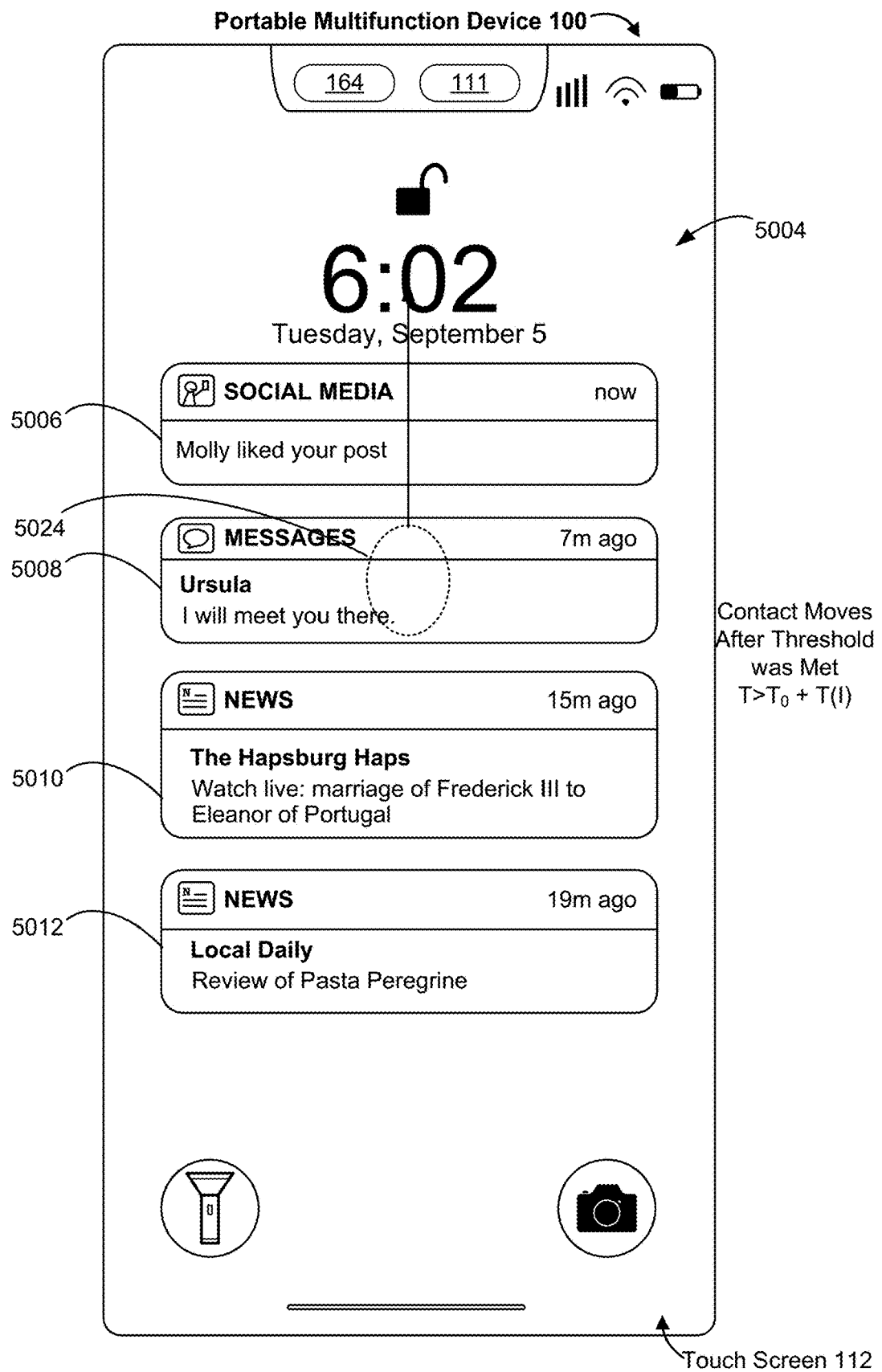
Figure 5A17 (Continue from 5A6)

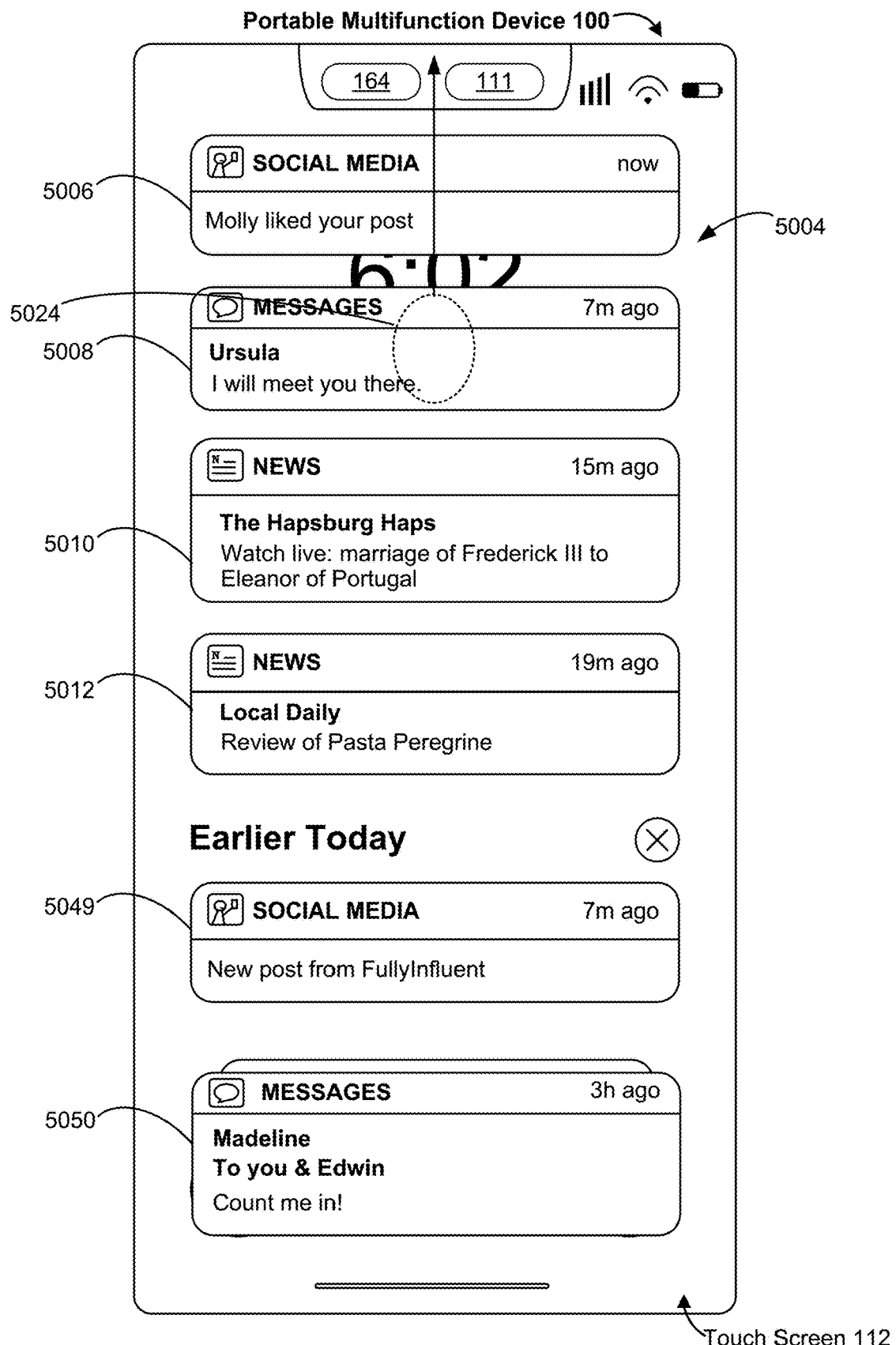
Figure 5A18

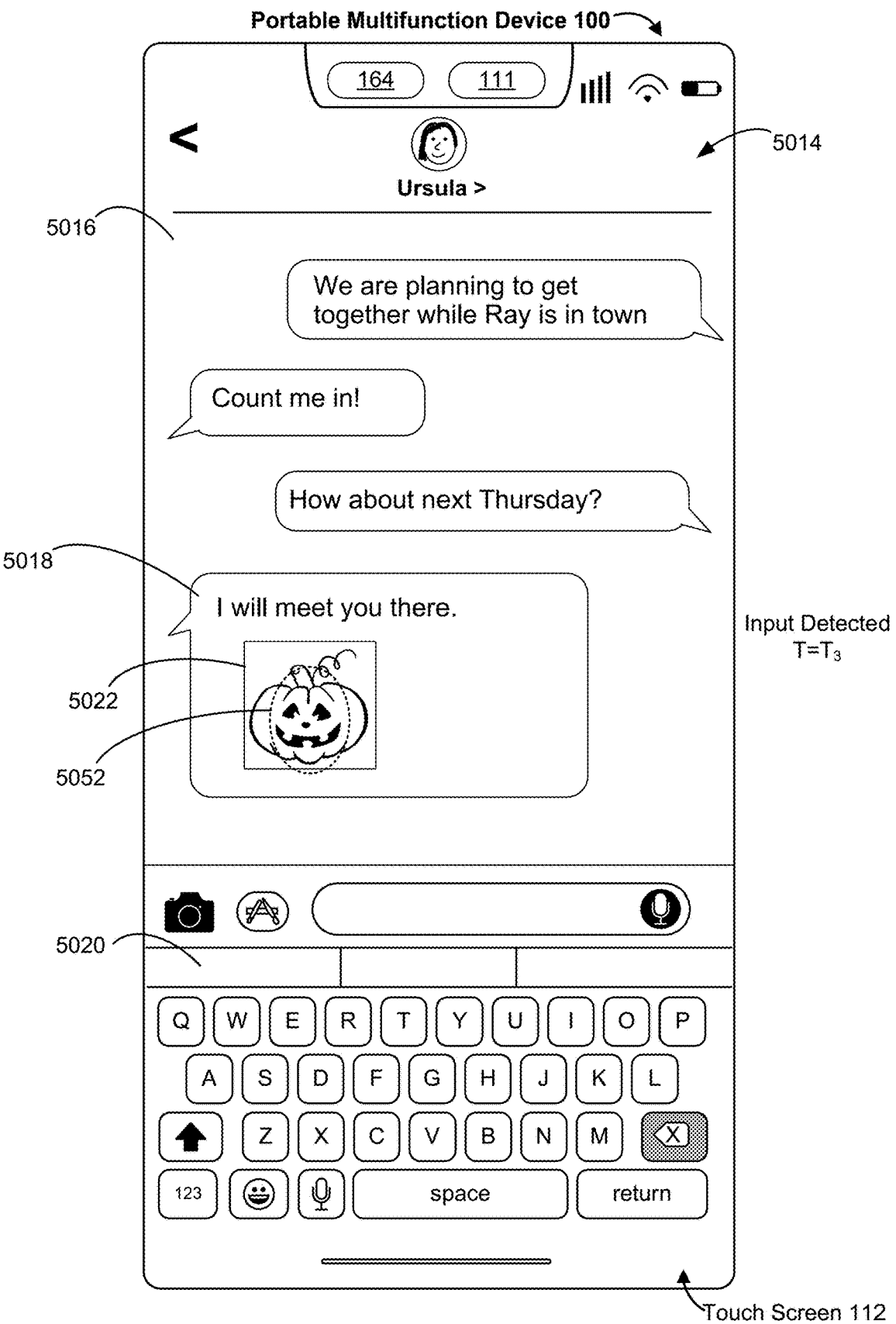
Figure 5A19 (Continue from 5A7)

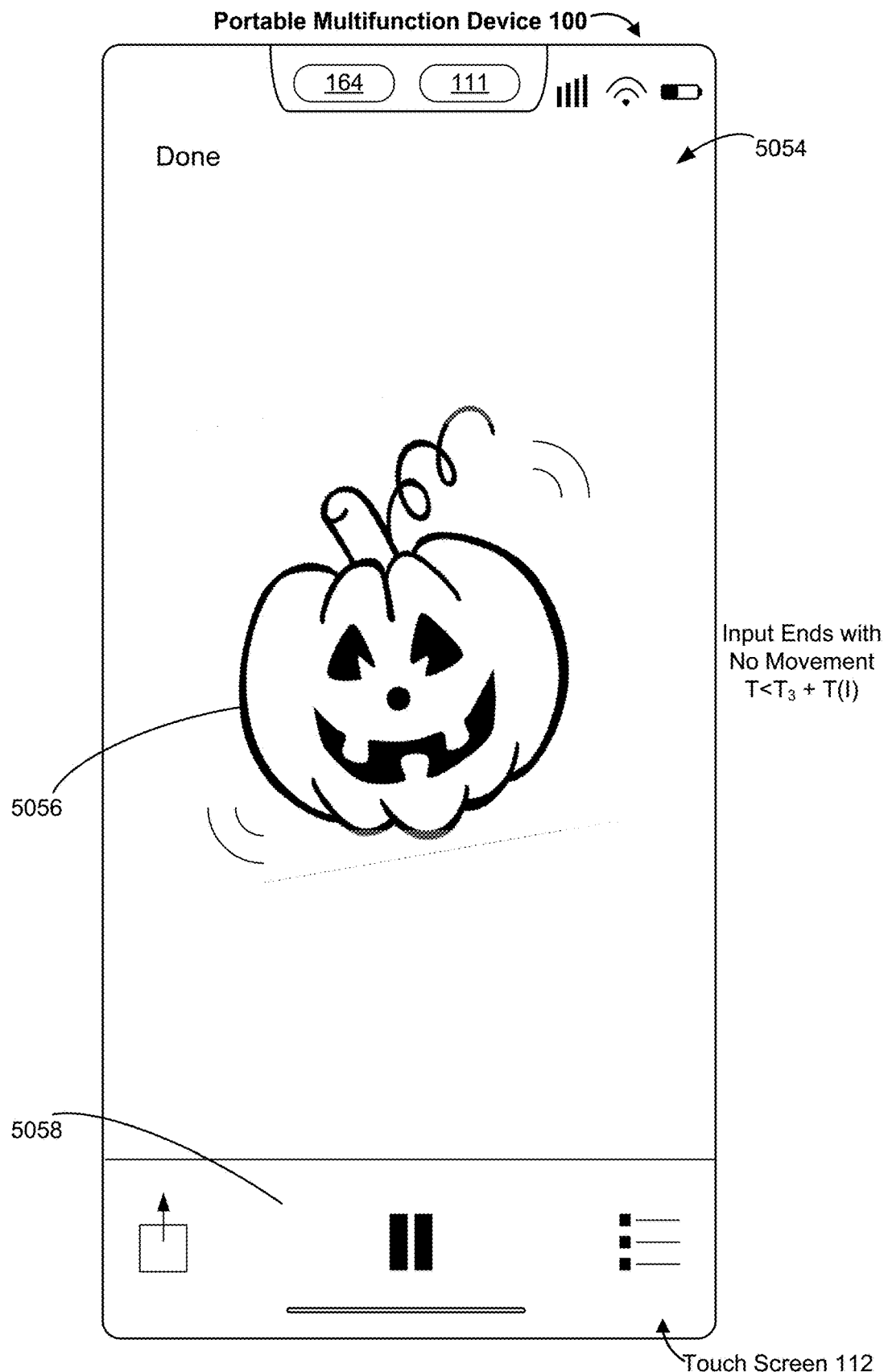
Figure 5A20

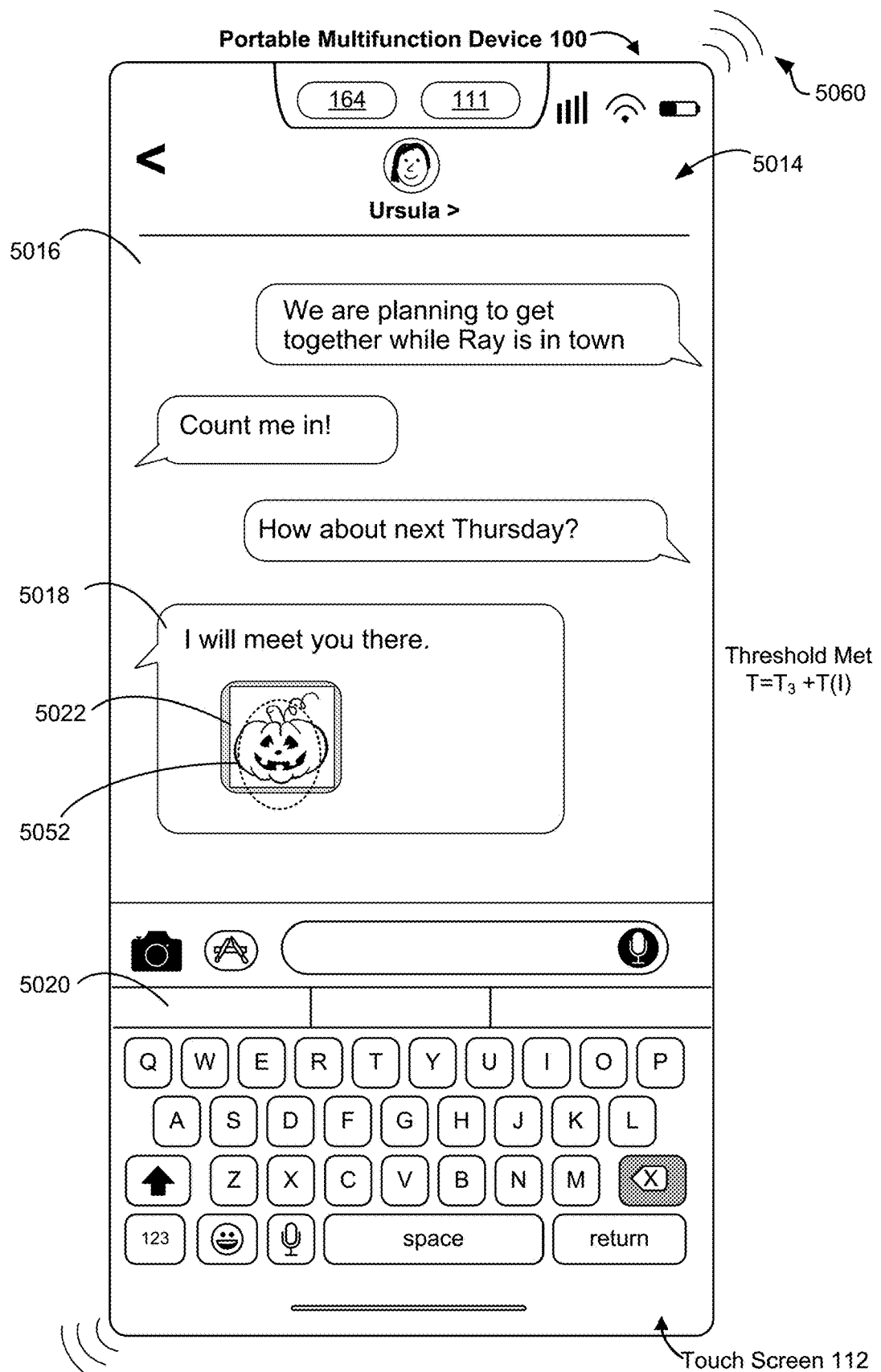
Figure 5A21 (Continue from 5A19)

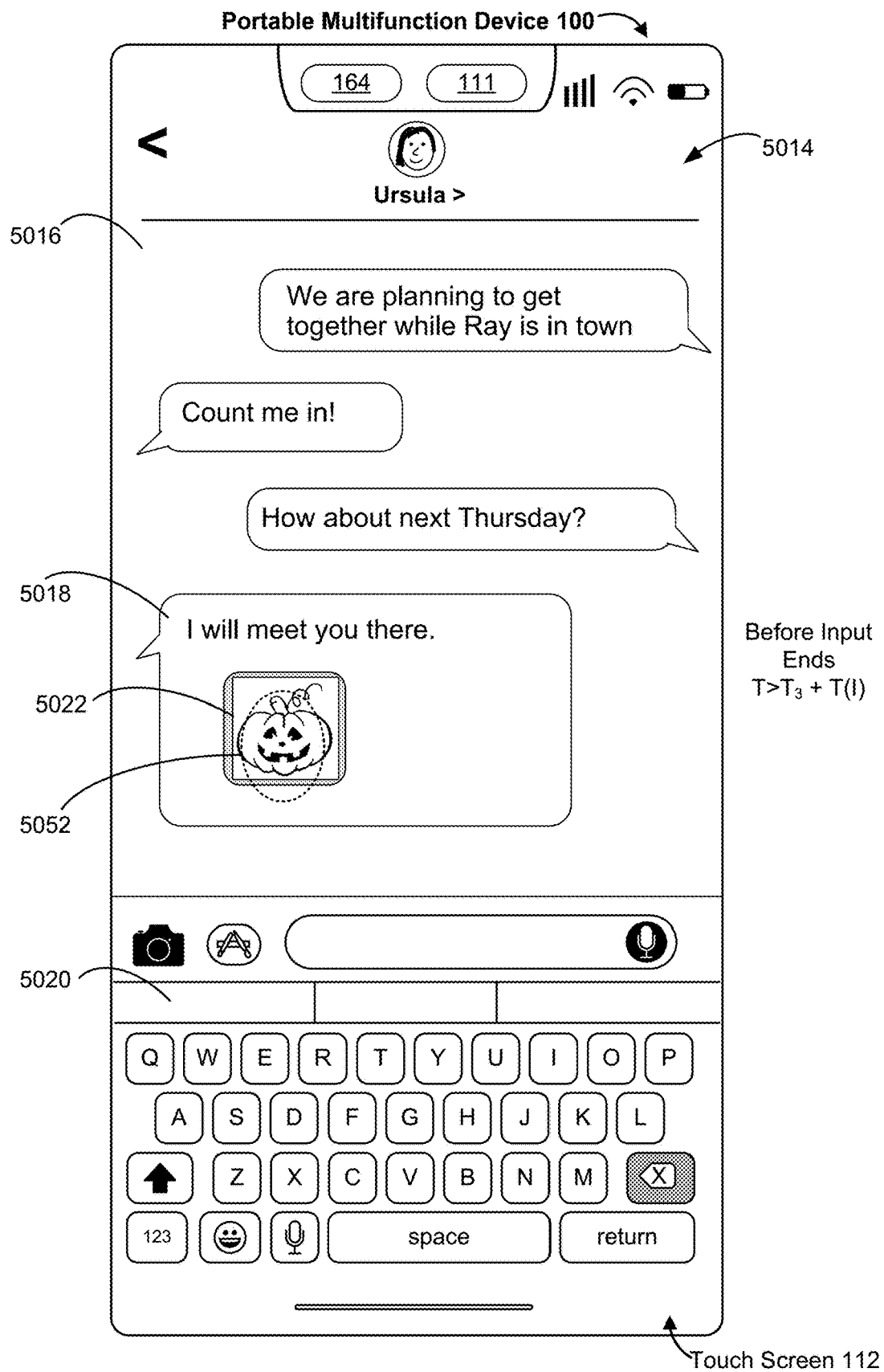
Figure 5A22

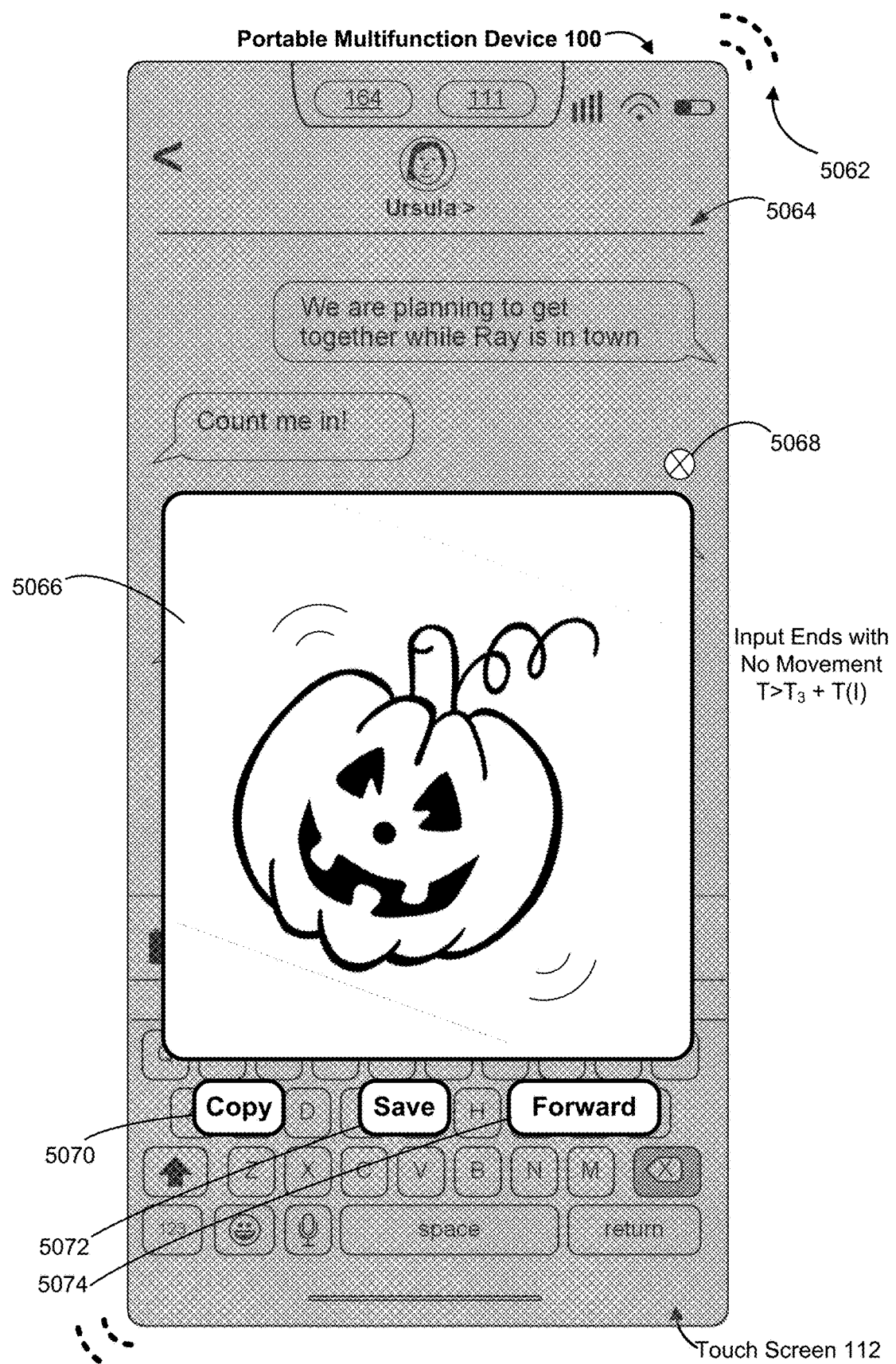
Figure 5A23 (Continue from 5A21 or 5A22)

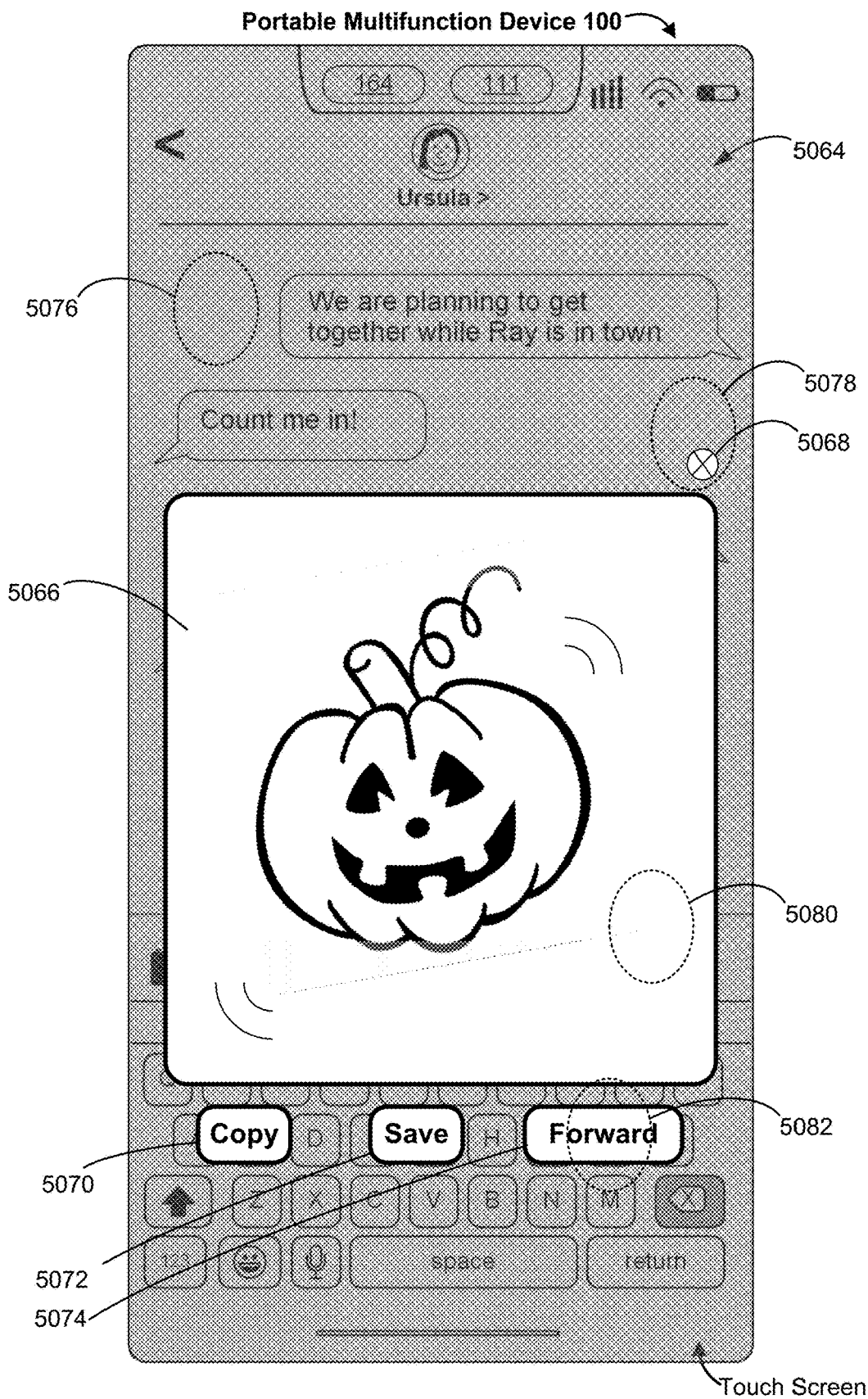
Figure 5A24

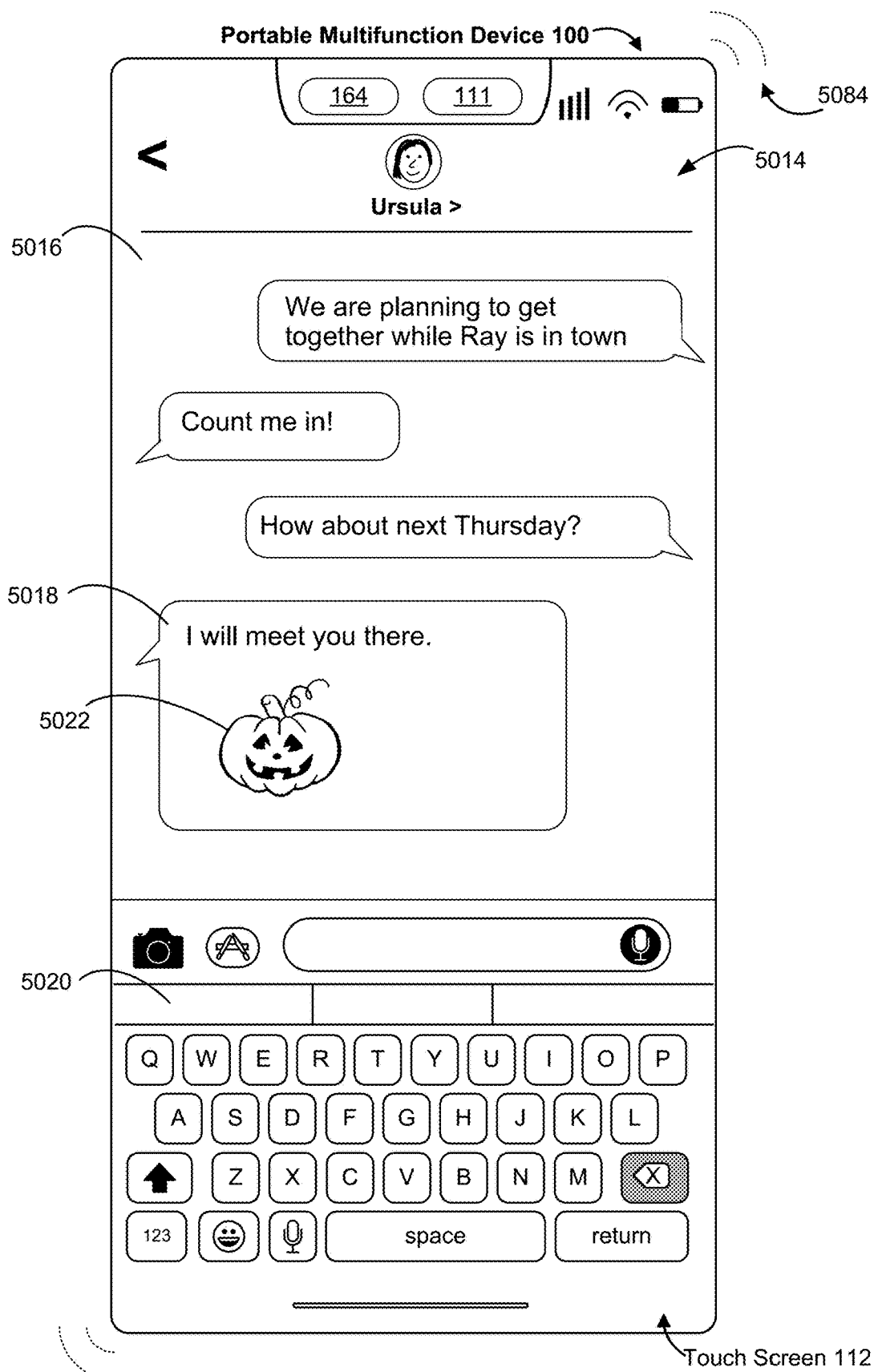
Figure 5A25

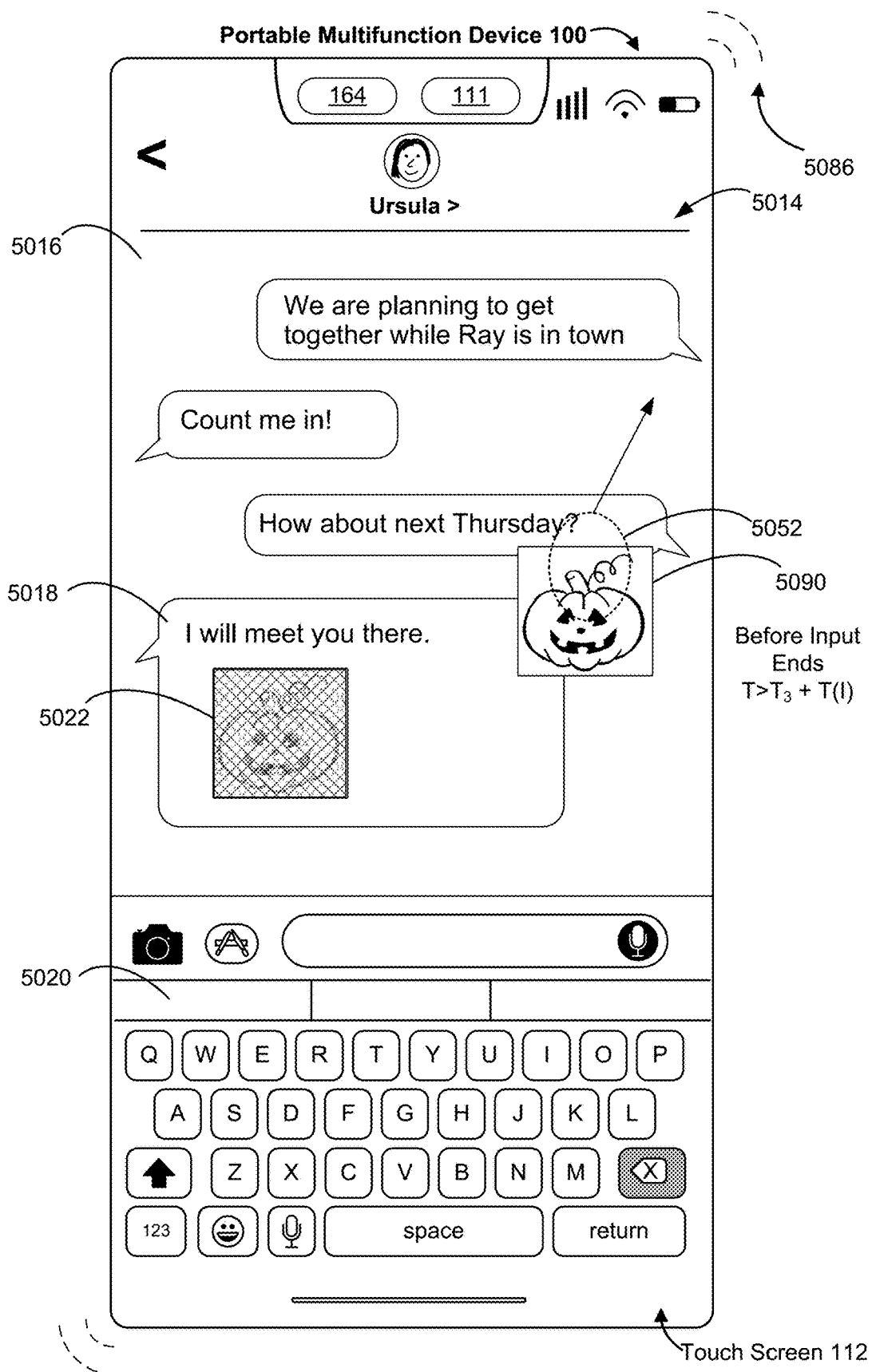
Figure 5A26 (Continue from 5A21 or 5A22)

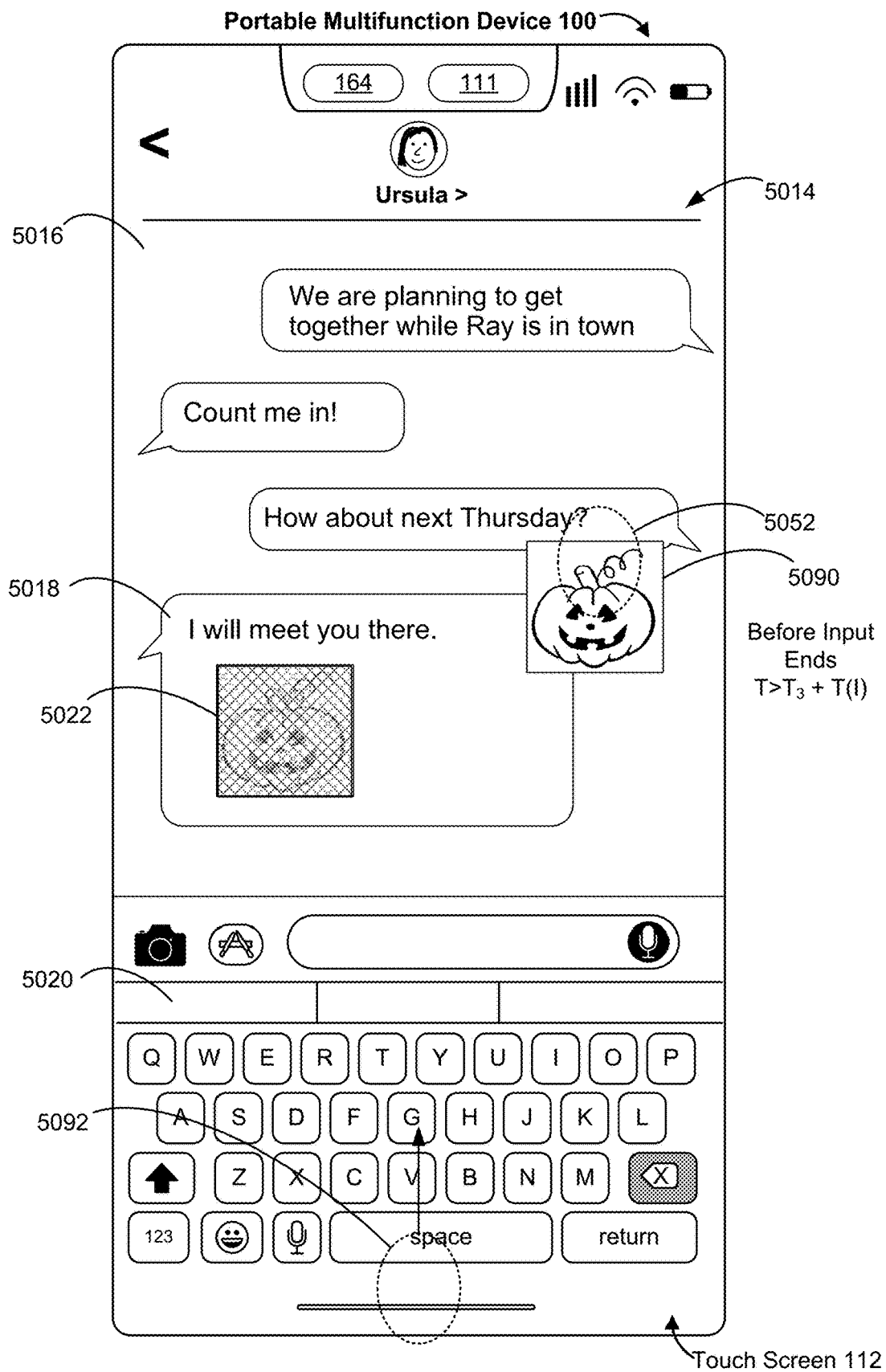
Figure 5A27

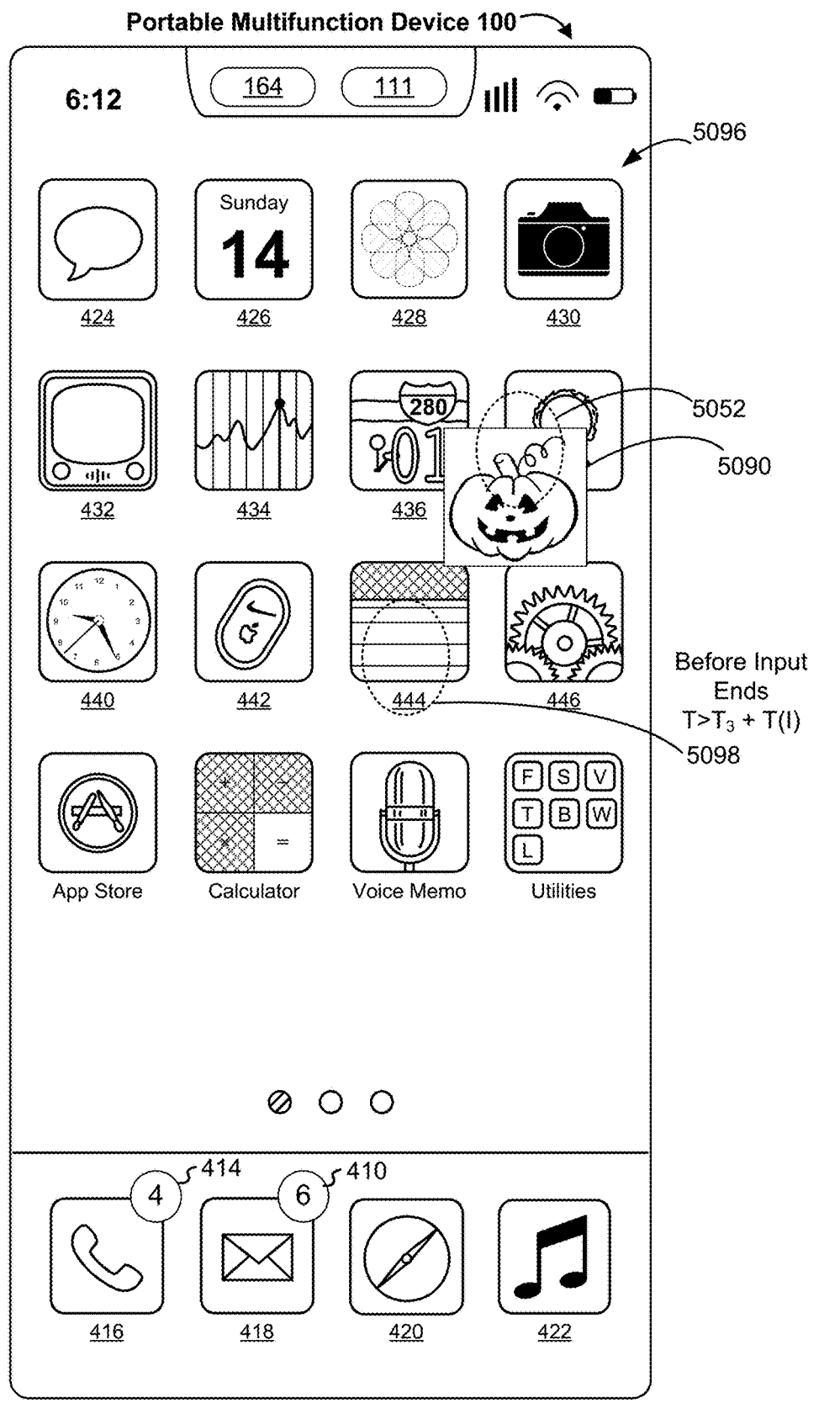
Figure 5A28

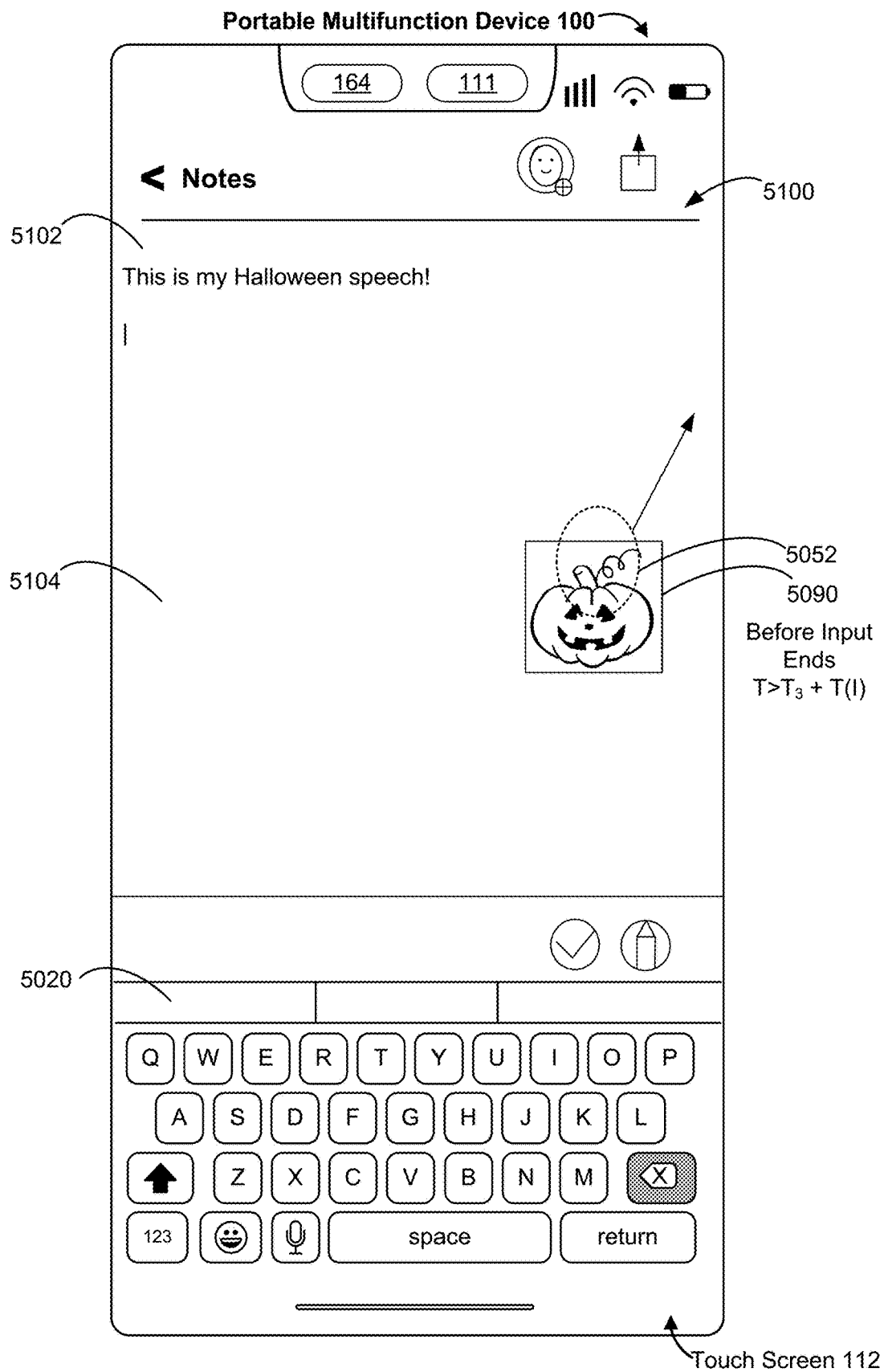
Figure 5A29

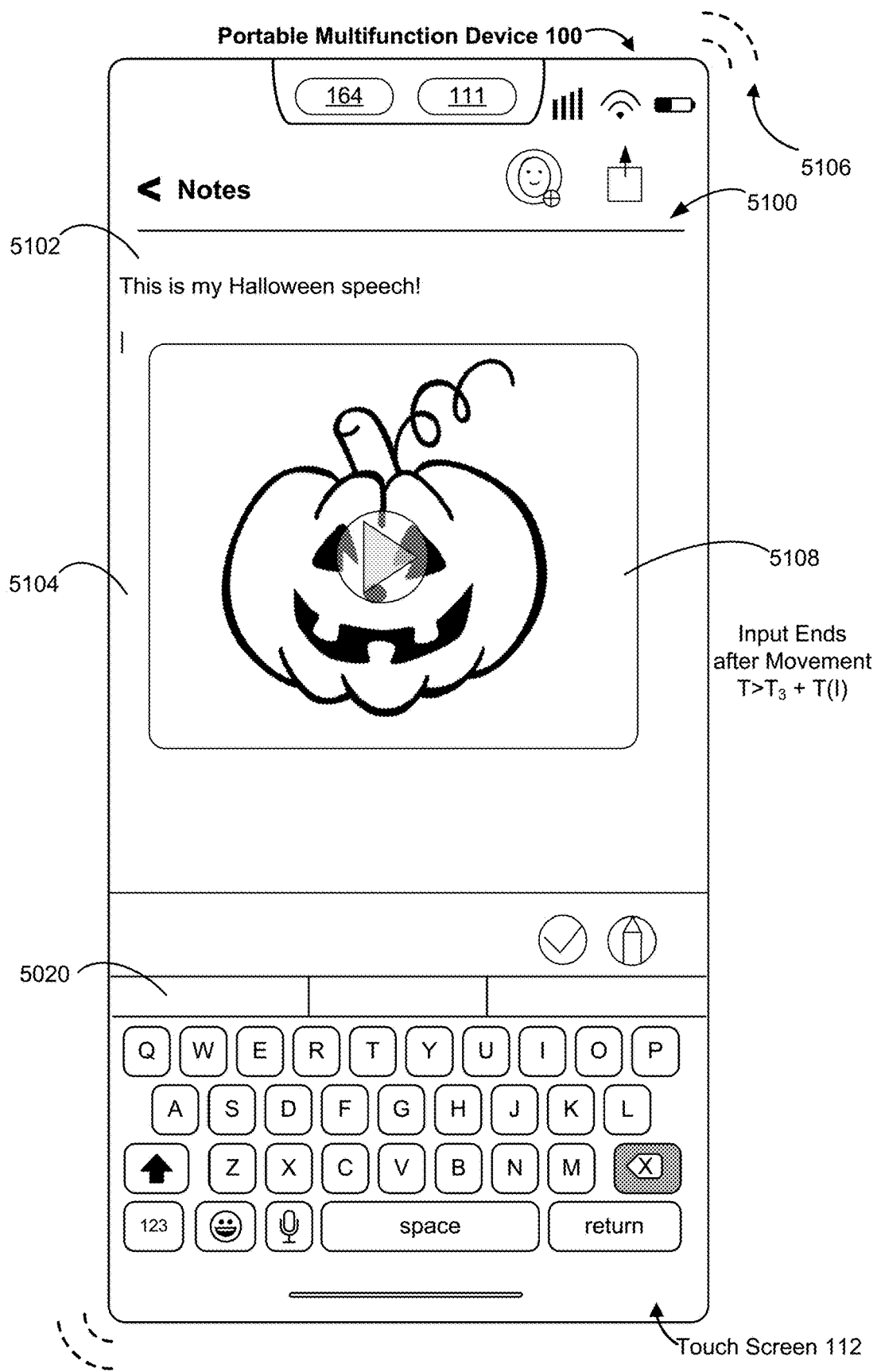
Figure 5A30

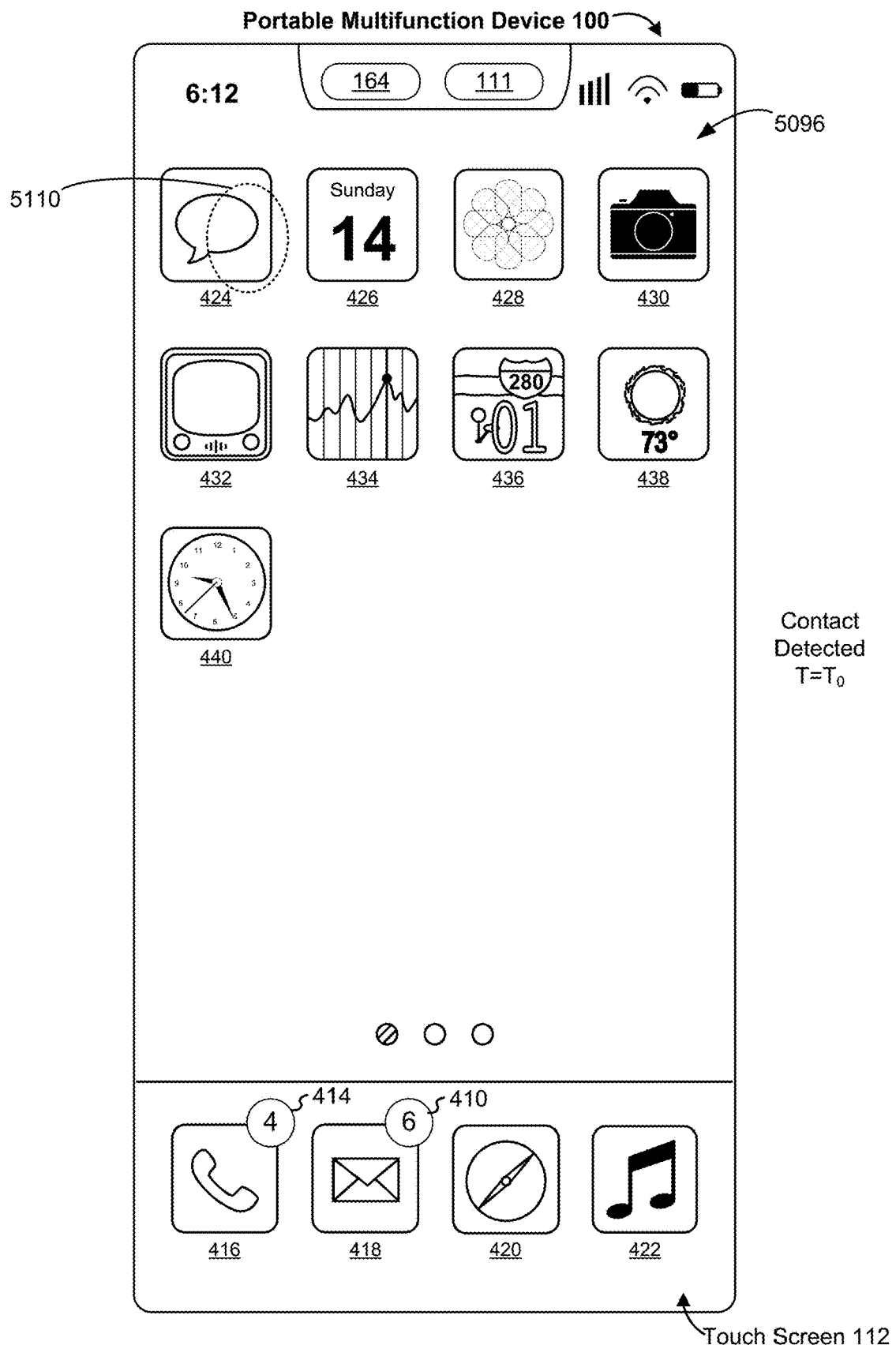
Figure 5A31

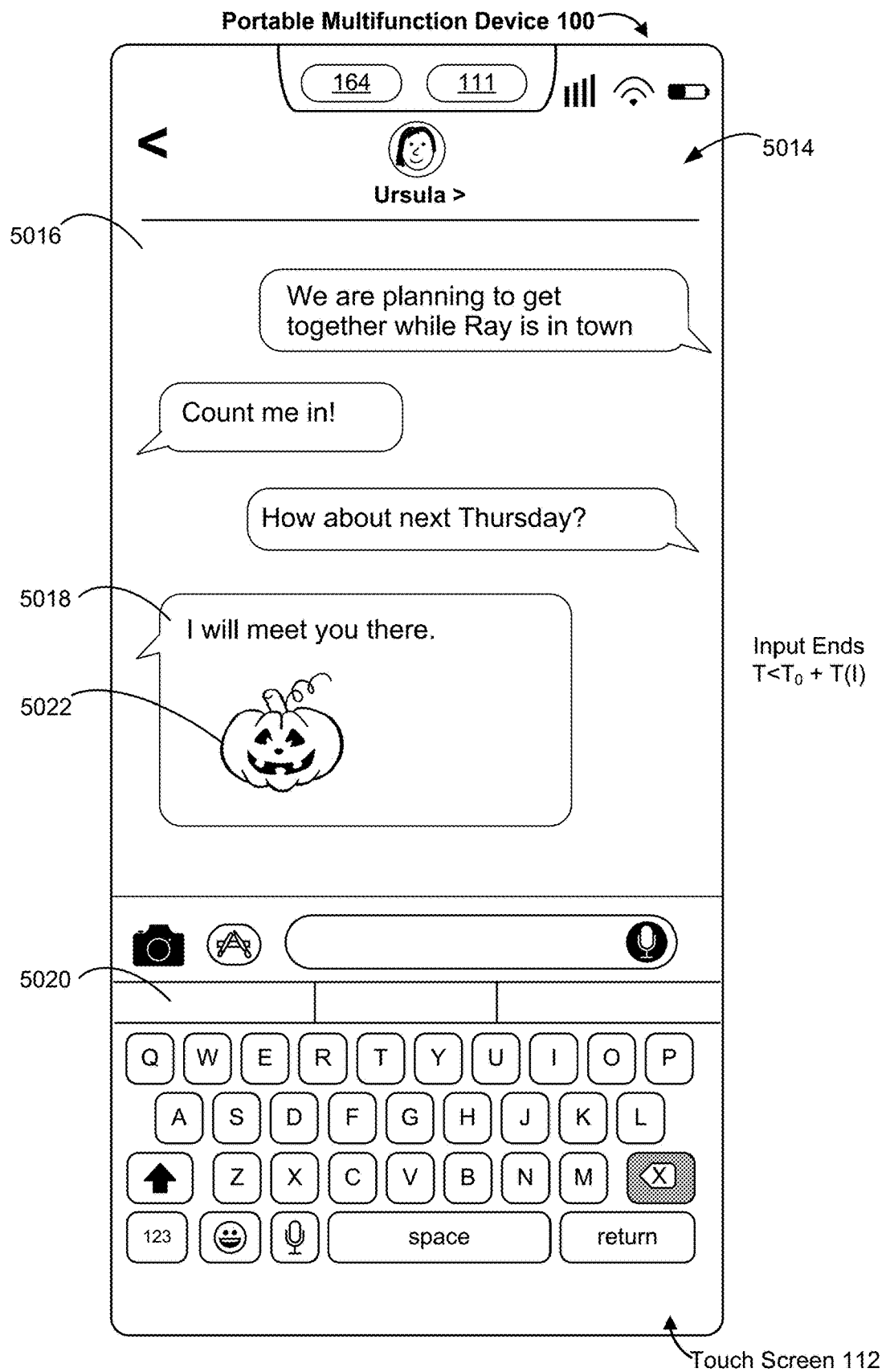
Figure 5A32

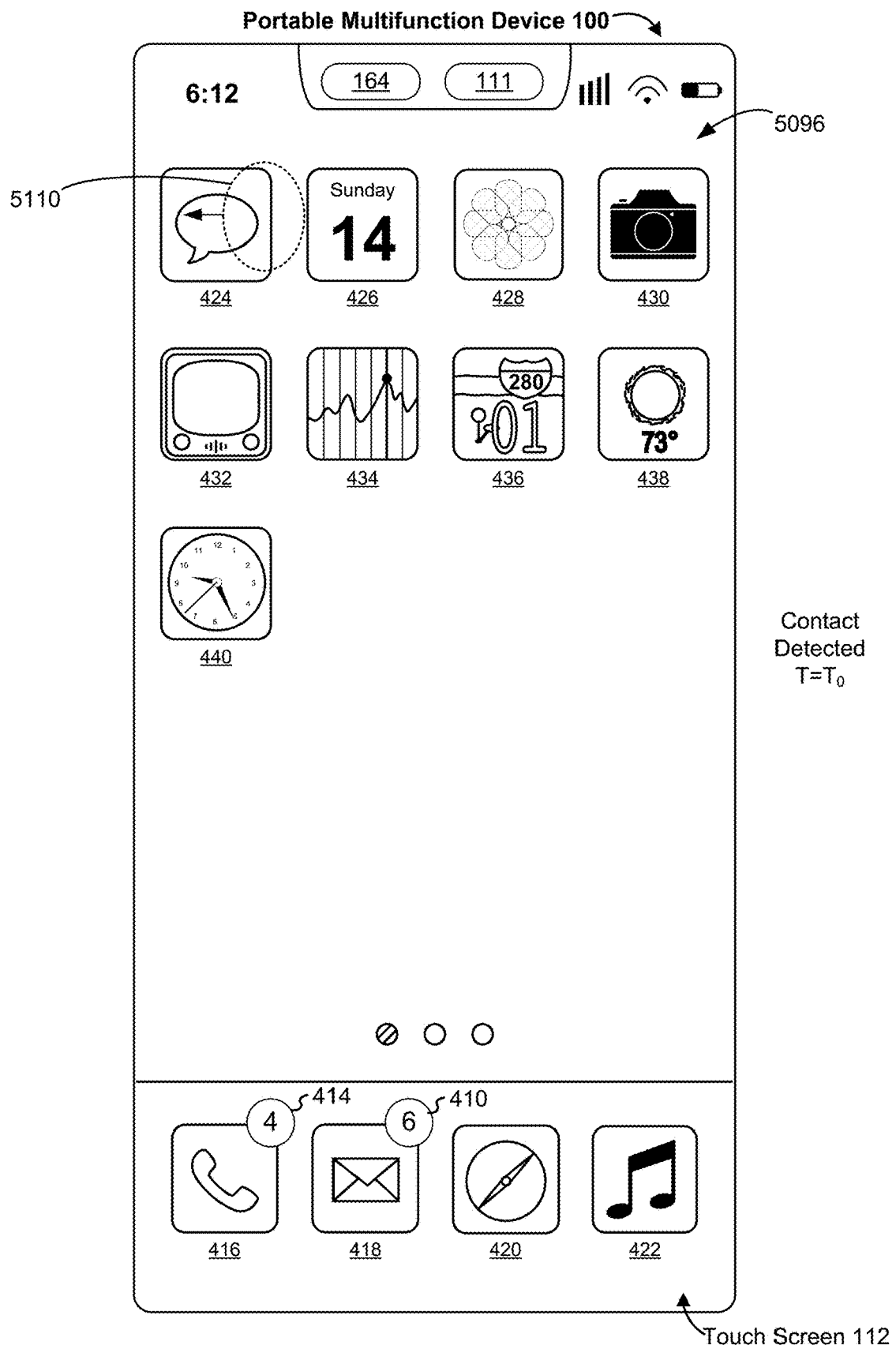
Figure 5A33

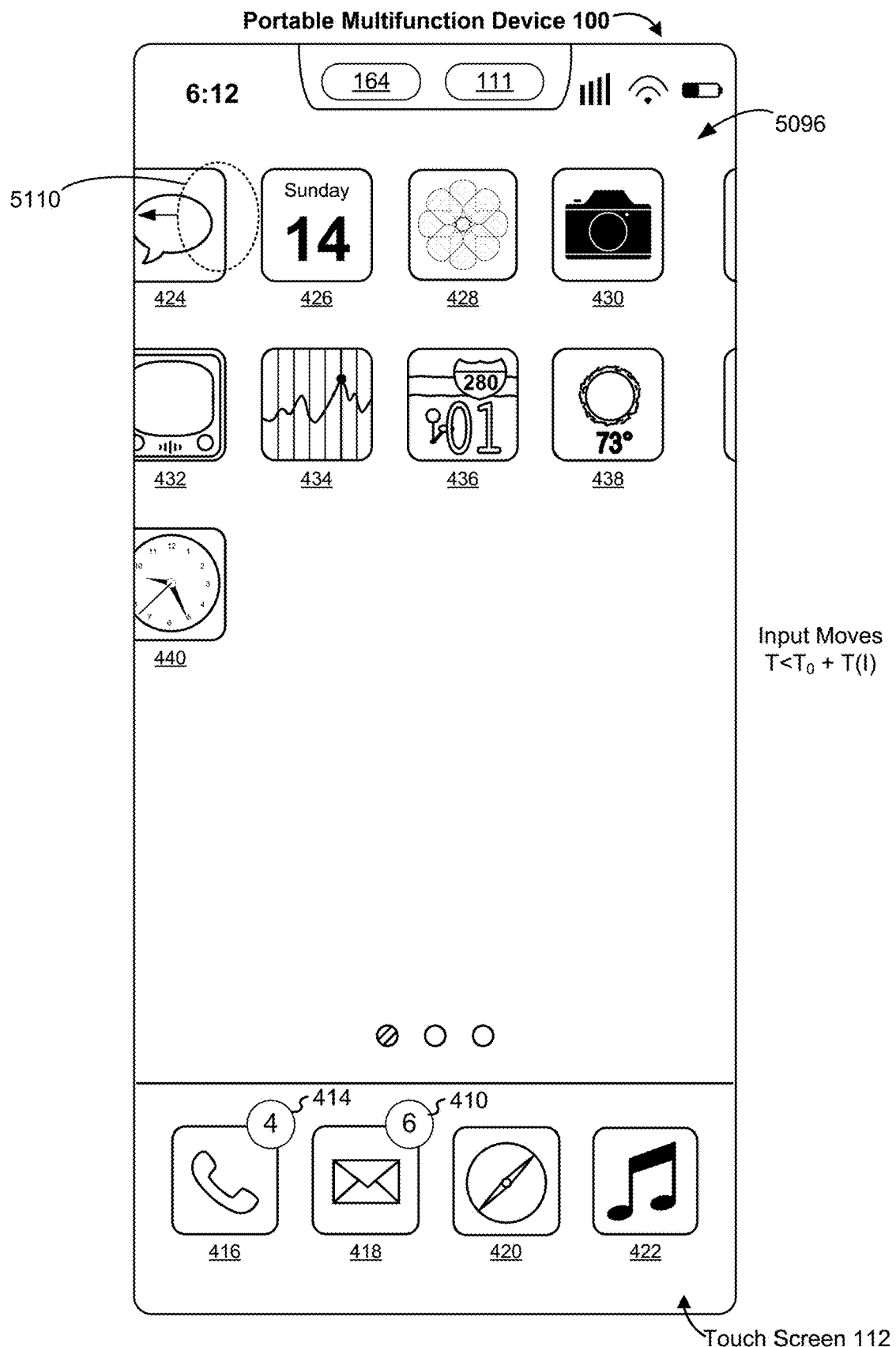
Figure 5A34

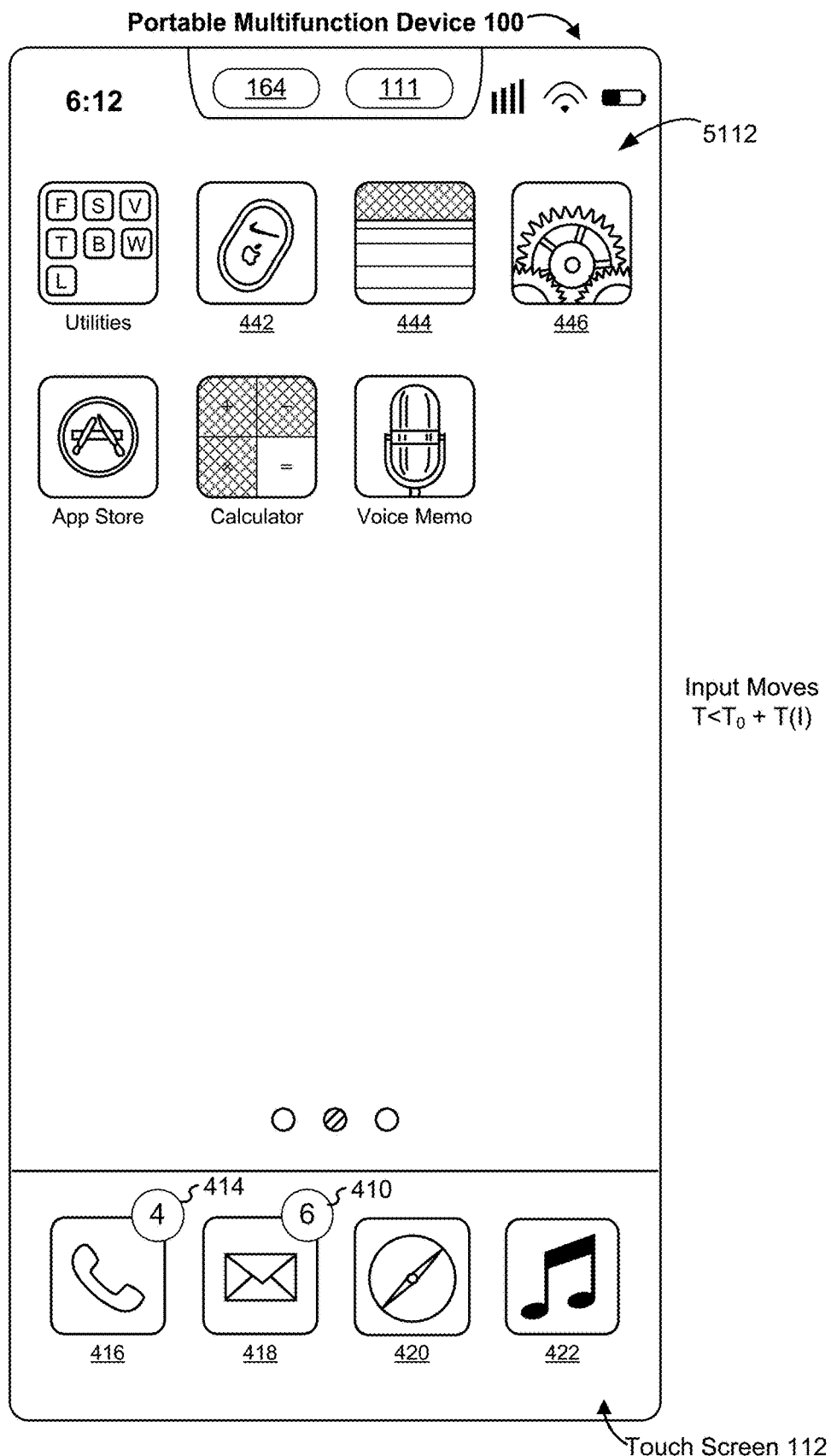
Figure 5A35

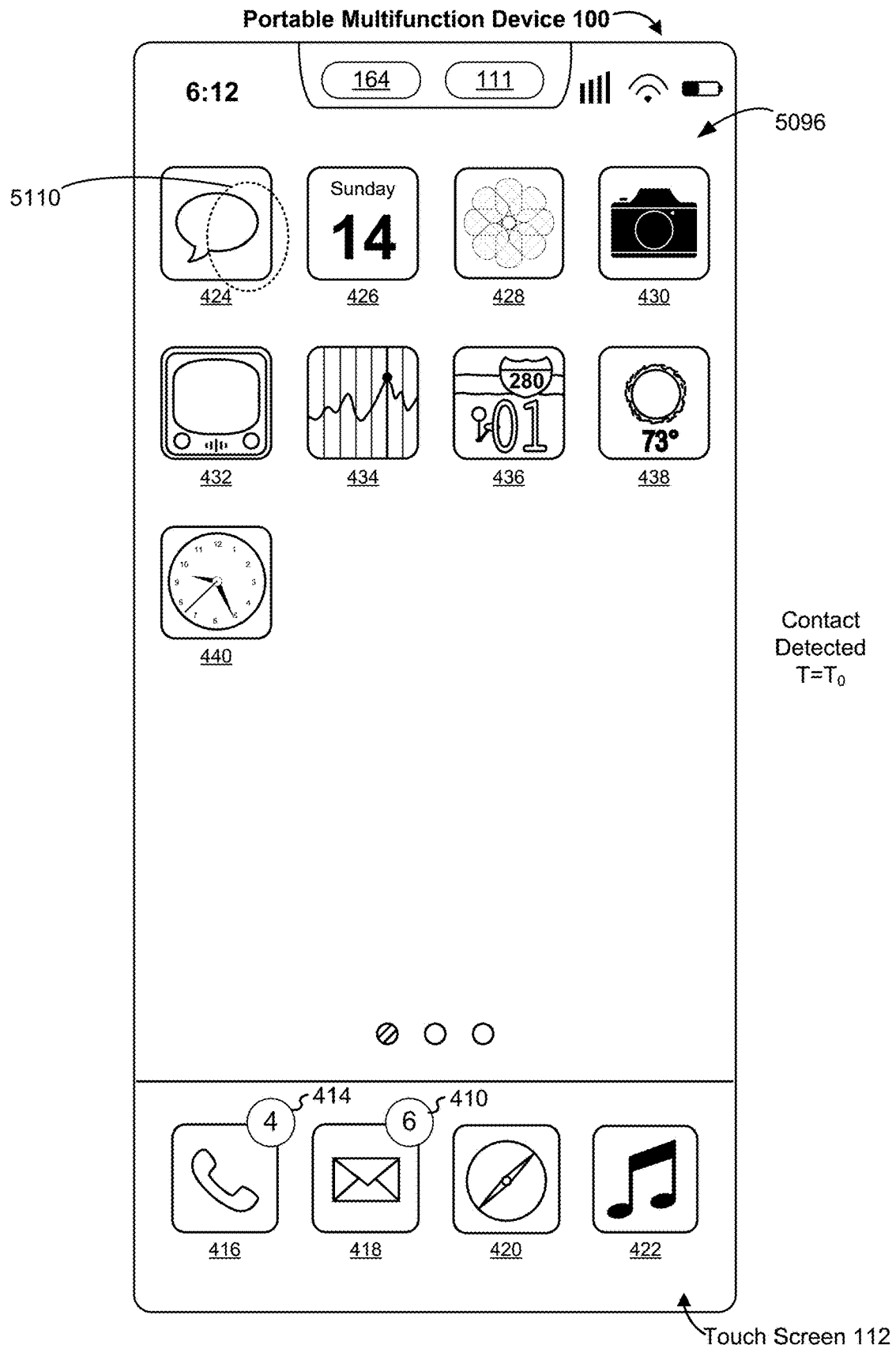
Figure 5A36

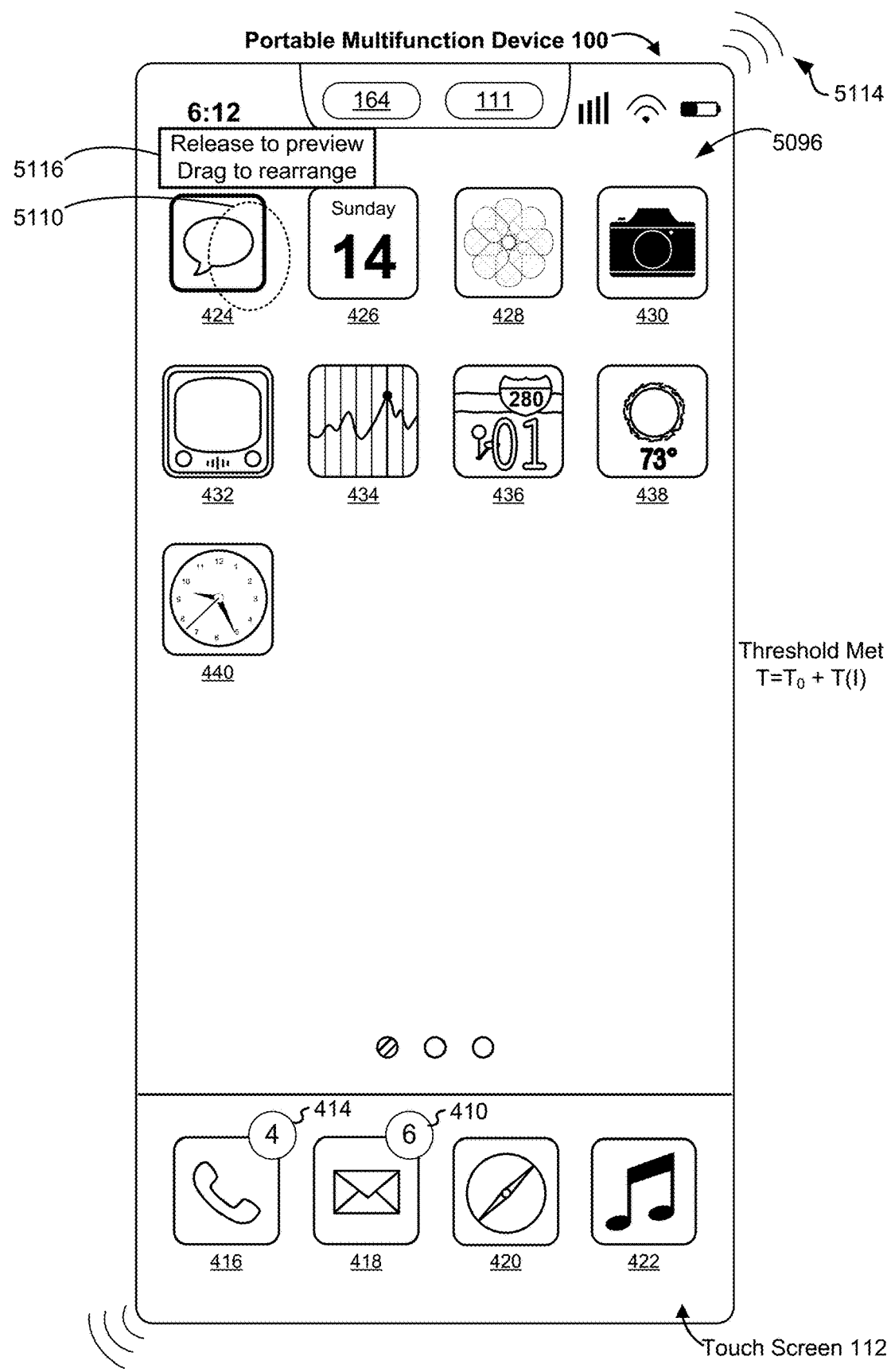
Figure 5A37

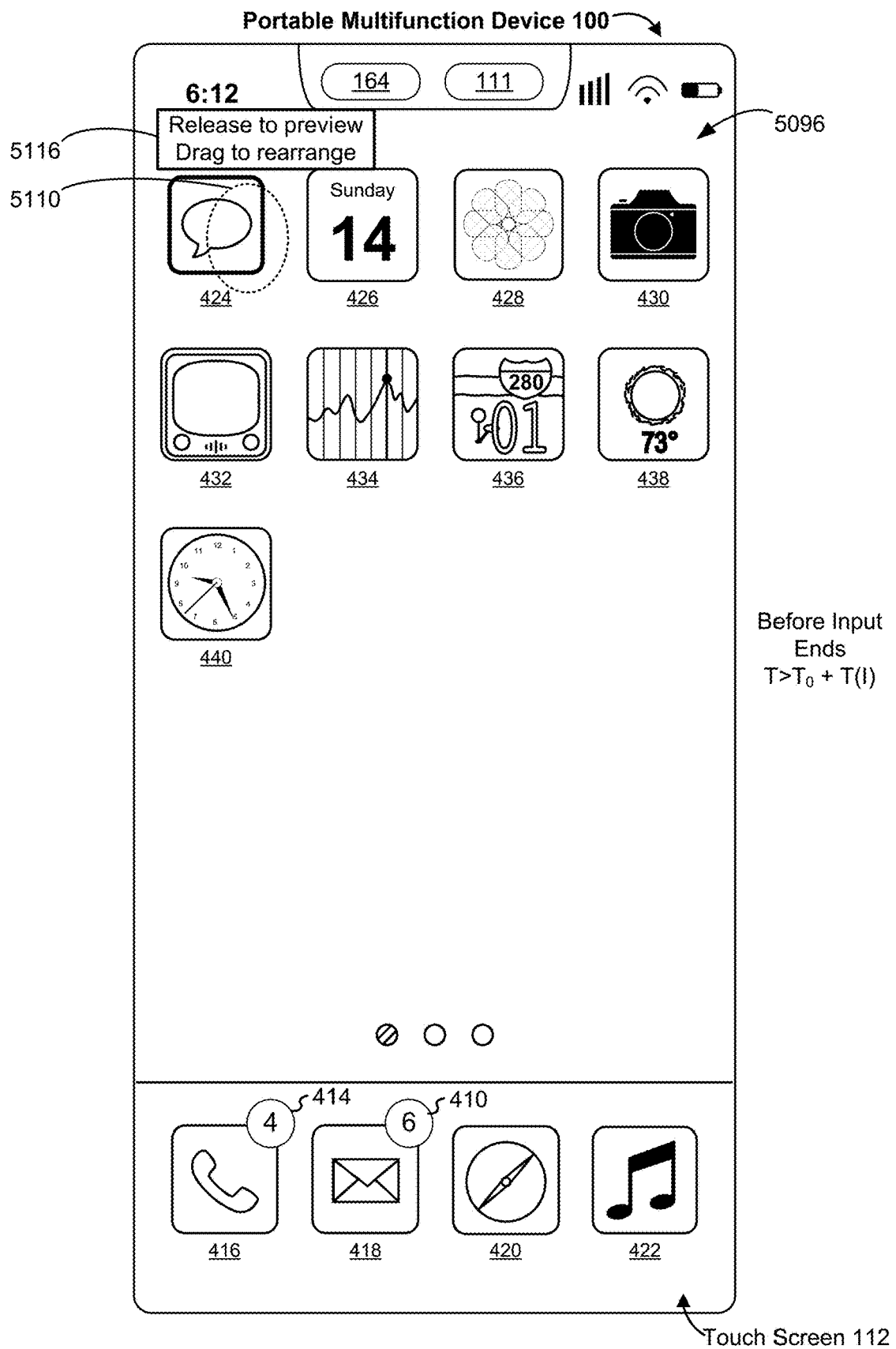
Figure 5A38

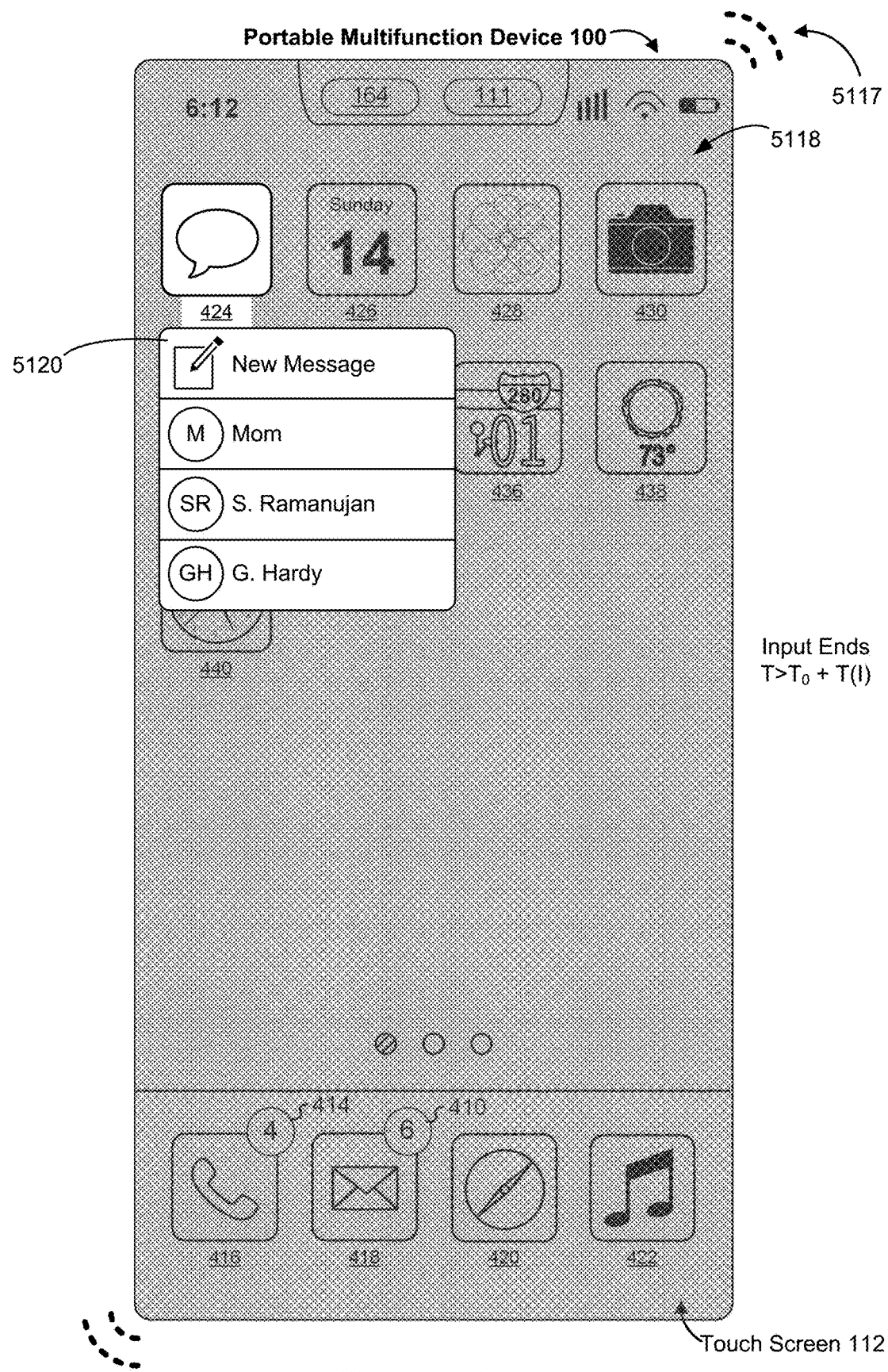
Figure 5A39

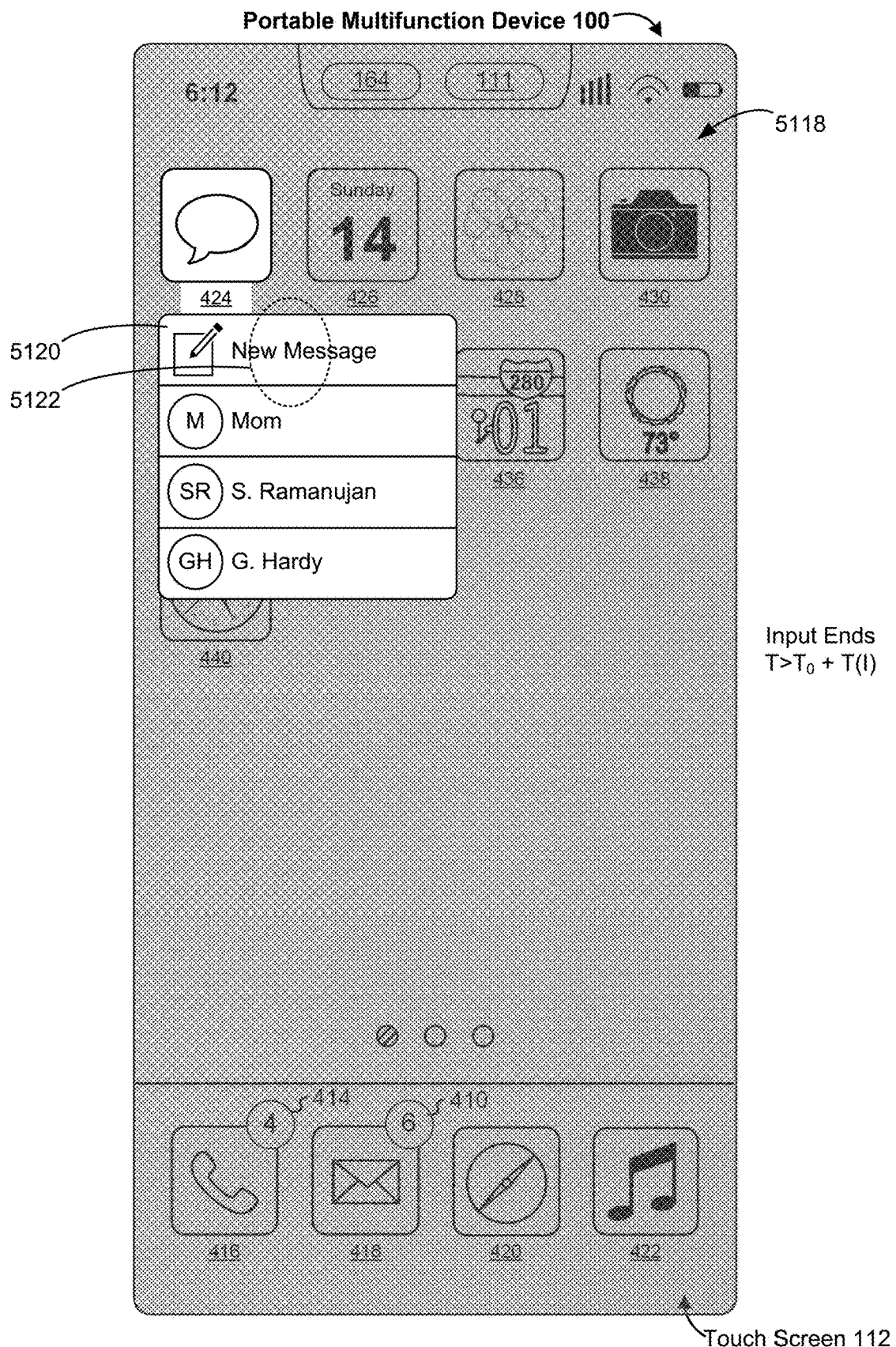
Figure 5A40

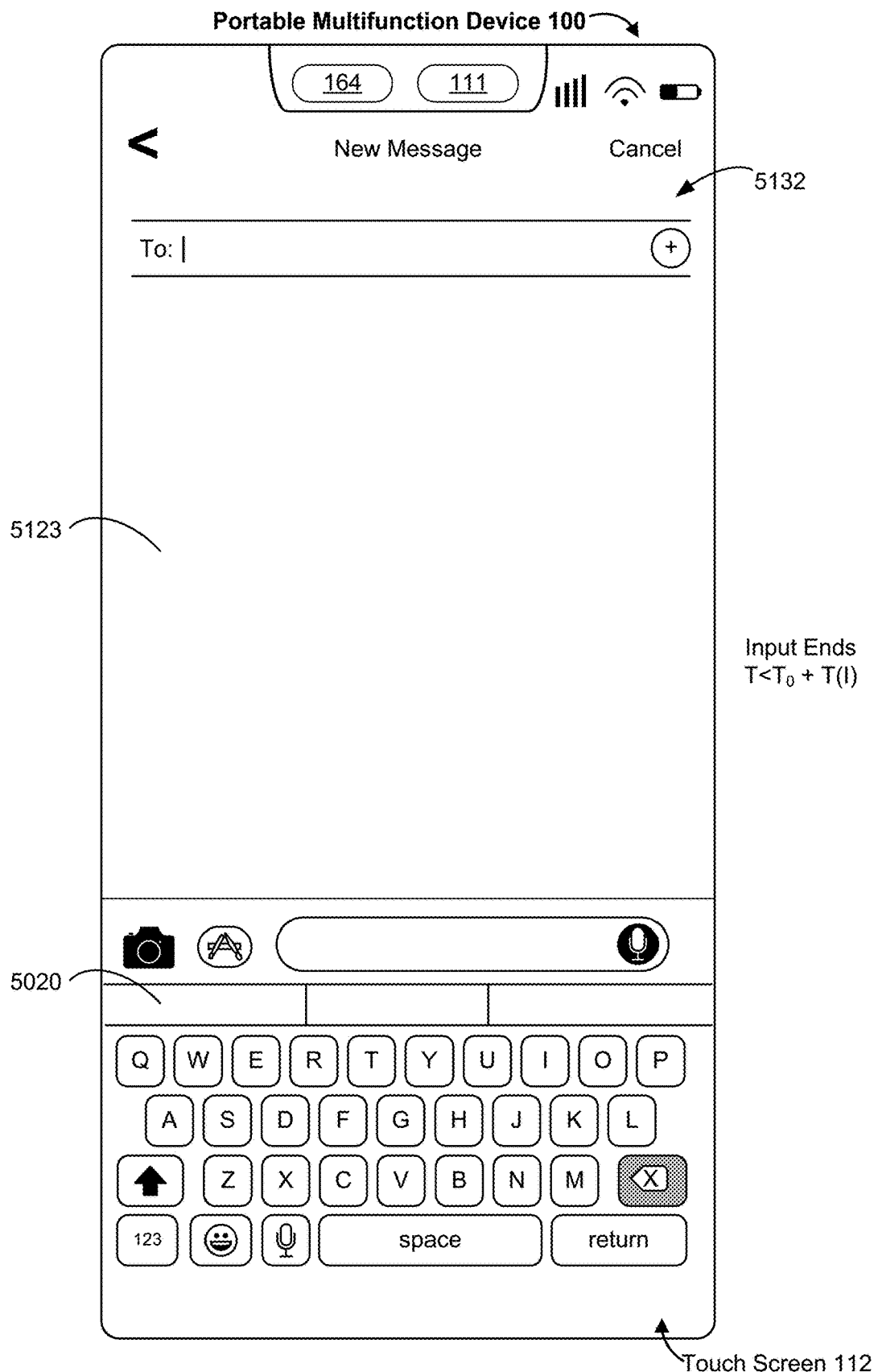
Figure 5A41

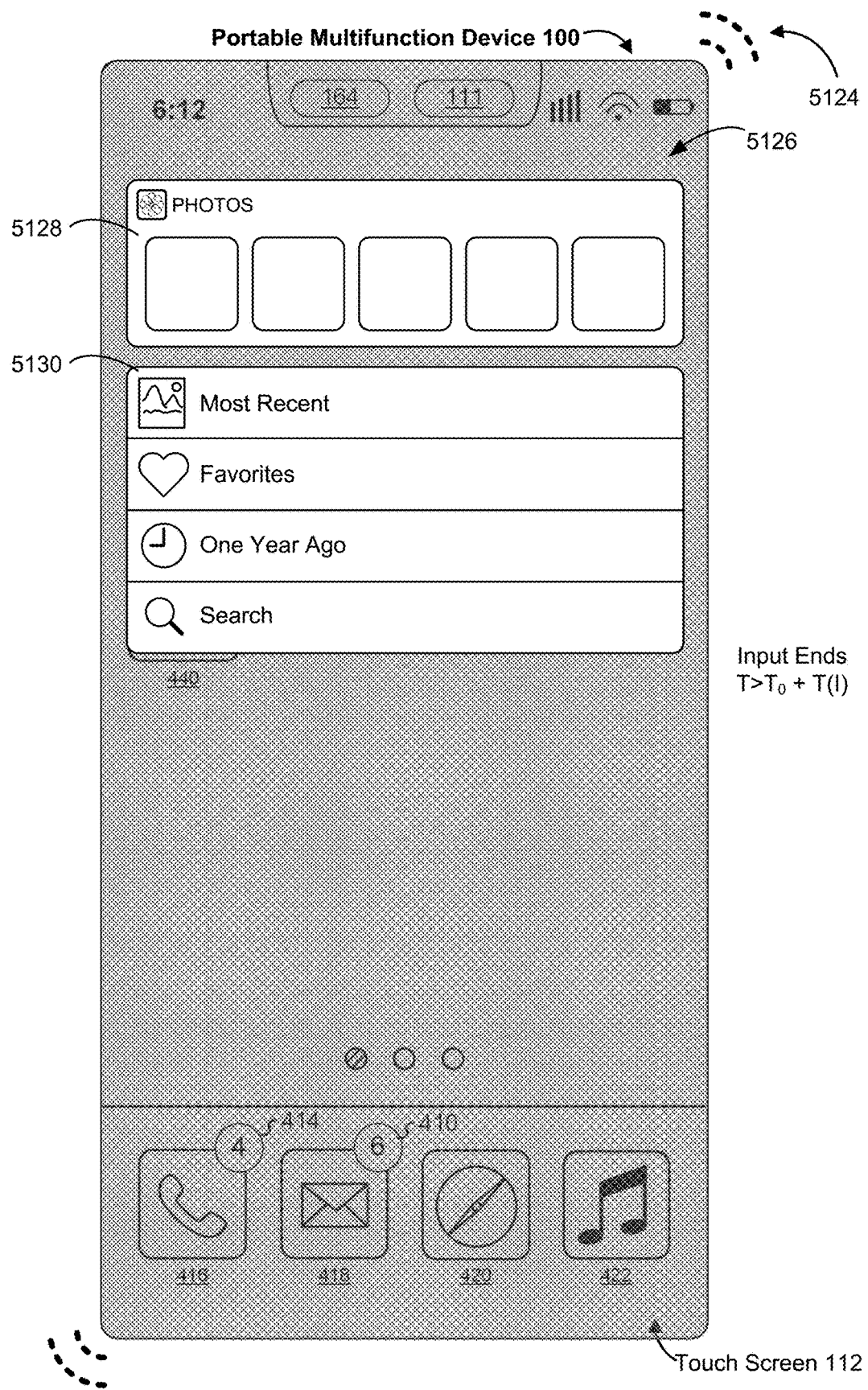
Figure 5A42

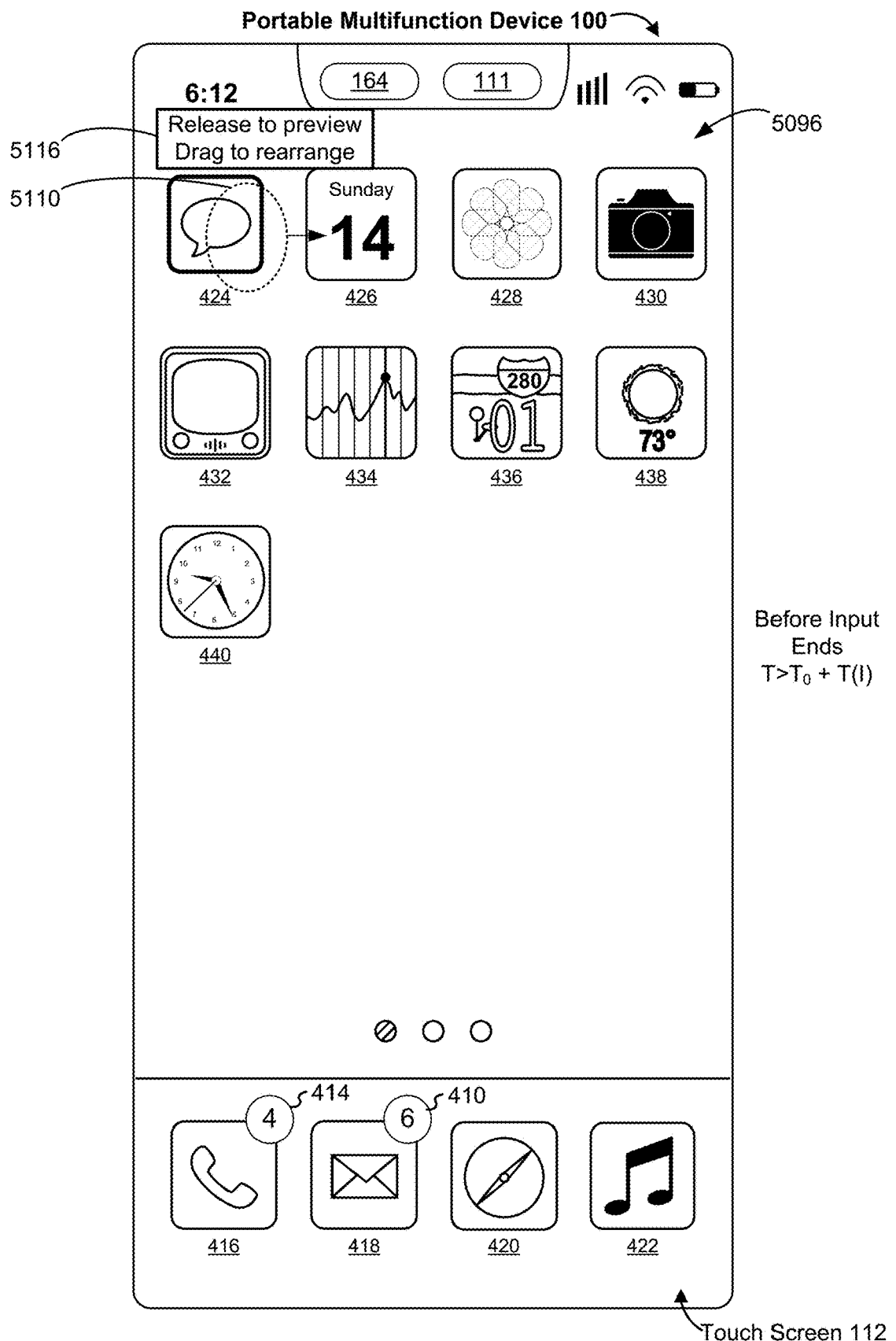
Figure 5A43

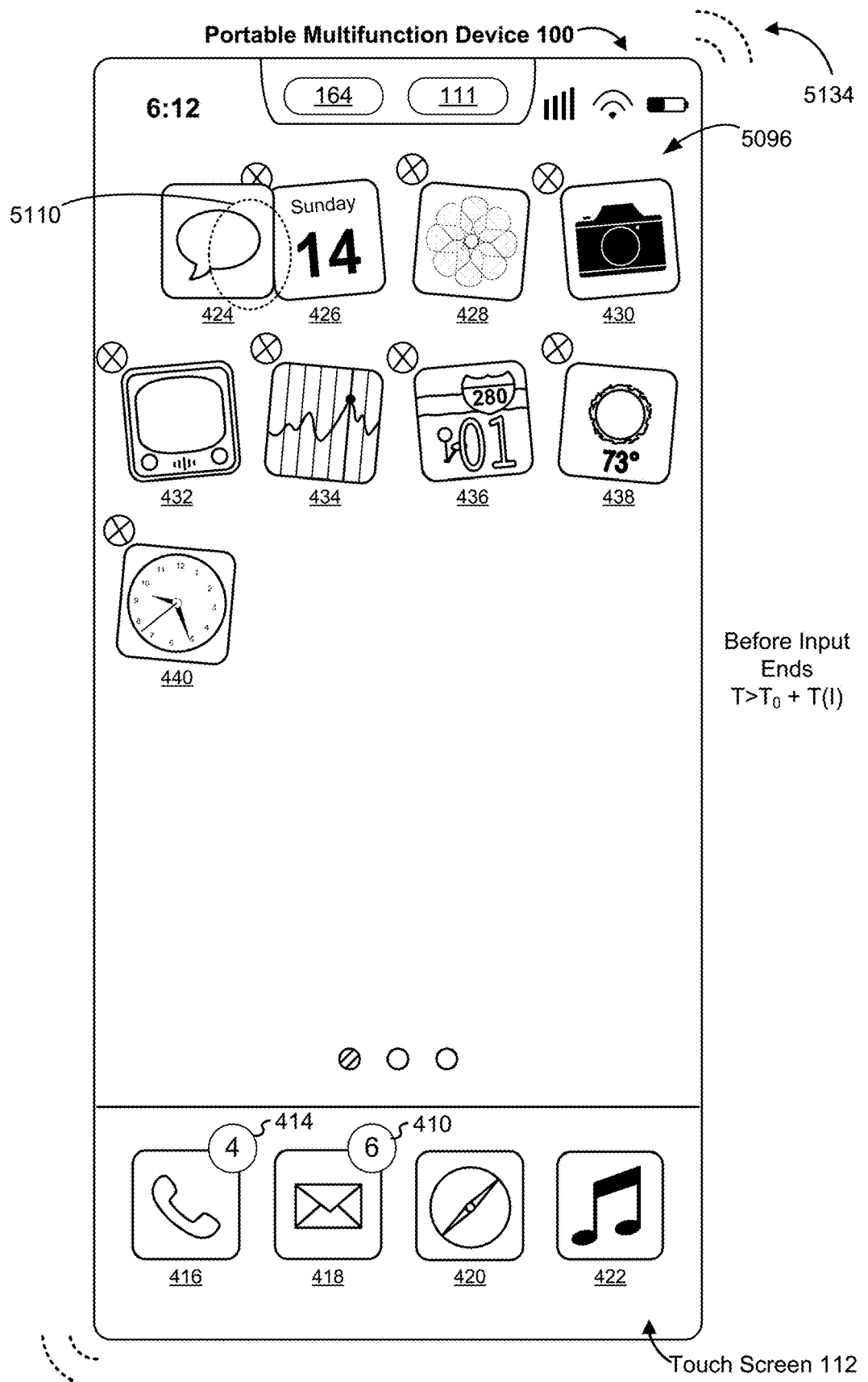
Figure 5A44

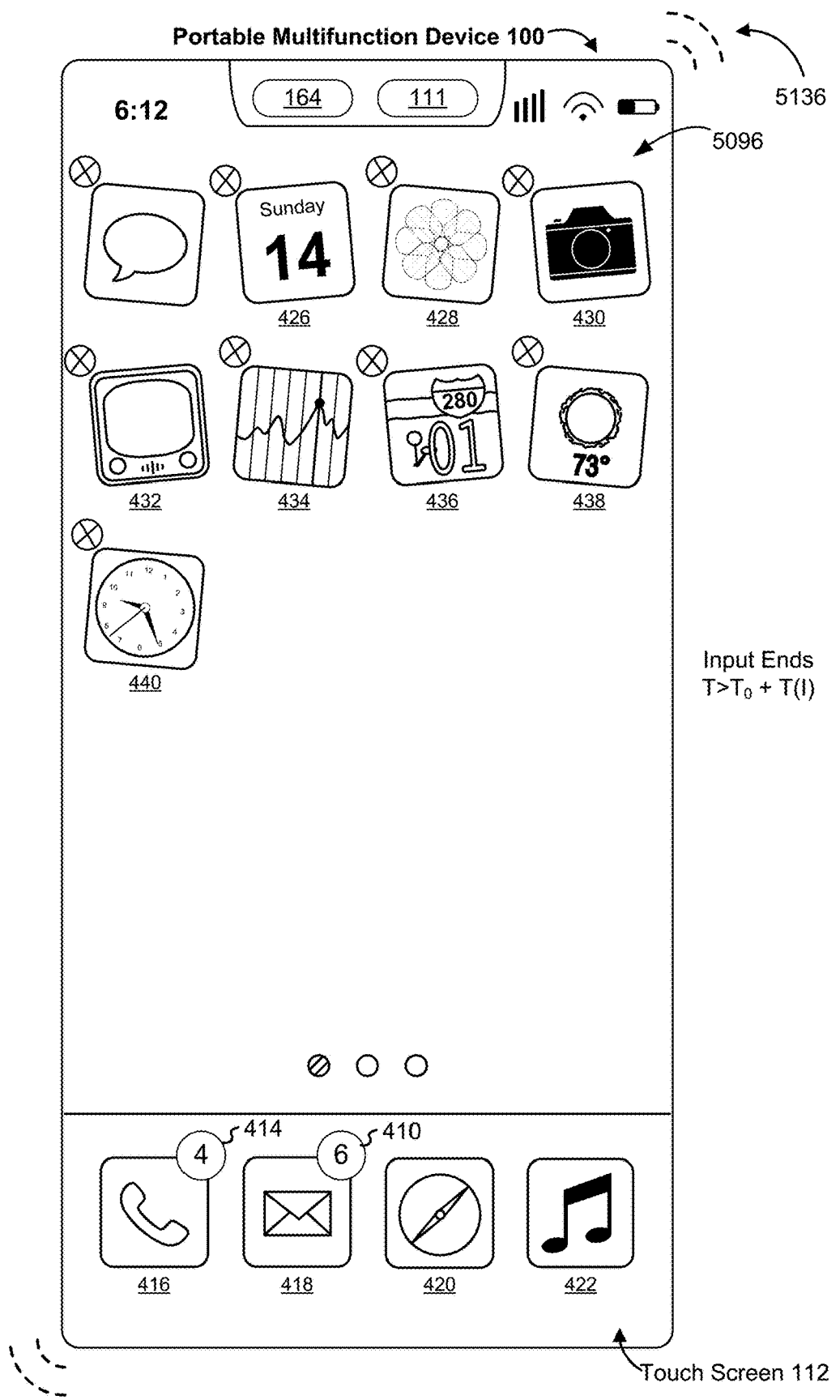
Figure 5A45

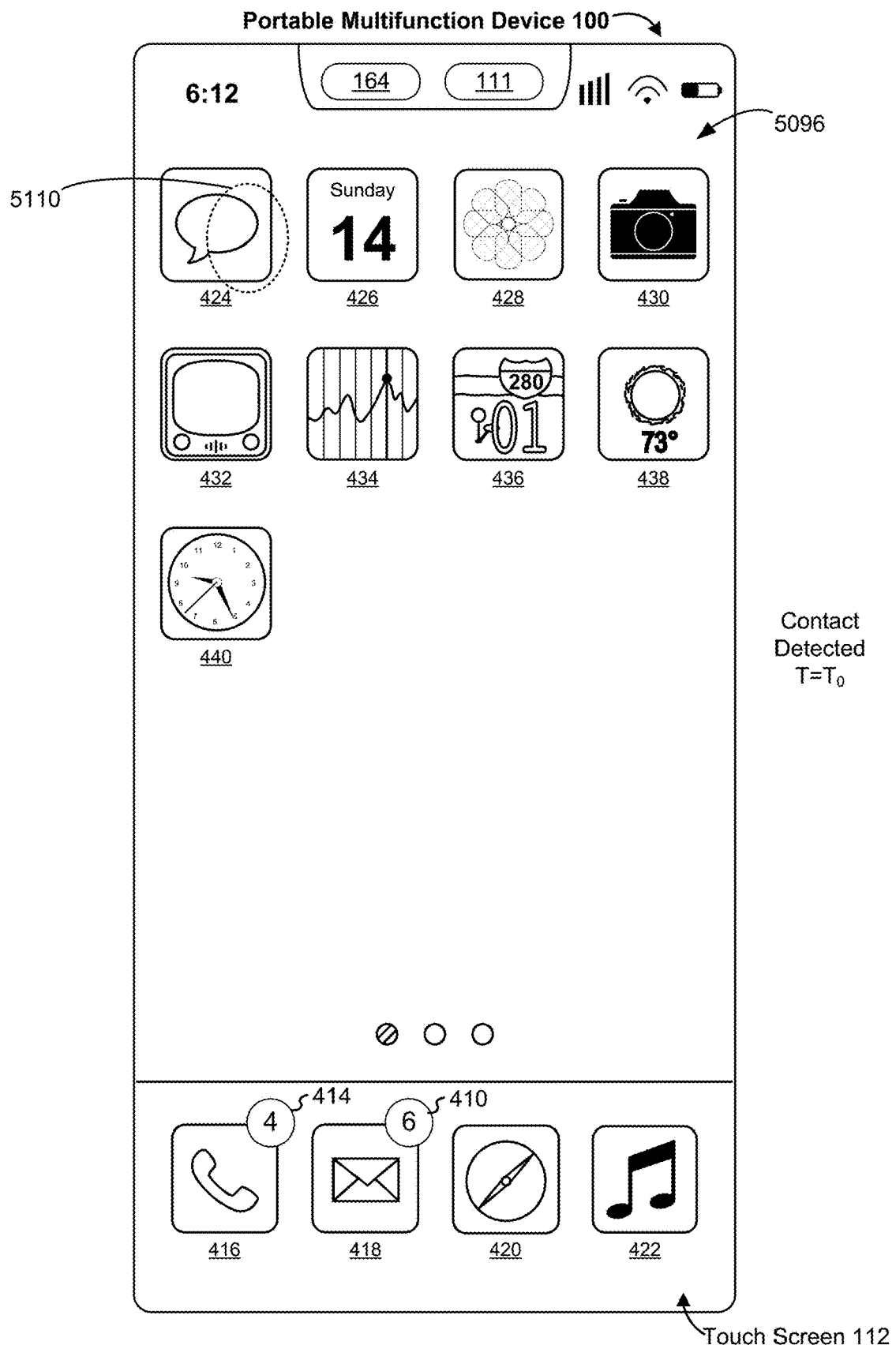
Figure 5A46

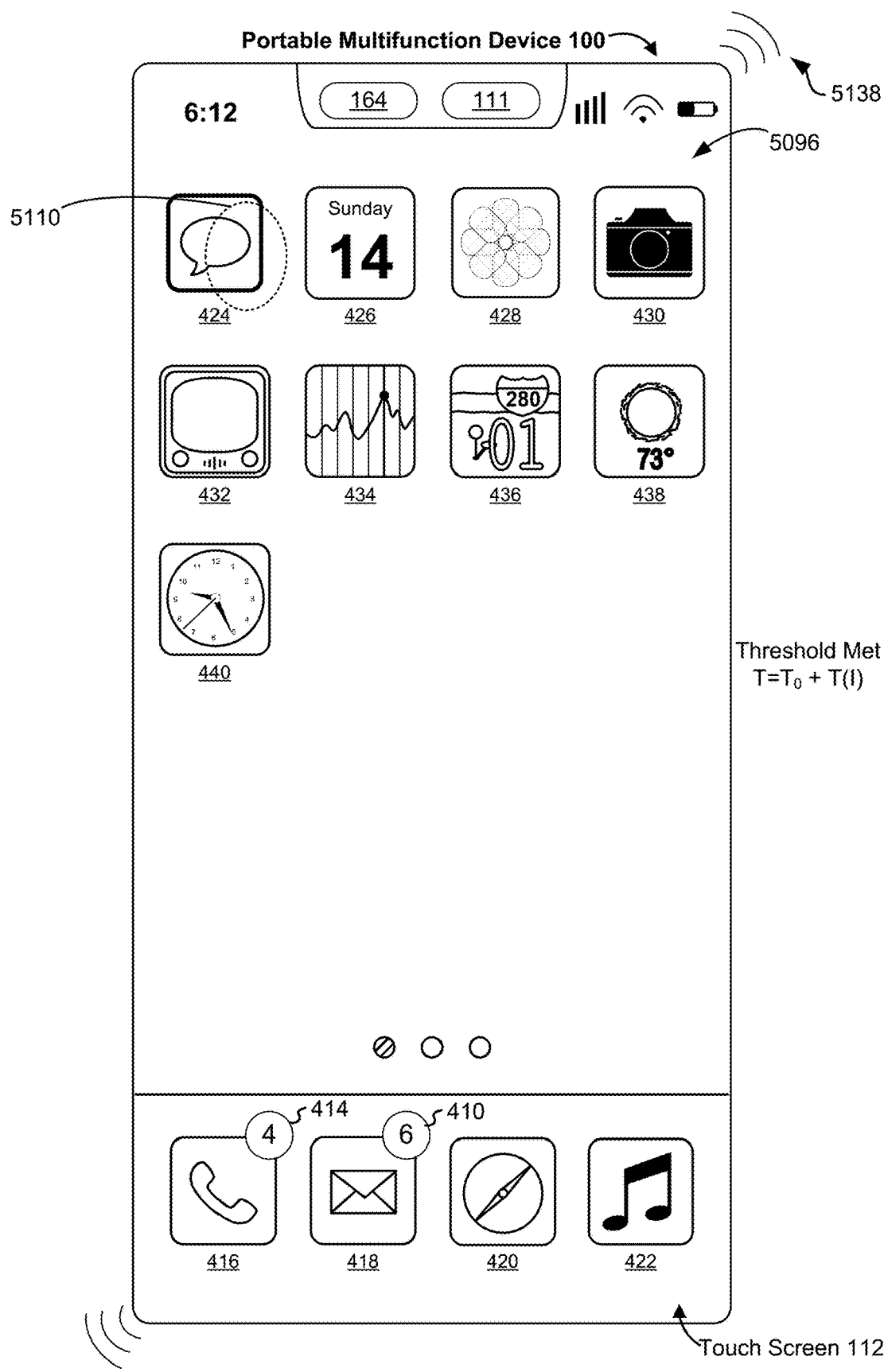
Figure 5A47

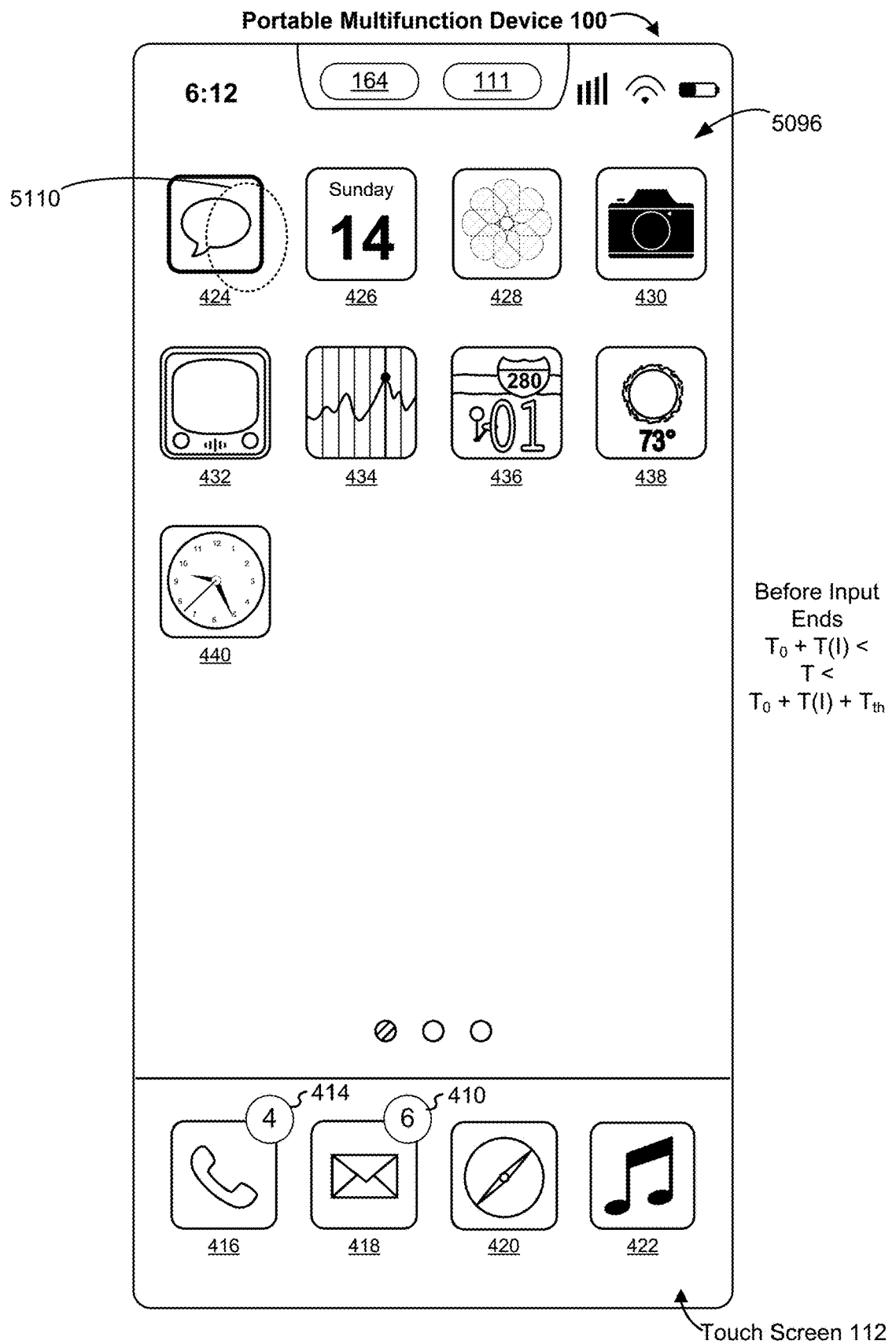
Figure 5A48

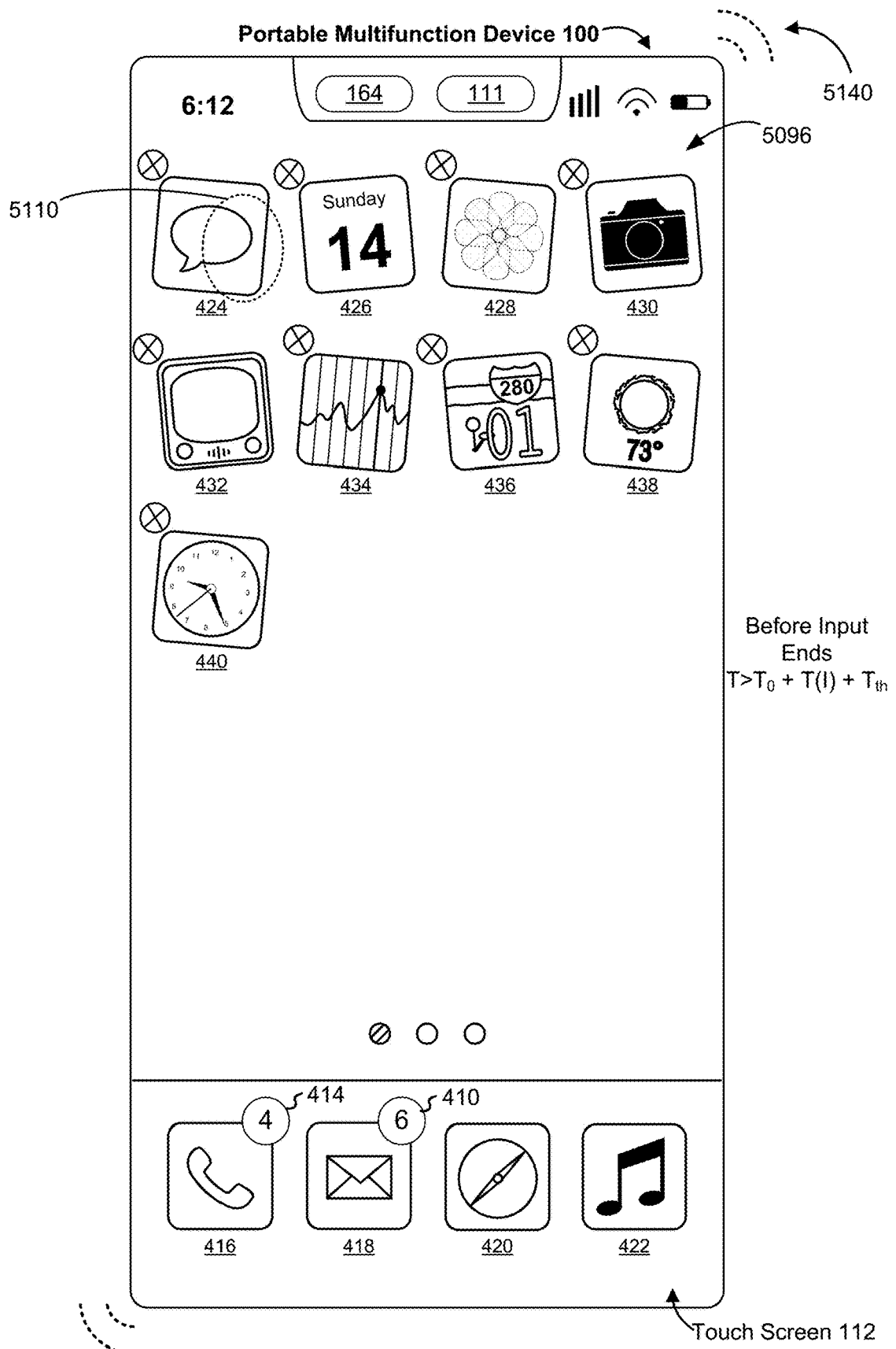
Figure 5A49

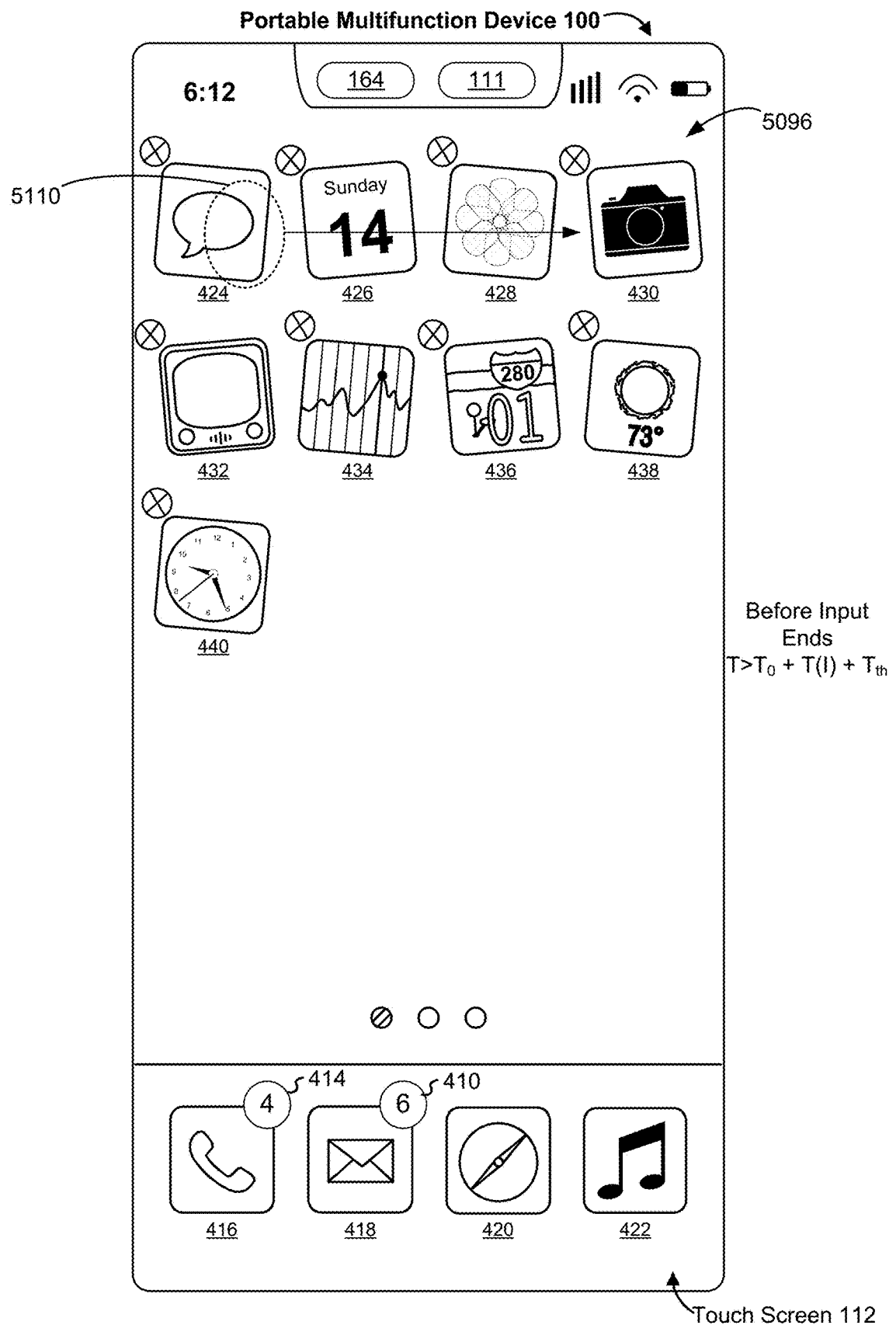
Figure 5A50

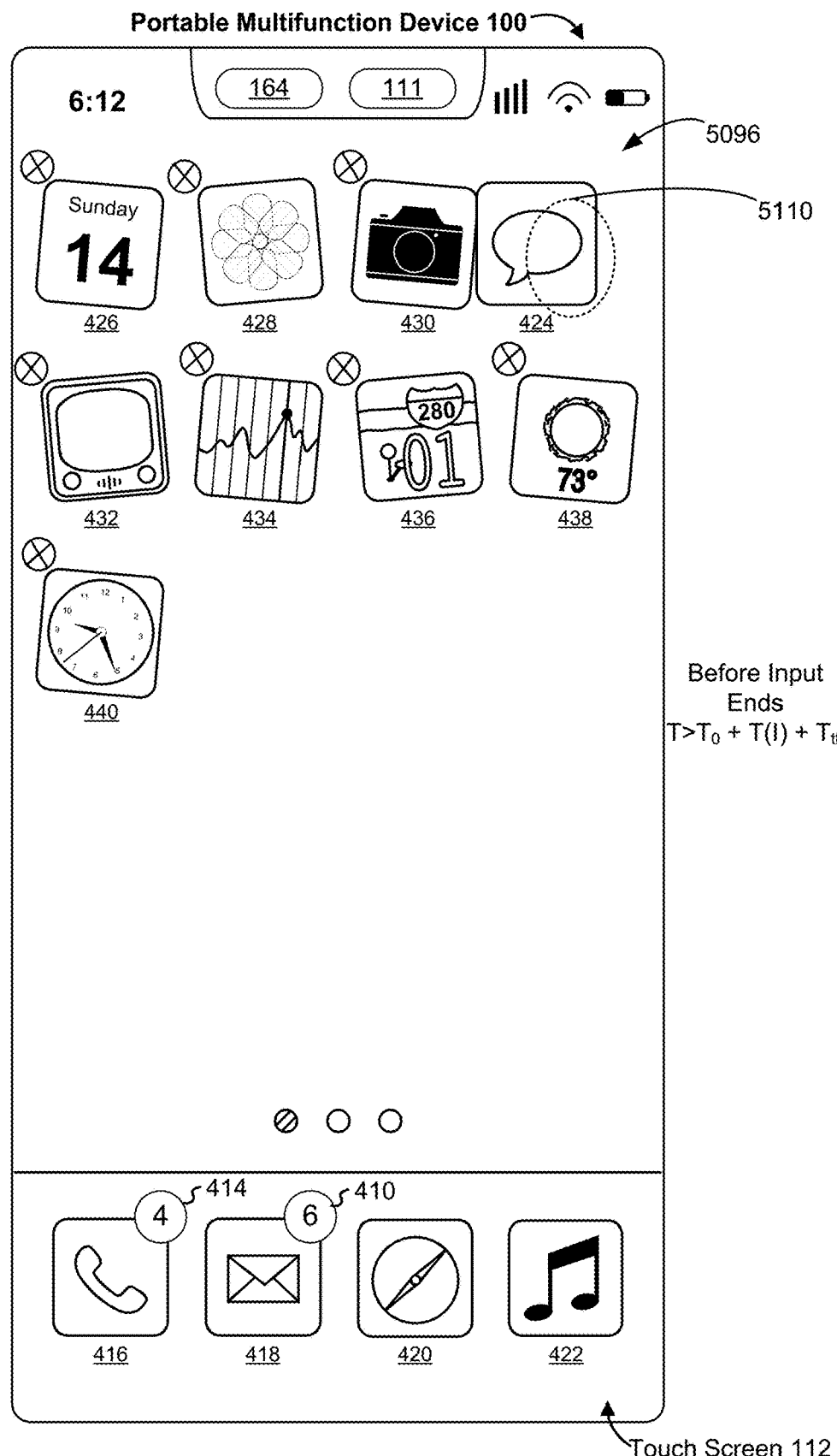
Figure 5A51

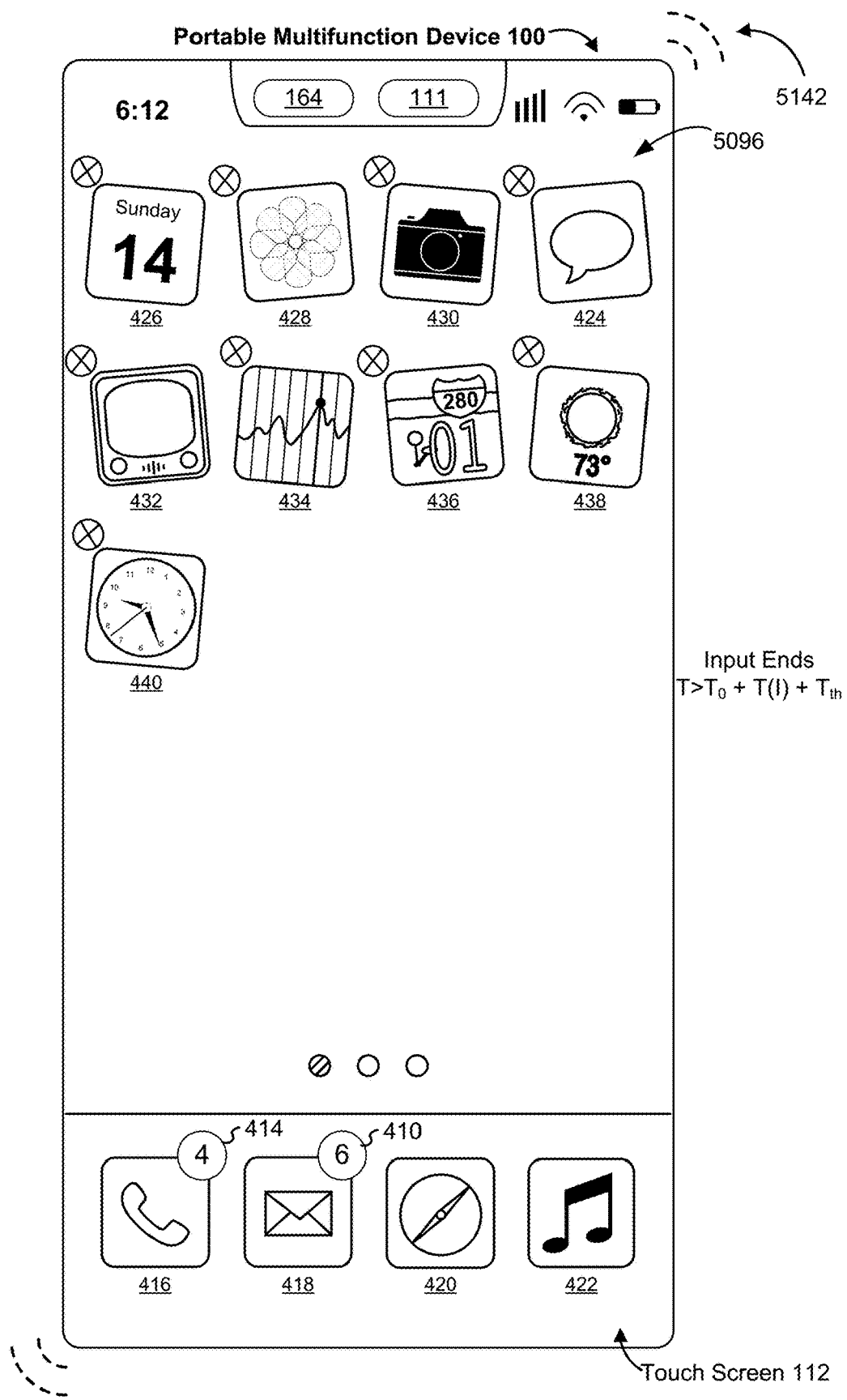
Figure 5A52

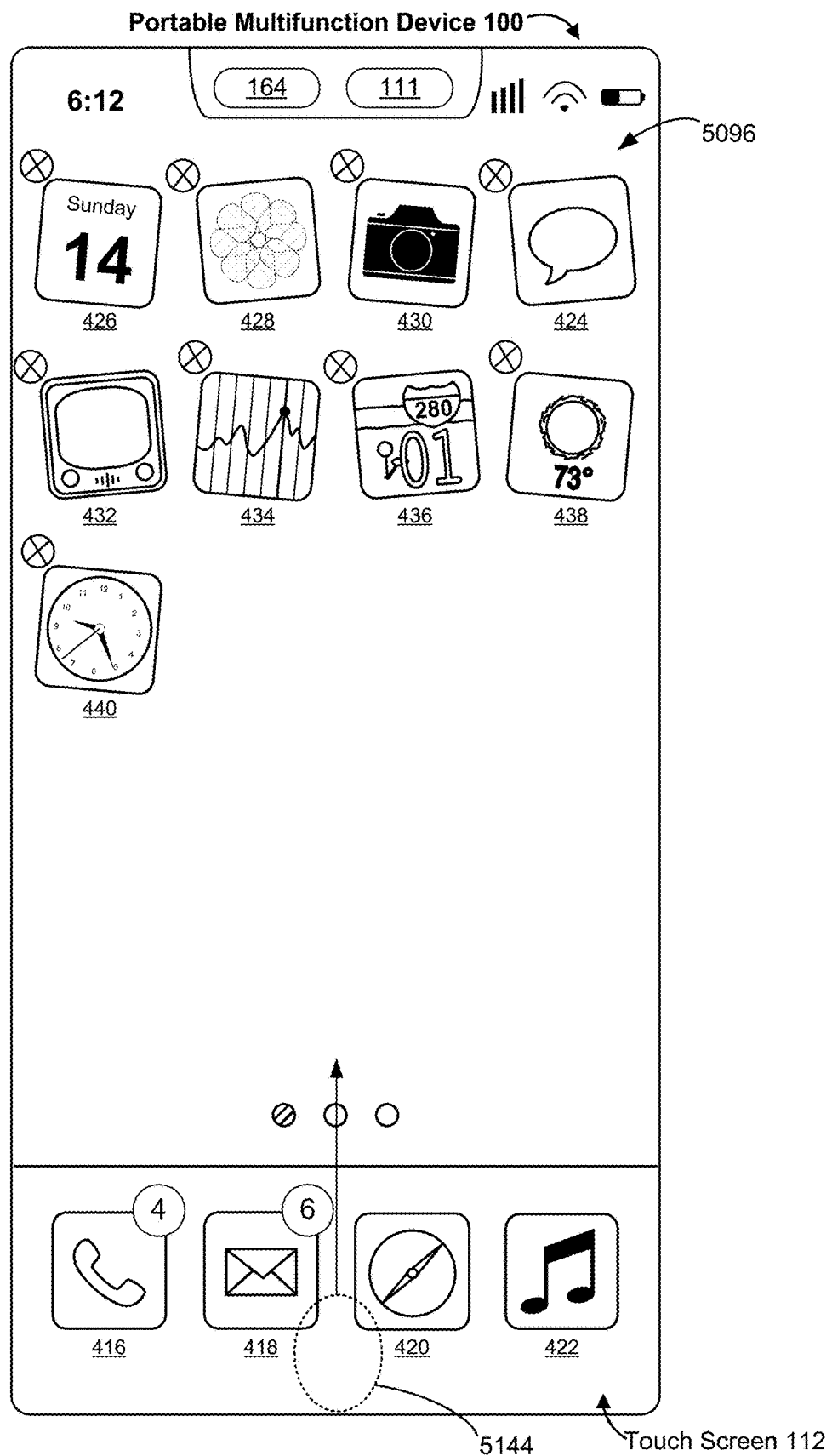
Figure 5A53

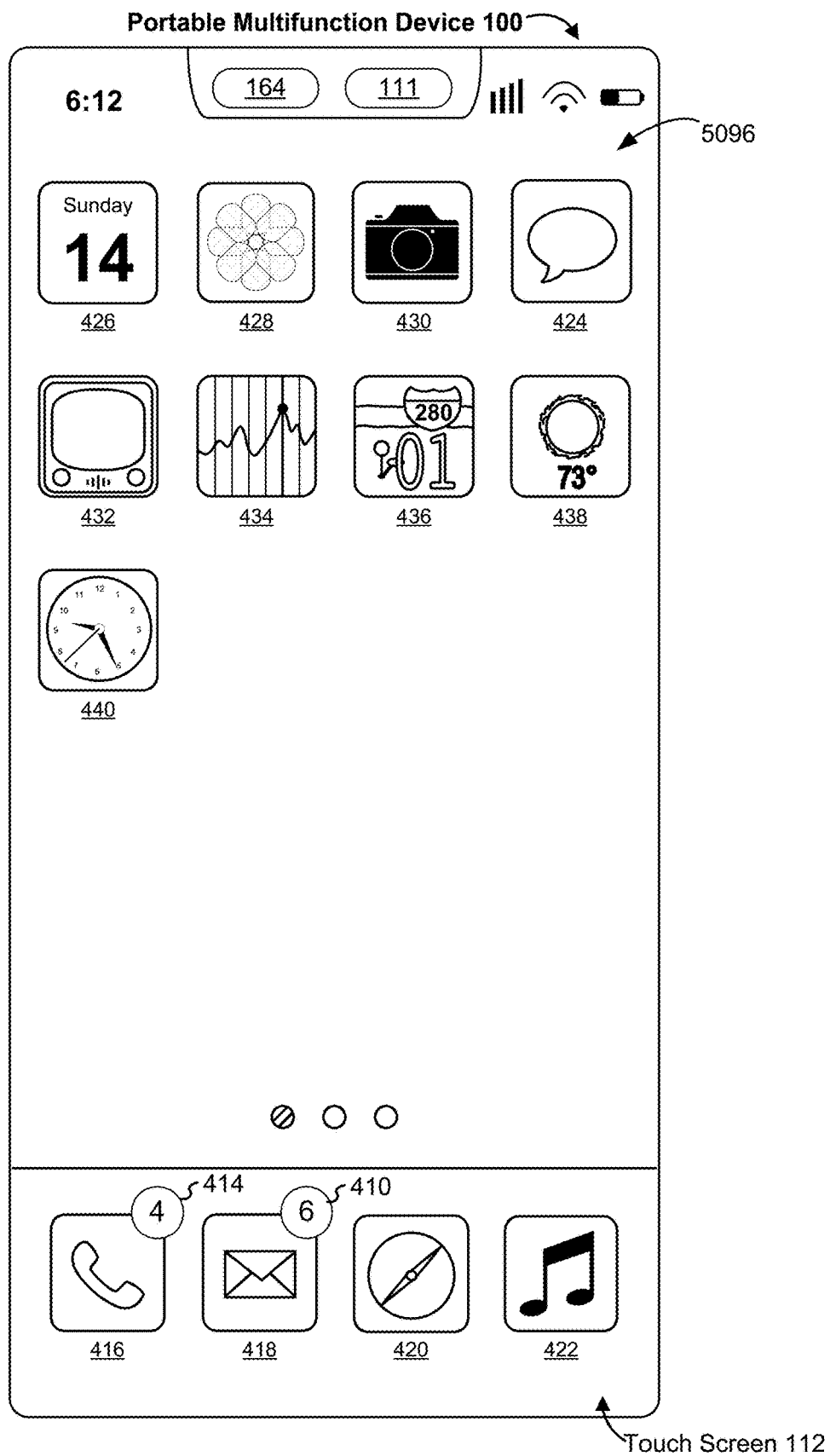
Figure 5A54

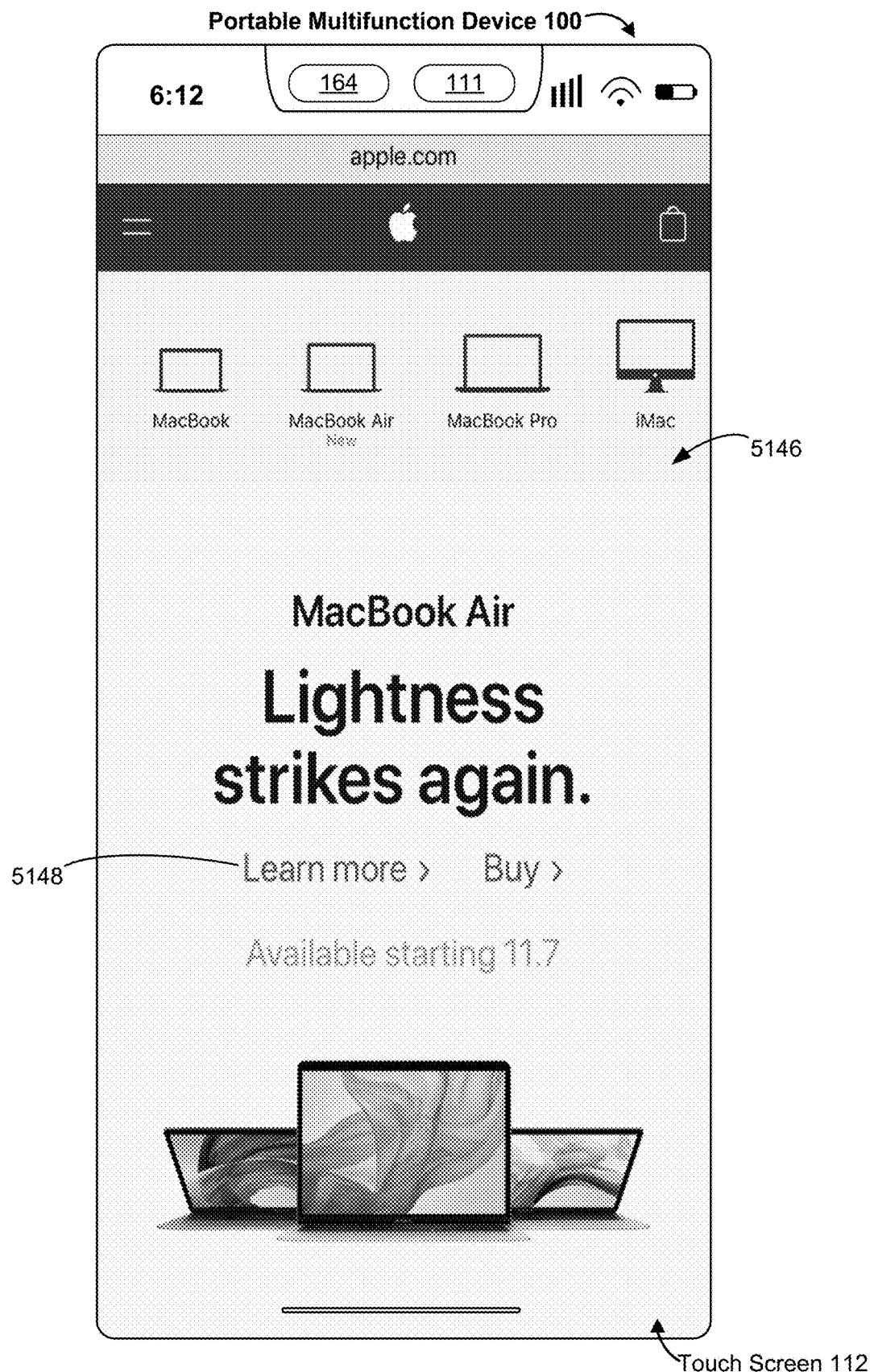
Figure 5A55

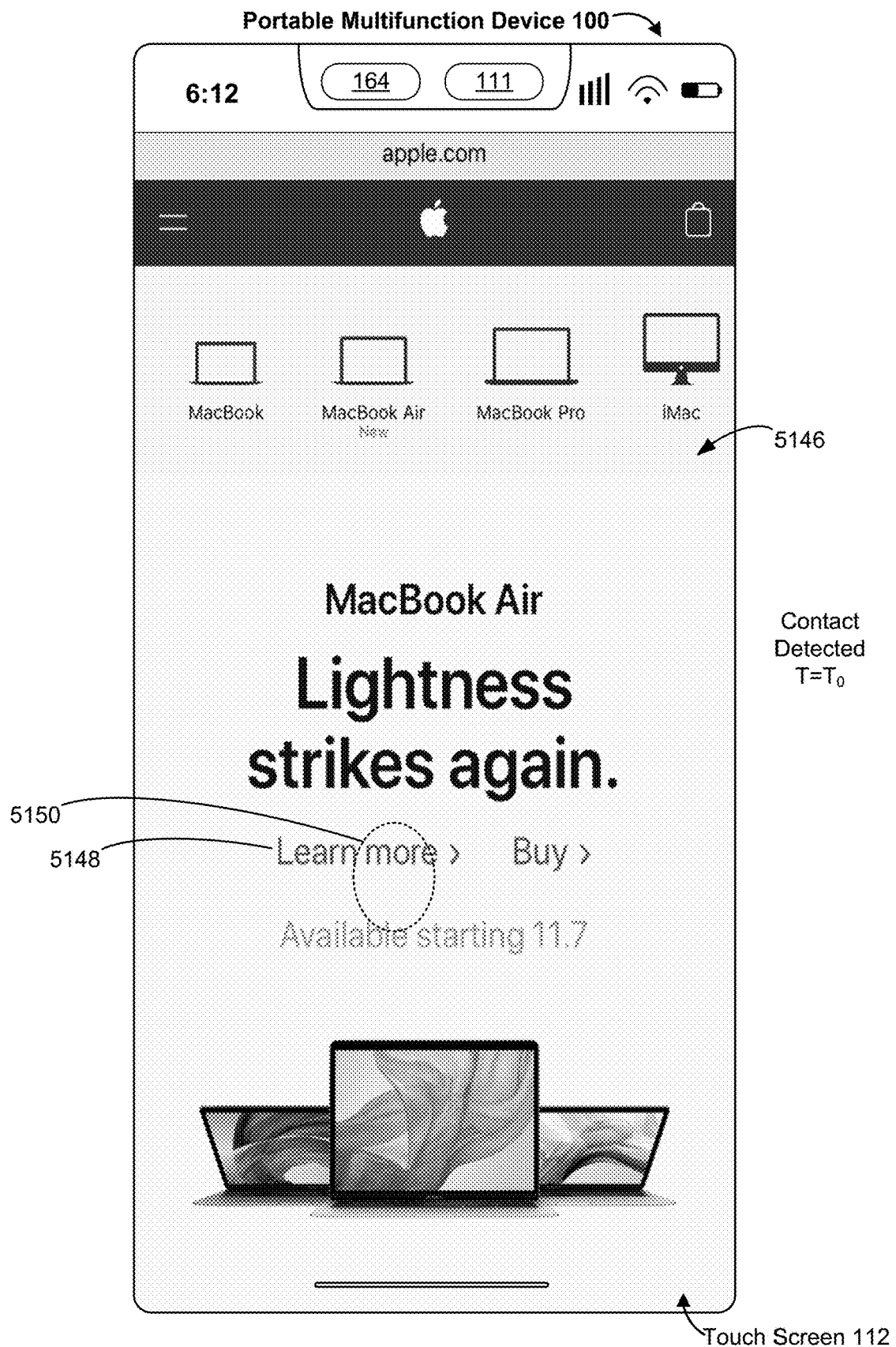
Figure 5A56

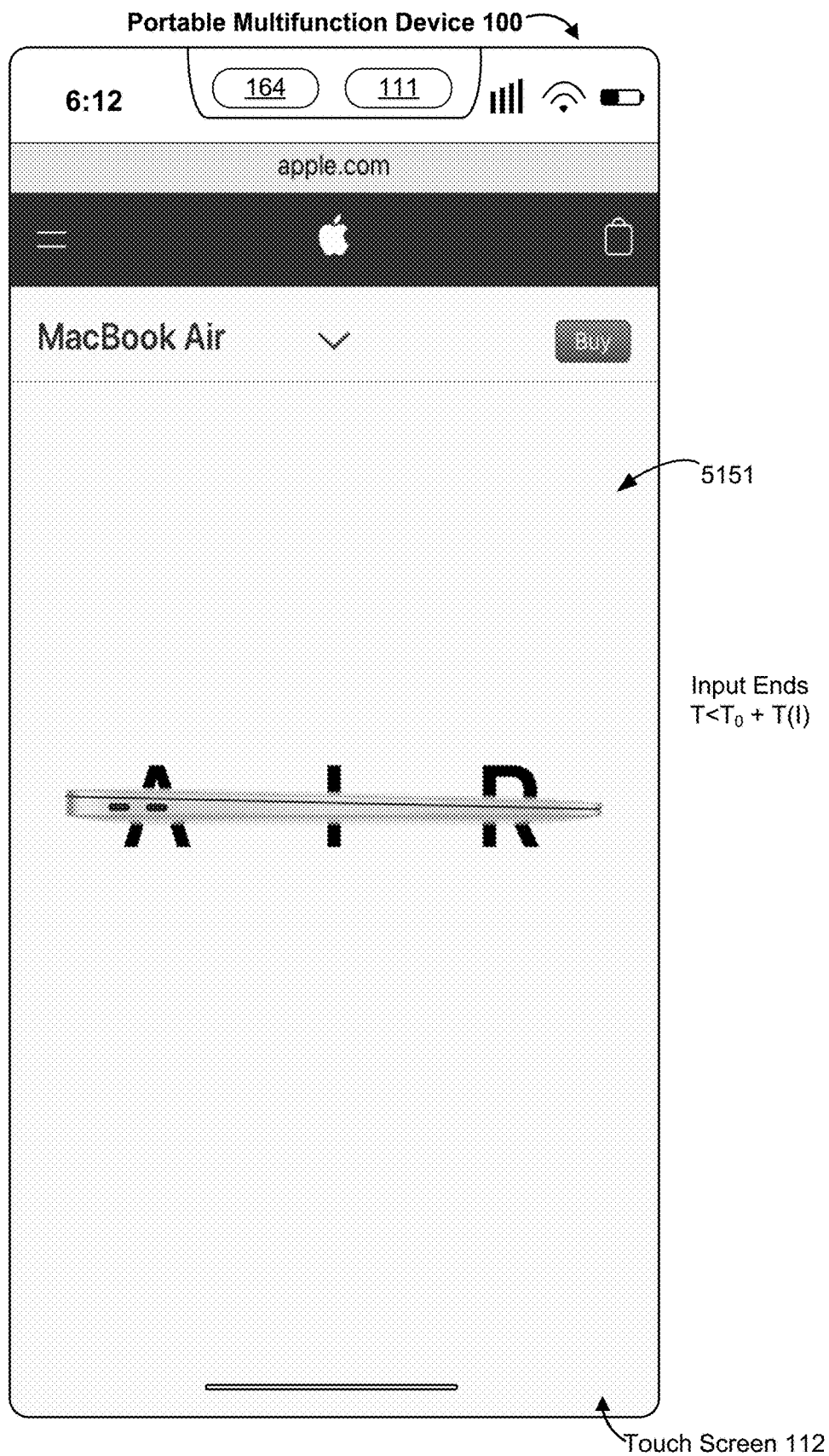
Figure 5A57

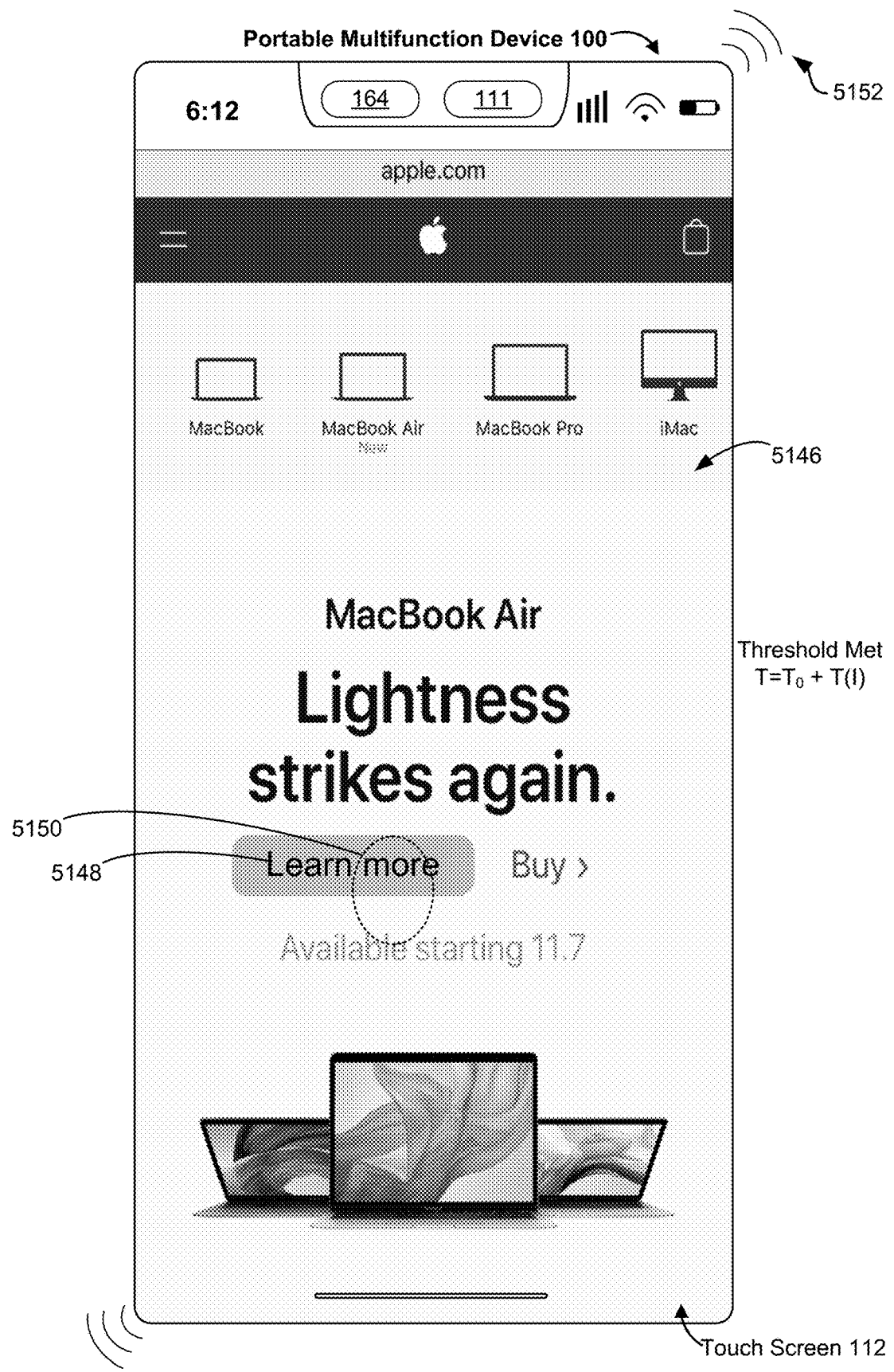
Figure 5A58

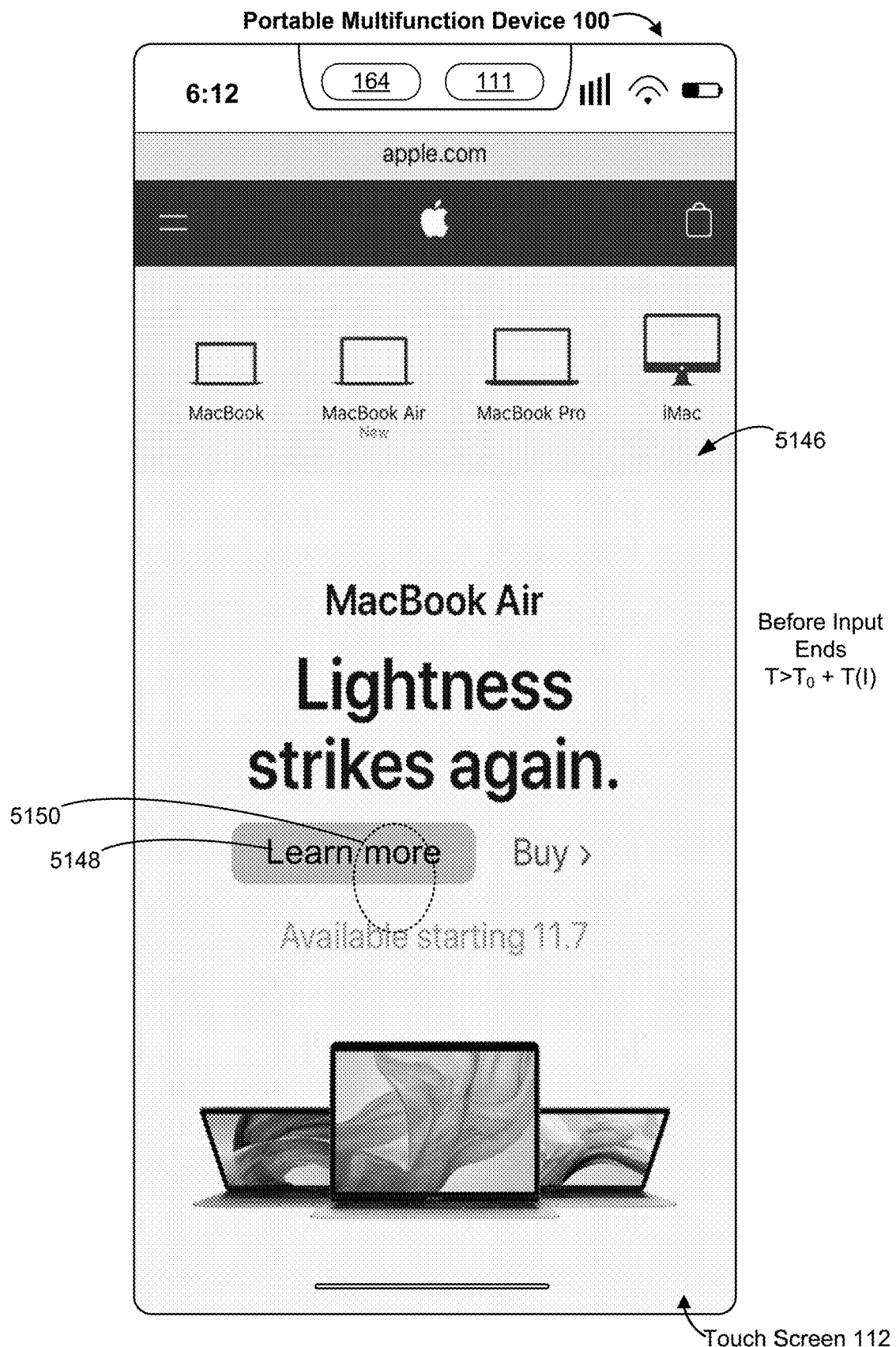
Figure 5A59

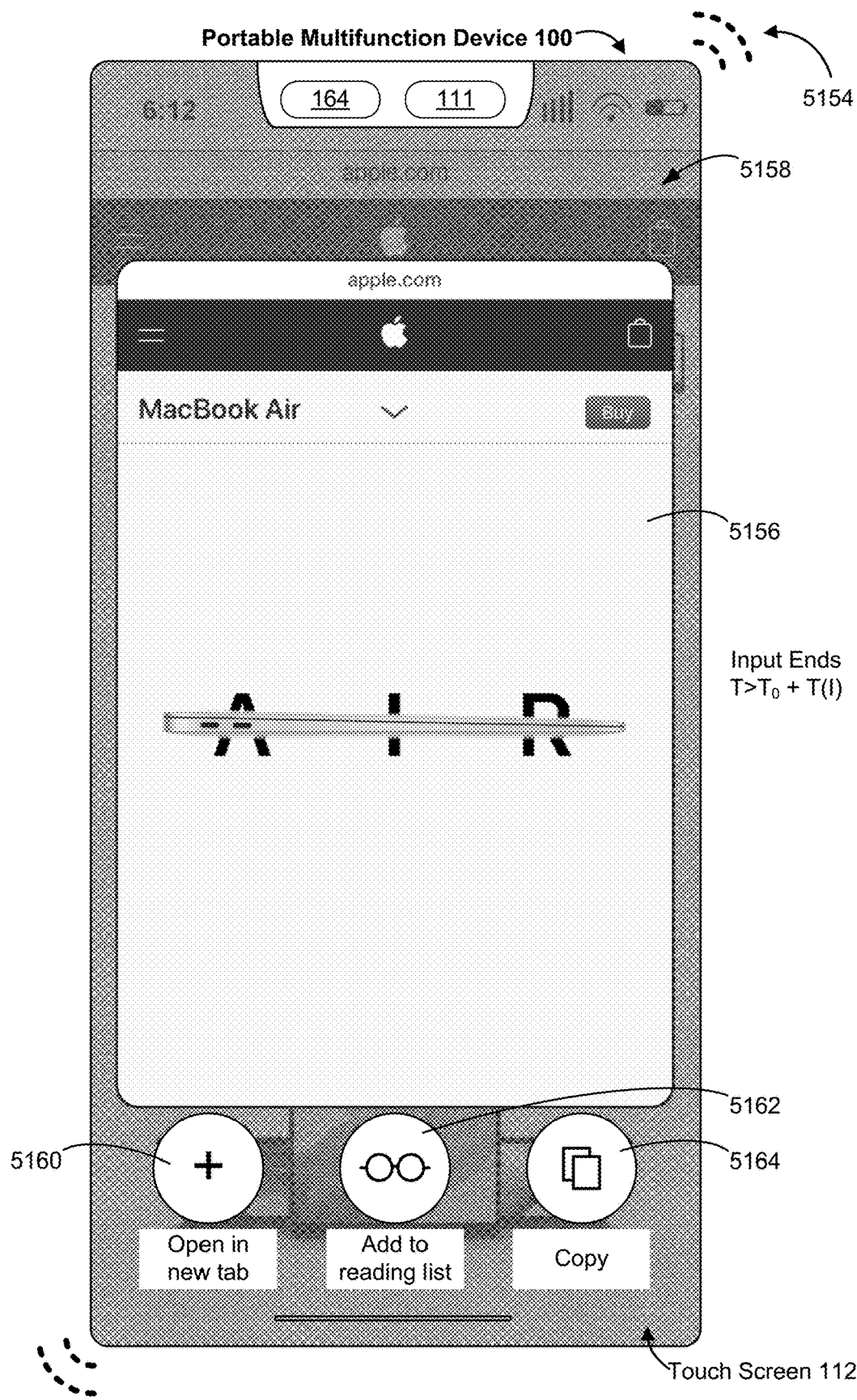
Figure 5A60

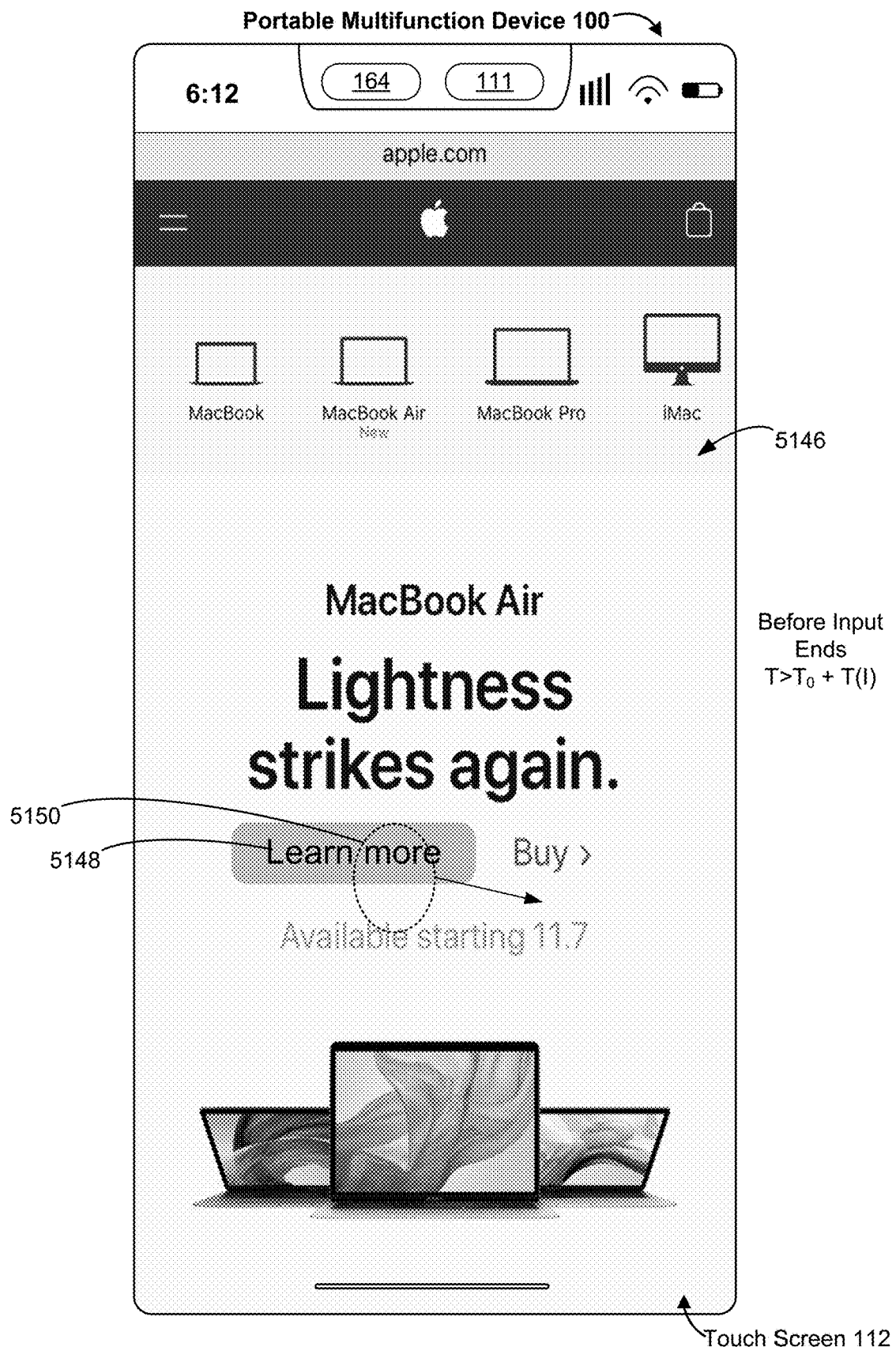
Figure 5A61

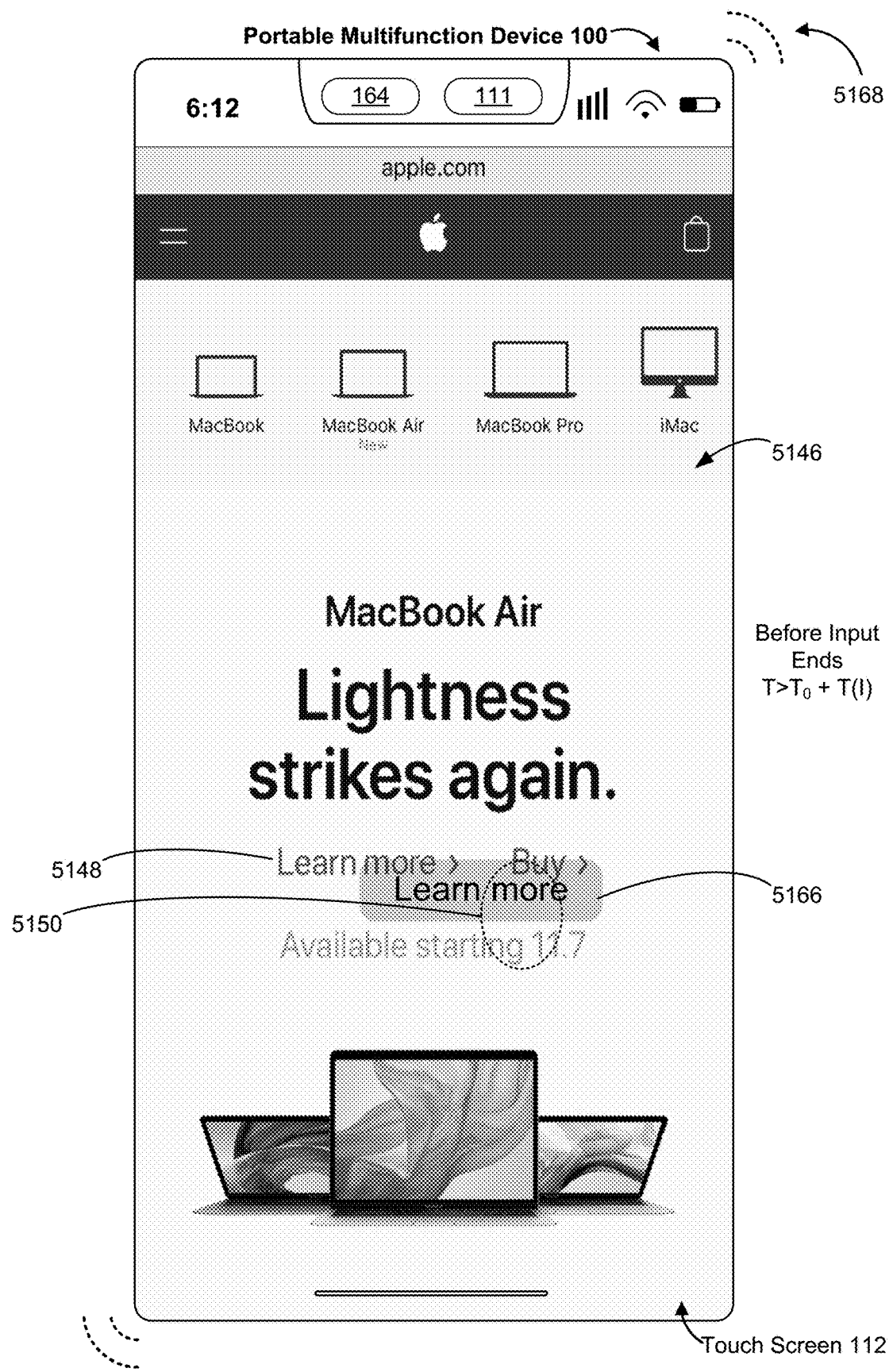
Figure 5A62

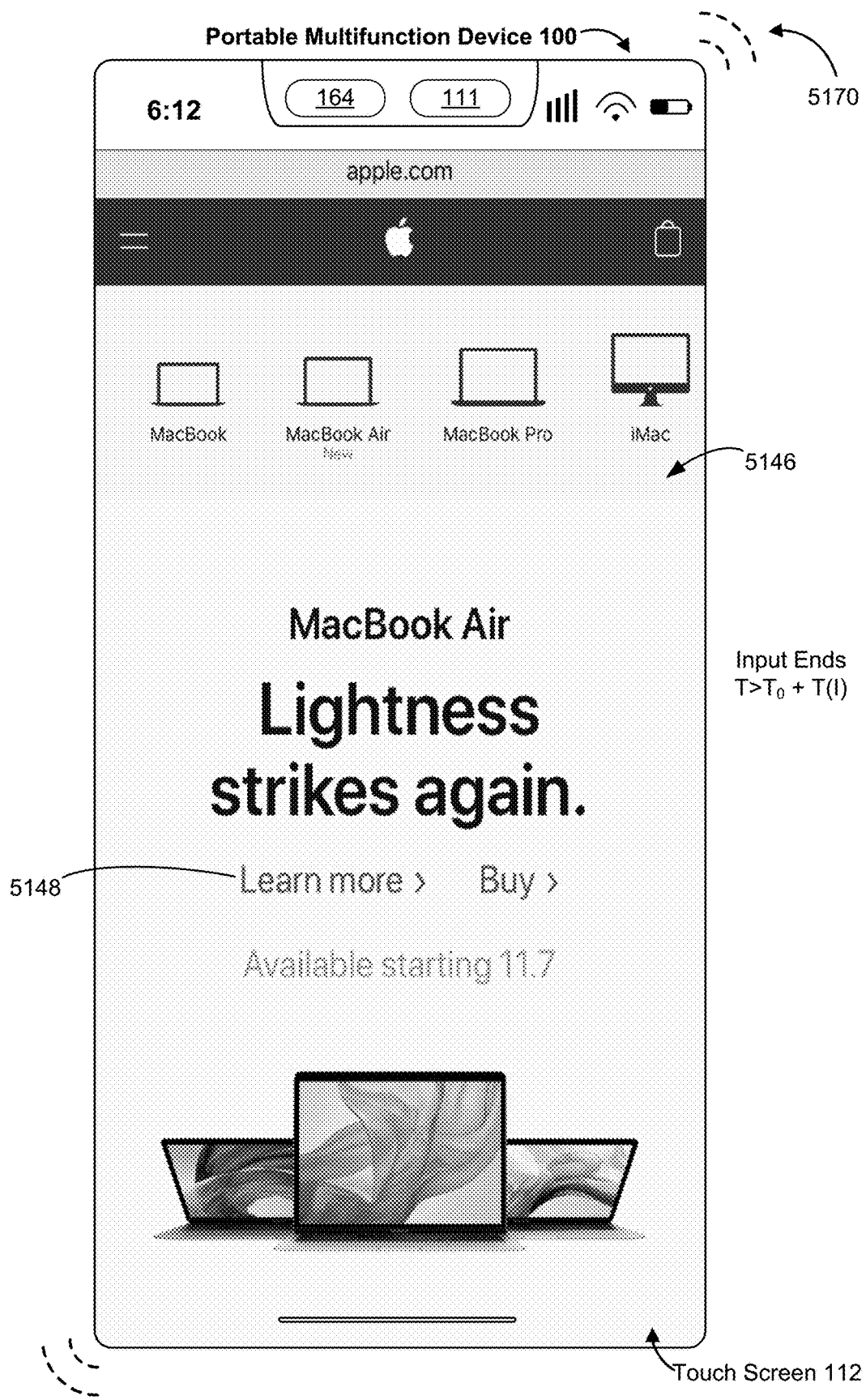
Figure 5A63

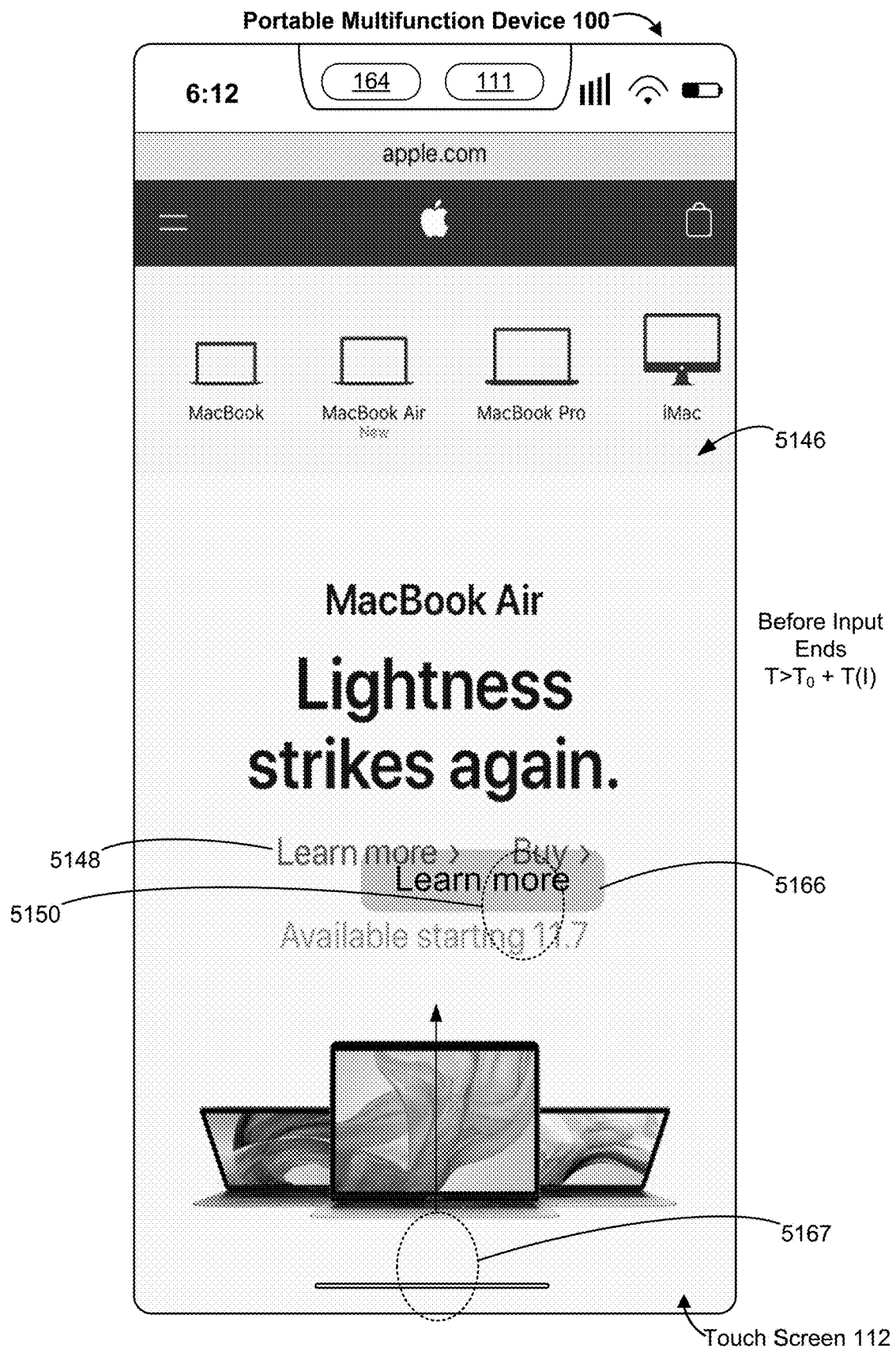
Figure 5A64

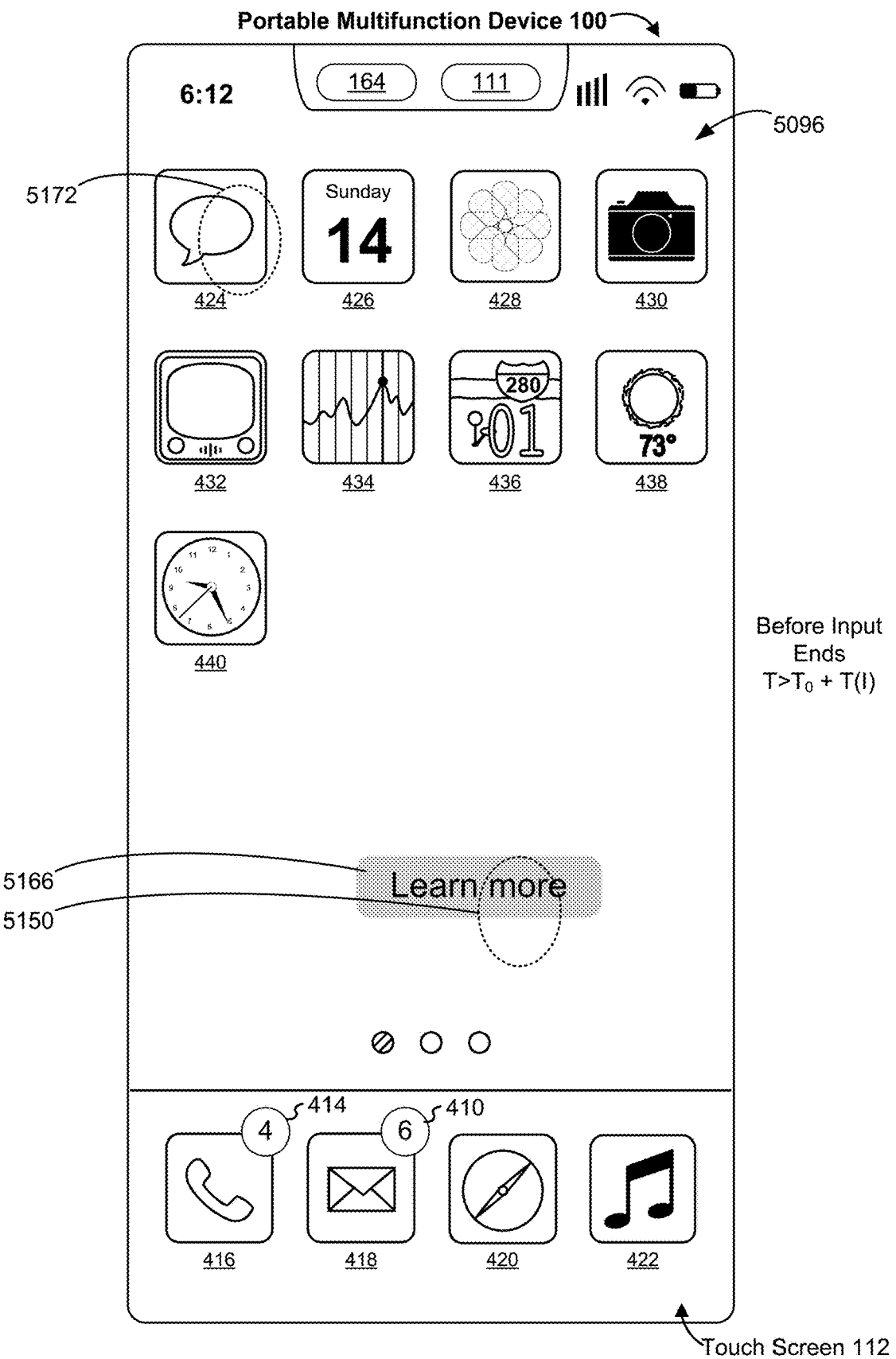
Figure 5A65

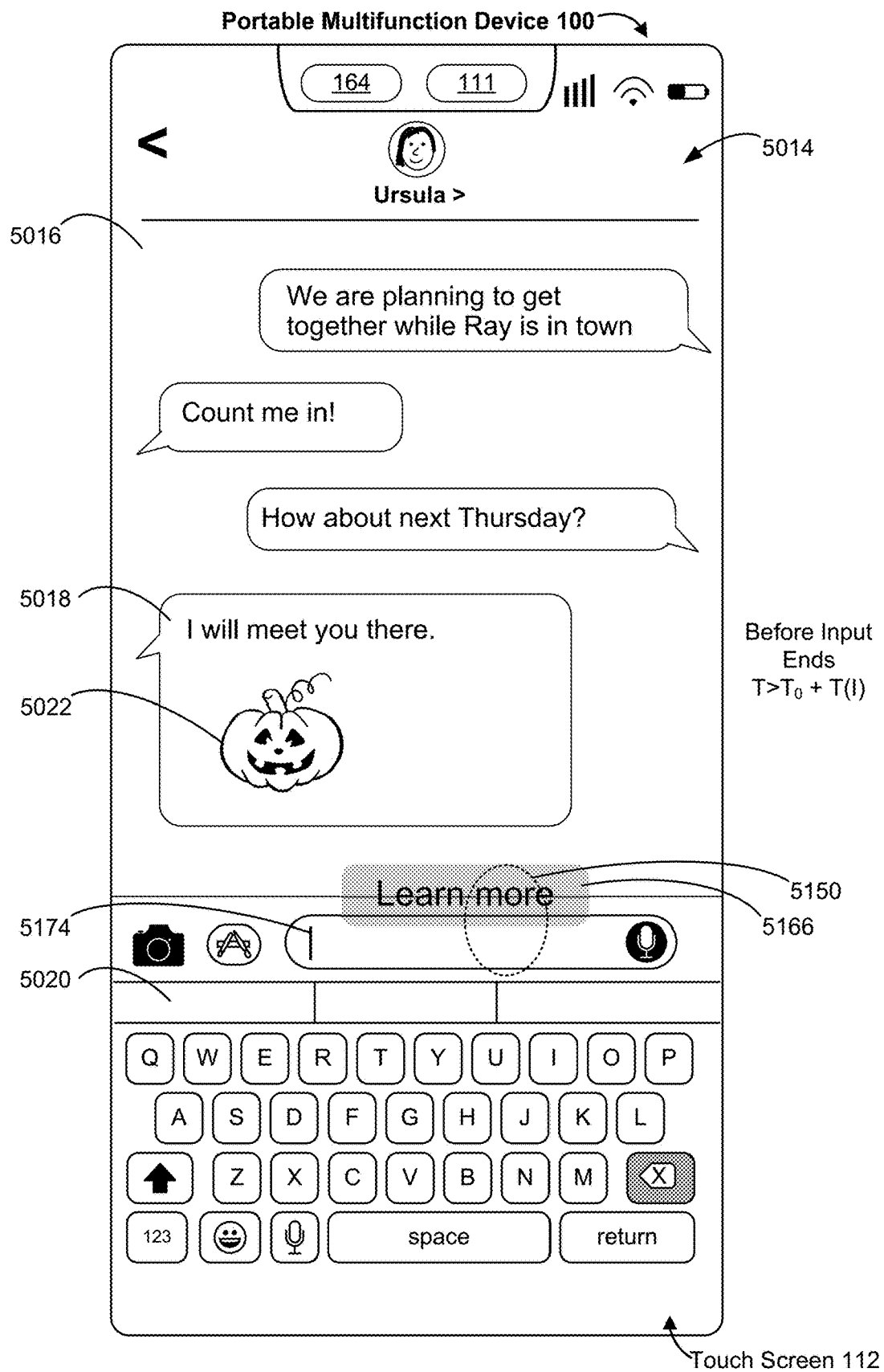
Figure 5A66

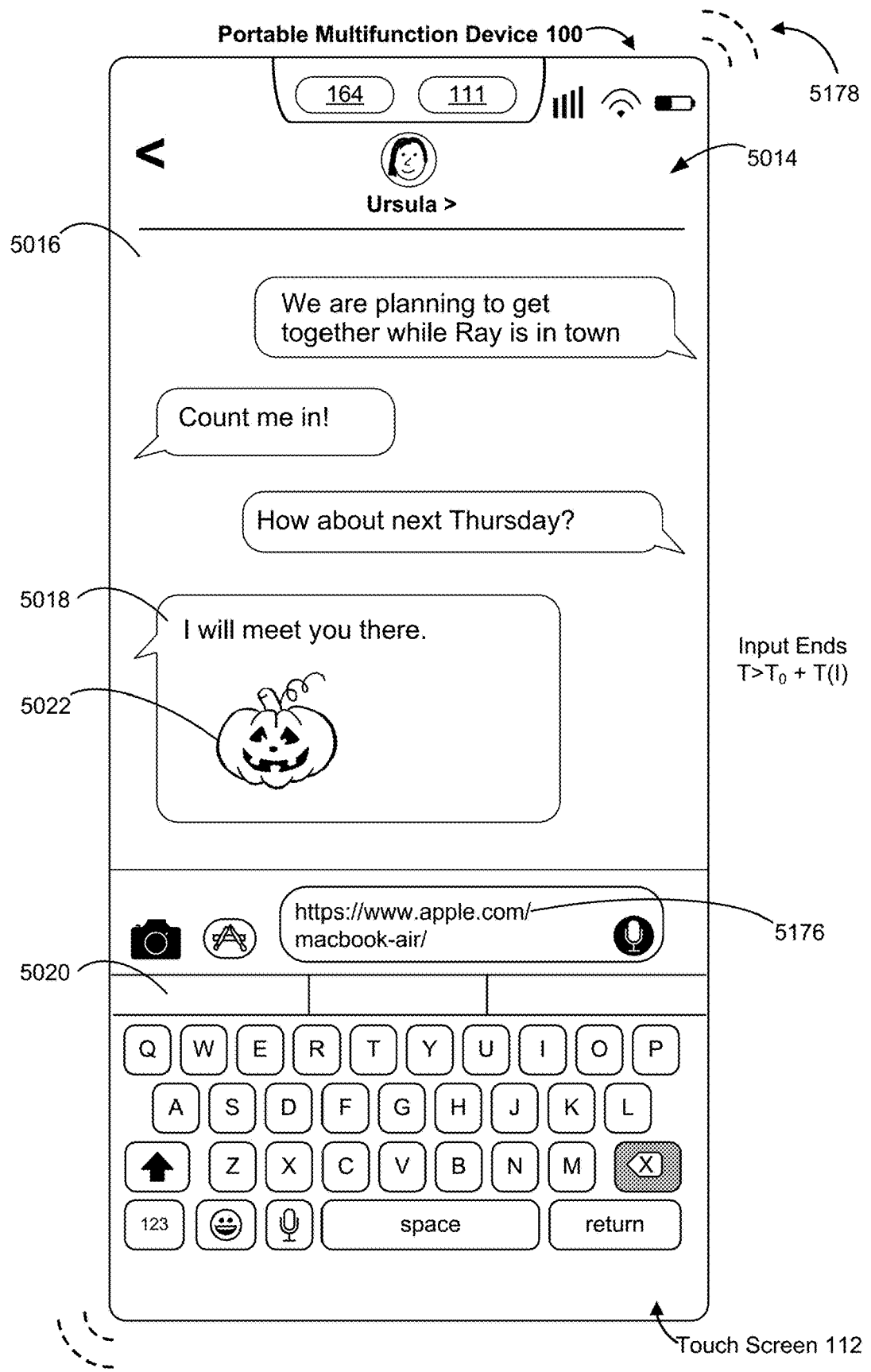
Figure 5A67

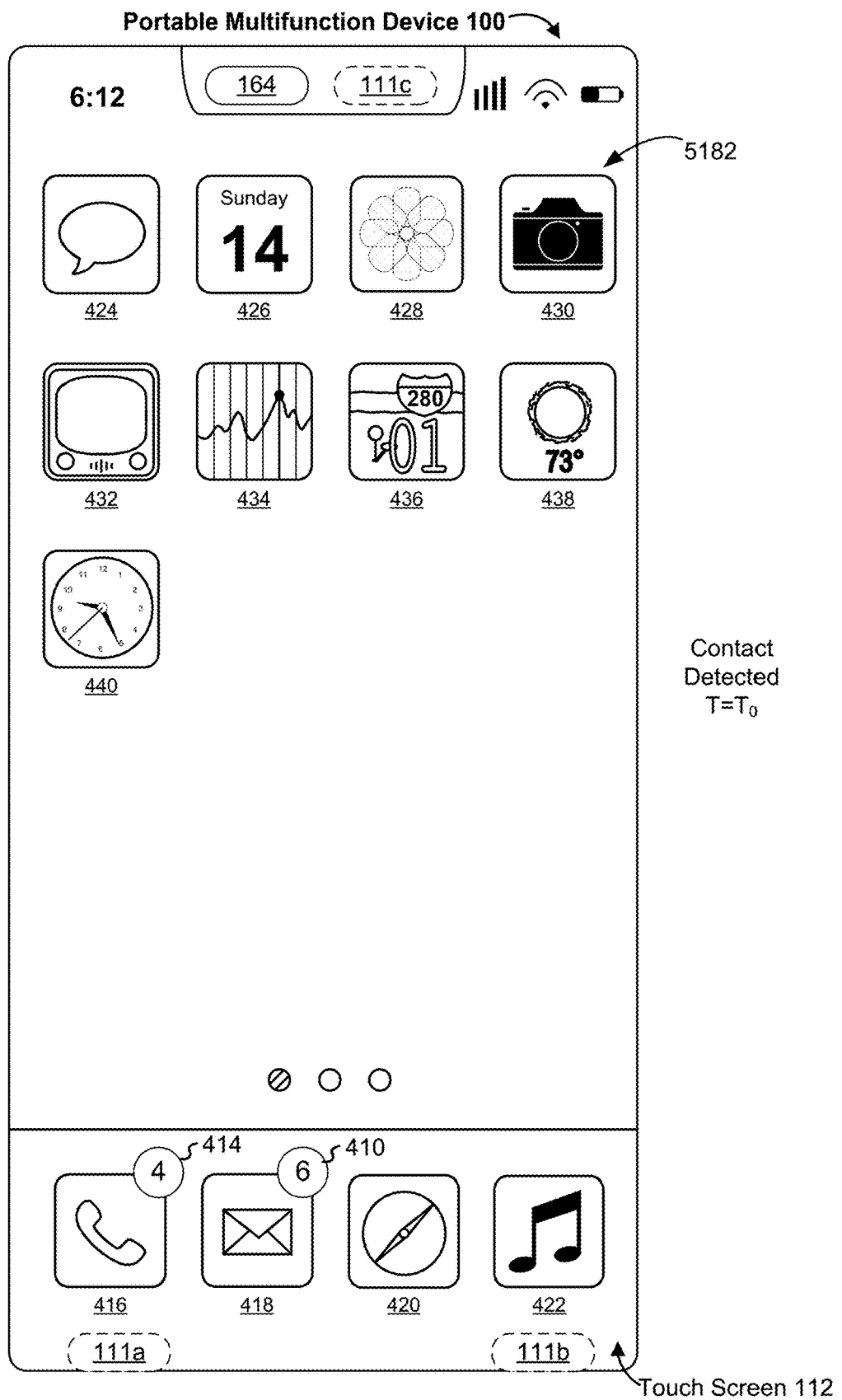
Figure 5B1

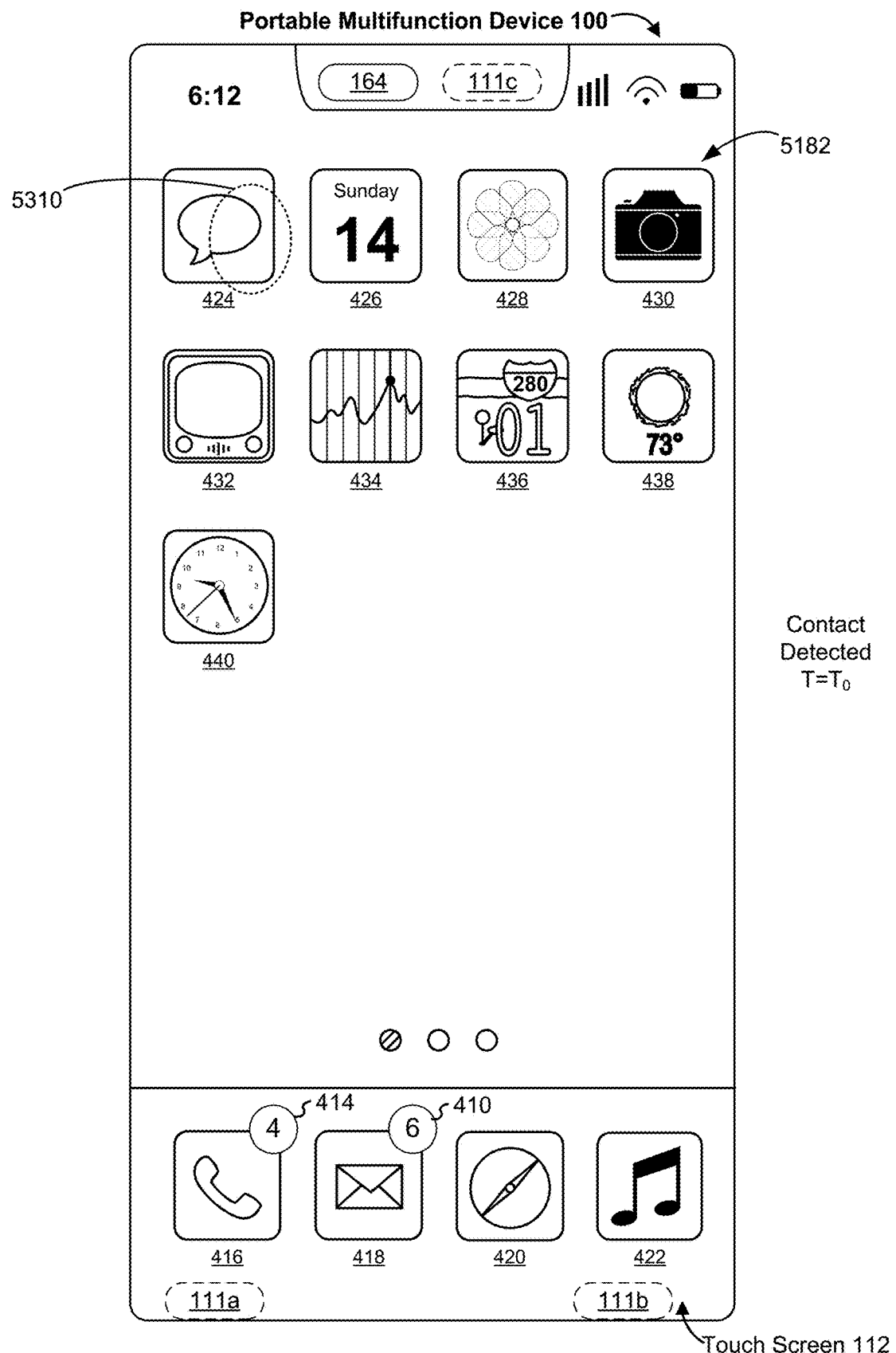
Figure 5B2

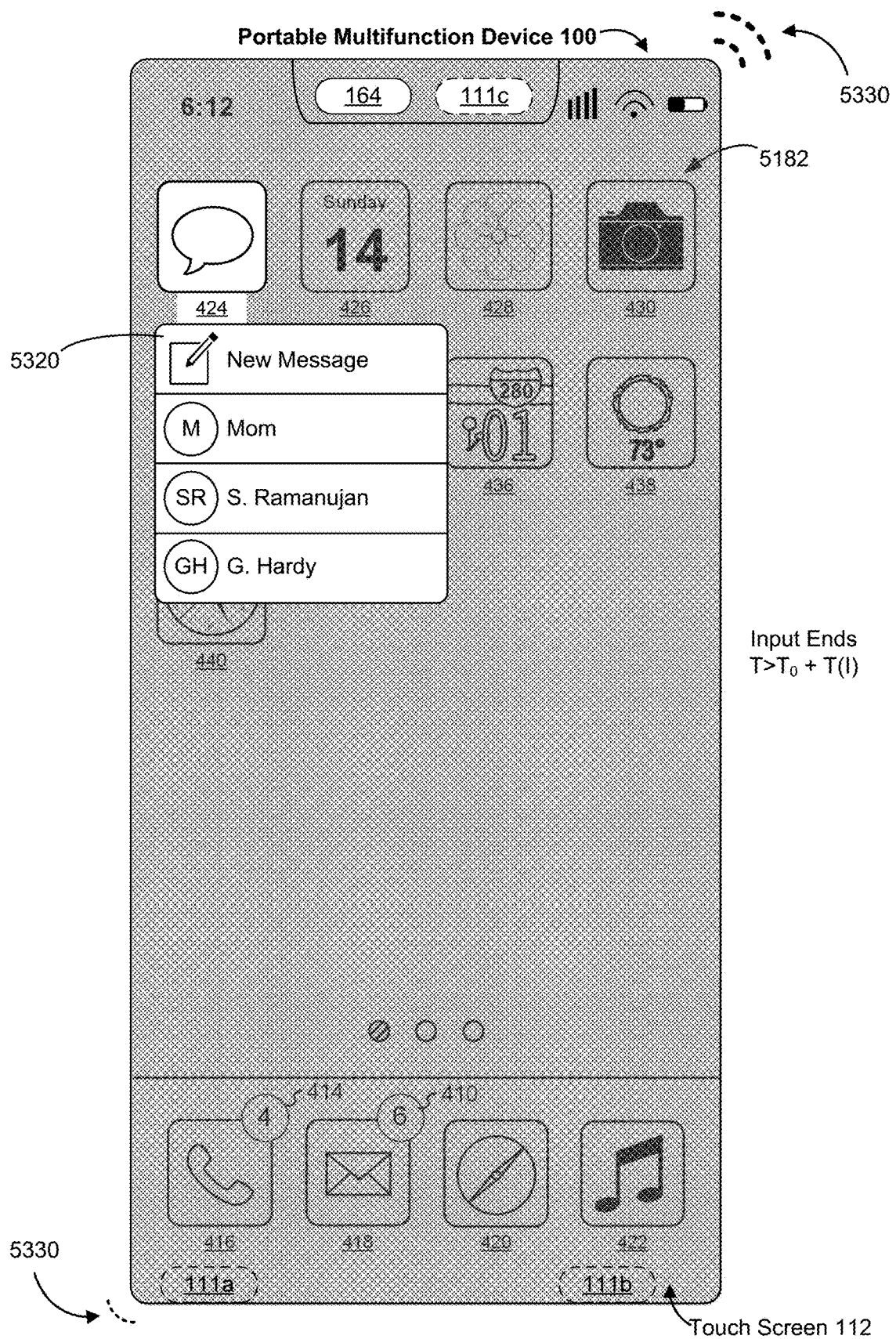
Figure 5B3

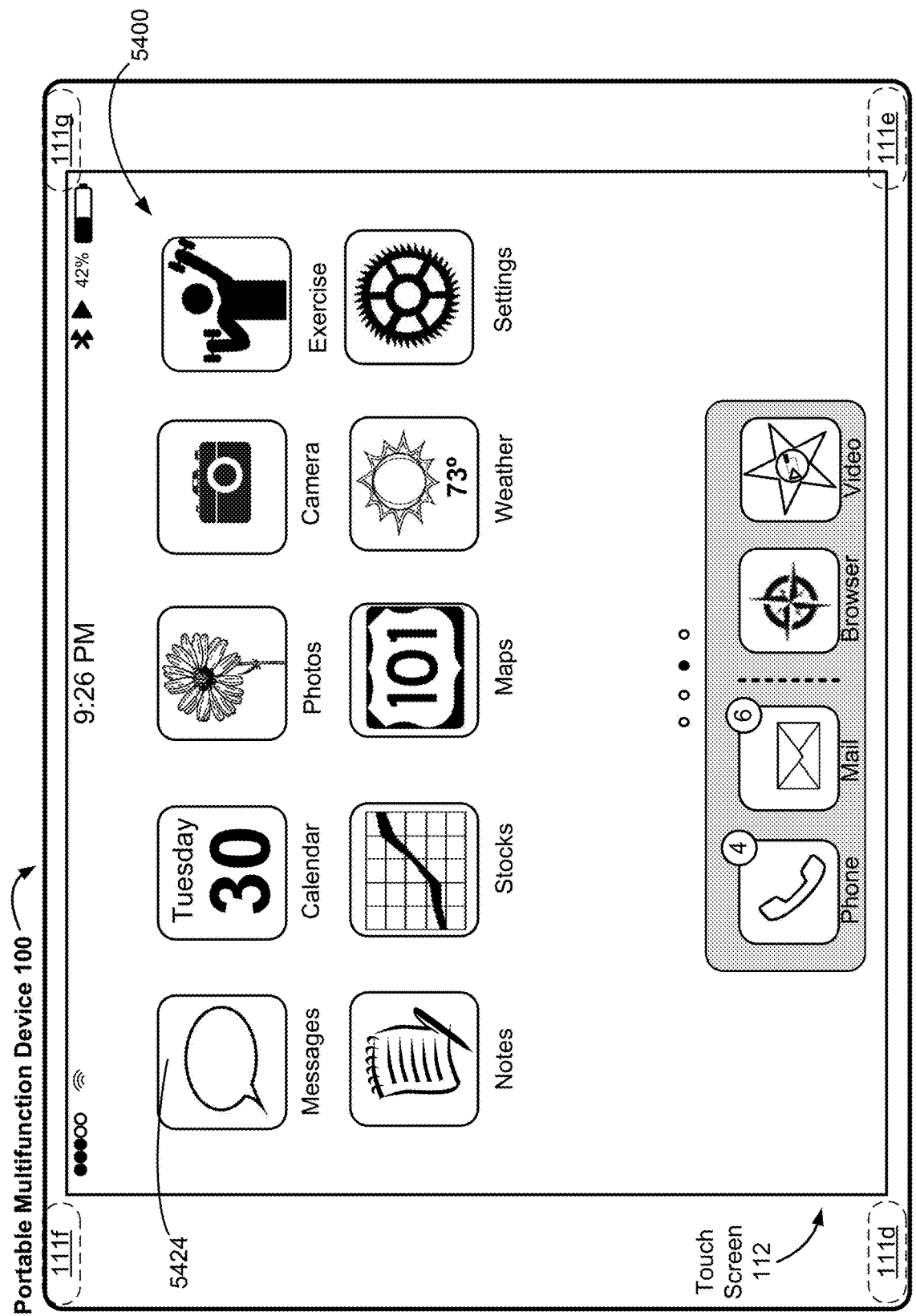
Figure 5B4

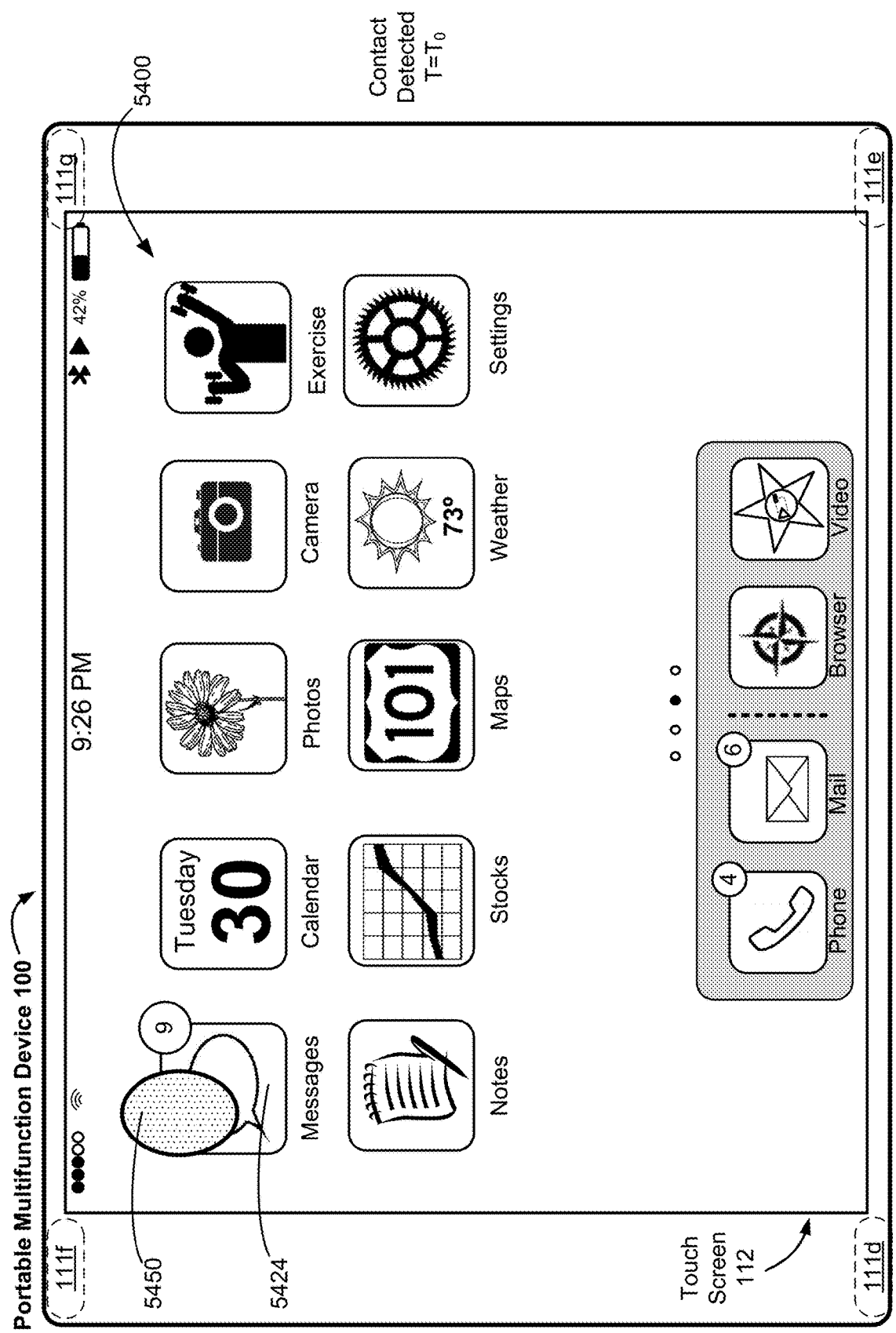
Figure 5B5

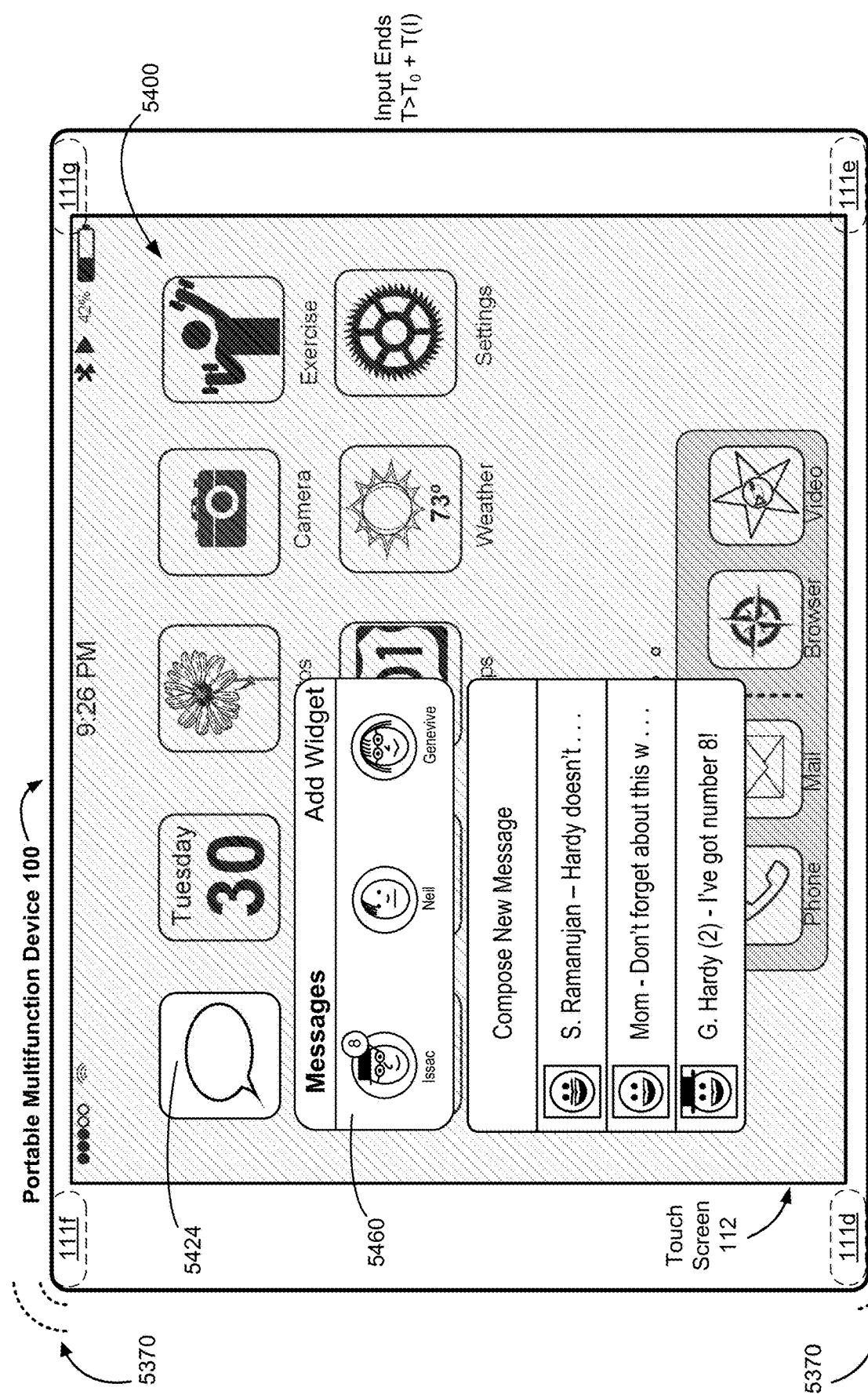
Figure 5B6

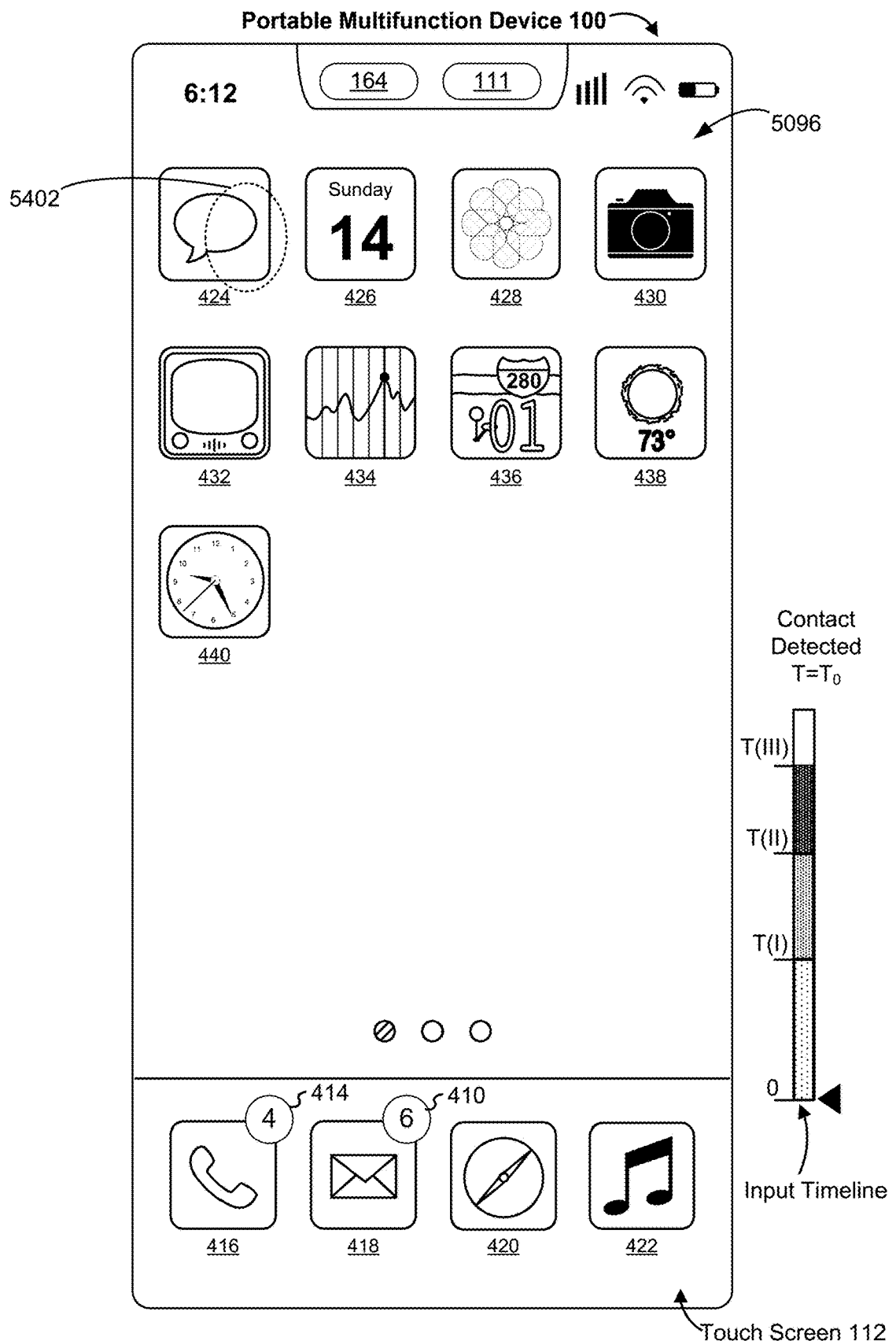
Figure 5C1

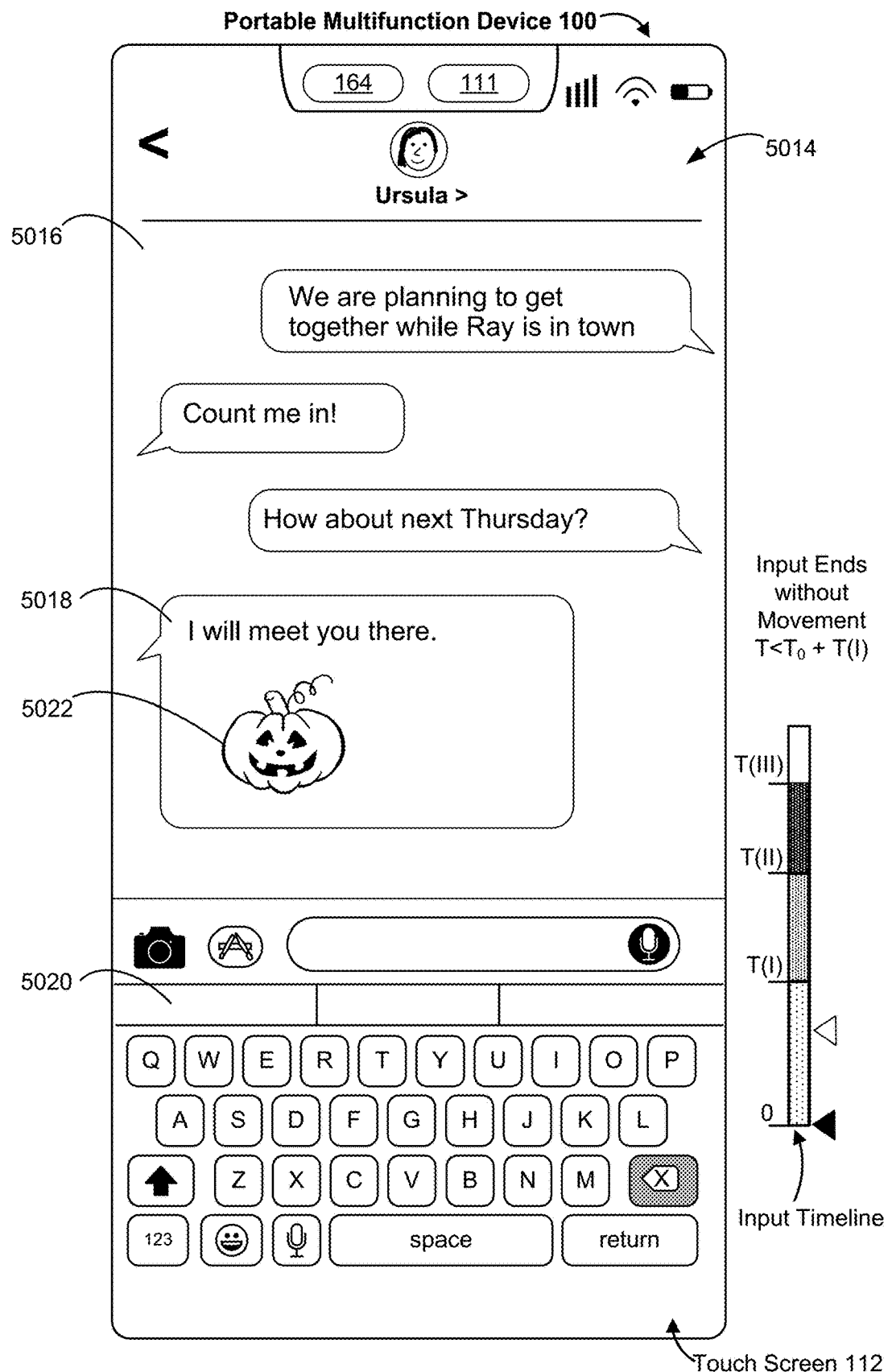
Figure 5C2

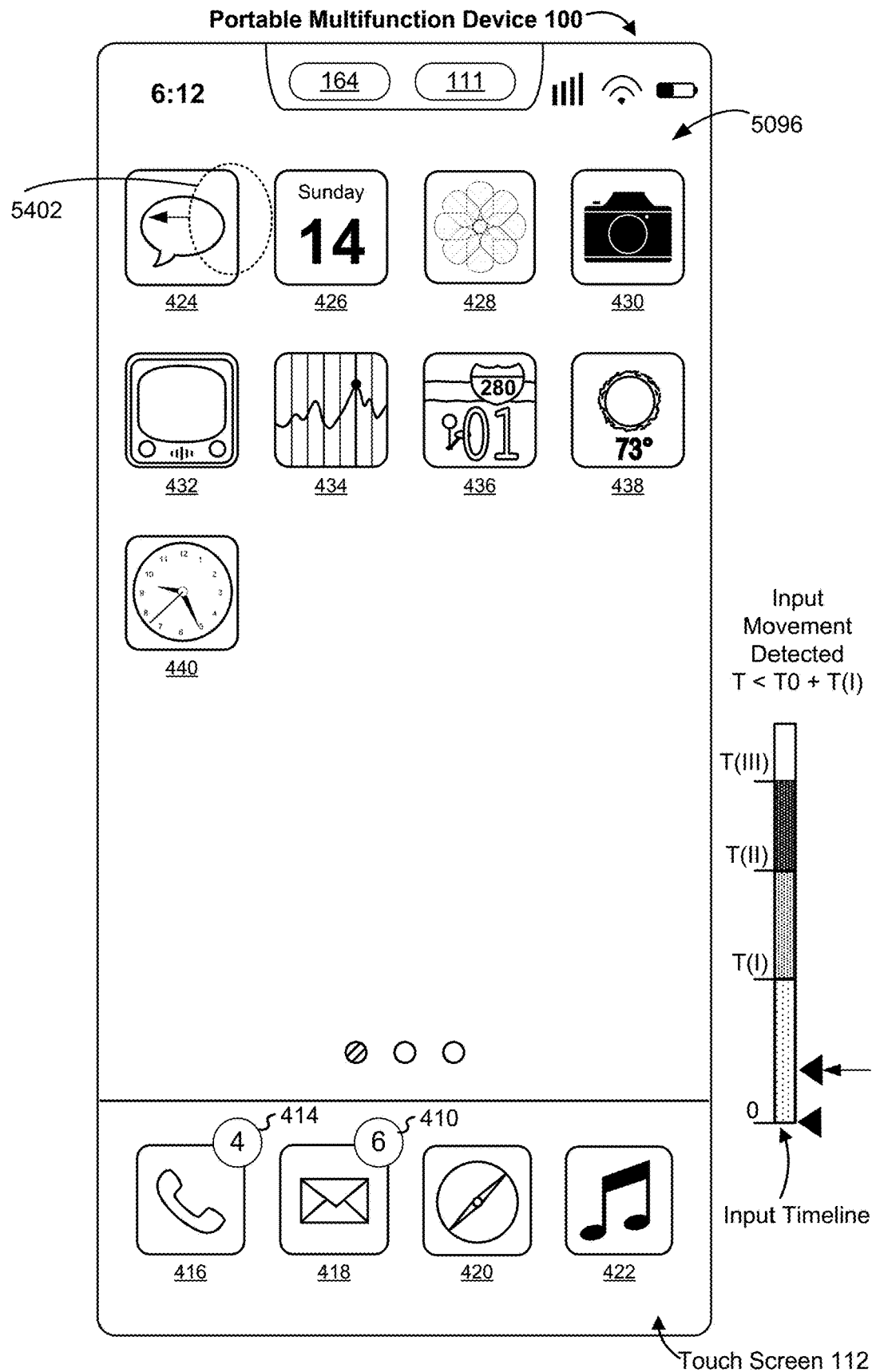
Figure 5C3 (Continued from Figure 5C1)

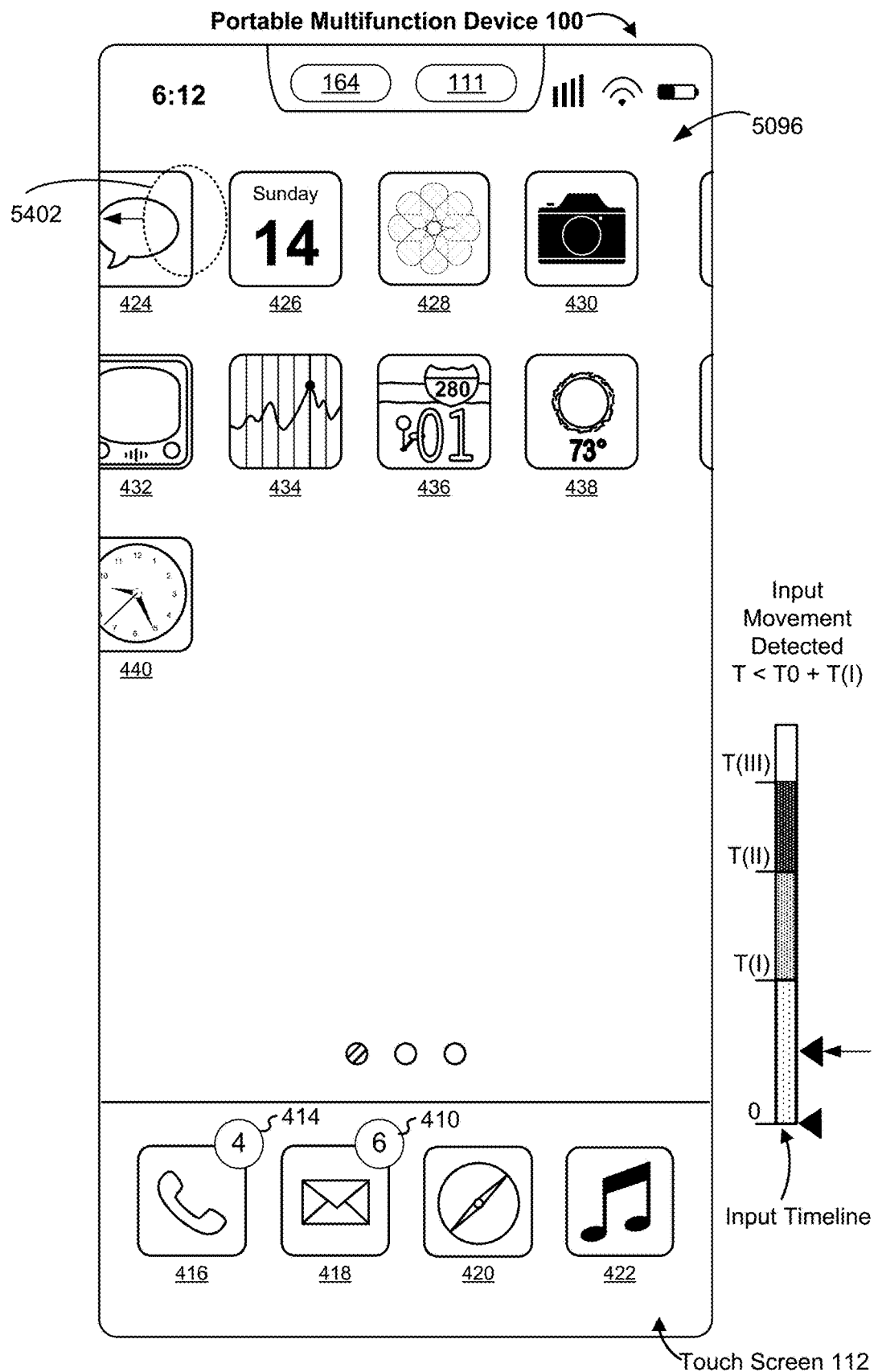
Figure 5C4

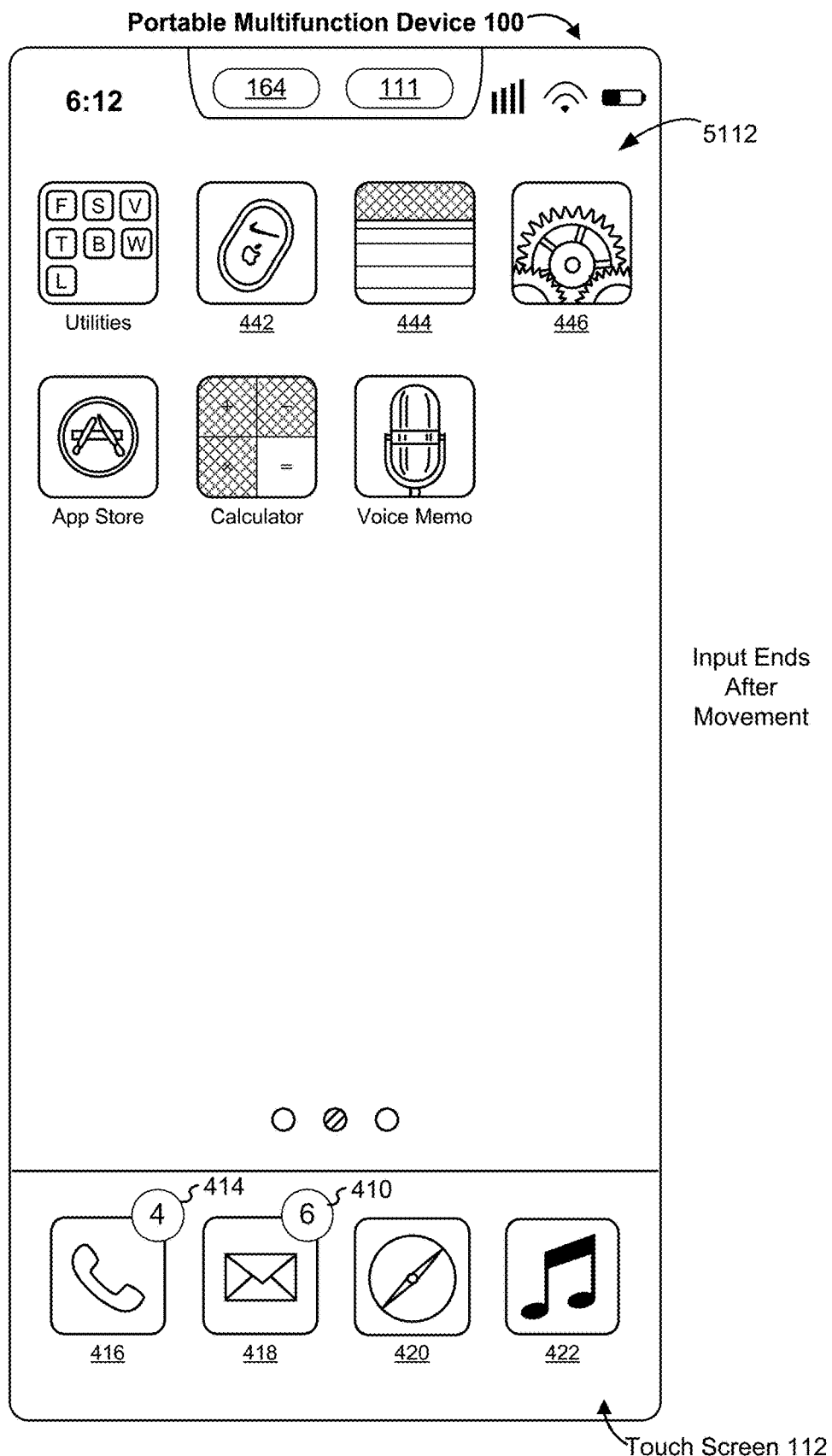
Figure 5C5

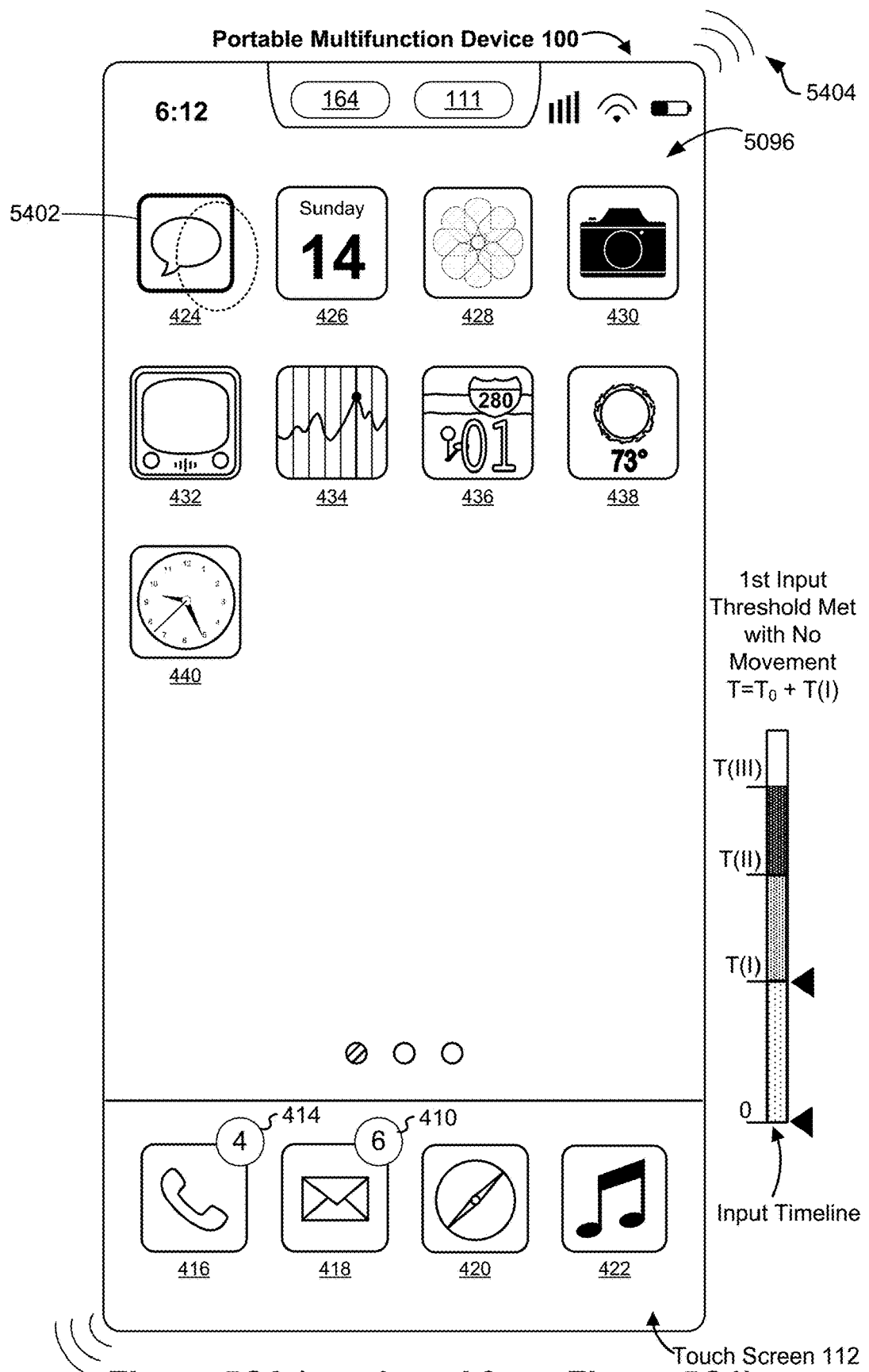
Figure 5C6 (continued from Figure 5C1)

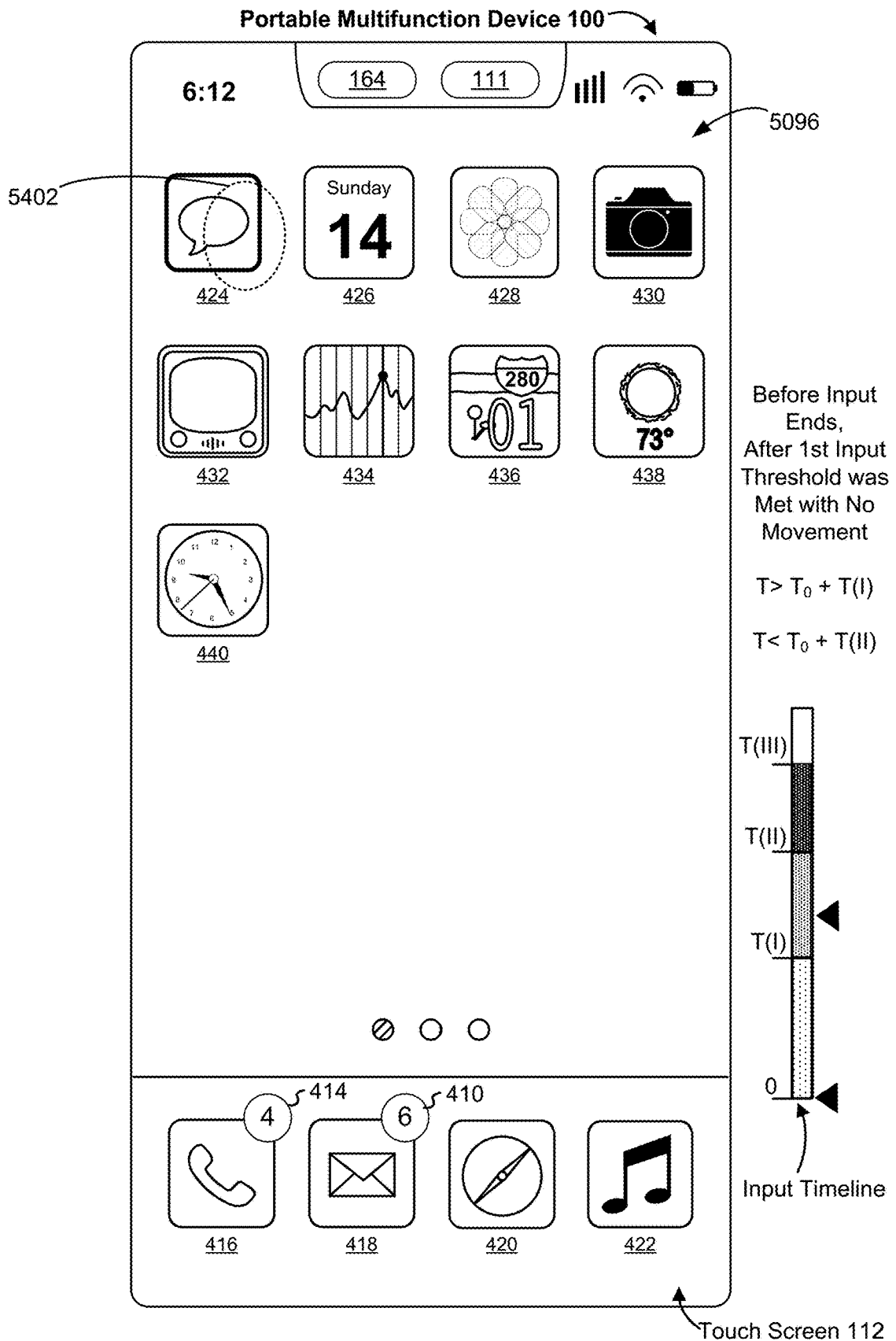
Figure 5C7

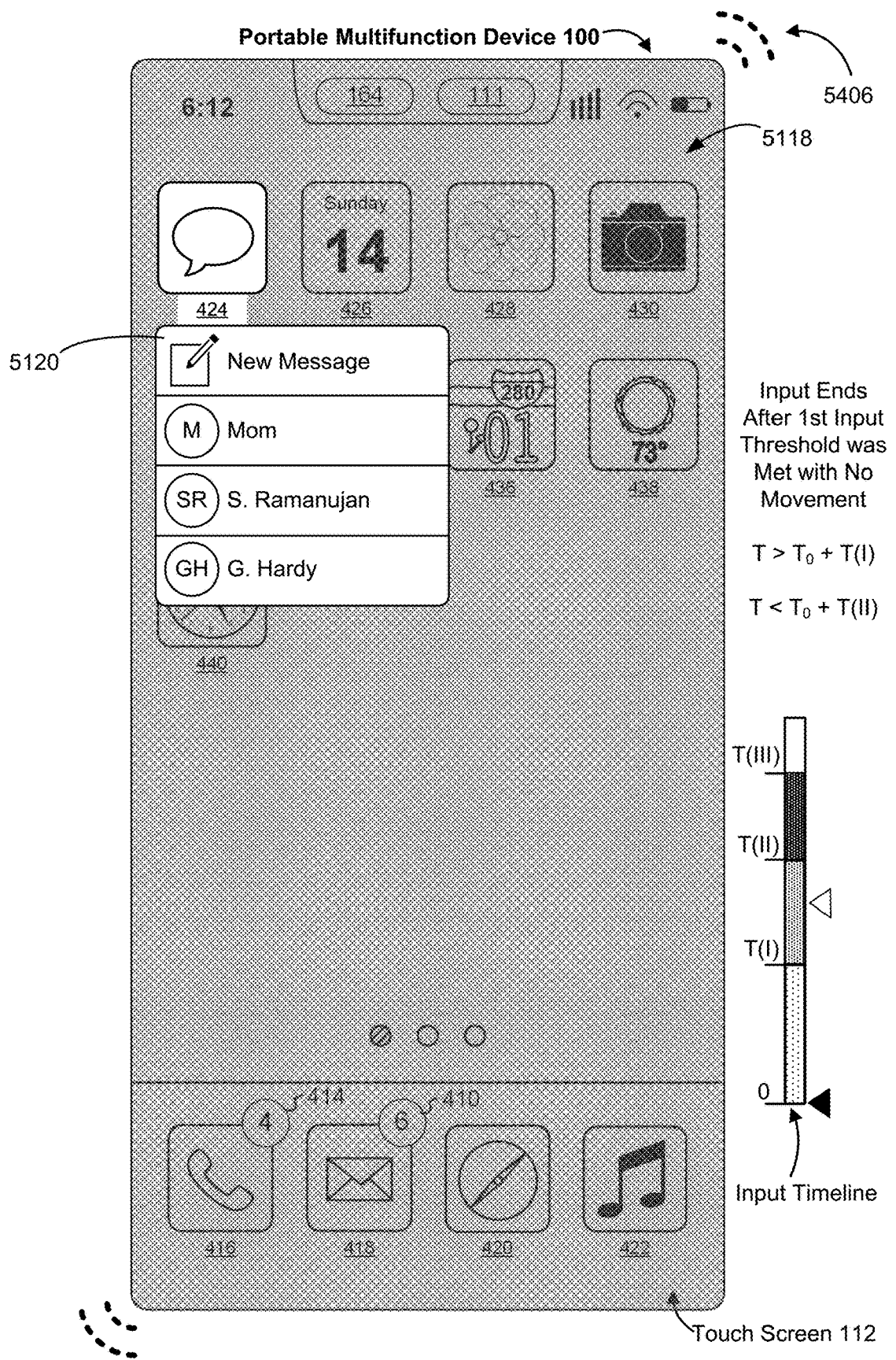
Figure 5C8

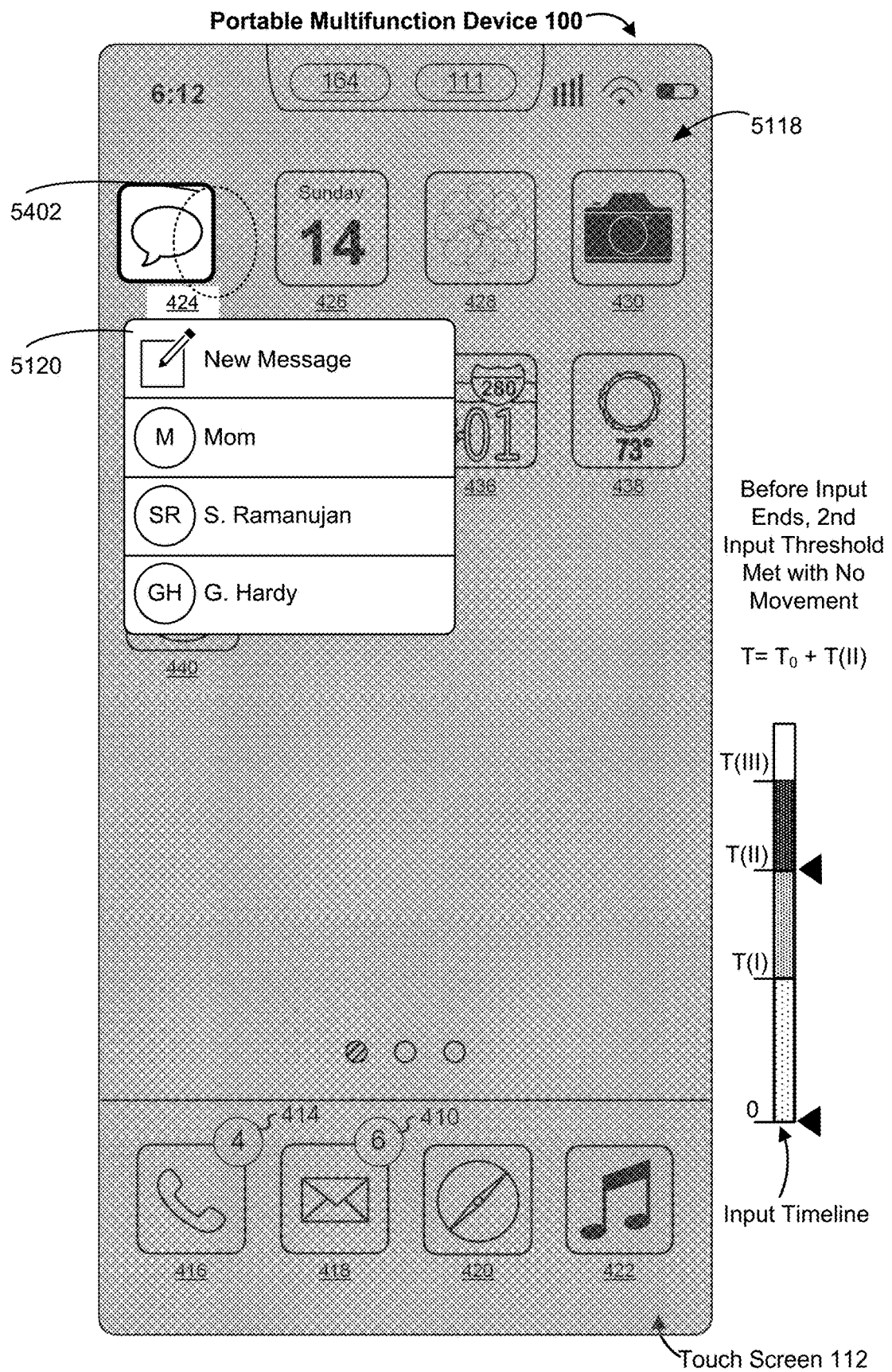
Figure 5C9 (Continued from Figure 5C7)

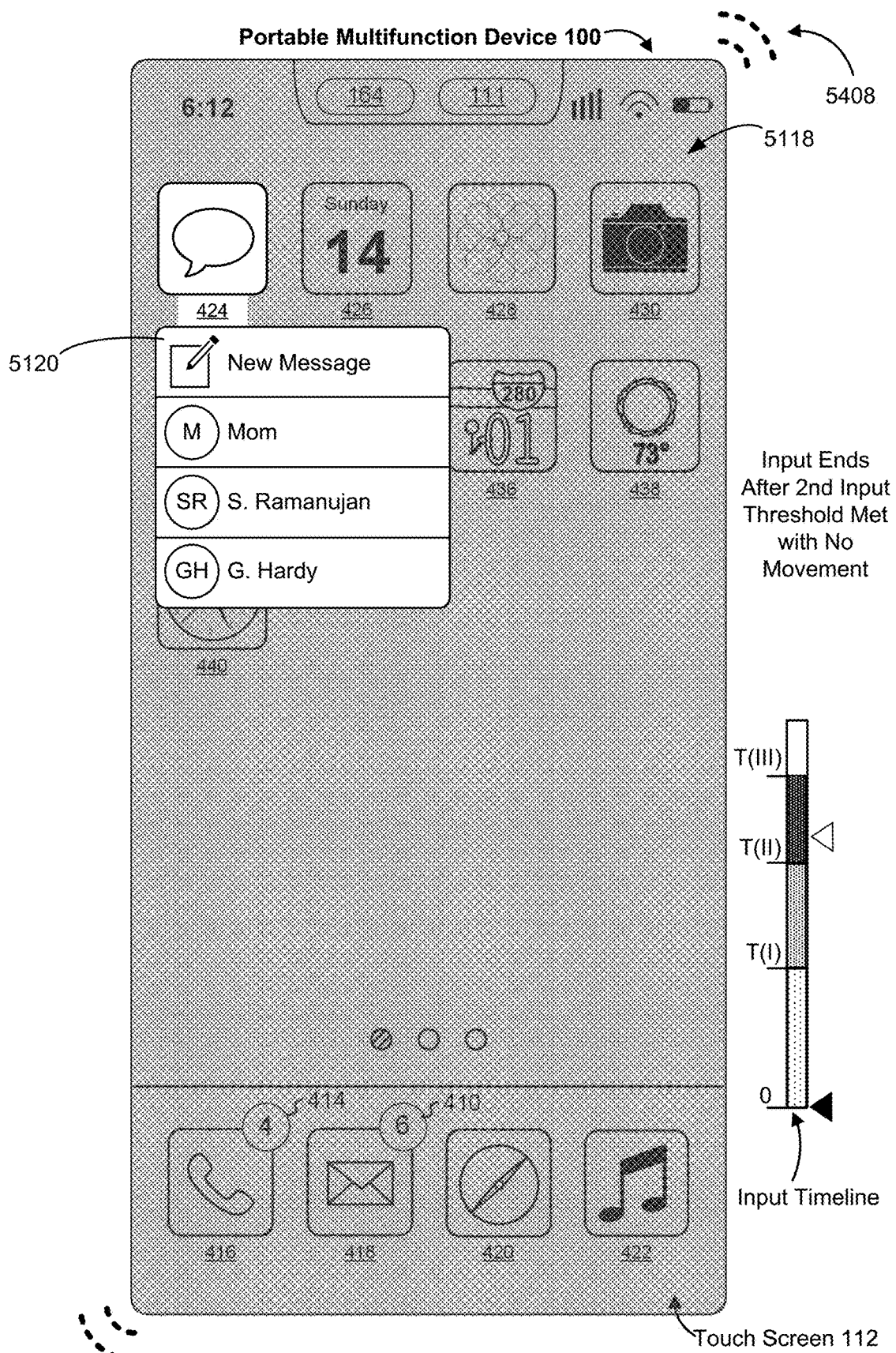
Figure 5C10

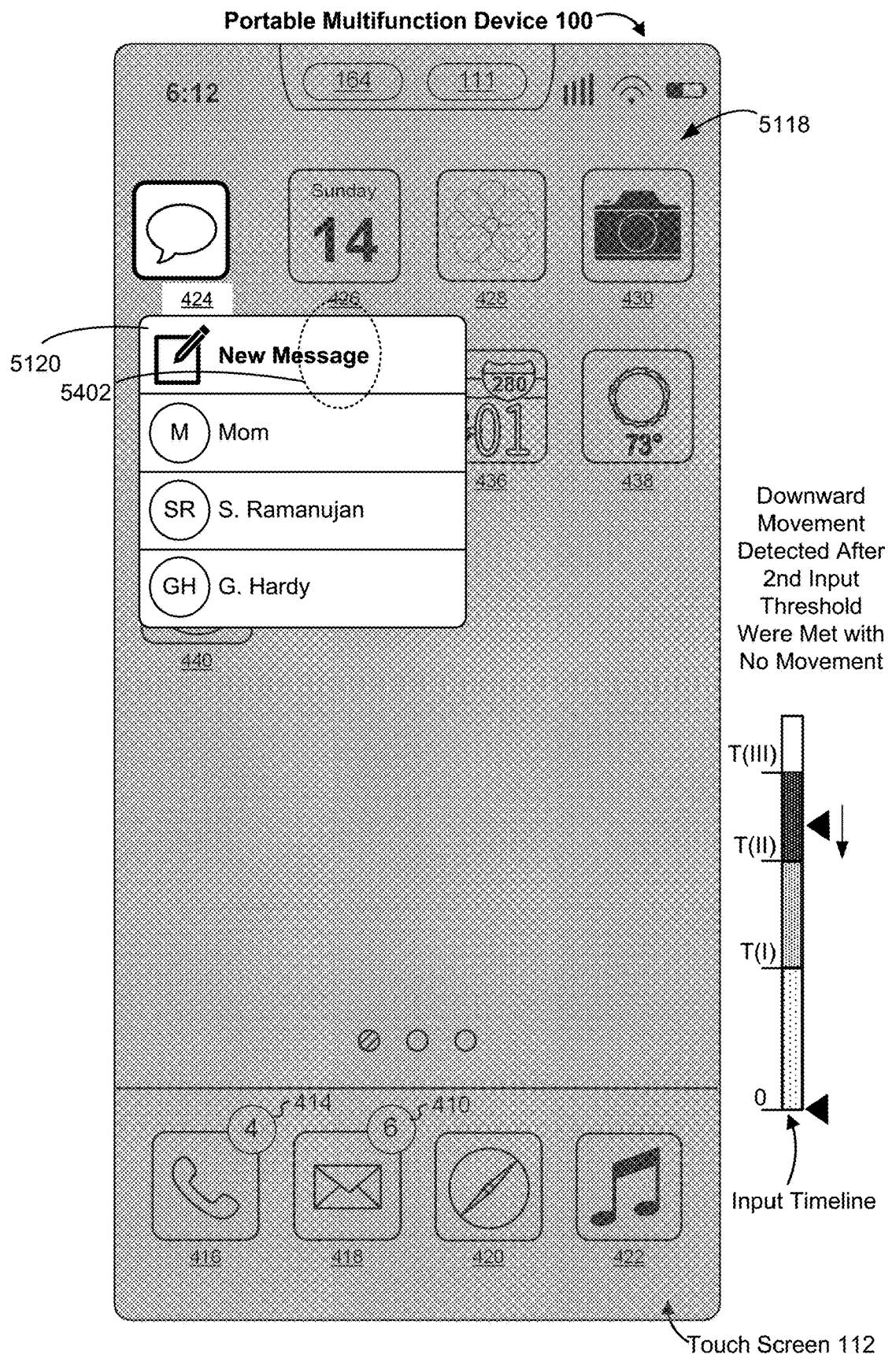
Figure 5C11 (Continued from Figure 5C9)

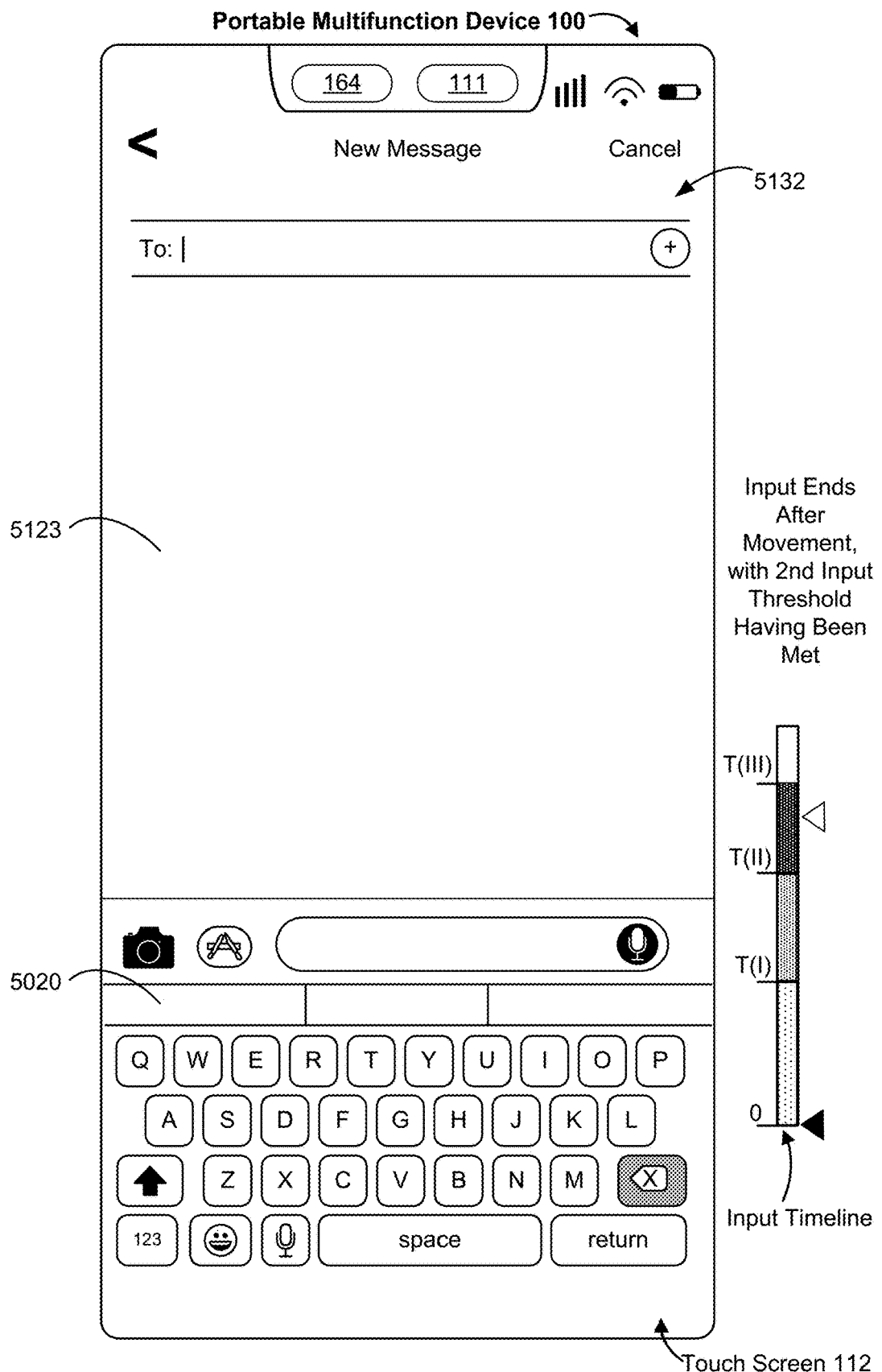
Figure 5C12

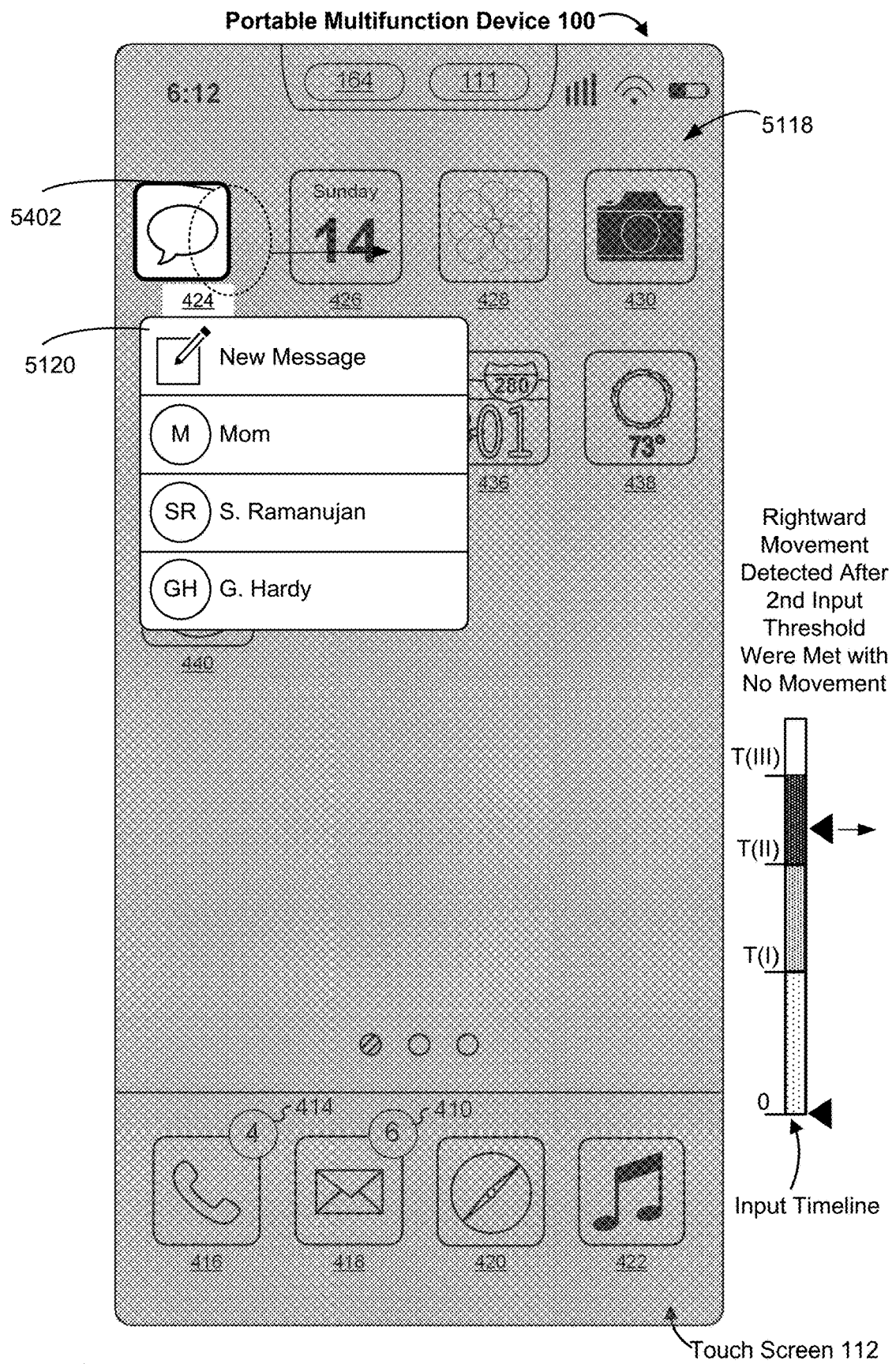
Figure 5C13 (Continued from Figure 5C9)

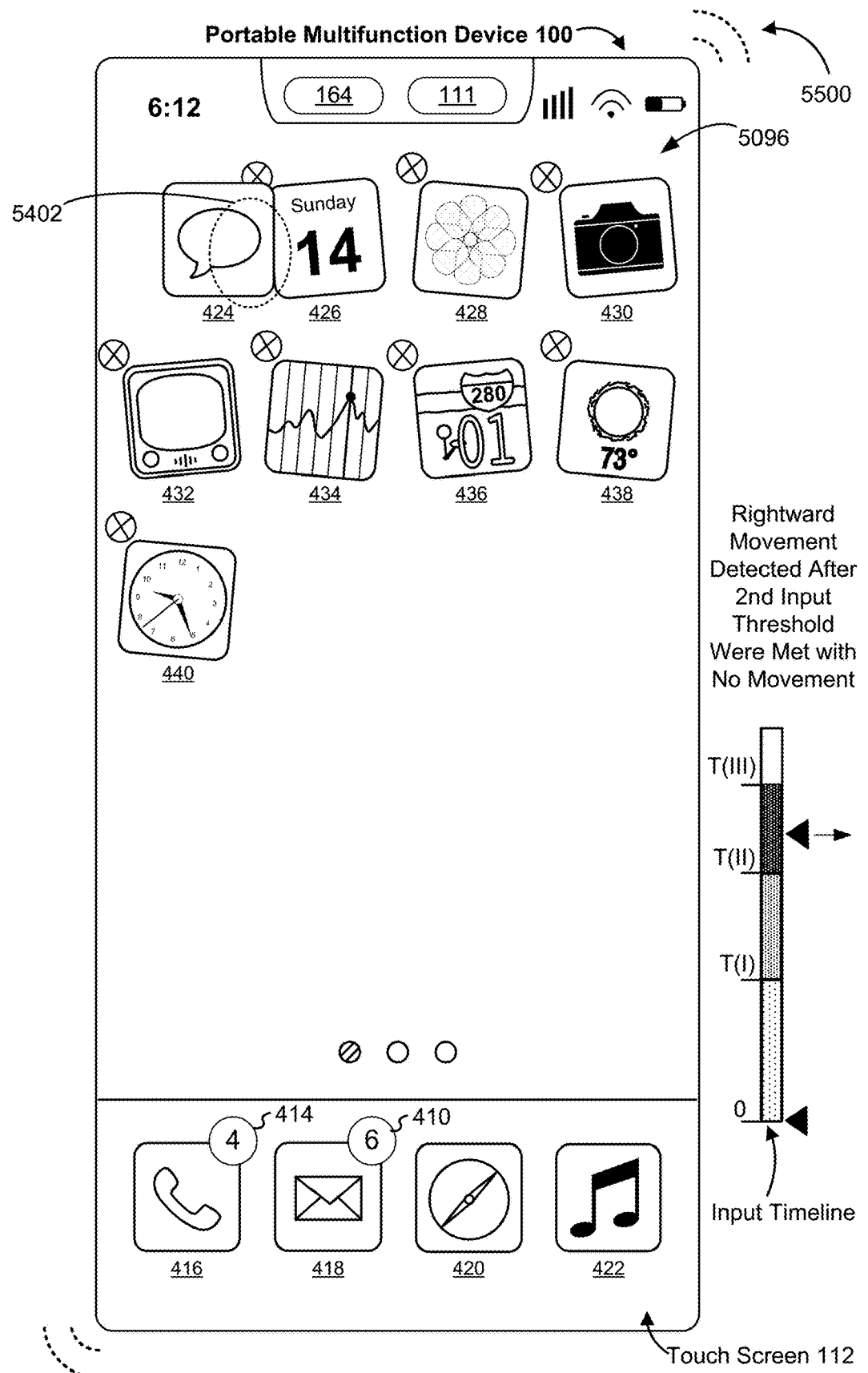
Figure 5C14

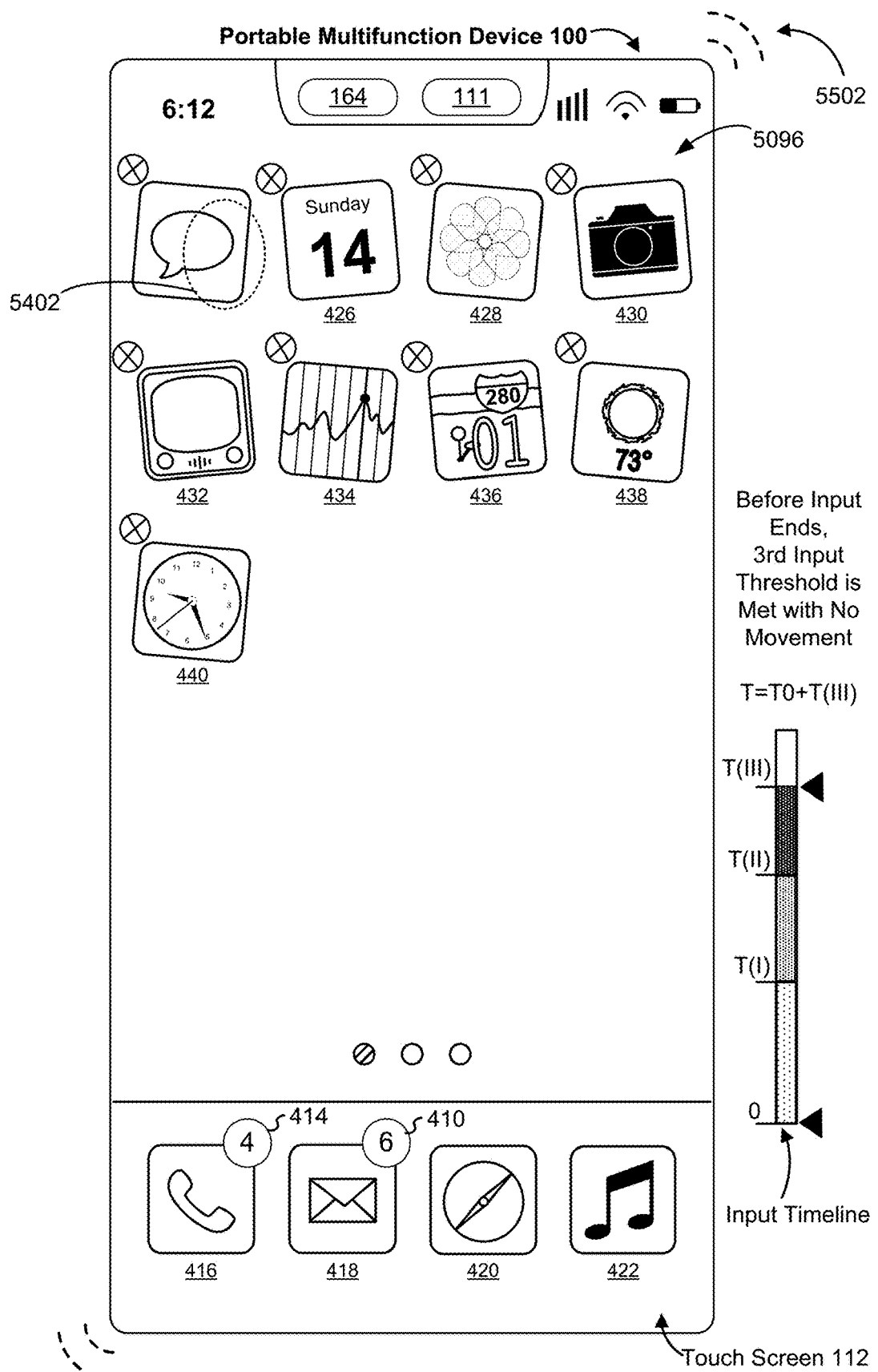
Figure 5C15 (Continued from Figure 5C9)

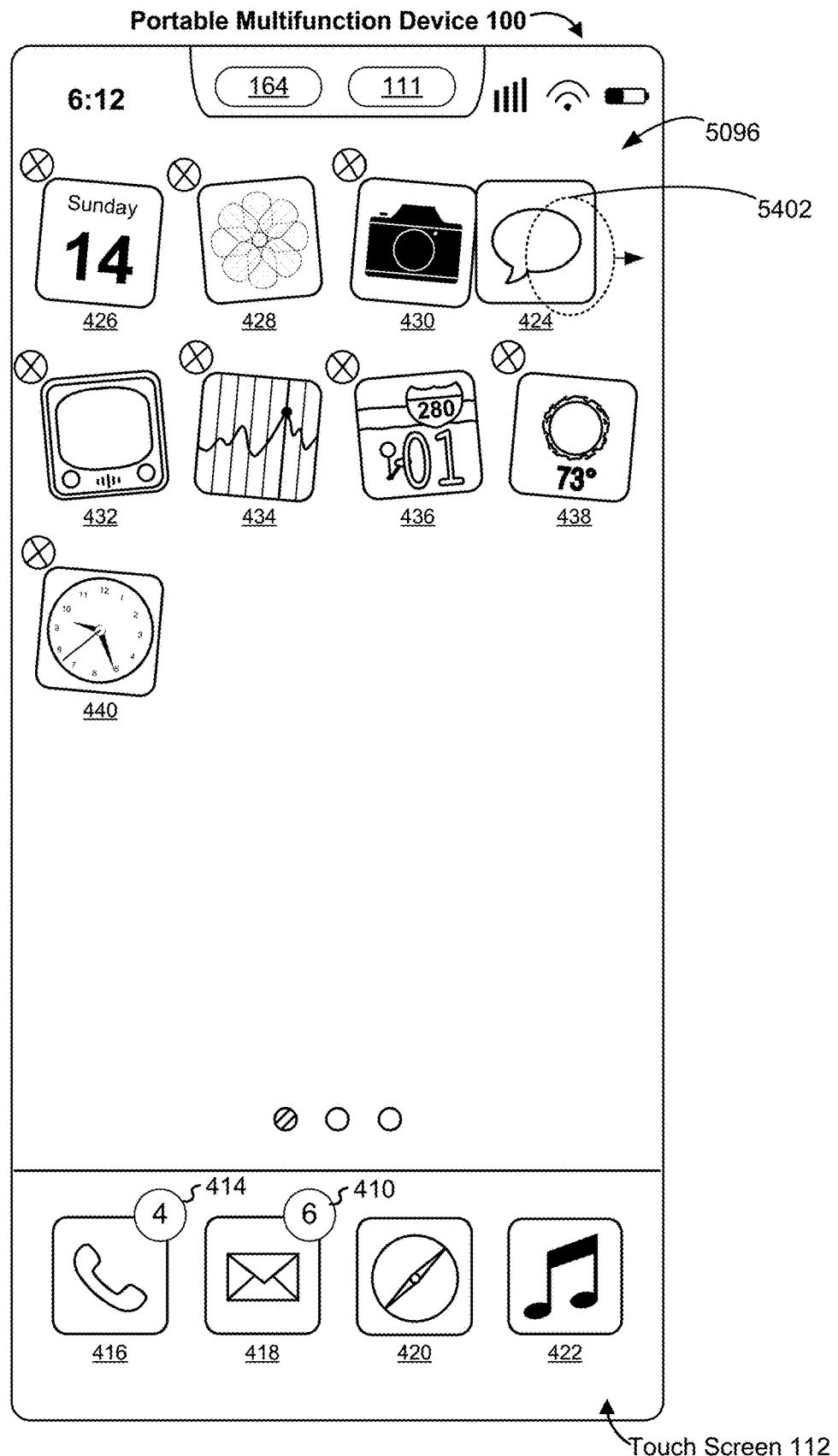
Figure 5C16 (Continued from Figures 5C14 or 5C15)

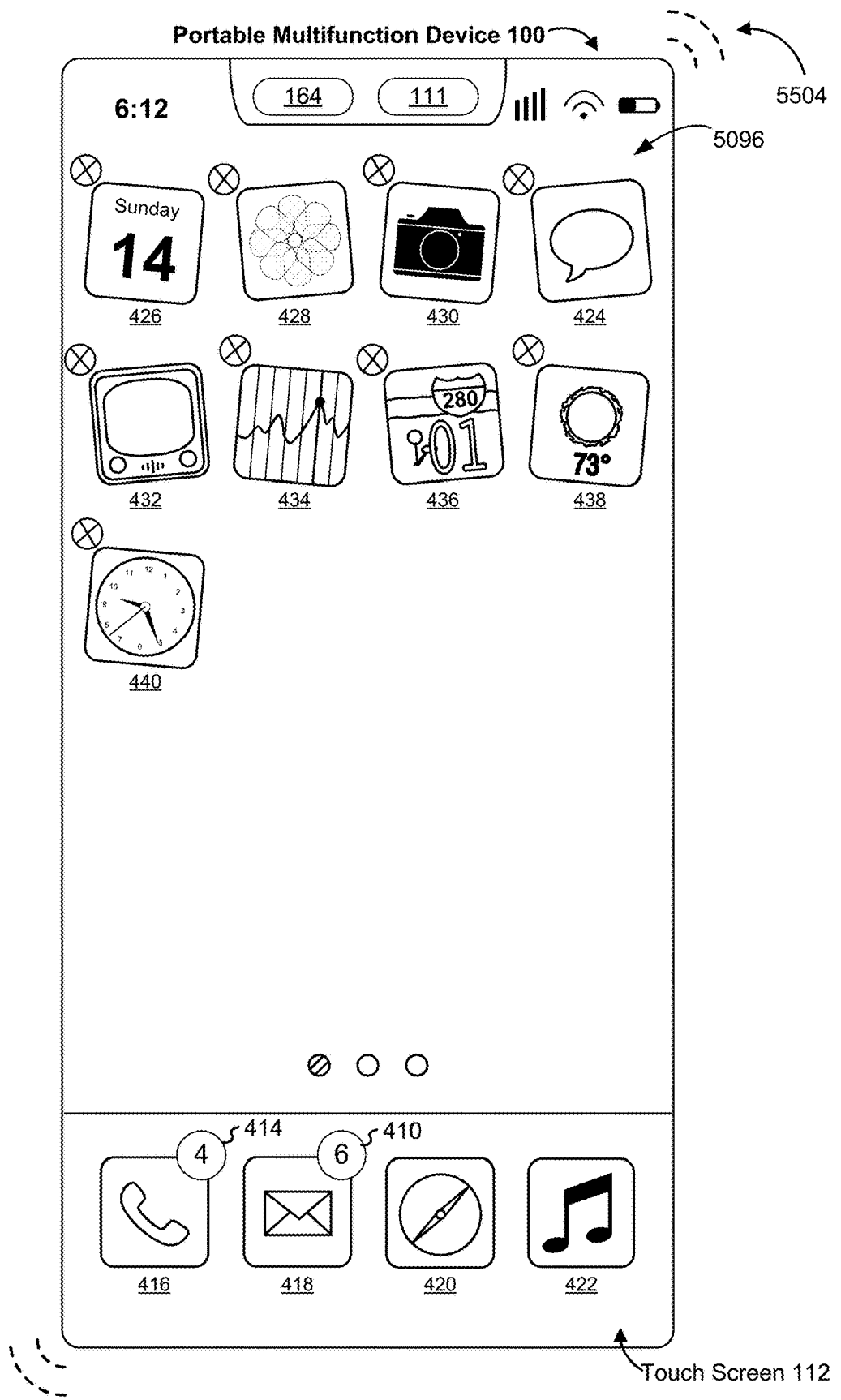
Figure 5C17

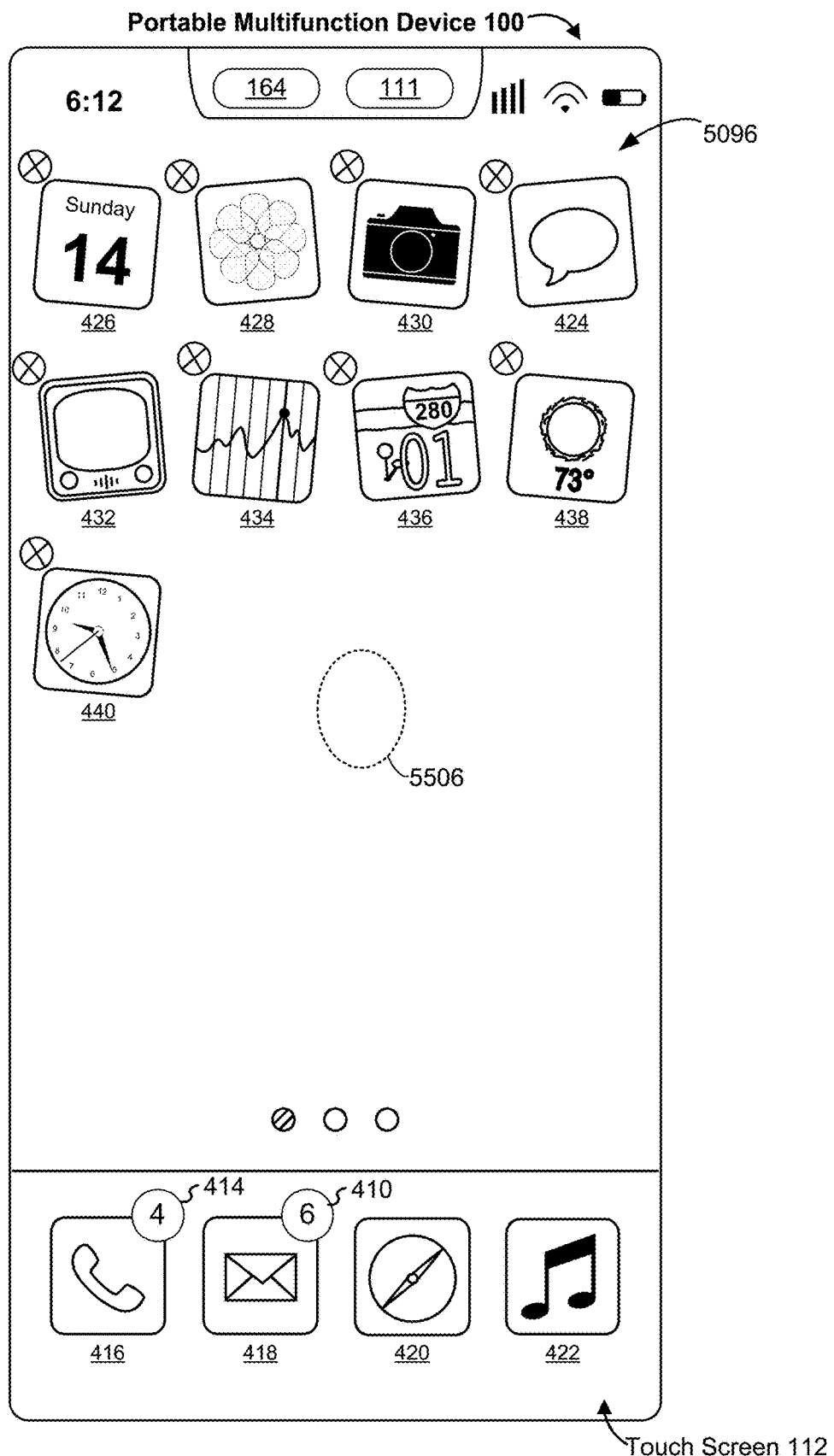
Figure 5C18

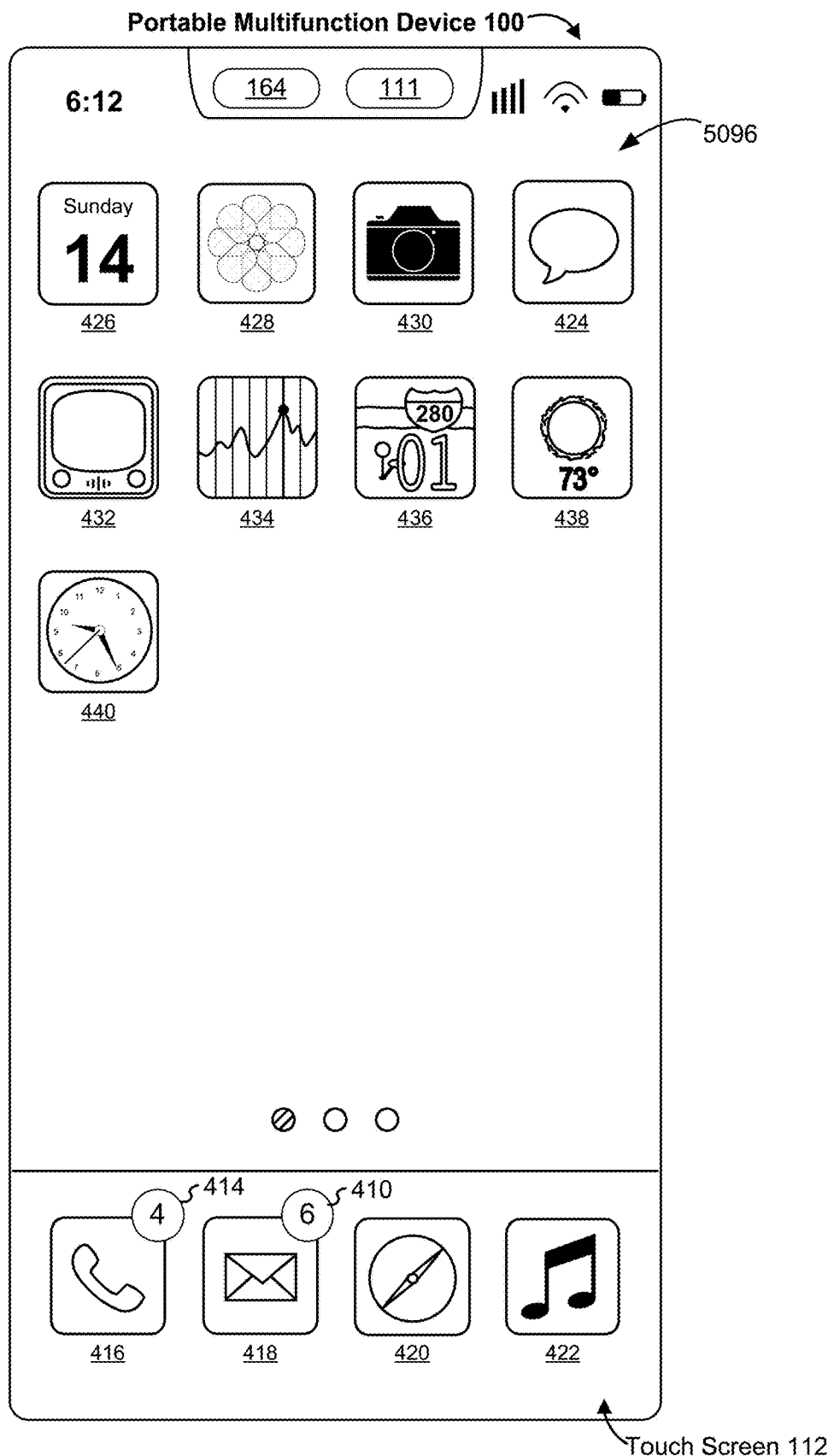
Figure 5C19

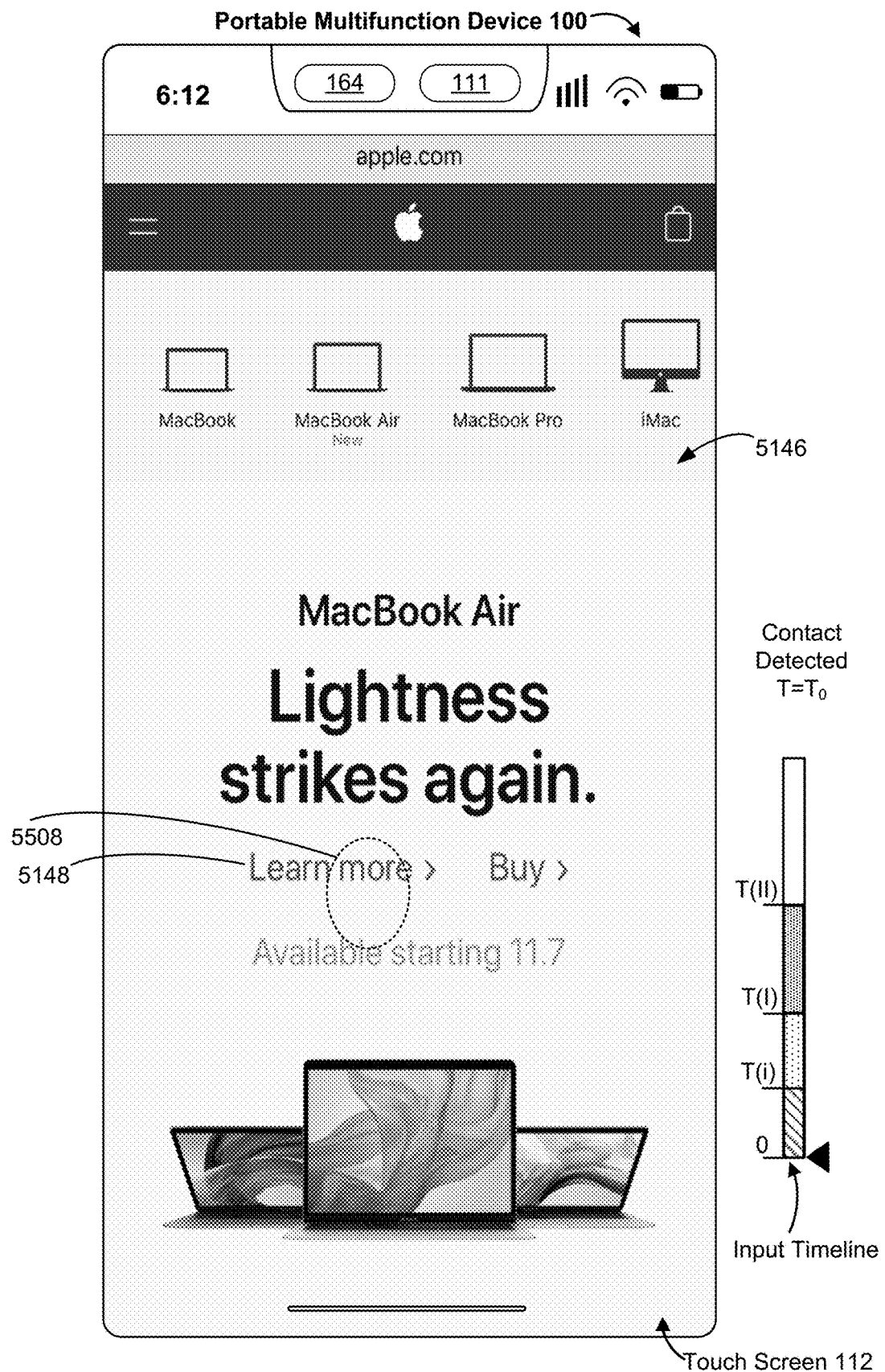
Figure 5D1

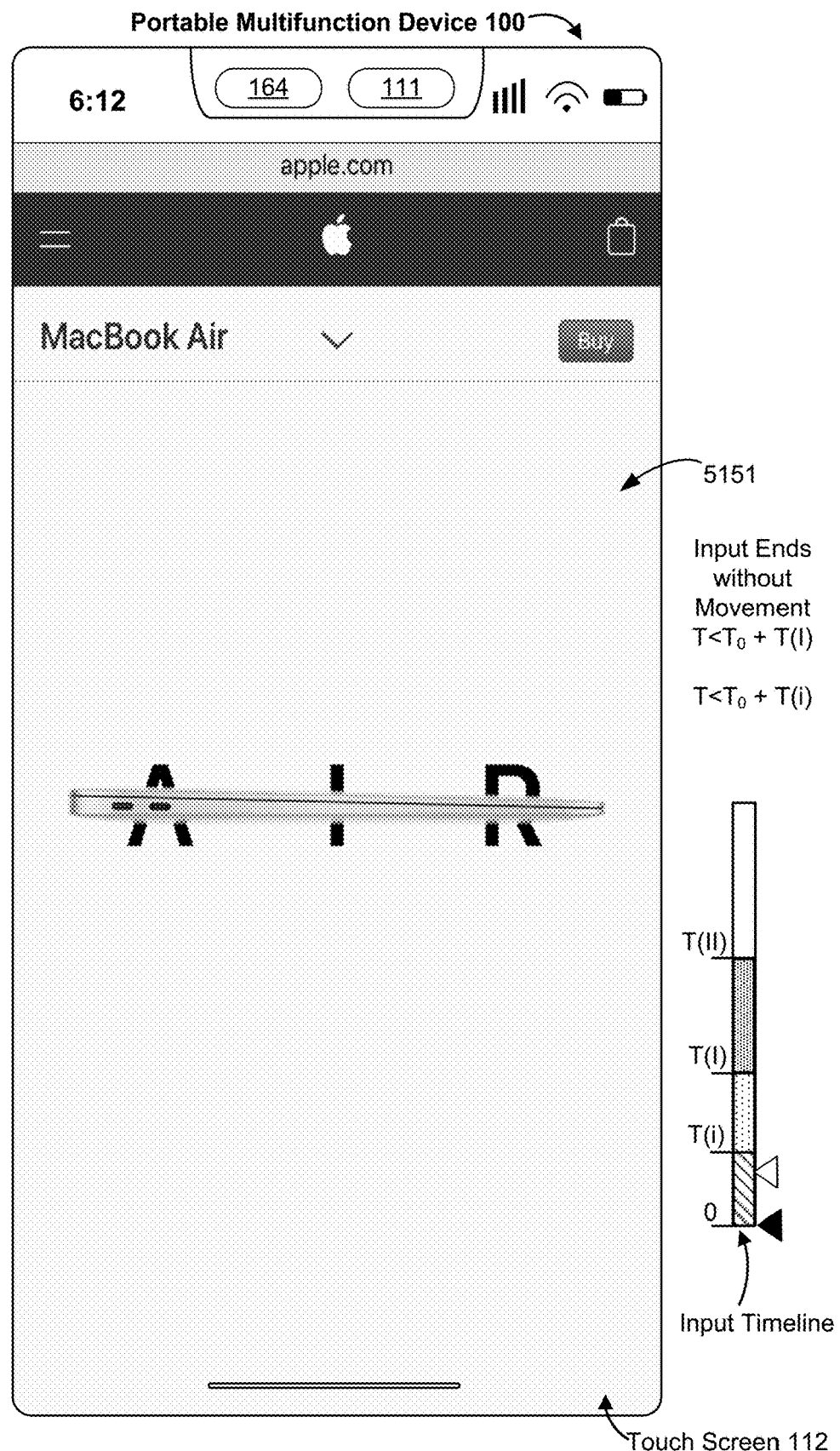
Figure 5D2

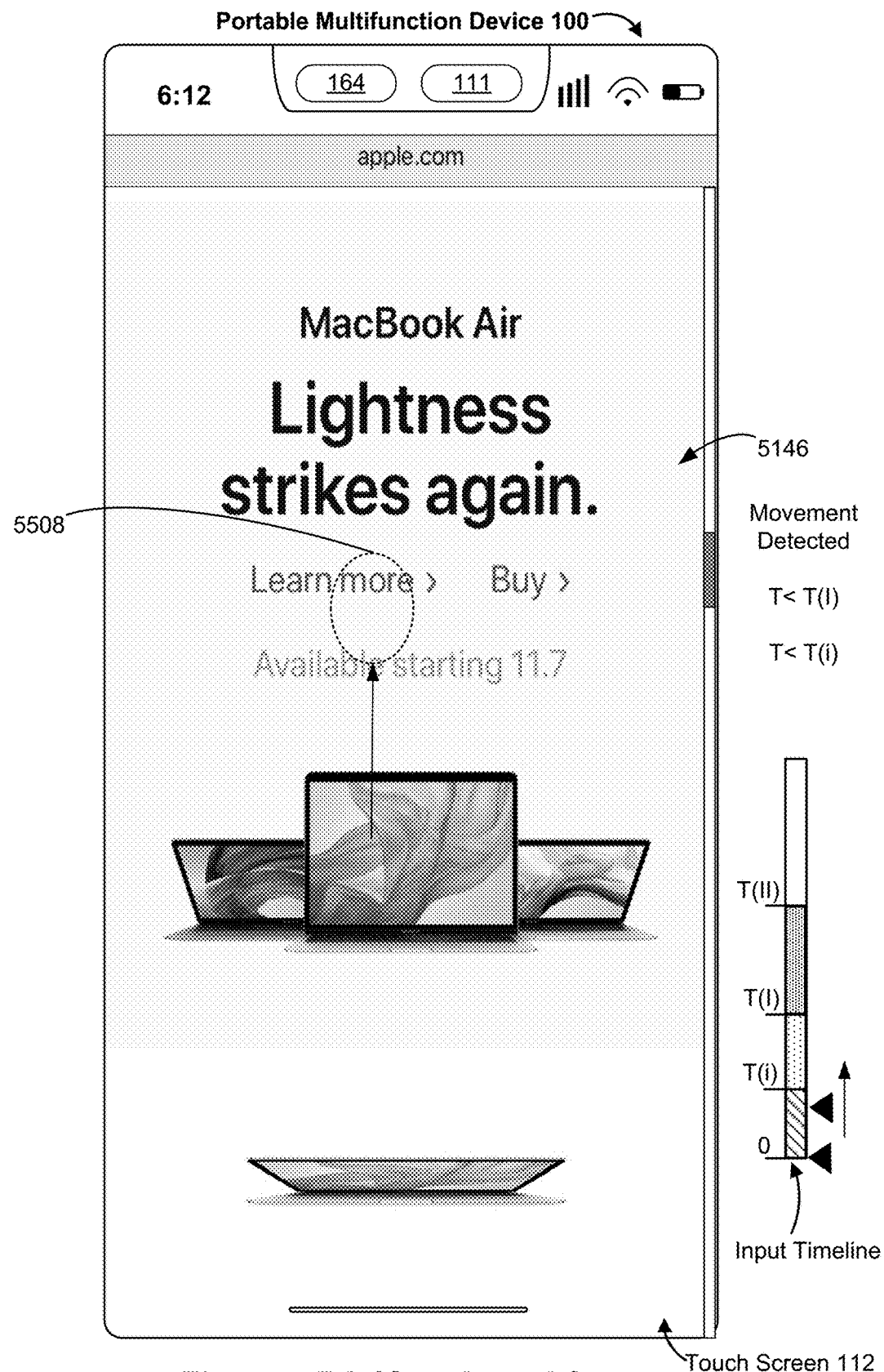
Figure 5D3 (Continued from Figure 5D1)

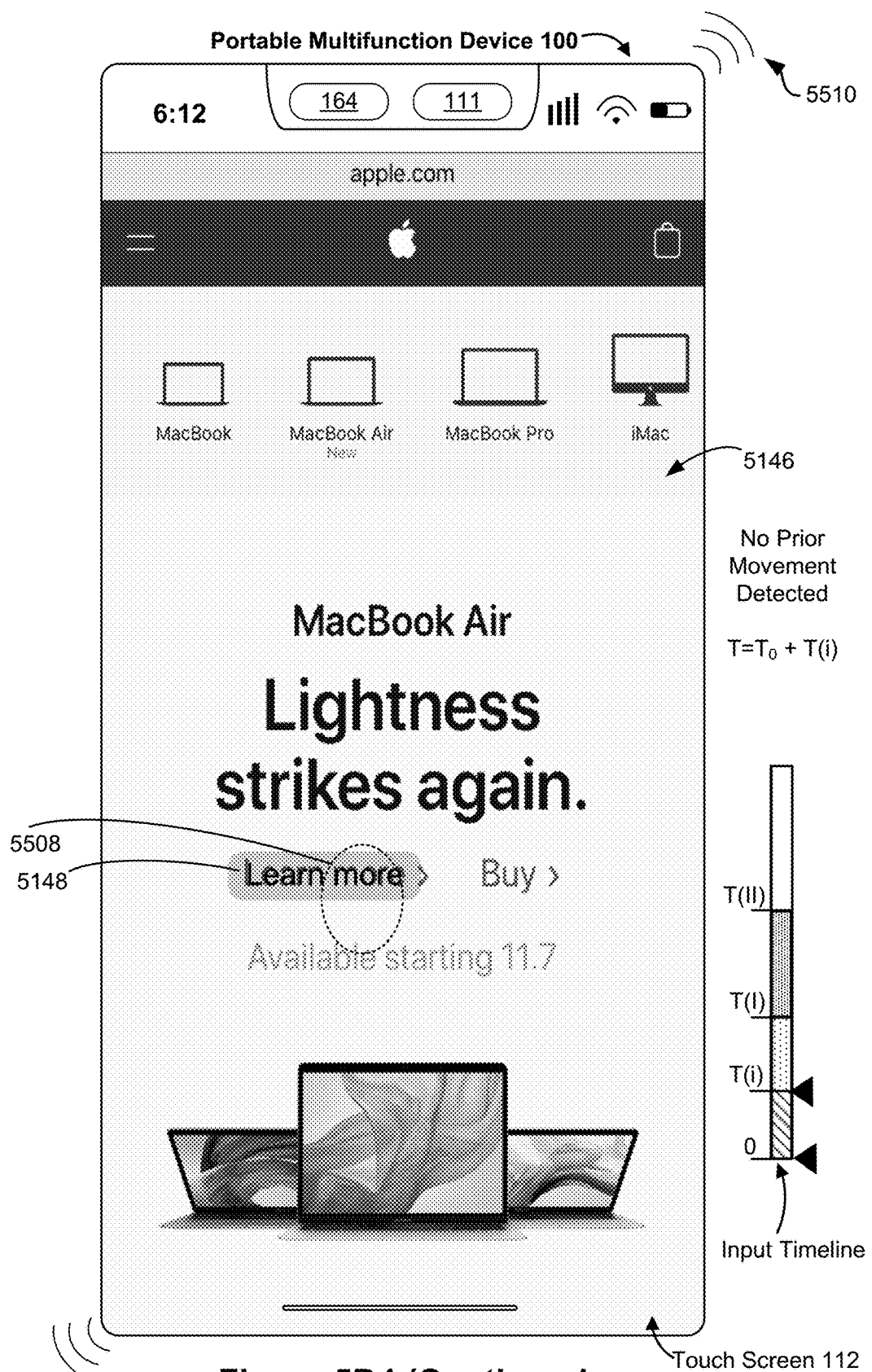
Figure 5D4 (Continued from Figure 5D1)

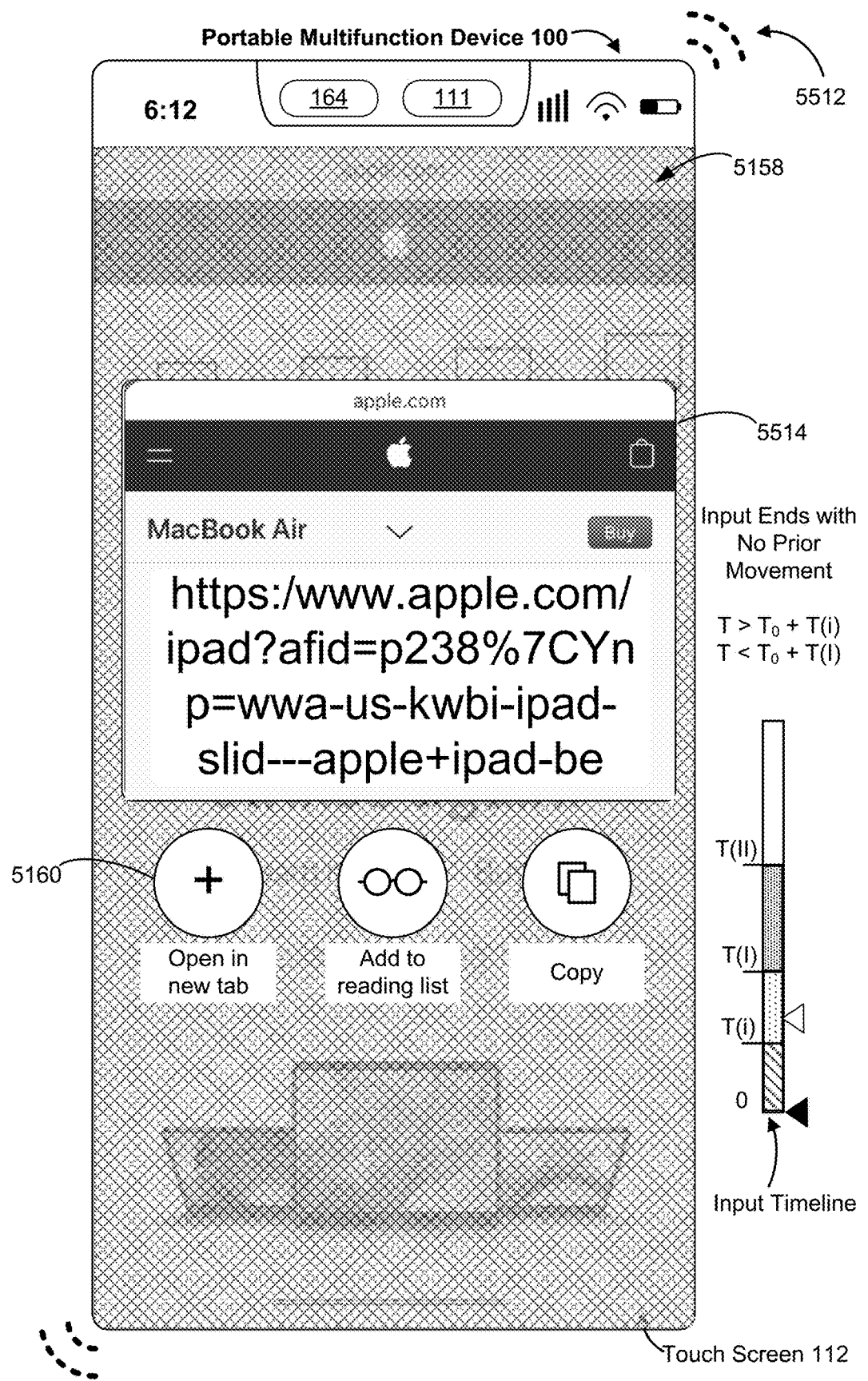
Figure 5D5

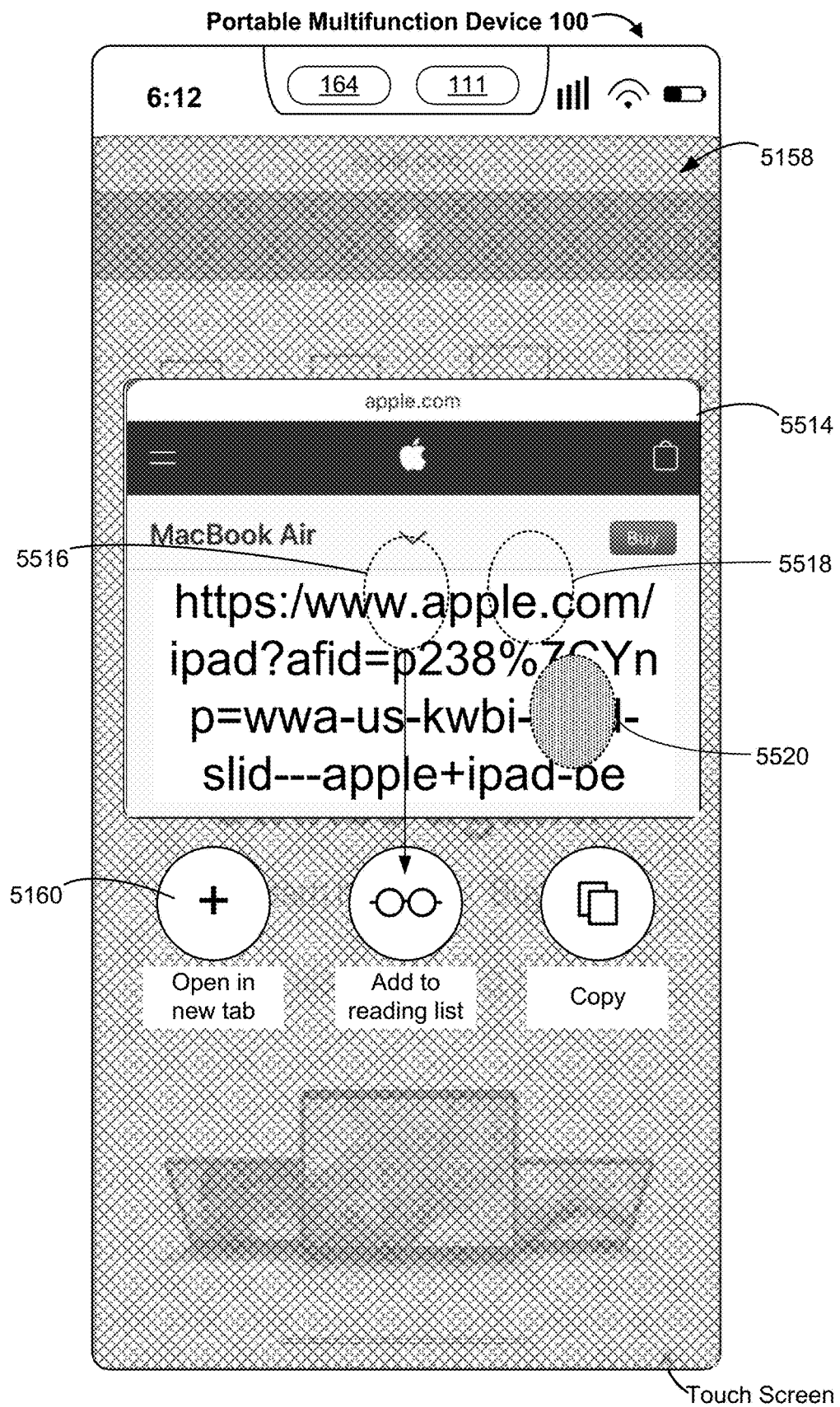
Figure 5D6

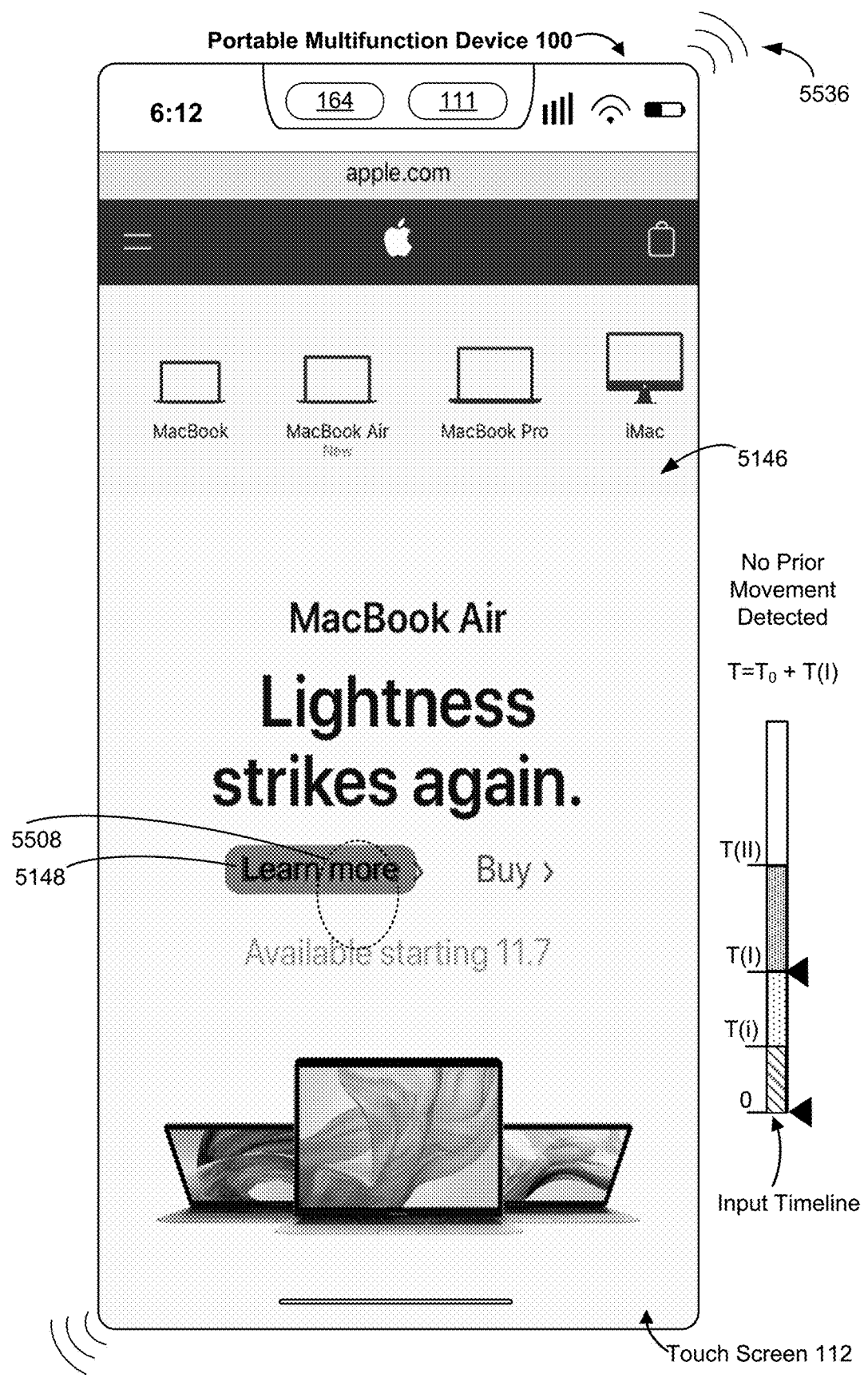
Figure 5D7 (Continued from Figure 5D4)

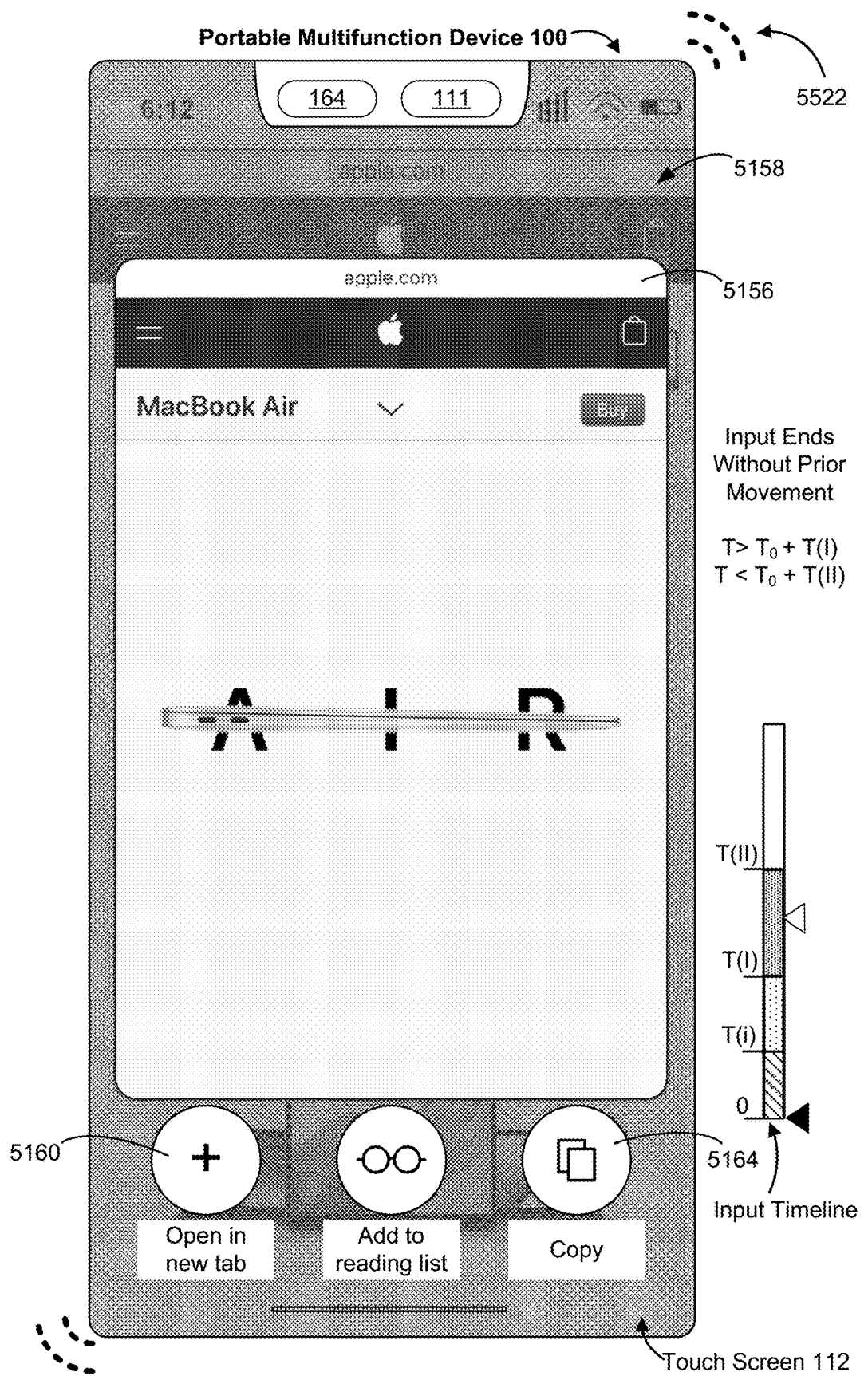
Figure 5D8 (Continued from Figure 5D6 or 5D7)

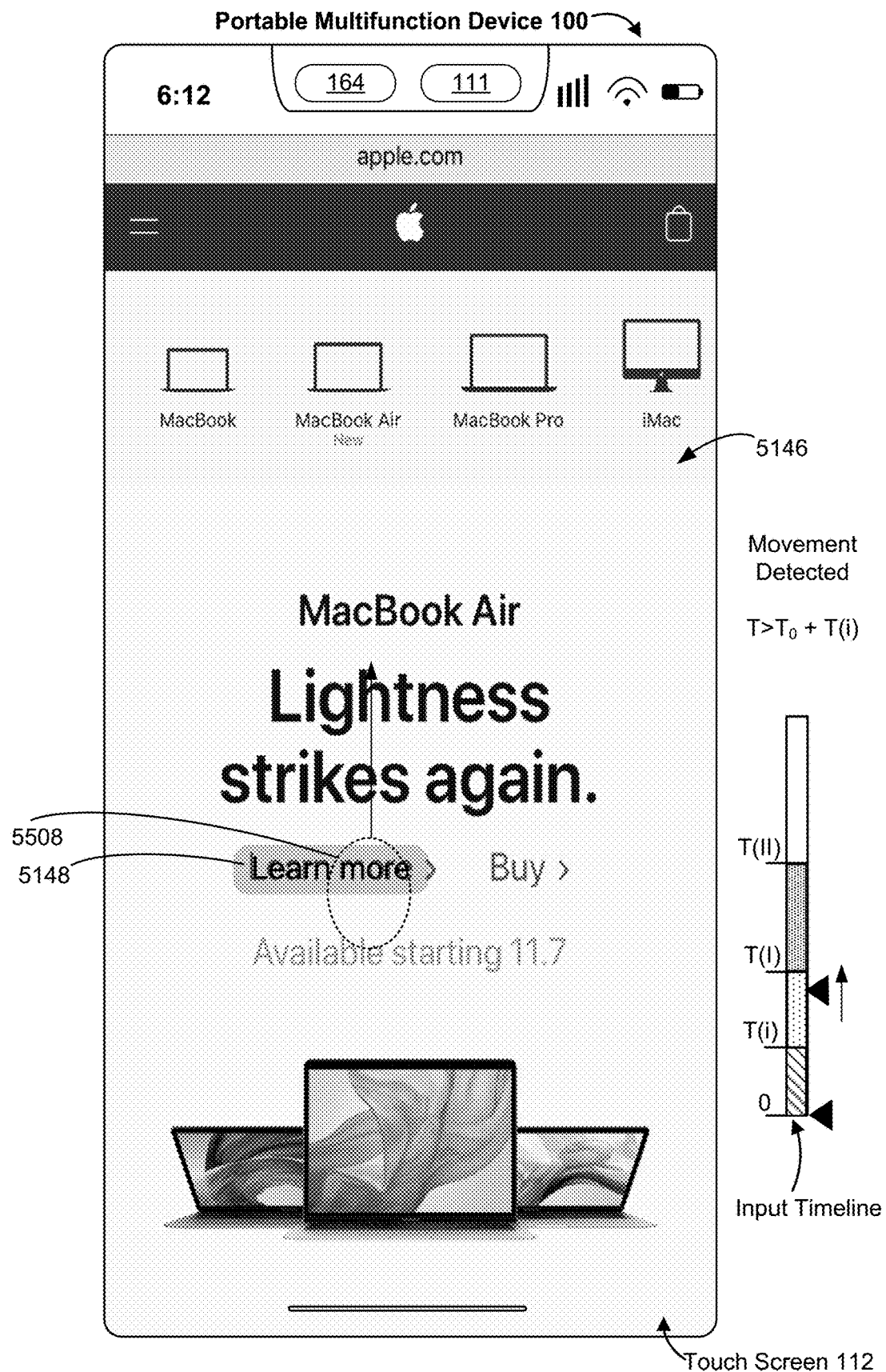
Figure 5D9 (Continued from Figure 5D4)

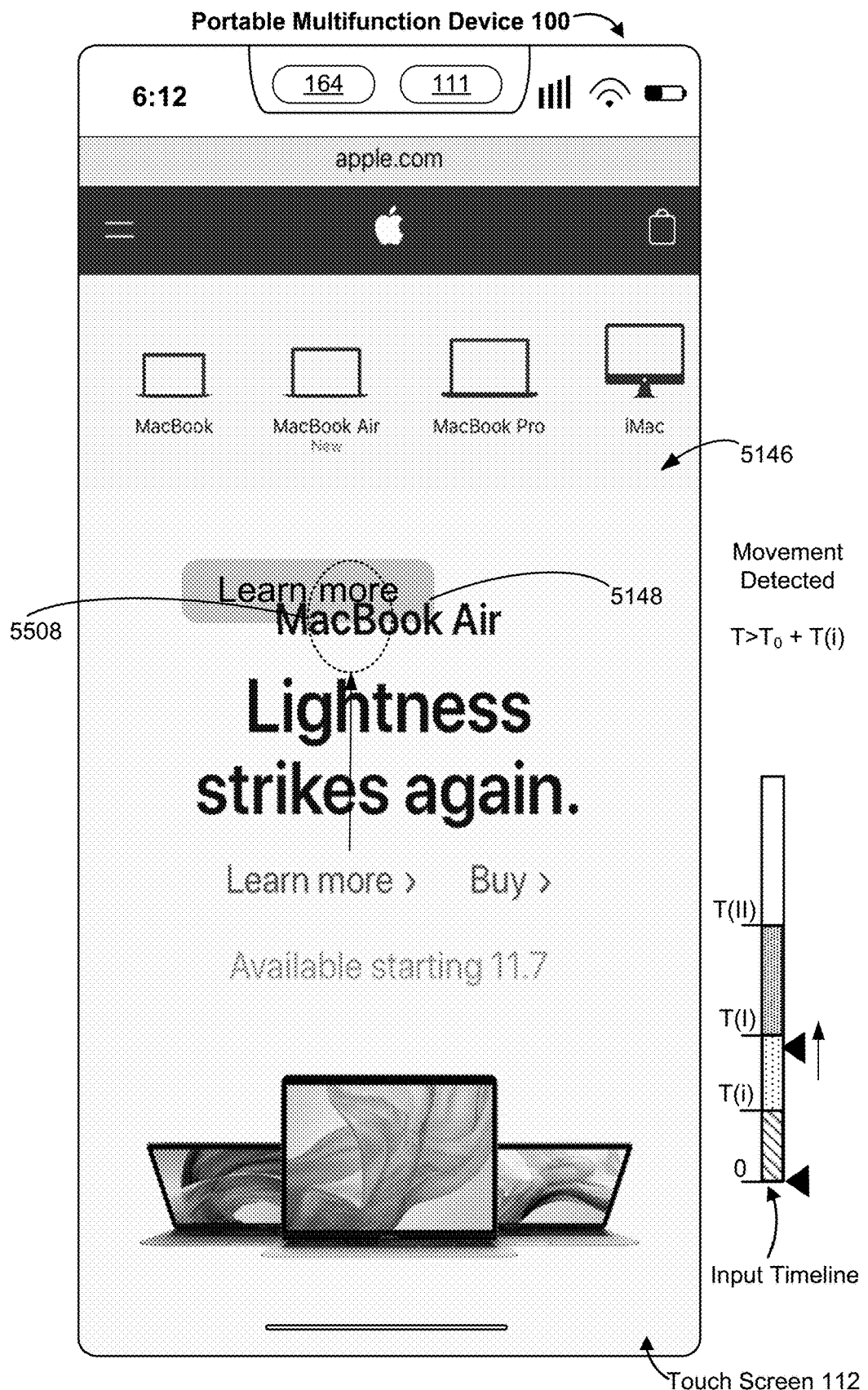
Figure 5D10

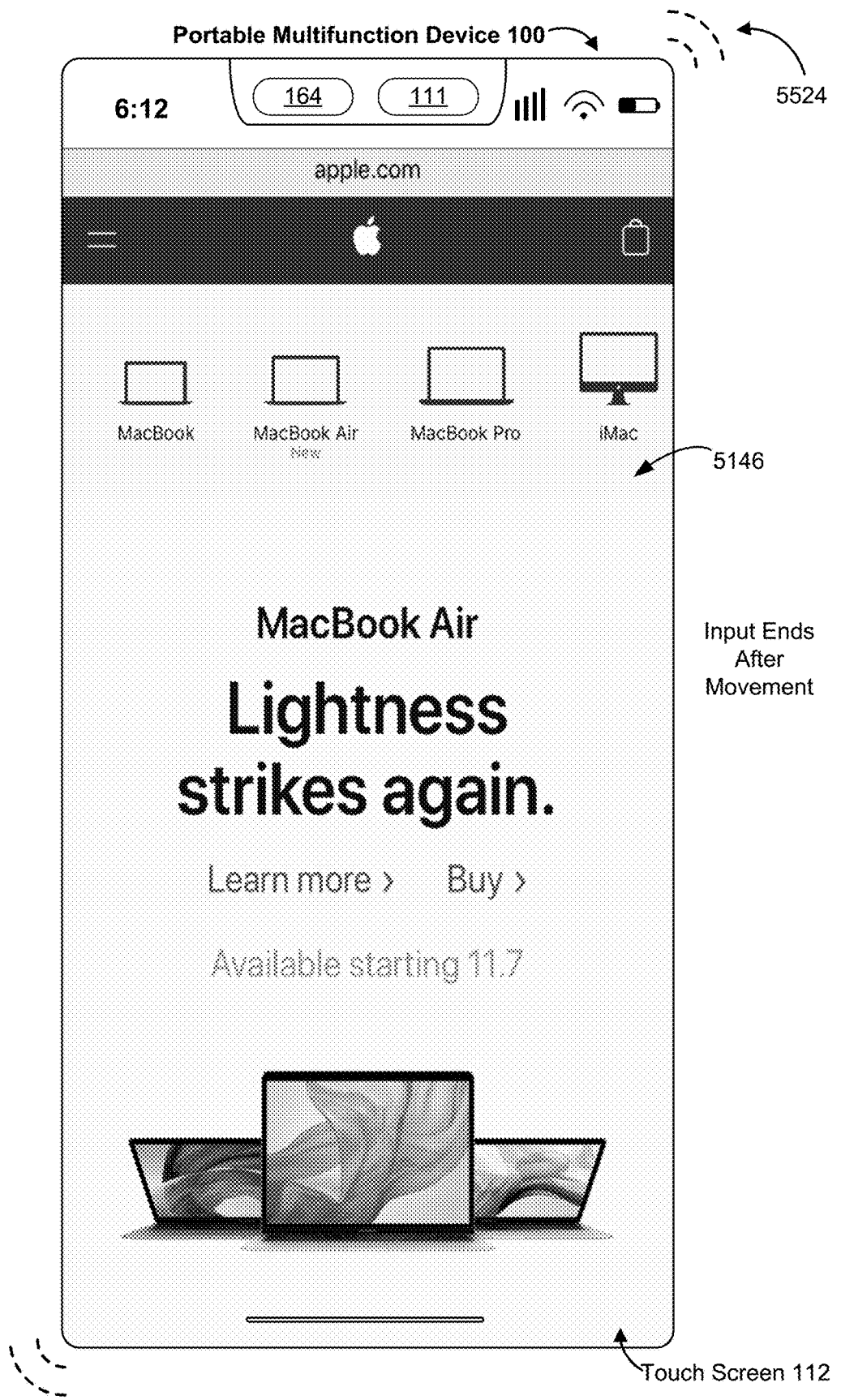
Figure 5D11

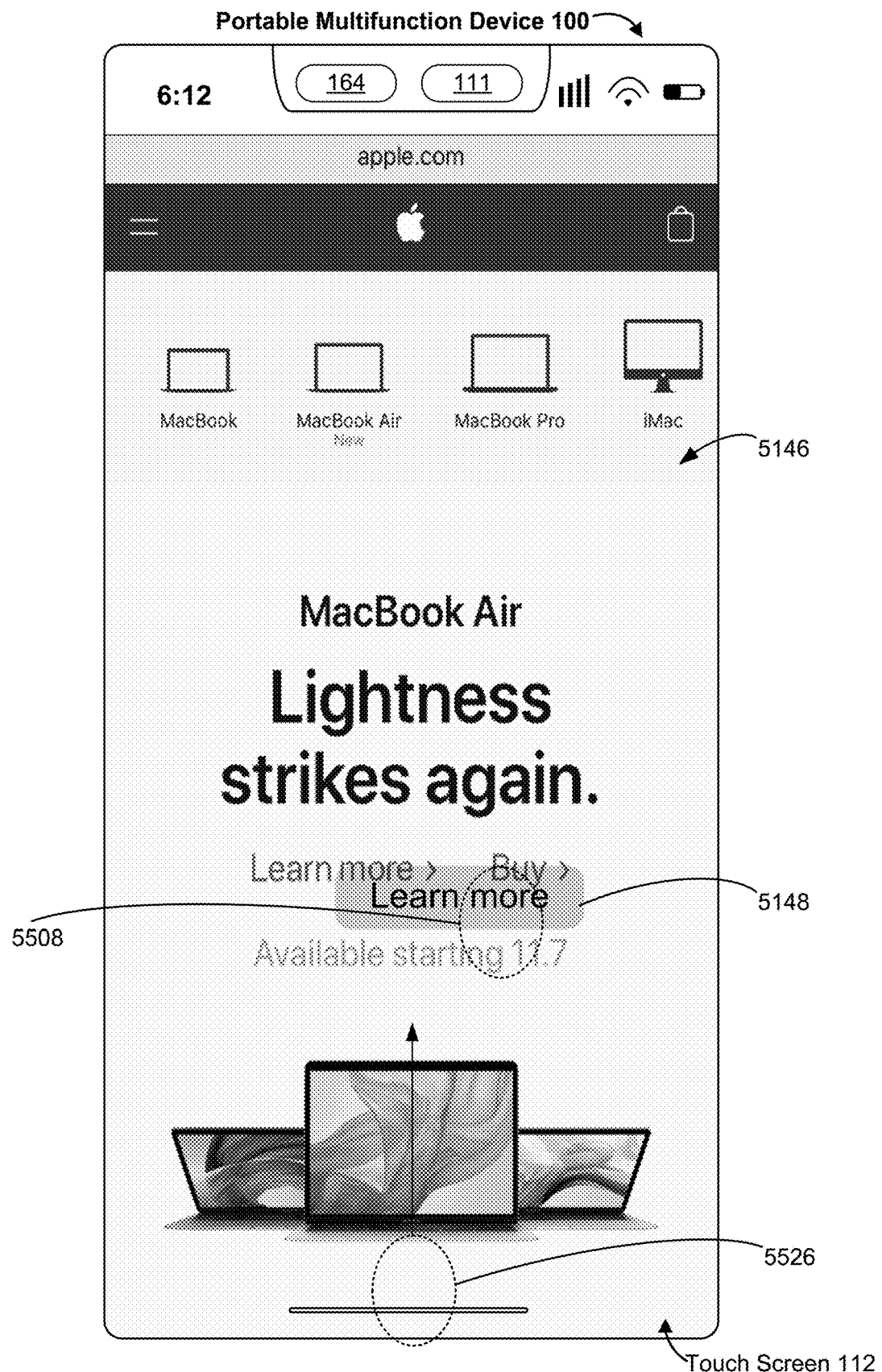
Figure 5D12 (Continued from Figure 5D9)

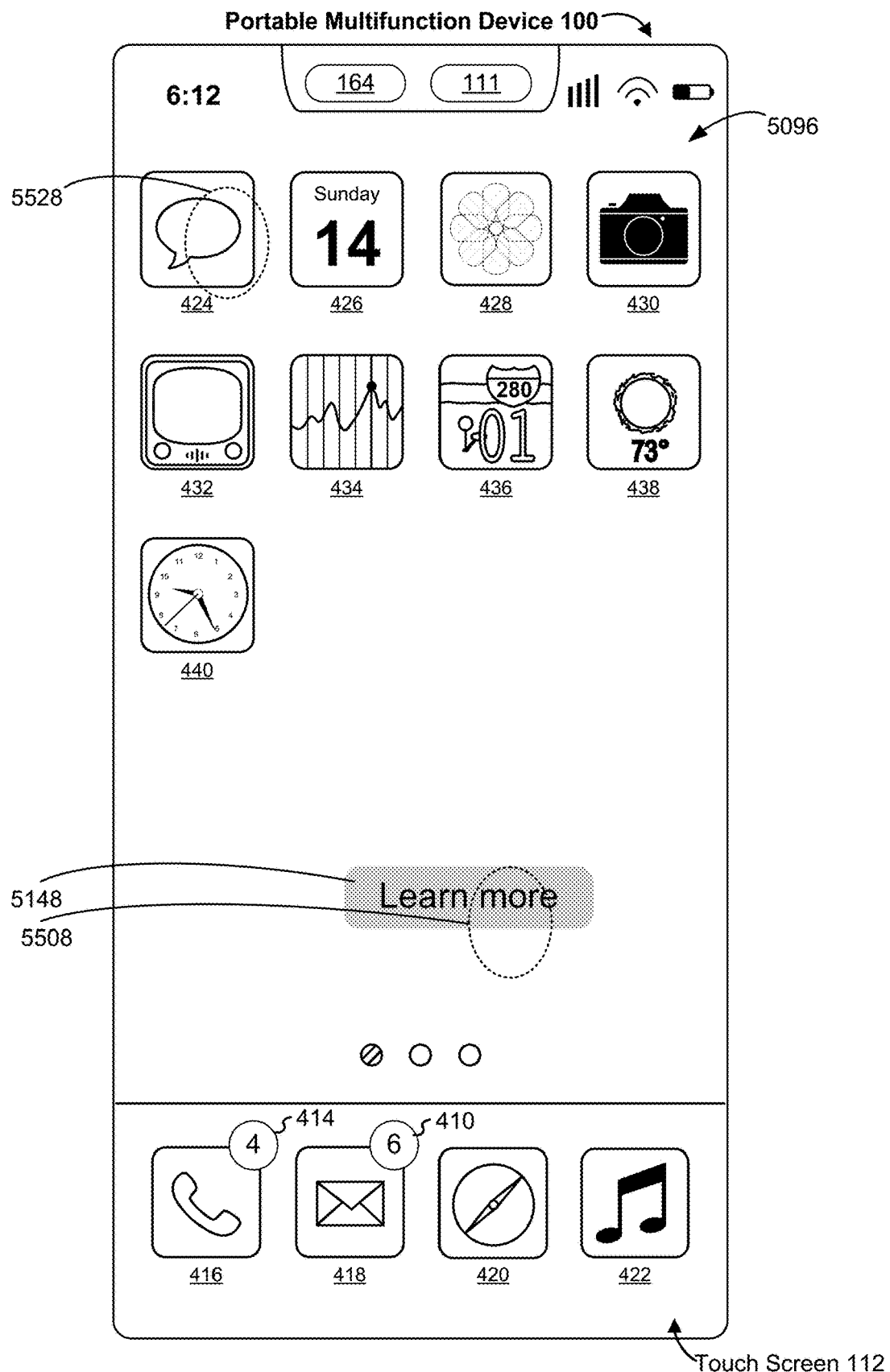
Figure 5D13

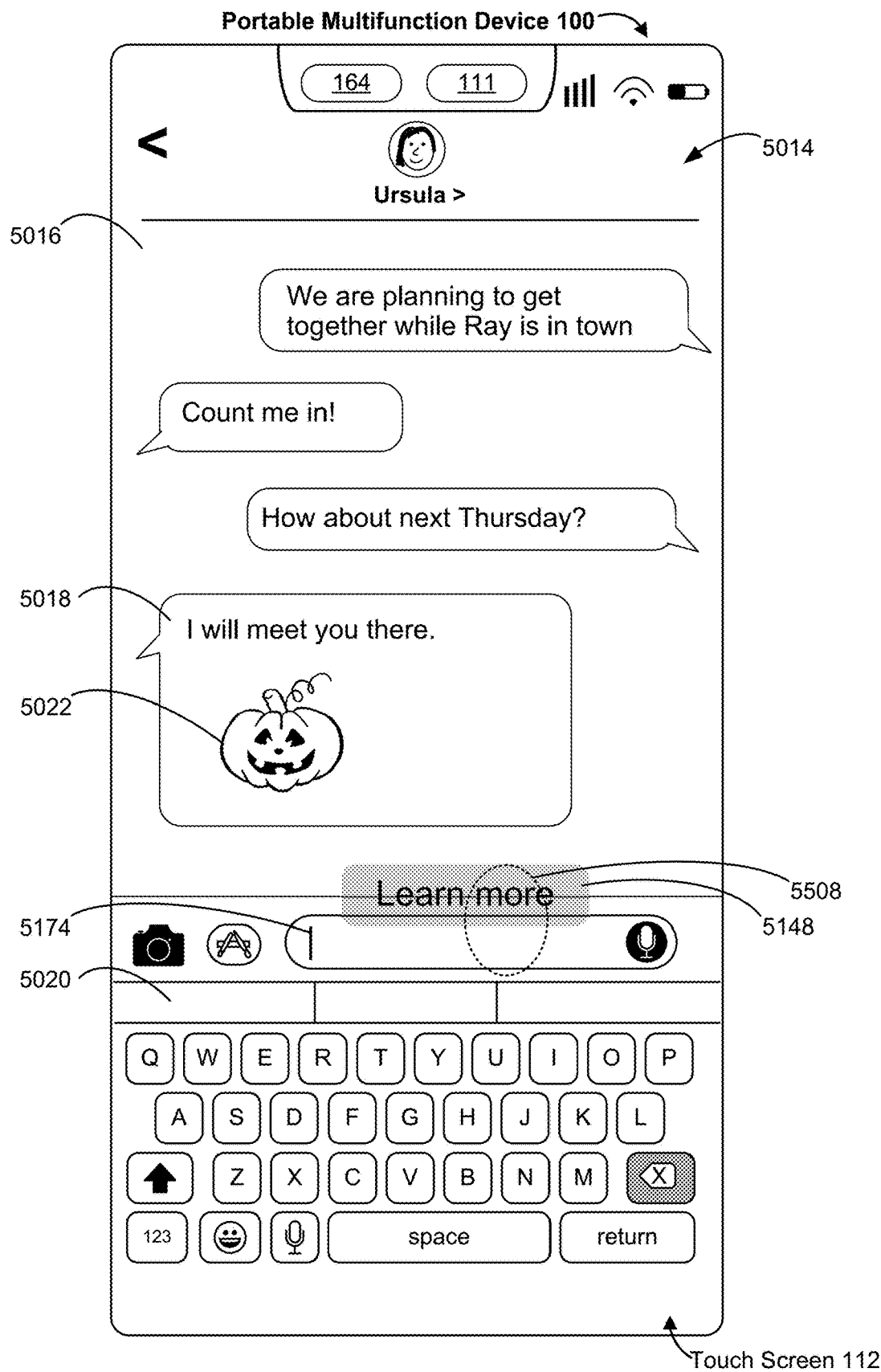
Figure 5D14

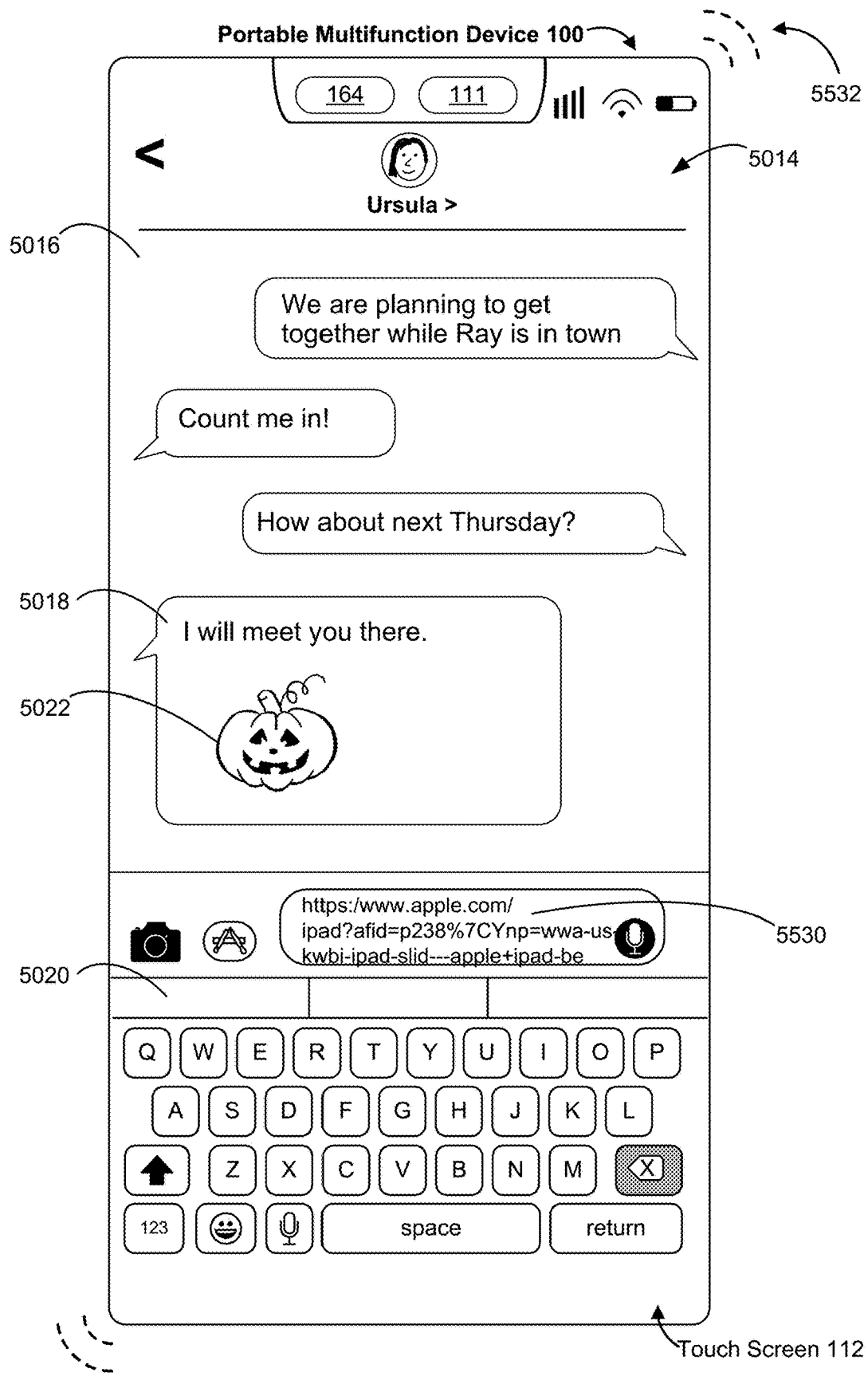
Figure 5D15

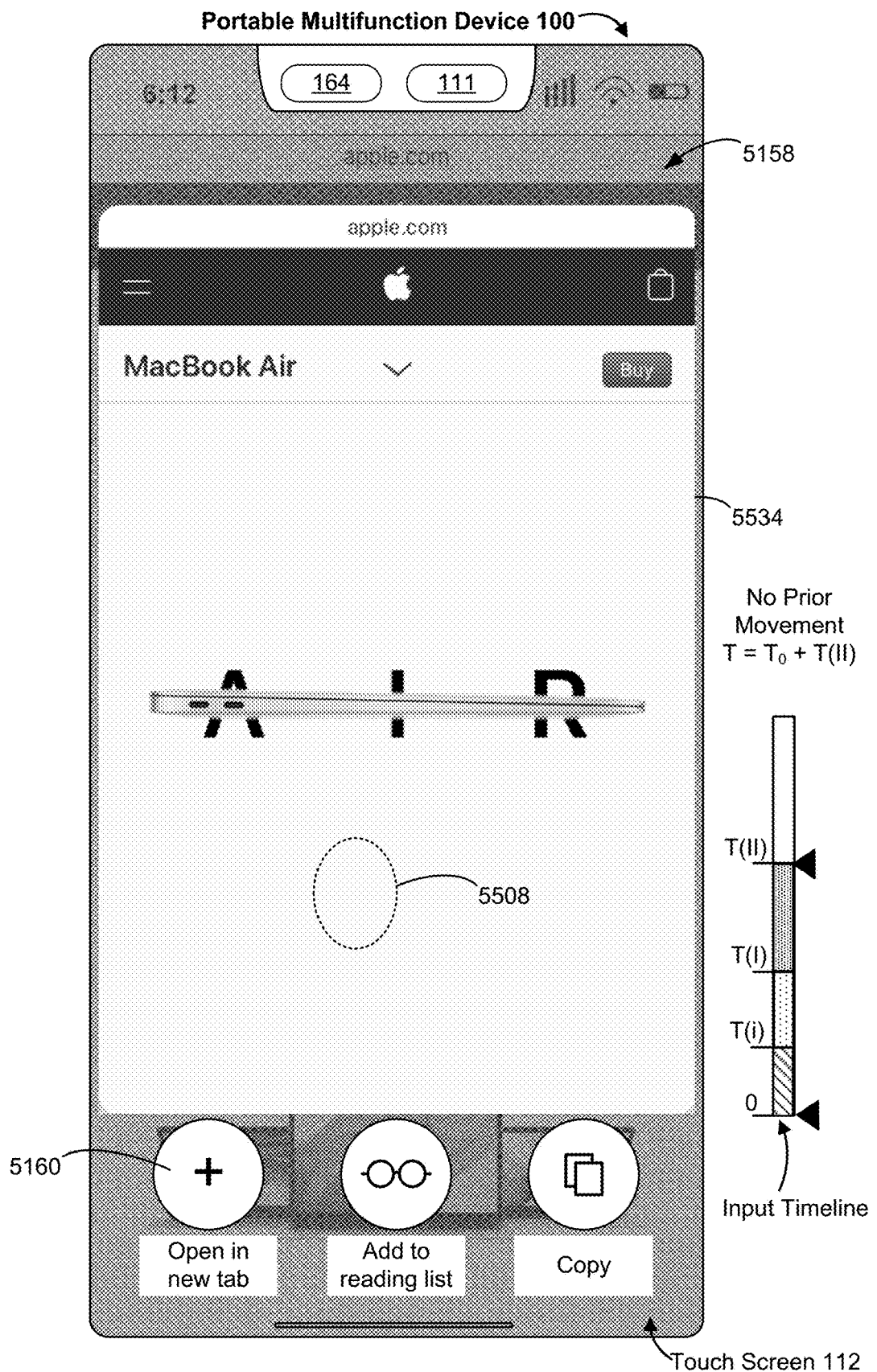
Figure 5D16 (Continued from Figure 5D7)

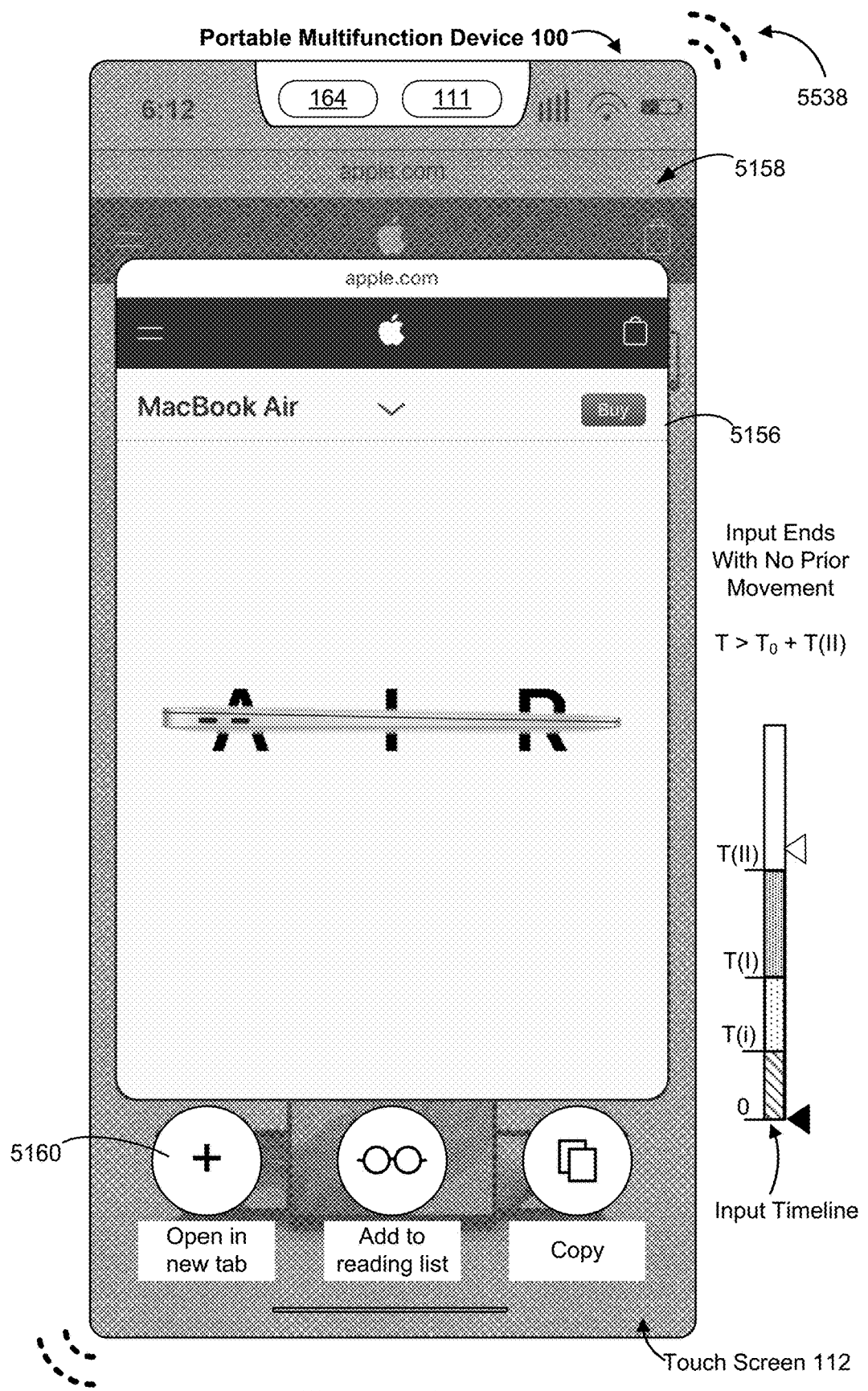
Figure 5D17

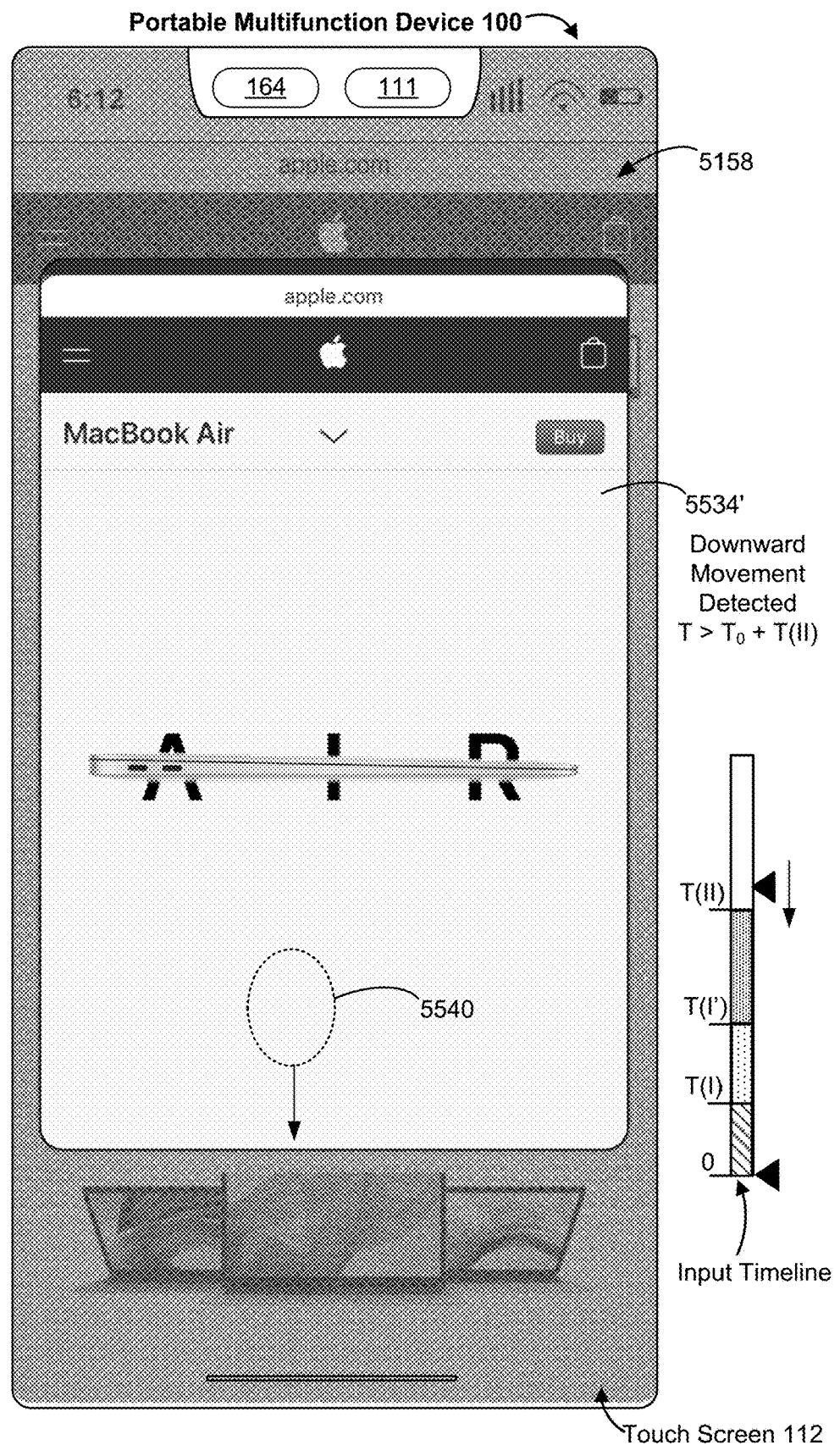
Figure 5D18 (Continued from Figure 5D16 or 5D17)

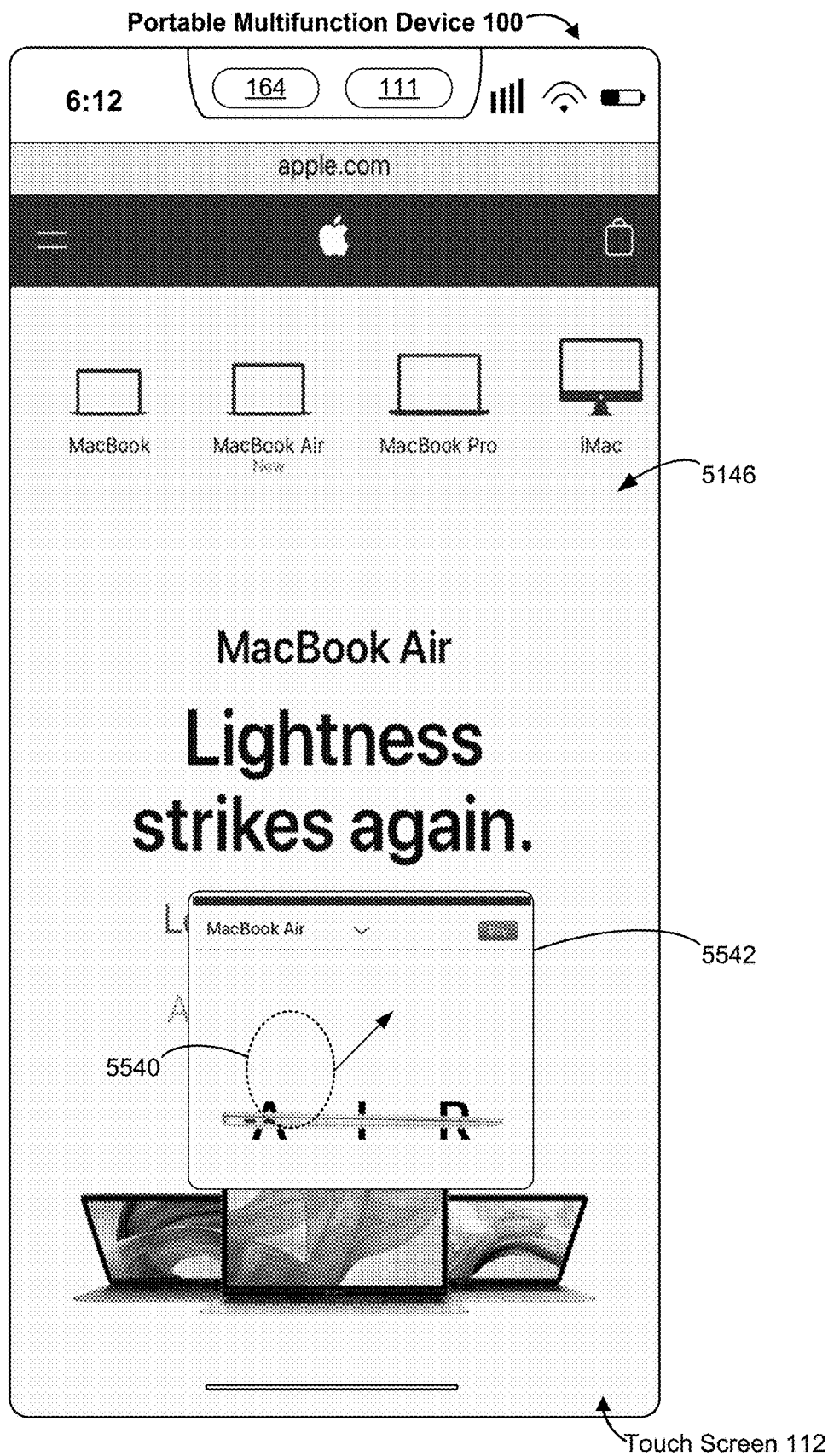
Figure 5D19

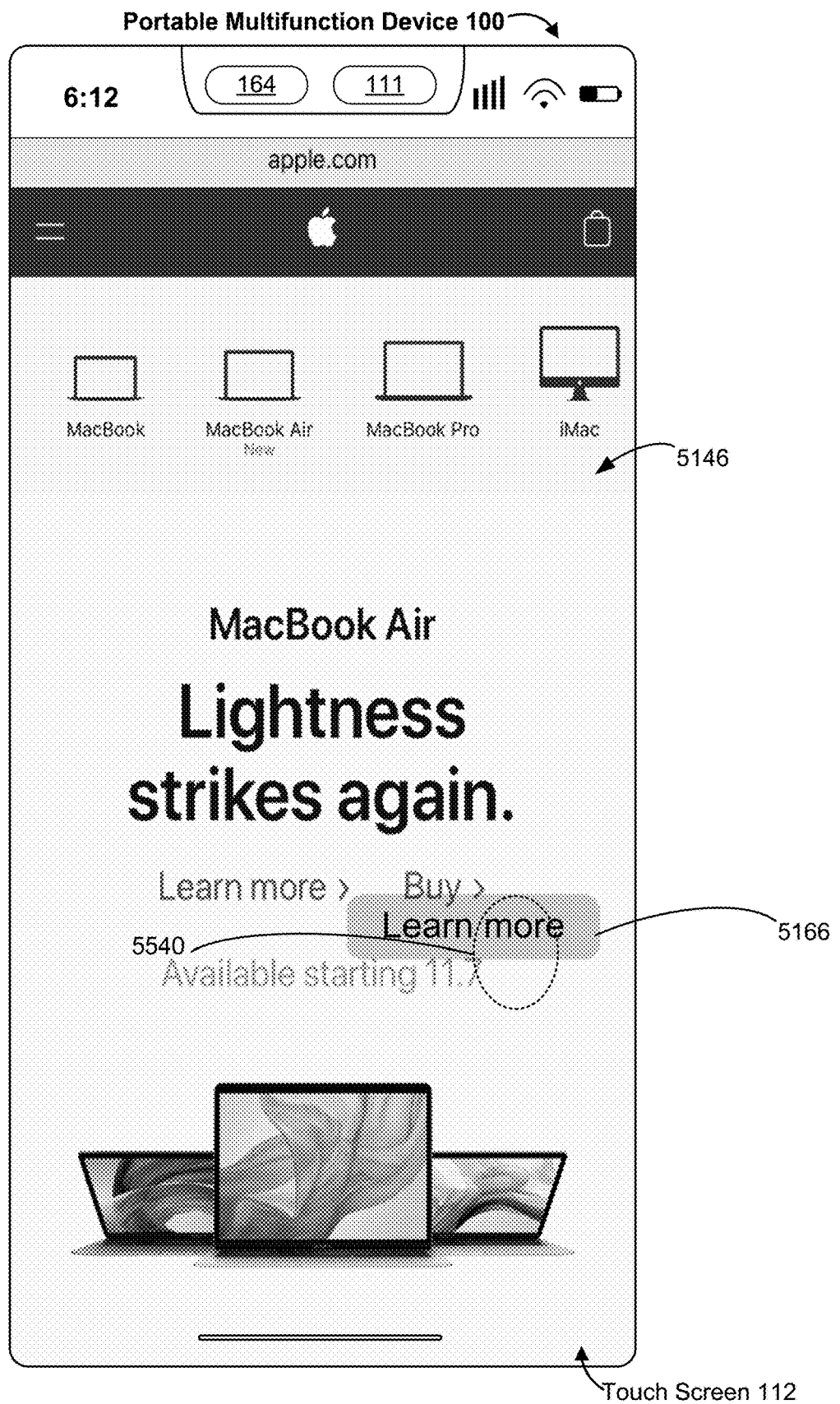
Figure 5D20

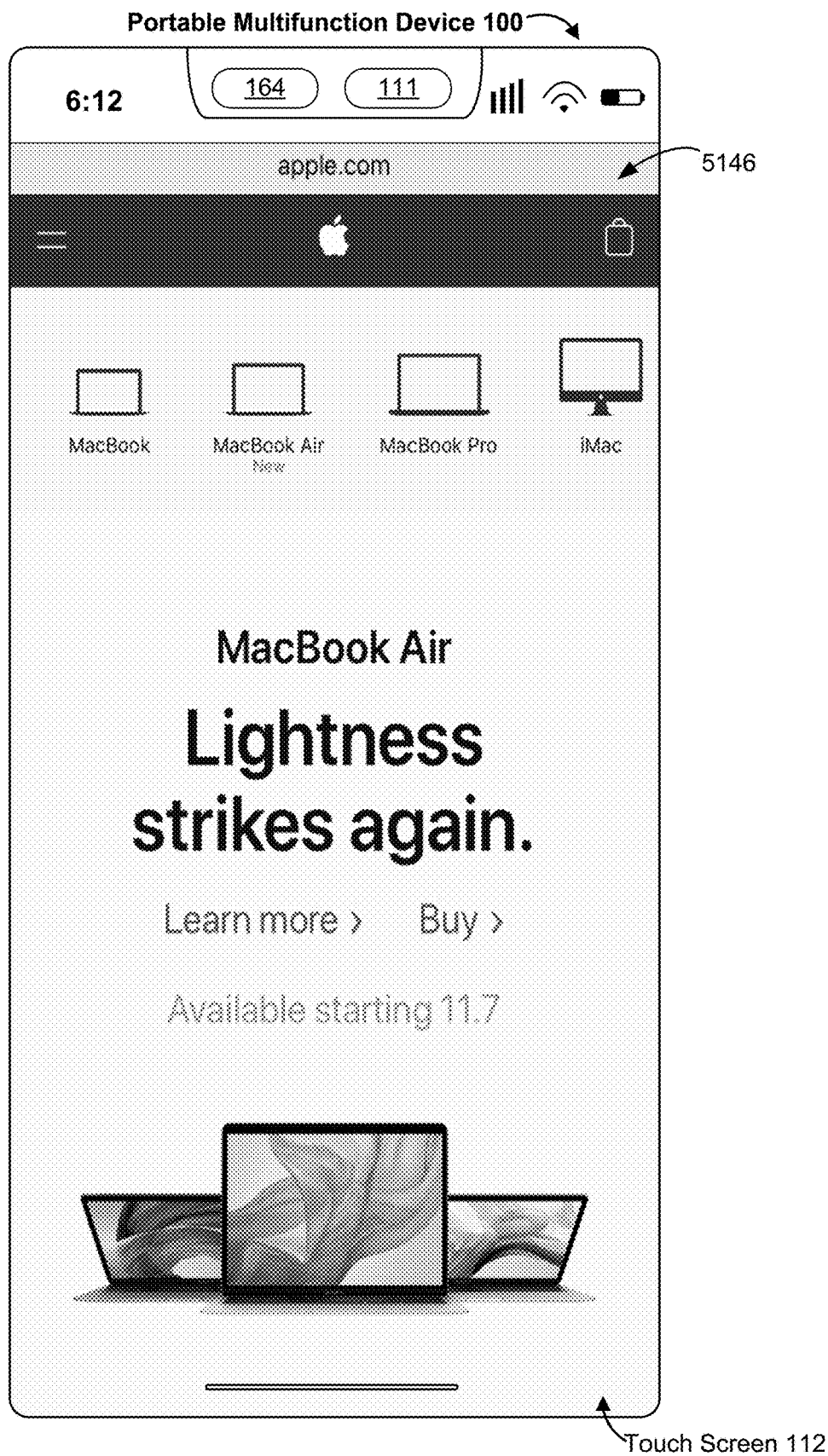
Figure 5D21

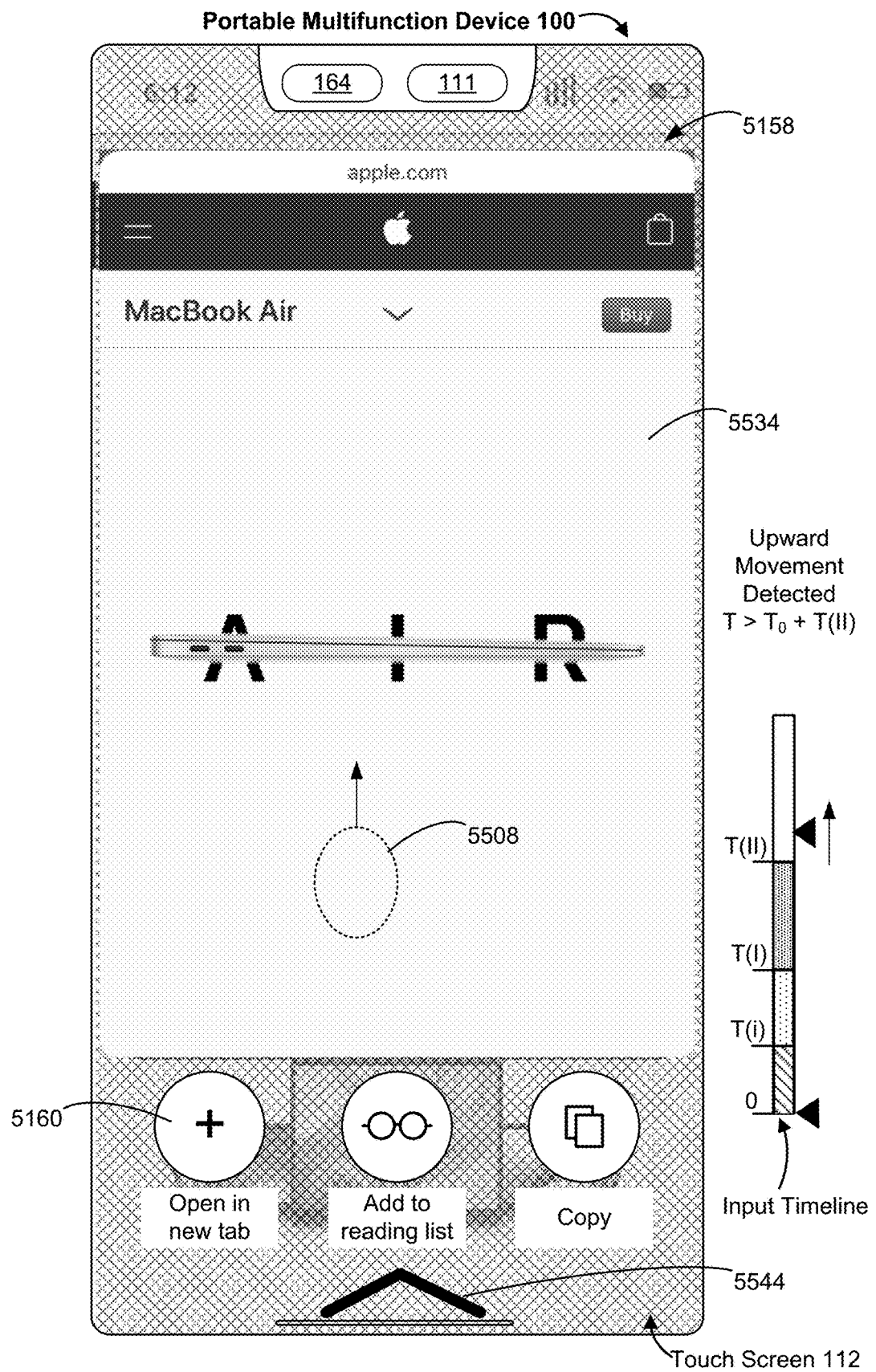
Figure 5D22 (Continued from Figure 5D6)

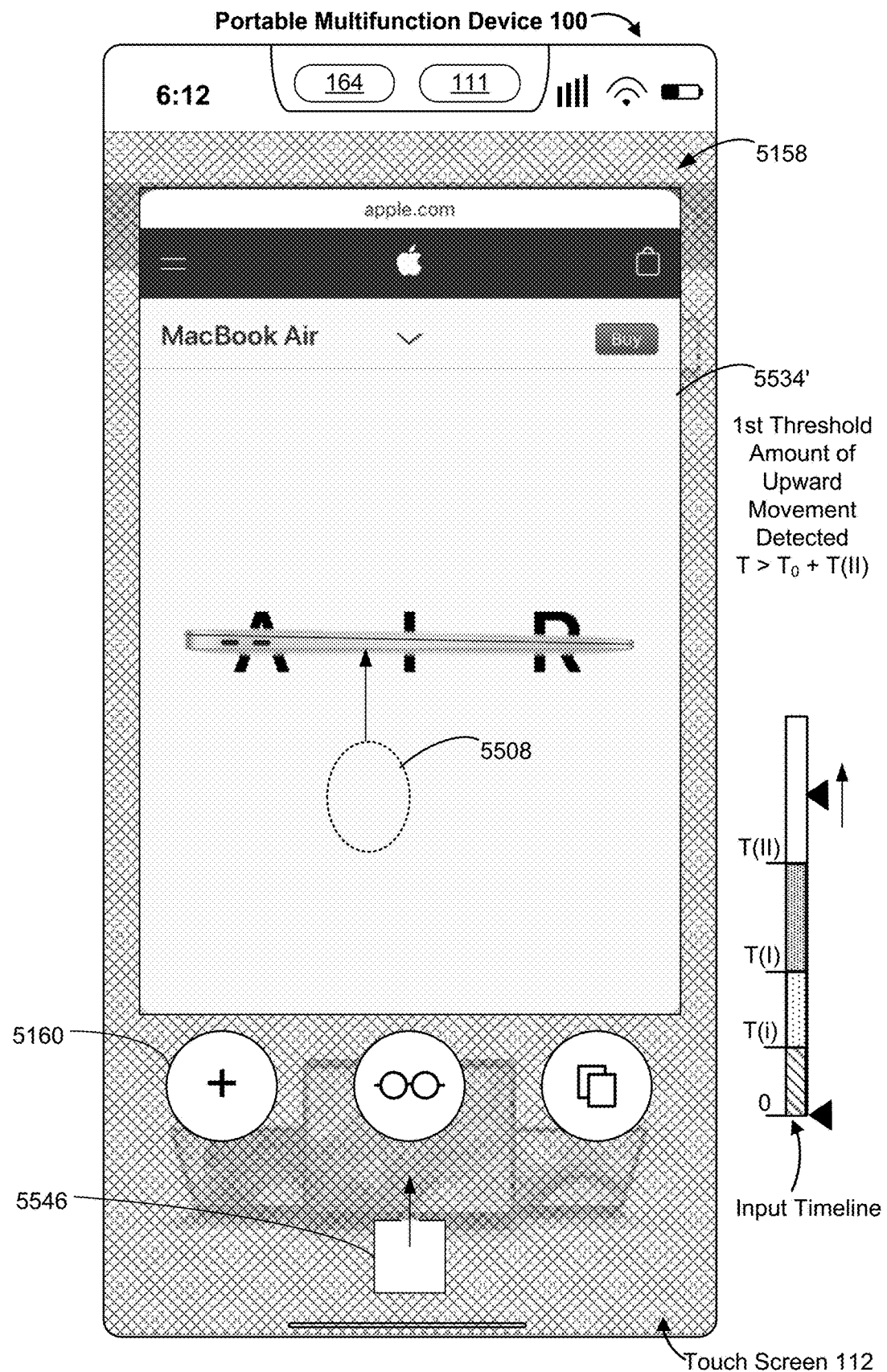
Figure 5D23

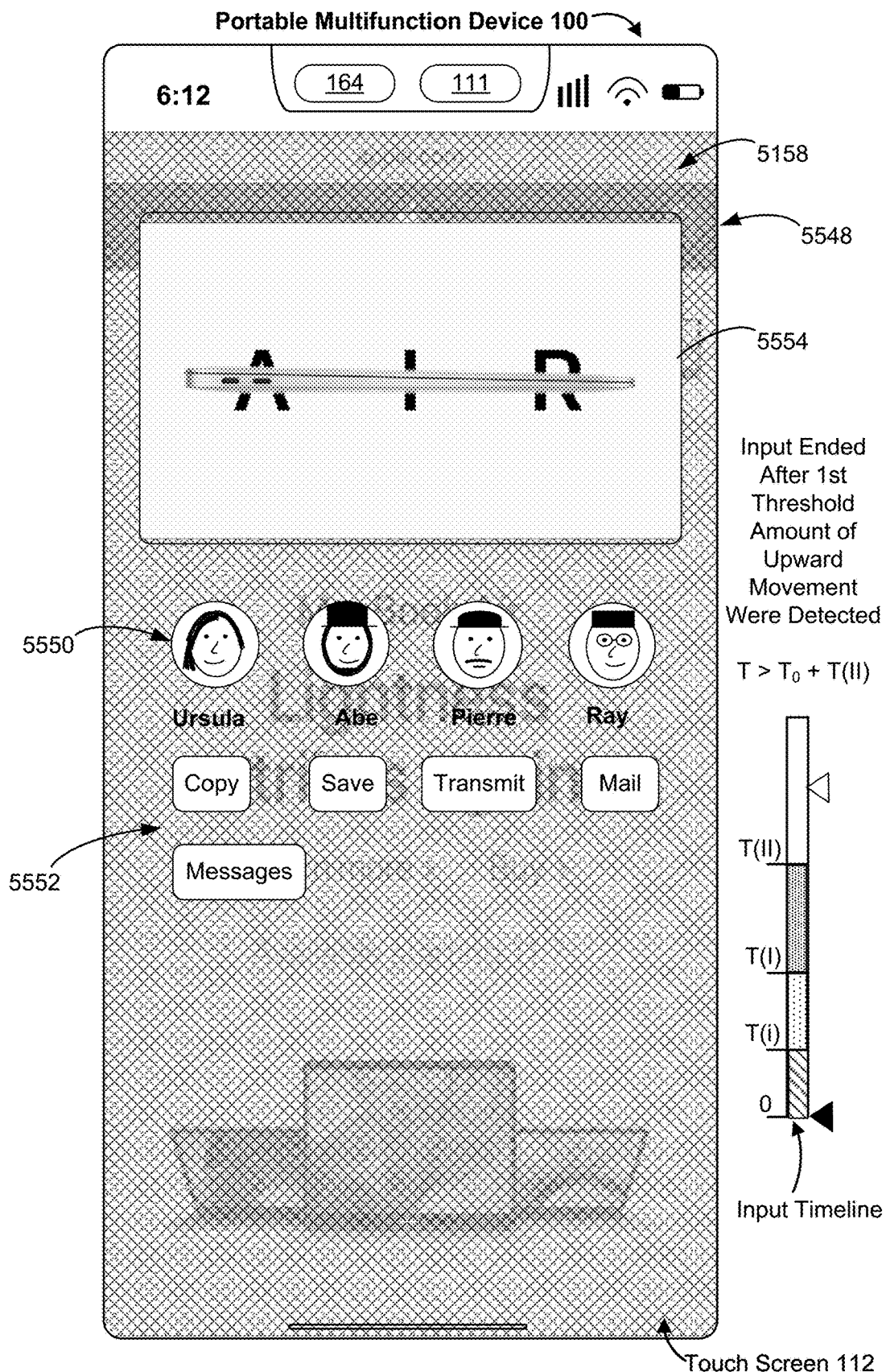
Figure 5D24

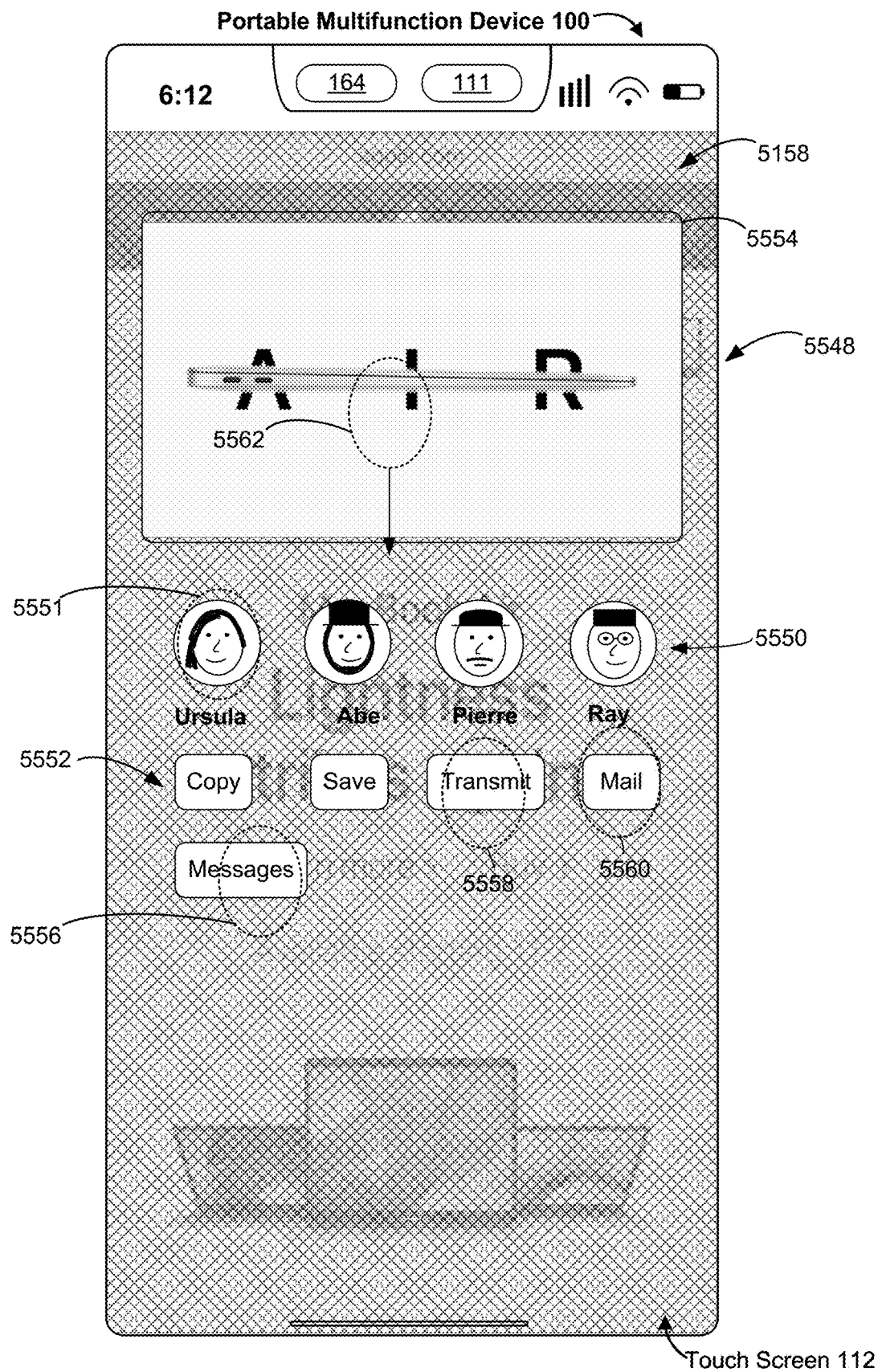
Figure 5D25

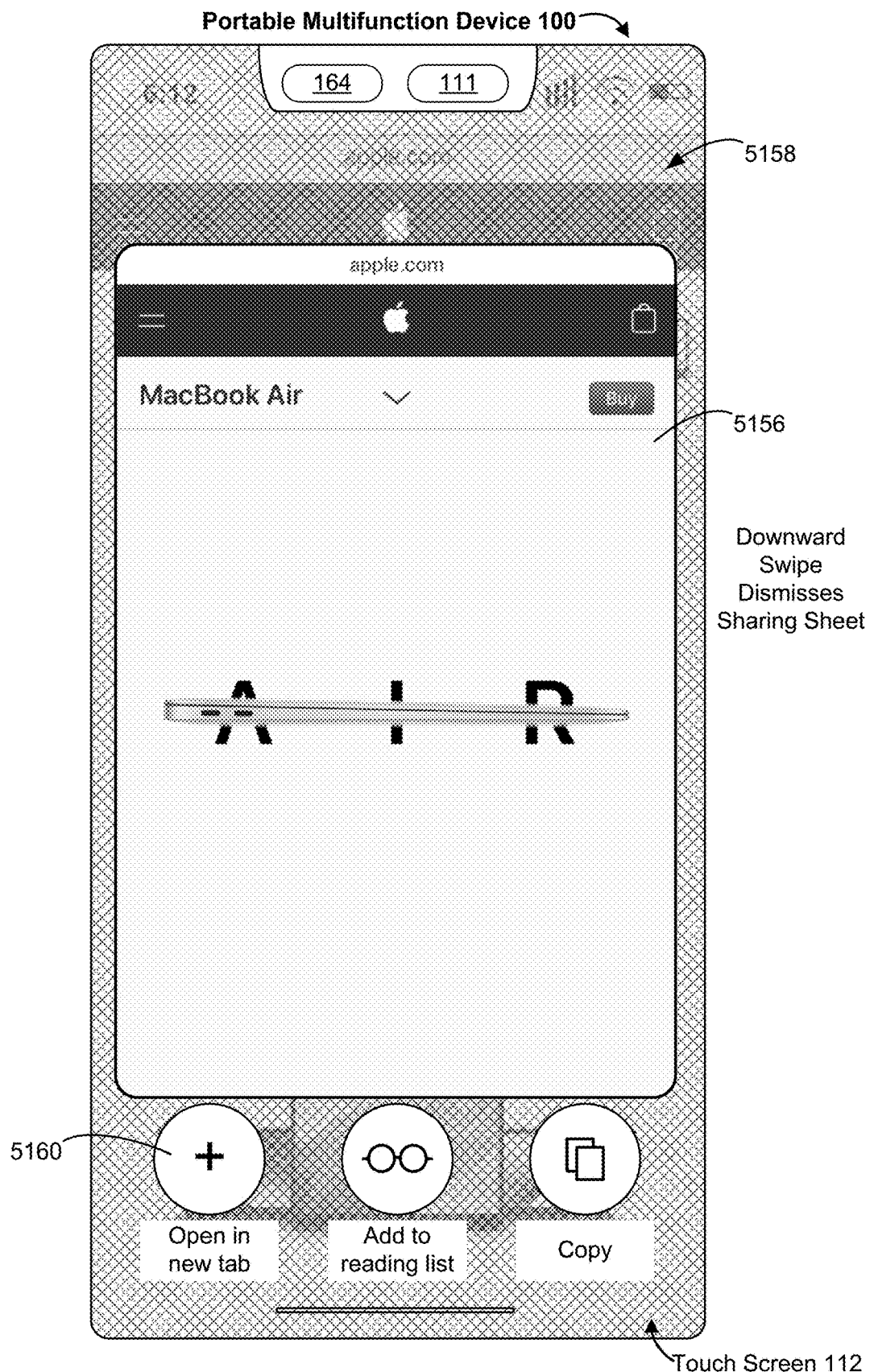
Figure 5D26

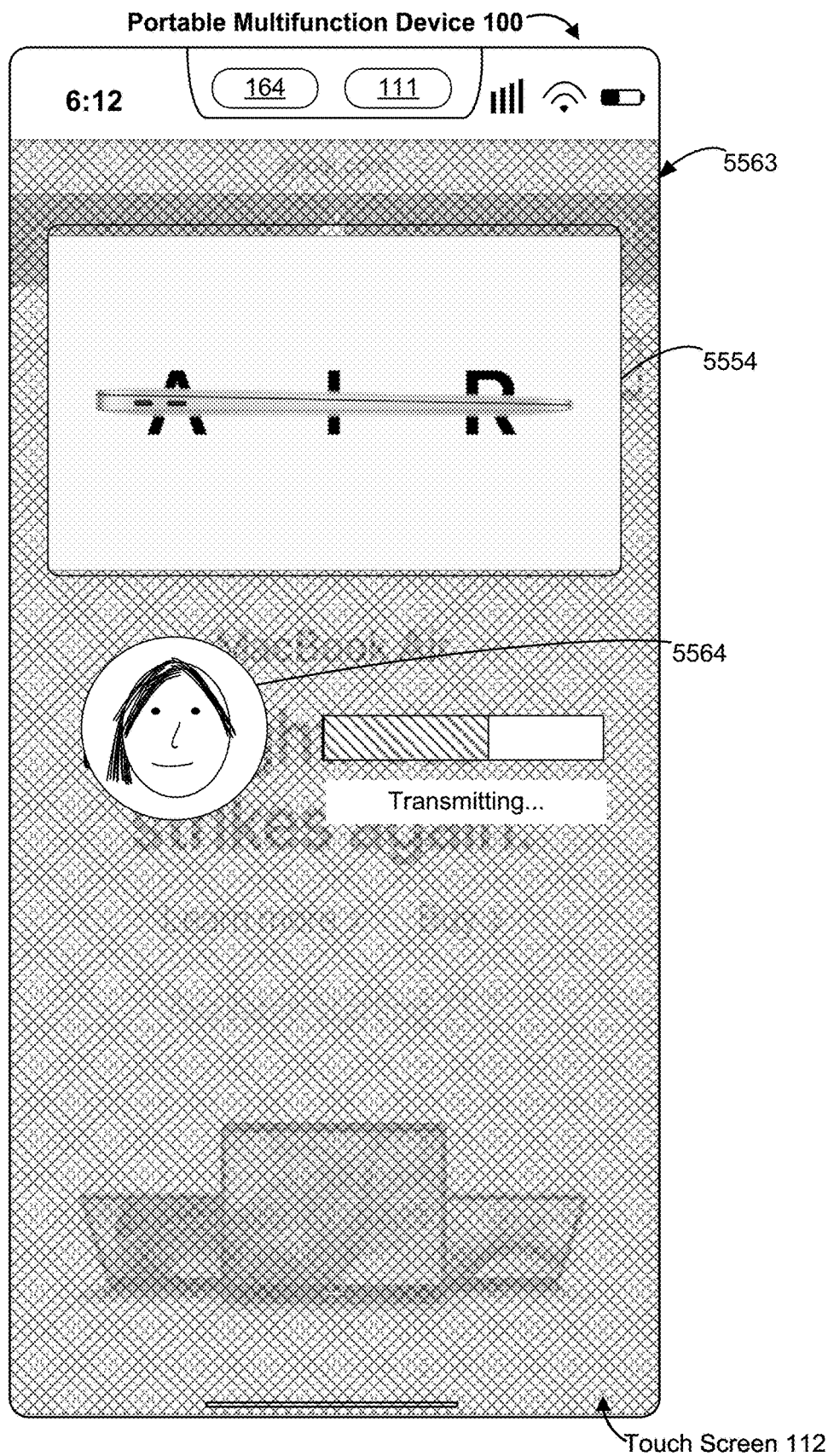
Figure 5D27

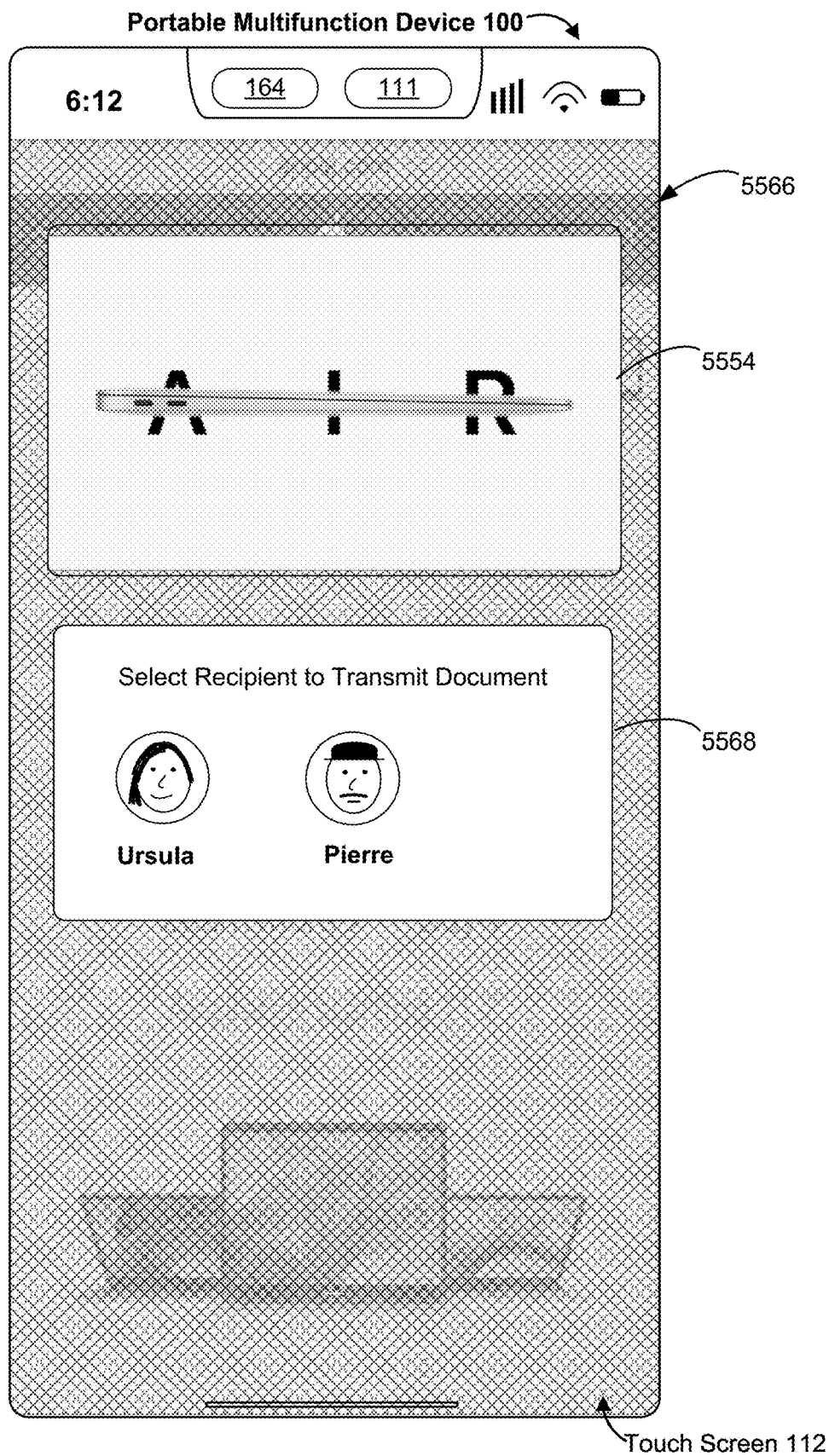
Figure 5D28

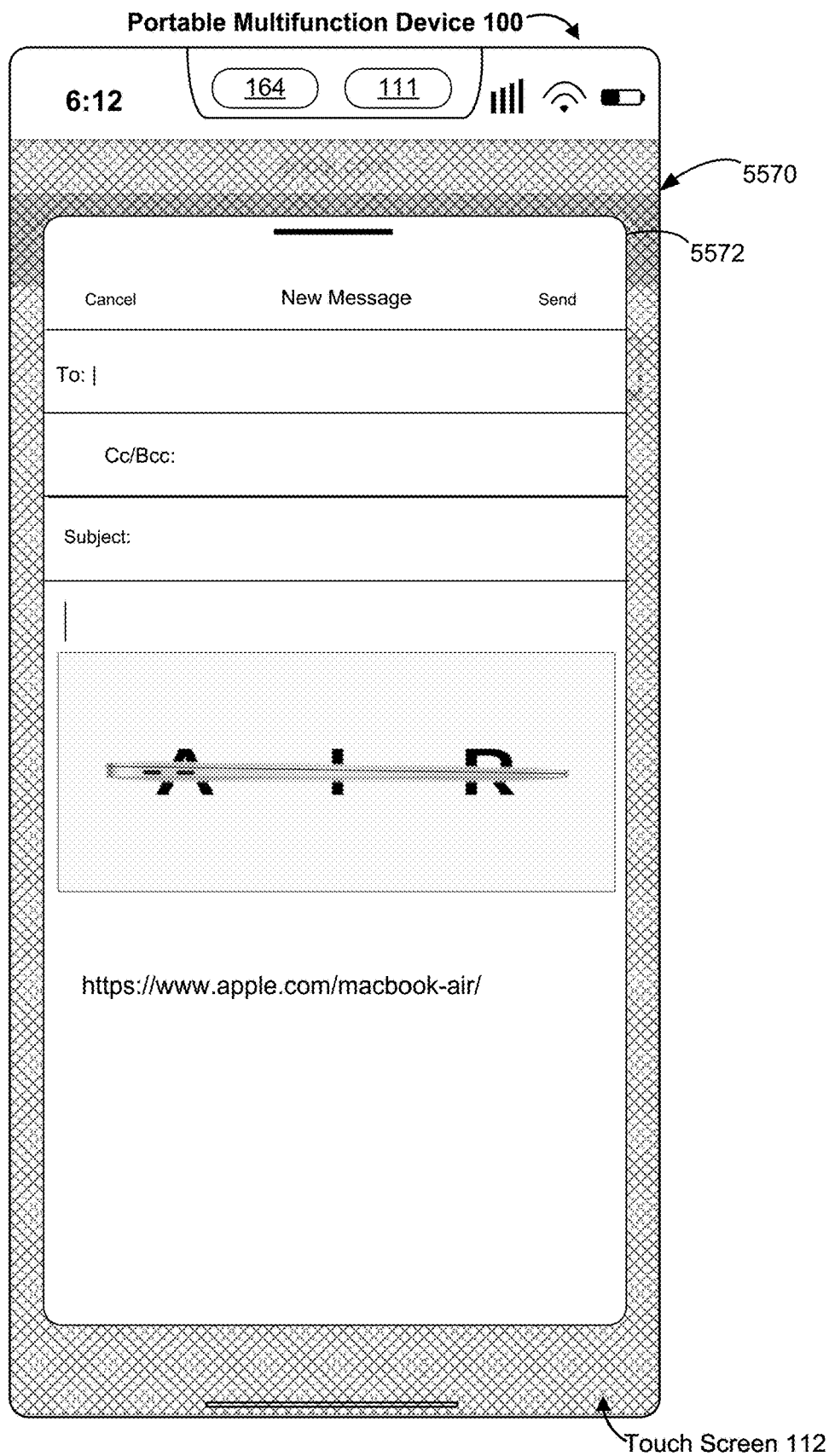
Figure 5D29

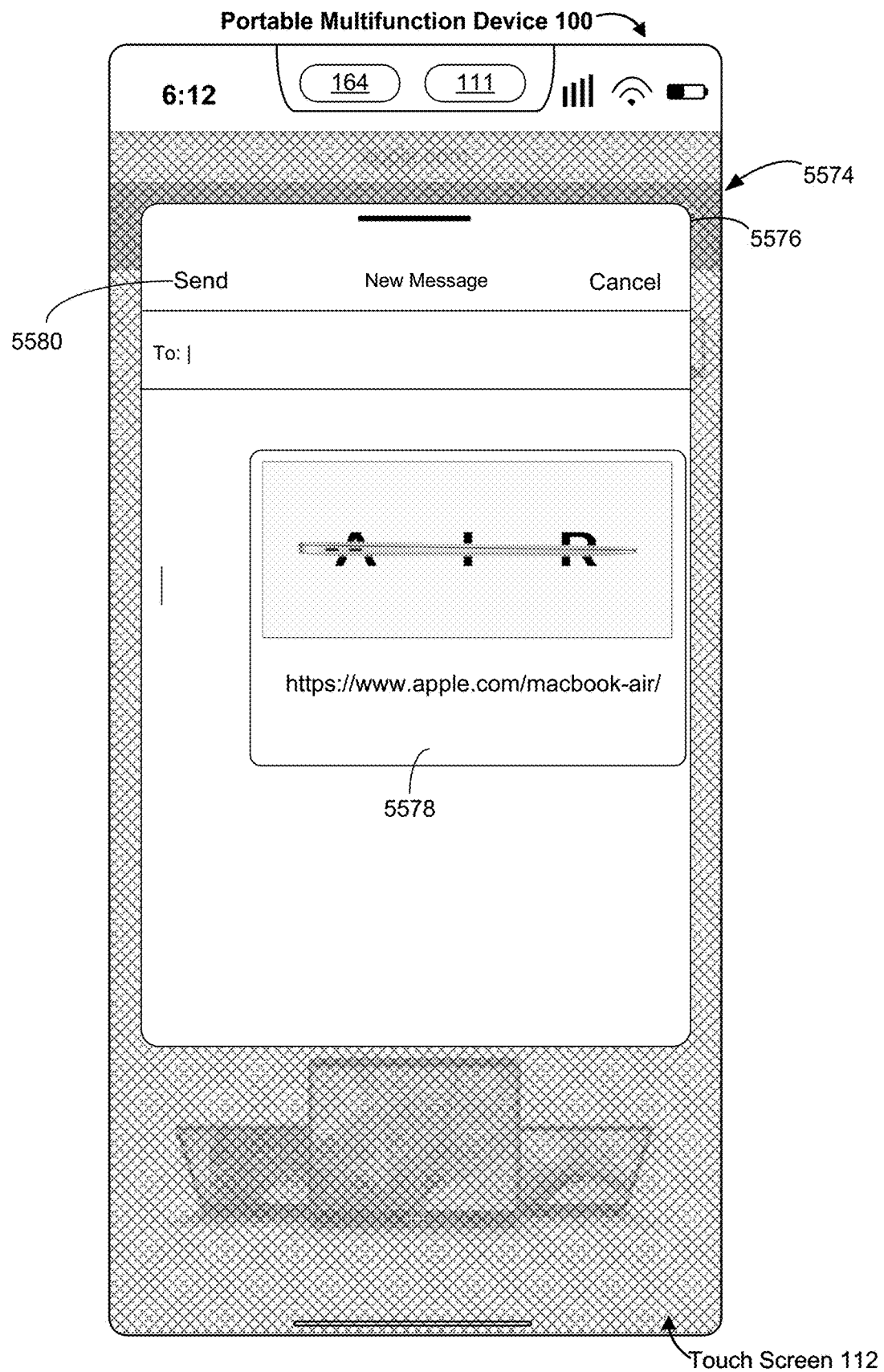
Figure 5D30

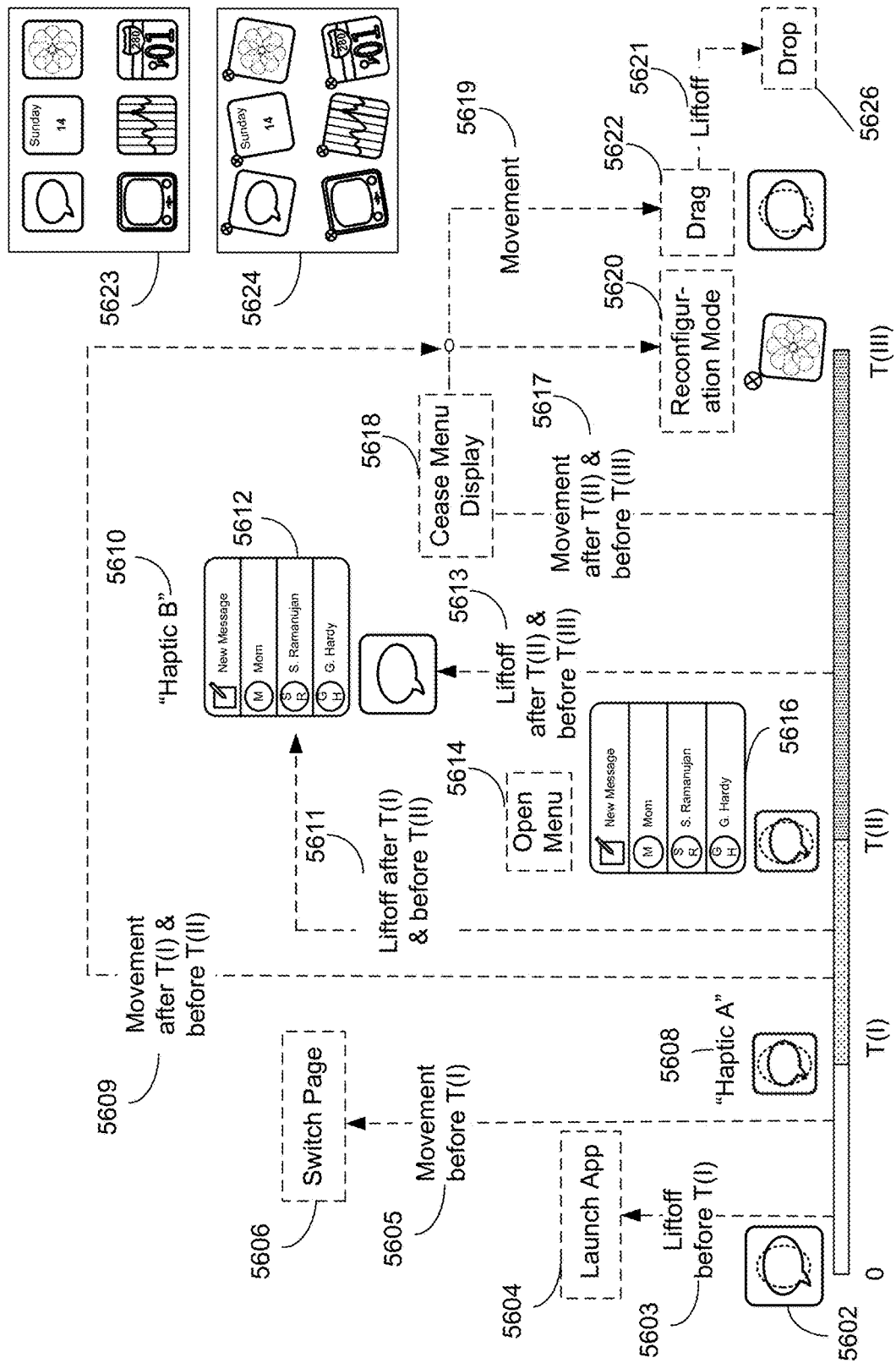
Figure 5E1

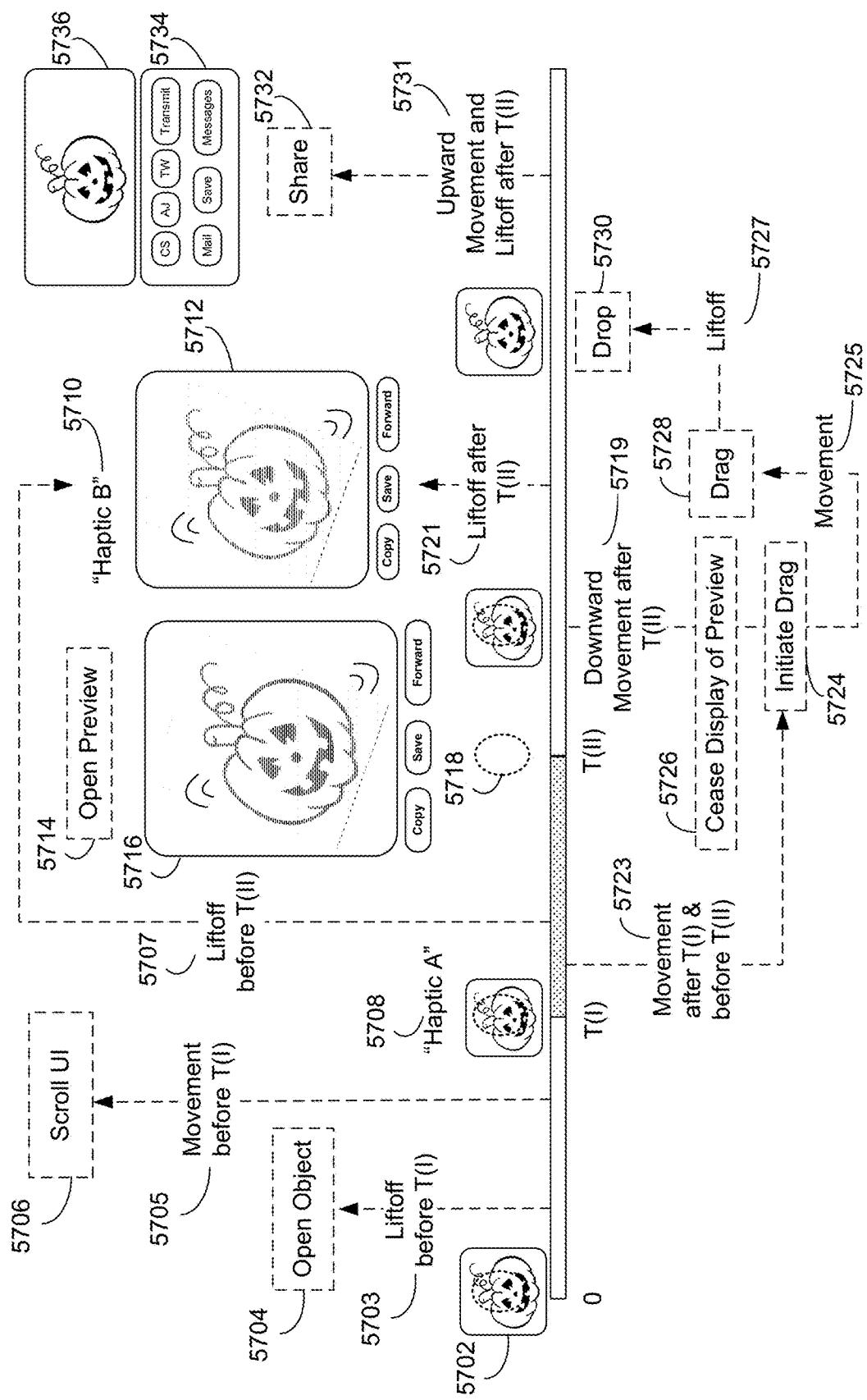
Figure 5E2

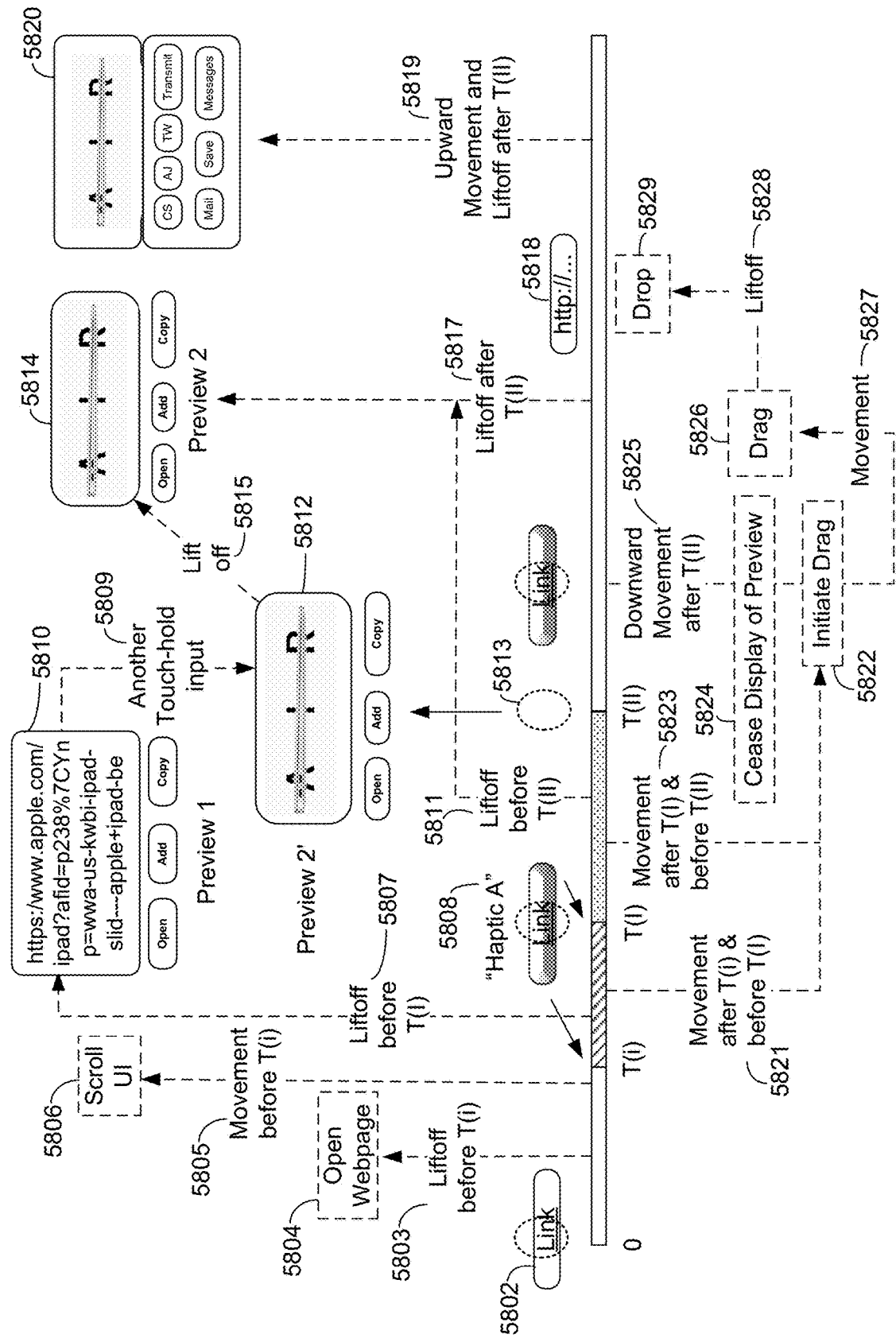
Figure 5E3

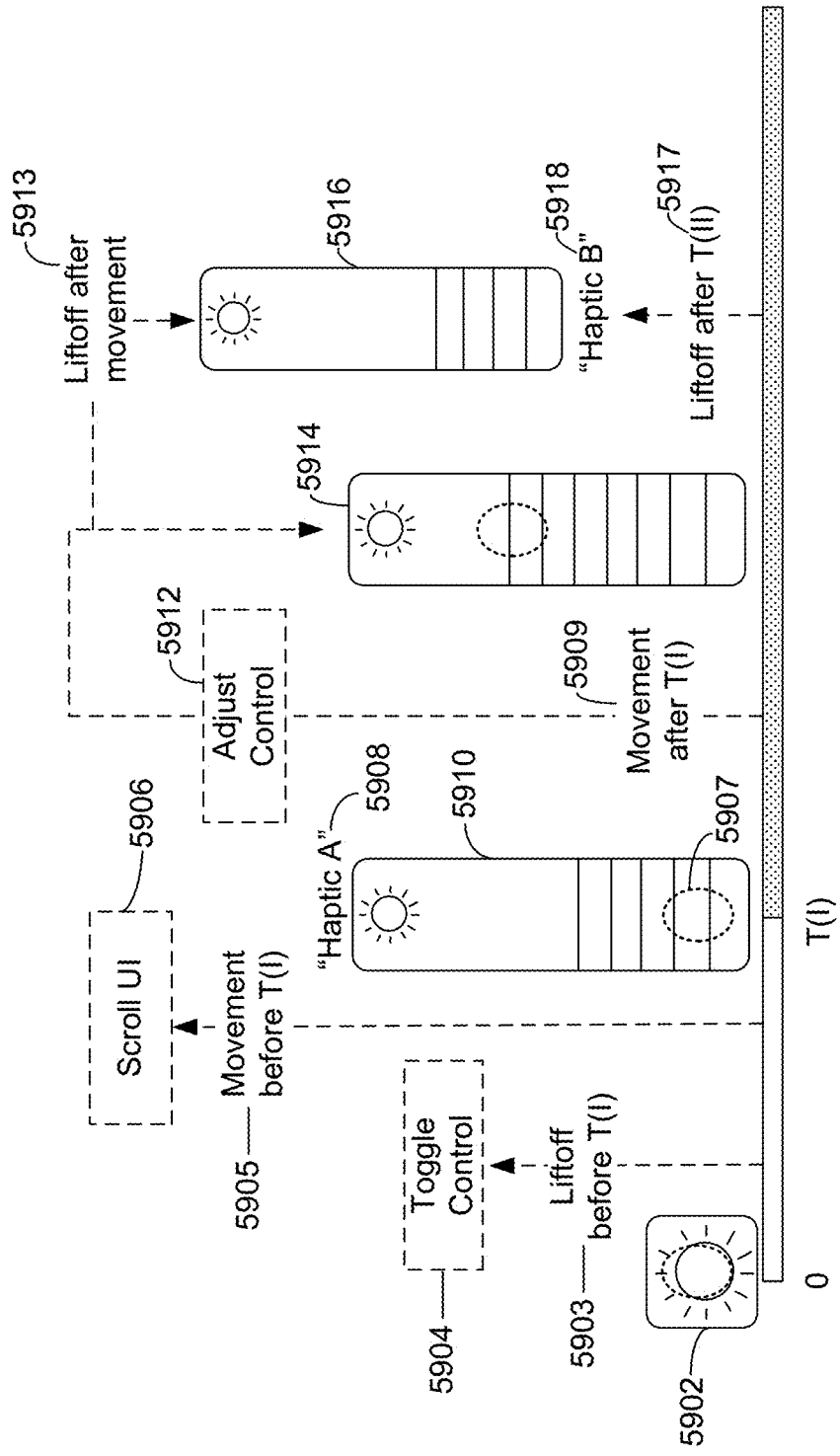
Figure 5E4

612 In response to detecting the first input directed to the user interface object, in accordance with a determination that the first input does not meet the first input threshold and includes more than the threshold amount of movement, perform an operation corresponding to the first input without displaying additional information associated with the application 614 In response to detecting the first input directed to the user interface object, in accordance with a determination that the first input meets the first input threshold and includes more than the threshold amount of movement, drag the user interface object relative to one or more user interface objects displayed on the display 616 In response to detecting that the first input includes more than the threshold amount of movement, generate a non-visual output that indicates that the first input includes more than the threshold amount of movement 618 In response to detecting the first input directed to the user interface object, in accordance with a determination that the first input includes more than the threshold amount of movement, forgo displaying additional information associated with the application 620 The system user interface includes a plurality of user-selectable actions associated with the first application 622 While displaying the system user interface, detect an input corresponding to a request to dismiss the system user interface; and
  in response to detecting the input corresponding to the request to dismiss the system user interface, dismiss the system user interface and generate a non-visual output corresponding to dismissal of the system user interface

Figure 6B

624 While displaying the system user interface, detect an input directed to the system user interface; and
   in response to detecting the input directed to the system user interface:
      in accordance with a determination that the input directed to the system user interface corresponds to a request to dismiss the system user interface, dismiss the system user interface and generate a non-visual output corresponding to dismissal of the system user interface; and
      in accordance with a determination that the input directed to the system user interface corresponds to a request to select an action corresponding to the first application, perform the action corresponding to the first application without generating a non-visual output corresponding to performing the action 626 The first input includes a touch input on a touch-sensitive surface of the device;
   detect liftoff of the touch input from the touch-sensitive surface while displaying the system user interface; and
   after detecting liftoff of the touch input, maintain display of the system user interface on the display 628 In response to determining that the first input meets the first input threshold, change a size of the user interface object 630 The first input threshold includes one or more of a time-based threshold and an intensity-based threshold 632 The system user interface is displayed over an obscured representation of a user interface that includes the user interface object 634 Detect an end of the first input, and, after detecting the end of the first input, generate a non-visual output that corresponds to detecting the end of the first input

Figure 6C

636 The user interface object is a notification that includes a subset of information about an event corresponding to the first application;
    the system user interface is an expanded view of the notification that includes the subset of information about the event and additional information about the event; and
    displaying the first application includes displaying a view of the first application that corresponds to the event 638 The user interface object is a representation of content;
    the system user interface includes a preview of the content; and
    displaying the first application includes displaying the content in the first application 640 The user interface object is an application icon for the first application; and
    the system user interface includes a plurality of actions associated with the first application 642 In response to determining that the first input meets the first input threshold, display a visual indication that a user interface that includes the user interface object is in a reconfiguration mode 644 In response to determining that the first input meets the first input threshold, display a visual indication of further action that can be taken to enter a reconfiguration mode 646 In accordance with a determination that the first input meets the first input threshold and includes more than the threshold amount of movement, display a visual indication that a user interface that includes the user interface object is in a reconfiguration mode

Figure 6D

714 The first input includes a touch input on a touch-sensitive surface of the device, and detecting the end of the first input includes detecting a reduction in intensity of the first input below a threshold intensity 716 The first input includes a touch input on a touch-sensitive surface of the device, and detecting the end of the first input includes detecting liftoff of the touch input from the touch-sensitive surface 718 In accordance with a determination that the first input meets the input threshold, generate a third tactile output before detecting the end of the first input 720 In accordance with a determination that the first input includes more than the threshold amount of movement after meeting the input threshold, generate a fourth tactile output before detecting the end of the first input. The fourth tactile output is different from the third tactile output.

722 The third tactile output is similar in at least a respective tactile output property to the second tactile output; and
the fourth tactile output is similar in at the least the respective tactile output property to the first tactile output 724 Generate a first audio output in conjunction with generating the first tactile output;
generate a second audio output in conjunction with generating the second tactile output, where the second audio output is different from the first audio output;
generate a third audio output in conjunction with generating the third tactile output; and
generate a fourth audio output in conjunction with generating the fourth tactile output, where the fourth audio output is different from the third audio output;
where:
the third audio output is similar in at least a respective audio output property to the second audio output; and
the fourth audio output is similar in at the least the respective audio output property to the first audio output

914 After detecting the end of the first input, maintain display of the first respective user interface region and the representation of at least the portion of the first user interface at the location that is outside of the first respective user interface region;

while maintaining display of the first respective user interface region and the representation of at least the portion of the first user interface at the location that is outside of the first respective user interface region, detect a second input directed to a location that is outside of the first respective user interface region; and in response to detecting the second input directed to a location that is outside of the first respective user interface region:

cease to display the first respective user interface region; and restore display of the first user interface.

---

916 Display, after detecting the end of the first input, the first respective user interface region that includes information corresponding to the user interface object includes:

in response to detecting the end of the first input, displaying the first respective user interface region with a first size; and changing a displayed size of the first respective user interface region from the first size to a second size that is different from the first size.

918 Display, prior to detecting the end of the first input, the first respective user interface region that includes information corresponding to the user interface object includes:

in response to detecting the first input meeting the second input threshold prior to detecting the end of the first input, displaying the first respective user interface region with the second size.

---

920 In response to detecting the first input directed to the user interface object:

in accordance with a determination that the first input includes more than the threshold amount of movement before the first input threshold is met by the first input, move at least a portion of the first user interface in accordance with movement of the first input.

922 In response to detecting the first input directed to the user interface object:
    in accordance with a determination that the first input includes more than the threshold amount of movement after meeting the first input threshold and before meeting the second input threshold, move the user interface object relative to the first user interface in accordance with movement of the first input.

924 In response to detecting the first input:
    in accordance with a determination that the first input includes more than the threshold amount of movement after meeting the second input threshold, initiate a drag operation that moves the user interface object.

926 Initiating the drag and drop operation that moves the user interface object includes:
    replacing display of the first respective user interface region with a representation of the user interface object; and
    moving the representation of the user interface object in accordance with the movement of the first input.

928 In response to detecting the first input:
    in accordance with a determination that the first input includes more than the threshold amount of movement after meeting the second input threshold, initiate a user interface reconfiguration mode of the first user interface, wherein, in the user interface reconfiguration mode of the first user interface, a plurality of user interface objects in the first user interface are movable relative to the first user interface by a respective input that includes more than the threshold amount of movement, without the respective input having met the first input threshold.

930 In response to detecting the first input:
    in accordance with a determination that the first input includes more than the threshold amount of movement after meeting the second input threshold:
        in accordance with a determination that the first input includes movement in a first direction relative to the first respective user interface region, perform a first operation corresponding to a location within the first respective user interface region; and
        in accordance with a determination that the first input includes movement in a second direction, distinct from the first direction, relative to the first respective user interface region, initiate a drag and drop operation that moves the user interface object.

932 Initiating the drag operation that moves the user interface object includes:
    ceasing display of the first respective user interface region; and
    moving the user interface object in accordance with the movement of the first input.

934 After detecting the end of the first input and while maintaining display of the first respective user interface region on the display, detect a second input directed to a first portion of the first respective user interface region, wherein the first portion of the first respective user interface region corresponds to a first operation; and
    in response to detecting the second input directed to the first portion of the first respective user interface region, in accordance with a determination that the second input meets first criteria, perform the first operation.

936 After detecting the end of the first input and while maintaining display of the first respective user interface region on the display, detect a third input directed to the first respective user interface region; and in response to detecting the third input directed to the first respective user interface region, in accordance with a determination that the third input includes more than the threshold amount of movement, initiate a drag operation that moves the user interface object.

938 In response to detecting the first input directed to the user interface object:

in accordance with a determination that the first input meets a third input threshold that is greater than the second input threshold, and includes less than the threshold amount of movement, initiate, before detecting the end of the first input, a user interface reconfiguration mode of the first user interface, wherein, in the user interface reconfiguration mode of the first user interface, a plurality of user interface objects in the first user interface are movable relative to the first user interface by a respective input that includes more than the threshold amount of movement, without the respective input having met the first input threshold.

940 During the user interface reconfiguration mode of the first user interface, detect a fourth input directed to a first location in the first user interface; and in response to detecting the fourth input directed to the first location in the first user interface:

in accordance with a determination that the first location is unoccupied by a user interface object, terminate the user interface reconfiguration mode of the first user interface; and in accordance with a determination that the first location is occupied by a user interface object, maintain the user interface reconfiguration mode of the first user interface.

942 In response to detecting the first input directed to the user interface object:

in accordance with a determination that the first input meets the first input threshold and includes less than the threshold amount of movement and that the first input does not meet the second input threshold that is greater than the first input threshold, provide a visual indication that the first input threshold has been met with less than the threshold amount of movement.

944 In response to detecting the first input directed to the user interface object:

in accordance with a determination that the first input meets the first input threshold and includes less than the threshold amount of movement and that the first input does not meet the second input threshold that is greater than the first input threshold, provide a non-visual indication that the first input threshold has been met with less than the threshold amount of movement.

946 In response to detecting the first input directed to the user interface object:

in accordance with a determination that the first input meets a third input threshold and includes less than the threshold amount of movement and that the first input does not meet the first input threshold or the second input threshold that are greater than the third input threshold, display, after detecting the end of the first input, a second respective user interface region that includes information corresponding to the user interface object, wherein the second respective user interface region is distinct from the first respective user interface region, and wherein the second respective user interface region is displayed overlaying at least a portion of the first user interface while maintaining a representation of at least a portion of the first user interface at a location that is outside of the second respective user interface region.

1002 Display, on the display, a first user interface object that corresponds to first content

1004 While displaying the first user interface object, detect, via the input element, a first input directed to the first user interface object

1006 In response to detecting the first input:
    in accordance with a determination that the first input includes more than a first threshold amount of movement in a first direction after first criteria have been met, display a sharing user interface for the first content, wherein displaying the sharing user interface includes concurrently displaying a plurality of representations of different sharing options, including a first sharing option associated with a first sharing protocol and a second sharing option associated with a second sharing protocol that is different from the first sharing protocol; and
    in accordance with a determination that the first input includes less than the first threshold amount of movement after the first criteria have been met, display, a representation of the first content without displaying the plurality of representations of different sharing options.

1012 While displaying the first user interface object, detect a second input directed to the first user interface object; and
    in response to detecting the second input:
        in accordance with a determination that the second input meets second criteria that are distinct from the first criteria, display the first content.

1014 While displaying the representation of the first content, detect, via the input element, a third input directed to the representation of the first user interface object; and
    in response to detecting the third input:
        in accordance with a determination that the third input meets the second criteria, cease display of the representation of the first content and displaying the first content.

1016 The first user interface object was part of a first user interface at a time when the first input was detected on the first user interface object, and
    the representation of the first content is displayed overlaying a first portion of the first user interface, concurrently with a representation of at least a second portion of the first user interface at a location that is outside of the representation of the first user interface object.

1018 The first sharing option associated with the first sharing protocol, when activated, initiates a first operation to share the first content using a first application, and the second sharing option associated with the second sharing protocol, when activated, initiates a second operation to share the first content using a second application distinct from the first application.

1020 The plurality of representations of different sharing options include a third sharing option associated with a first recipient user, and a fourth sharing option associated with a second recipient user, and wherein the third sharing option associated with the first recipient user, when activated, initiates a third operation to share the first content with the first recipient user, and the fourth sharing option associated with the second recipient user, when activated, initiates a fourth operation to share the first content with the second recipient user distinct from the first recipient user.

1022 Before the first threshold amount of movement is detected in the first input, display the representation of the first content.

1024 In accordance with a determination that the first input includes more than the first threshold amount of movement in the first direction while the representation of the first content is displayed, shrink the representation of the first content while moving the representation of the first content in accordance with movement of the first input in the first direction.

1026 In accordance with a determination that the first input includes more than a second threshold amount of movement in a second direction distinct from the first direction while the representation of the first content is displayed, cease display of the representation of the first content.

1028 In response to detecting the first input:
in accordance with a determination that the first input includes more than a third threshold amount of movement before the first criteria are met, scroll a first user interface on which the first user interface object is displayed, in accordance with movement of the first input.

1030 Display of the representation of the first content is maintained after detecting an end of the first input; and
the method includes:
    while maintaining display of the representation of the first content, detecting a fourth input directed to the representation of the first content; and
    in response to detecting the fourth input, and in accordance with a determination that the fourth input includes more than a fourth threshold amount of movement:
        moving the representation of the first content in accordance with movement of the fourth input; and
        displaying the sharing user interface for the first content.

1032 A first portion of the first input includes less than the first threshold amount of movement and the first portion of the first input meets the first criteria,
    a second portion of the first input detected after the first portion of the first input and before an end of the first input includes more than the first threshold amount of movement in the first direction after the first portion of the first input has met the first criteria,
    the representation of the first content is displayed in accordance with a determination that the first portion of the first input includes less than the first threshold amount of movement after the first criteria have been met by the first portion of the first input, and
    the sharing user interface is displayed in accordance with a determination that the second portion of the first input includes more than the first threshold amount of movement after the first criteria have been met by the first portion of the first input.

1034 In response to detecting the first input, in accordance with the determination that the first input includes more than the first threshold amount of movement in the first direction after the first criteria have been met, displaying the sharing user interface for the first content includes:
    providing an indication that the first threshold amount of movement in the first direction has been detected; and
    moving the plurality of representations of different sharing options in the first direction to a predefined location on the display, after detecting an end of the first input.

(C)

Figrue 10D

DEVICES, METHODS, AND GRAPHICAL USER INTERFACES FOR INTERACTING WITH USER INTERFACE OBJECTS AND PROVIDING FEEDBACK

RELATED APPLICATIONS

This application is a continuation of U.S. application Ser. No. 16/574,033, filed Sep. 17, 2019, which claims priority to U.S. Provisional Application Ser. No. 62/855,986, filed Jun. 1, 2019, and U.S. Provisional Application Ser. No. 62/756,560, filed Nov. 6, 2018, which are incorporated by reference in their entirety.

TECHNICAL FIELD

This relates generally to electronic devices with touch-sensitive surfaces, including but not limited to electronic devices with touch-sensitive surfaces that display user interface objects within user interfaces and generate non-visual outputs during user interactions with the user interface objects to provide non-visual feedback to a user.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interfaces and objects therein on a display.

Example user interface objects include digital images, video, text, icons, and control elements such as buttons and other graphics. Example manipulations include adjusting the position and/or size of one or more user interface objects or activating buttons or opening files/applications represented by user interface objects, as well as associating metadata with one or more user interface objects or otherwise manipulating user interfaces. A user will, in some circumstances, need to perform such manipulations on user interface objects in a file management program (e.g., Finder from Apple Inc. of Cupertino, Calif.), a system level user interface (e.g., a home screen or springboard user interface, a control center user interface, an application-switcher user interface, etc. of the iOS from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), or a spreadsheet application (e.g., Numbers from Apple Inc. of Cupertino, Calif.).

But methods for performing these manipulations are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

Haptic feedback, typically in combination with visual and/or audio feedback, is often used in an attempt to make manipulation of user interfaces and user interface objects more efficient and intuitive for a user, thereby improving the operability of electronic devices. But conventional methods of providing haptic feedback are not as helpful as they could be.

Some devices have touch-sensitive surfaces that are sensitive to a range of contact intensities. On such devices, multiple contact intensity thresholds are monitored by the devices and different responses are mapped to different contact intensity thresholds. However, such input and response mapping does not work for devices that do not have the capability of sensing a range of contact intensities, which limits the general applicability of an interaction model that utilizes multiple contact intensity thresholds.

SUMMARY

Accordingly, there is a need for electronic devices with faster, more efficient, and more versatile methods and interfaces for manipulating user interface objects and providing feedback. Such methods and interfaces optionally complement or replace conventional methods for manipulating user interfaces and providing feedback. Such methods and interfaces reduce the number, extent, and/or nature of the inputs from a user by helping the user understand the connection between provided inputs and device responses to the inputs, thereby creating a more efficient human-machine interface. For battery-operated devices, such methods and interfaces conserve power and increase the time between battery charges. Such methods and interfaces are also more easily adaptable for devices with varying capabilities with respect to detecting and monitoring contact intensities with respect to multiple intensity thresholds, thereby creating a more generally-applicable user interaction model for an operating system that is installed on a variety of devices. This unified interaction model also reduces confusion and user mistakes when user switches between devices with different intensity-sensing capabilities.

The above deficiencies and other problems associated with conventional methods and interfaces for manipulating user interface objects are reduced or eliminated by the disclosed computer systems. In some embodiments, the computer system includes a desktop computer. In some embodiments, the computer system is portable (e.g., a notebook computer, tablet computer, or handheld device). In some embodiments, the computer system includes a personal electronic device (e.g., a wearable electronic device, such as a watch). In some embodiments, the computer system has (and/or is in communication with) a display generation component and one or more input devices. In some embodiments, the computer system has (and/or is in communication with) a touchpad. In some embodiments, the computer system has (and/or is in communication with) a touch-sensitive display (also known as a "touch screen" or "touch screen display"). In some embodiments, the computer system has a graphical user interface (GUI), one or more processors, memory and one or more modules, programs or sets of instructions stored in the memory for performing multiple functions. In some embodiments, the user interacts with the GUI in part through stylus and/or finger contacts and gestures on the touch-sensitive surface. In some embodiments, the functions optionally include game playing, image editing, drawing, presenting, word processing, spreadsheet making, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display and an input element. The method includes displaying, on the display, a user interface object that corresponds to a first application. The method includes, while displaying the user interface object, detecting, via the input element, a first input directed to the user interface object. The method includes, in response to detecting the first input directed to the user interface object: in accordance with a determination that the first input meets a first input threshold and includes less than a threshold amount of movement, generating a non-visual output corresponding to the first input before detecting an end of the first input, and after detecting an end of the first input, displaying a system user interface that includes information about the first application without displaying the first application; and, in accordance with a determination that the first input does not meet the first input threshold and includes less than the threshold amount of movement, forgoing generating a non-visual output corresponding to the first input, and after detecting an end of the first input, displaying the first application on the display.

In accordance with some embodiments, a method is performed at an electronic device with a display and an input element. The method includes displaying, on the display, a user interface object that corresponds to a first application. The method includes, while displaying the user interface object, detecting, via the input element, a first input directed to the user interface object. The method includes, in response to detecting the first input directed to the user interface object: in accordance with a determination that the first input meets an input threshold and includes more than a threshold amount of movement after meeting the input threshold, generating a first tactile output in response to detecting an end of the first input; in accordance with a determination that the first input meets the input threshold and includes less than the threshold amount of movement after meeting the input threshold, generating a second tactile output in response to detecting an end of the first input, where the second tactile output is different from the first tactile output; and, in accordance with a determination that the first input does not meet the input threshold, performing an operation without generating the first tactile output and without generating the second tactile output in response to detecting an end of the first input.

In accordance with some embodiments, a method is performed at an electronic device having a display, an input element, and a plurality of audio output elements at distinct locations along a periphery of the electronic device. The method includes displaying a user interface object, and while displaying the user interface object, detecting, via the input element, a first input directed to the user interface object. In response to detecting the first input directed to the user interface object, and in response to determining that the first input meets predefined criteria and that the user interface object is located closer to a first audio output element of the plurality of audio output elements than to a second audio output element of the plurality of audio output elements, the device generates a first audio output that corresponds to the first input, wherein the first audio output has a greater amplitude at the first audio output element than at the second audio output element. Further, in response to detecting the first input directed to the user interface object, and in response to determining that the first input meets predefined criteria and that the user interface object is located closer to the second audio output element than to the first audio output element, generating a second audio output that corresponds to the first input, wherein the second audio output has a greater amplitude at the second audio output element than at the first audio output element.

In accordance with some embodiments, a method is performed at an electronic device with a display and an input element. The method includes: displaying, on the display, a first user interface that includes a user interface object; while displaying the user interface object, detecting, via the input element, a first input directed to the user interface object; and in response to detecting the first input directed to the user interface object: in accordance with a determination that the first input does not meet a first input threshold and includes less than a threshold amount of movement, after detecting an end of the first input, replacing display of the first user interface with a second user interface corresponding to the user interface object; in accordance with a determination that the first input meets the first input threshold and includes less than the threshold amount of movement and that the first input does not meet a second input threshold that is greater than the first input threshold, displaying, after detecting the end of the first input, a first respective user interface region that includes information corresponding to the user interface object, wherein the first respective user interface region is displayed overlaying at least a portion of the first user interface while maintaining a representation of at least a portion of the first user interface at a location that is outside of the first respective user interface region; and in accordance with a determination that the first input meets the second input threshold and includes less than the threshold amount of movement, displaying, prior to detecting the end of the first input, the first respective user interface region that includes information corresponding to the user interface object, wherein the user interface region is displayed overlaying at least a portion of the first user interface while maintaining a representation of at least a portion of the first user interface at the location that is outside of the first respective user interface region.

In some embodiments, a method is performed at an electronic device with a display and an input element. The method includes: displaying, on the display, a first user interface object that corresponds to first content; while displaying the first user interface object, detecting, via the input element, a first input directed to the first user interface object; and in response to detecting the first input: in accordance with a determination that the first input includes more than a first threshold amount of movement in a first direction after first criteria have been met, displaying a sharing user interface for the first content, wherein displaying the sharing user interface includes concurrently displaying a plurality of representations of different sharing options, including a first sharing option associated with a first sharing protocol and a second sharing option associated with a second sharing protocol that is different from the first sharing protocol; and in accordance with a determination that the first input includes less than the first threshold amount of movement after the first criteria have been met, displaying a representation of the first content without displaying the plurality of representations of different sharing options.

In accordance with some embodiments, an electronic device includes a display generation component and one or more input devices, optionally one or more sensors to detect intensities of contacts with the touch-sensitive surface, optionally one or more tactile output generators, optionally one or more device orientation sensors, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device with a display generation component, one or more input devices, optionally one or more sensors to detect intensities of contacts with the touch-sensitive surface, optionally one or more tactile output generators, and optionally one or more device orientation sensors cause the device to perform or cause performance of the operations of any of the methods described herein. In accordance with some embodiments, a graphical user interface on an electronic device with a display generation component, one or more input devices, optionally one or more sensors to detect intensities of contacts with the touch-sensitive surface, optionally one or more tactile output generators, optionally one or more device orientation sensors, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display generation component, one or more input devices, optionally one or more sensors to detect intensities of contacts with the touch-sensitive surface, optionally one or more tactile output generators, and optionally one or more device orientation sensors; and means for performing or causing performance of the operations of any of the methods described herein. In accordance with some embodiments, an information processing apparatus, for use in an electronic device with a display generation component, one or more input devices, optionally one or more sensors to detect intensities of contacts with the touch-sensitive surface, optionally one or more tactile output generators, and optionally one or more device orientation sensors includes means for performing or causing performance of the operations of any of the methods described herein.

Thus, electronic devices with display generation components, one or more input devices, optionally one or more sensors to detect intensities of contacts with the touch-sensitive surface, optionally one or more tactile output generators, and optionally one or more device orientation sensors, are provided with improved methods and interfaces for interacting with user interface objects, thereby increasing the effectiveness, efficiency, and user satisfaction with such devices. Such methods and interfaces may complement or replace conventional methods for interacting with user interface objects.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates an example user interface for a multifunction device with a touch-sensitive surface that is separate from the display in accordance with some embodiments.

FIGS. 4H-4J illustrate example haptic audio output patterns versus time that are used in conjunction with tactile outputs to simulate button clicks in accordance with some embodiments.

FIGS. 5A1-5A67 illustrate example user interfaces for interacting with user interface objects within user interfaces, in accordance with some embodiments.

FIGS. 5B1-5B6 illustrate example user interfaces for generating audio outputs in response to an input, in accordance with some embodiments.

FIGS. 5C1-5C19 illustrate example user interfaces for interacting with a user interface object, in accordance with some embodiments.

FIGS. 5D1-5D30 illustrate example user interfaces for interacting with a user interface object, and for interacting with a preview corresponding to content and displaying a sharing user interface for sharing the content using various sharing mechanisms, in accordance with some embodiments.

FIGS. 5E1-5E4 illustrate various example user interaction models for interacting with a user interface object, in accordance with some embodiments.

FIGS. 6A-6D are flow diagrams of a process for interacting with user interface objects, in accordance with some embodiments.

FIGS. 7A-7B are flow diagrams of a process for generating tactile outputs to provide haptic feedback for user interactions with a user interface object, in accordance with some embodiments.

FIGS. 9A-9G are flow diagrams of a process for interacting with a user interface object (e.g., integrating displaying a preview or menu corresponding to an object with dragging the object or other interactions with the object, and providing multiple interaction paths to trigger the display of the preview), in accordance with some embodiments.

FIGS. 10A-10E are flow diagrams of a process for interacting with a preview corresponding to content and displaying a sharing user interface for sharing the content using various sharing protocols, in accordance with some embodiments.

DESCRIPTION OF EMBODIMENTS

Figure 1A:
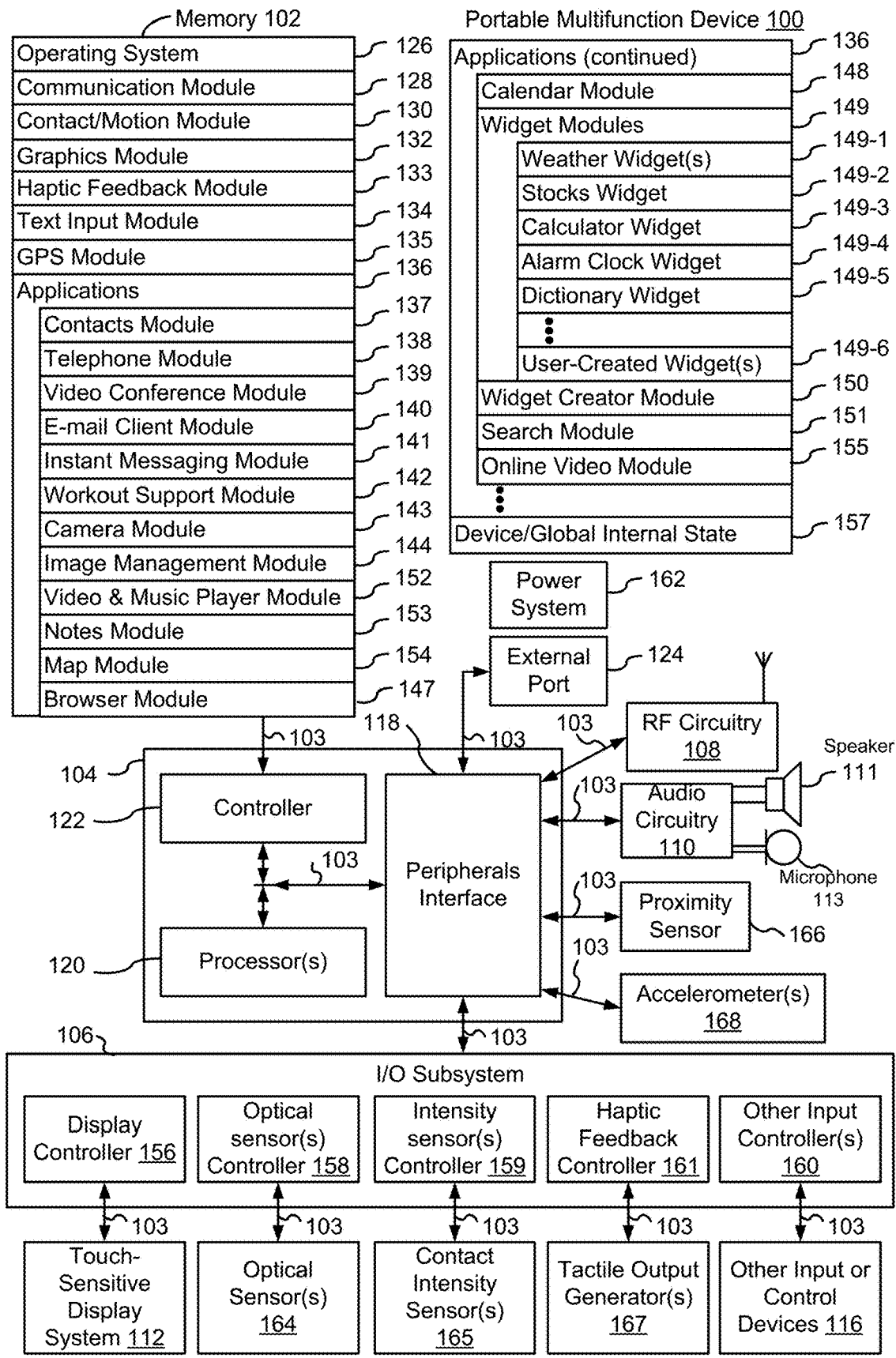
FIG. 1A is a block diagram illustrating a portable multifunction device with a touch-sensitive display in accordance with some embodiments.

The methods, devices and GUIs described herein provide visual and/or non-visual feedback (e.g., audio and haptic feedback) that makes manipulation of user interface objects more efficient and intuitive for a user.

In some embodiments, a user interface provides responses (e.g., visual, audio, and/or tactile cues) that are indicative of (1) whether an input threshold (e.g., a threshold based on contact intensity and an amount of time that the contact is maintained on the touch-sensitive surface (e.g., with less than a threshold amount of movement) after being detected (or after reaching a predefined intensity threshold)) has been met by an input, (2) whether the input has ended, (3) if an input has ended, whether it ended before or after the input threshold was met, (4) whether the input includes movement, and/or (5) whether the movement, if it exists, occurred before or after the input threshold was met. For example, visual outputs, audio outputs (e.g., audio alerts, and stand-alone audio outputs), and/or tactile outputs (e.g., haptic feedback and optionally, accompanying audio outputs) that are provided in conjunction with displaying a preview associated with a user interface object and moving a user interface object, and/or that are generated when particular threshold(s) (e.g., input threshold(s) based on contact intensity, duration, and/or a combination of both) are met by the input, alert the user of the changes occurring or about to occur in the internal state of the device, such that the user is given a chance to continue or correct the current input to achieve a desired outcome.

In some embodiments, for a device with a touch-sensitive surface that is sensitive to various parameters of the input (e.g., including a range of contact intensities, locations, durations, direction, rate of change, etc.), multiple input thresholds (e.g., thresholds based on intensity, duration, location, movement, speed, rate of change in one or more of the above, and/or a combination of two or more of the above) are monitored by the device. Different responses are mapped to the different input threshold values of a given input threshold type (e.g., a duration threshold type, an intensity threshold type, a speed threshold type, a position threshold type, or a combination of multiple thresholds of different types), and triggered when a respective input threshold value of the input threshold type is reached.

In some embodiments, for a device with a touch-sensitive surface that is sensitive to a range of contact intensities, the device provides additional functionality by allowing users to perform complex operations with a single continuous contact, e.g., based on various input thresholds being met by the input at different points in time (e.g., when different intensity thresholds and/or time thresholds are met) during the input.

In some embodiments, when an input directed to a user interface object is detected, a current value of the input relative to a number of input thresholds (e.g., a number distinct time thresholds or a number of intensity thresholds), as well as movement of the input (e.g., movement of a contact that provides the input) are monitored. The existence of movement in the input and the timing of the movement relative to the timing of when one or more of the input thresholds are met, are used in various criteria to determine which of a number of operations is to be performed in response to the input (e.g., at the time that the threshold is met, or after the end of the input is detected). In some embodiments, some operations are performed after the end of the input is detected, if the criteria for performing those operations have been met prior to the end of the input; and other operations are performed before the end of the input is detected (e.g., as soon as the criteria for performing those operations are met). In some embodiments, some operations are performed only if no movement is detected prior to the input thresholds for those operations are met; and some operations are performed only if the end of the input or movement of the input are detected prior to zero or more of the input thresholds having been met. In some embodiments, the same operation or an analogous operation, such as displaying a preview of content or a quick action menu, can be triggered in response to an end of an input that has met a lesser input threshold, as well as in response to an input that has met a greater input threshold but has not ended. Allowing an operation to be performed in response to detecting an end of the input after the lesser input threshold is met shortens the amount of time that a user has to wait to trigger the operation, provides an opportunity to cancel the operation after the input threshold has been met (e.g., by subsequent movement of the input), and permits the user to directly control (e.g., within a small time window before a greater input threshold is met) when the operation is actually performed. At the same time, allowing the same operation or an analogous operation to be performed when the greater input threshold is met without requiring the end of the input to be detected, enables the user to perform additional operations with the same sustained contact. In some embodiments, when the input continues after the preview or quick action menu has been displayed in response to an initial portion of the input, subsequent movement in the input is evaluated against various criteria to determine additional operations that are to be performed (e.g., to initiate a drag operation on an object that corresponds to the preview, to activate a selectable option that has been displayed, to display a sharing interface, to display a different preview, etc.). The integration of (1) multiple input thresholds and (2) the timing of input movement relative to the timing of one or more of these input thresholds being met into a multi-branch user interaction model improves the efficiency of the user interfaces, provides more direct control to the user, and reduces user mistakes (e.g., with improved feedback that are provided in response to the evaluation of the input against the various input thresholds).

In some embodiments, an interaction with a preview by an input (e.g., a new input or a later portion of the input that triggered display of the preview) causes the preview to be shifted on the user interface to reveal a number of selectable sharing options. This allows the user to quickly and conveniently review and choose a sharing operation for an object while viewing the preview of the object, without navigating to a completely different user interface, thereby reducing user mistakes and reduces the number of inputs required to perform a task.

A number of different approaches for manipulating user interface objects are described herein. Using one or more of these approaches (optionally in conjunction with each other) helps to provide a user interface that intuitively provides users with additional information and functionality. Using one or more of these approaches (optionally in conjunction with each other) reduces the number, extent, and/or nature of the inputs from a user and provides a more efficient human-machine interface. This enables users to use devices that have touch-sensitive surfaces faster and more efficiently. For battery-operated devices, these improvements conserve power and increase the time between battery charges.

Figure 7A:
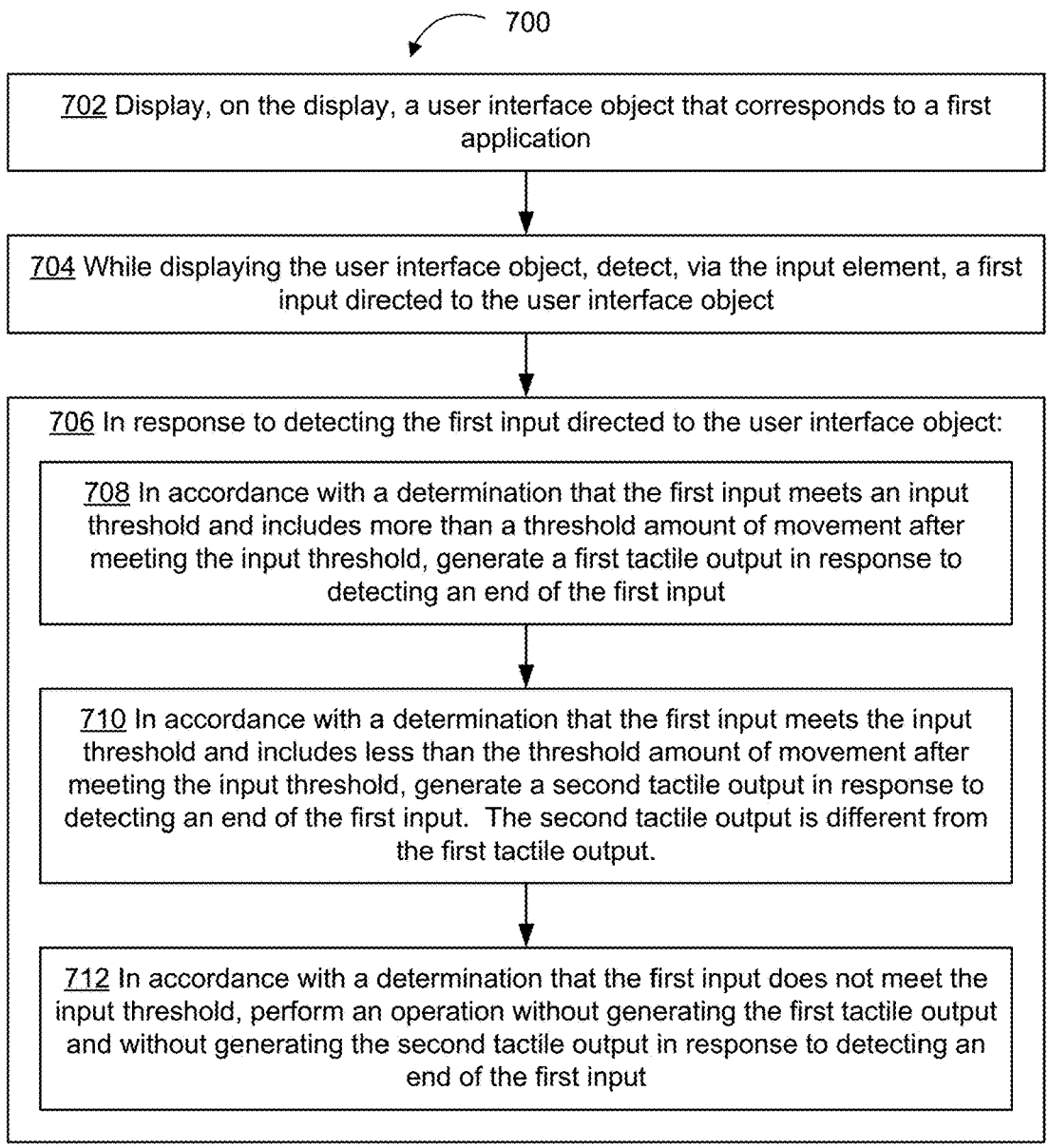
Figure 8A:
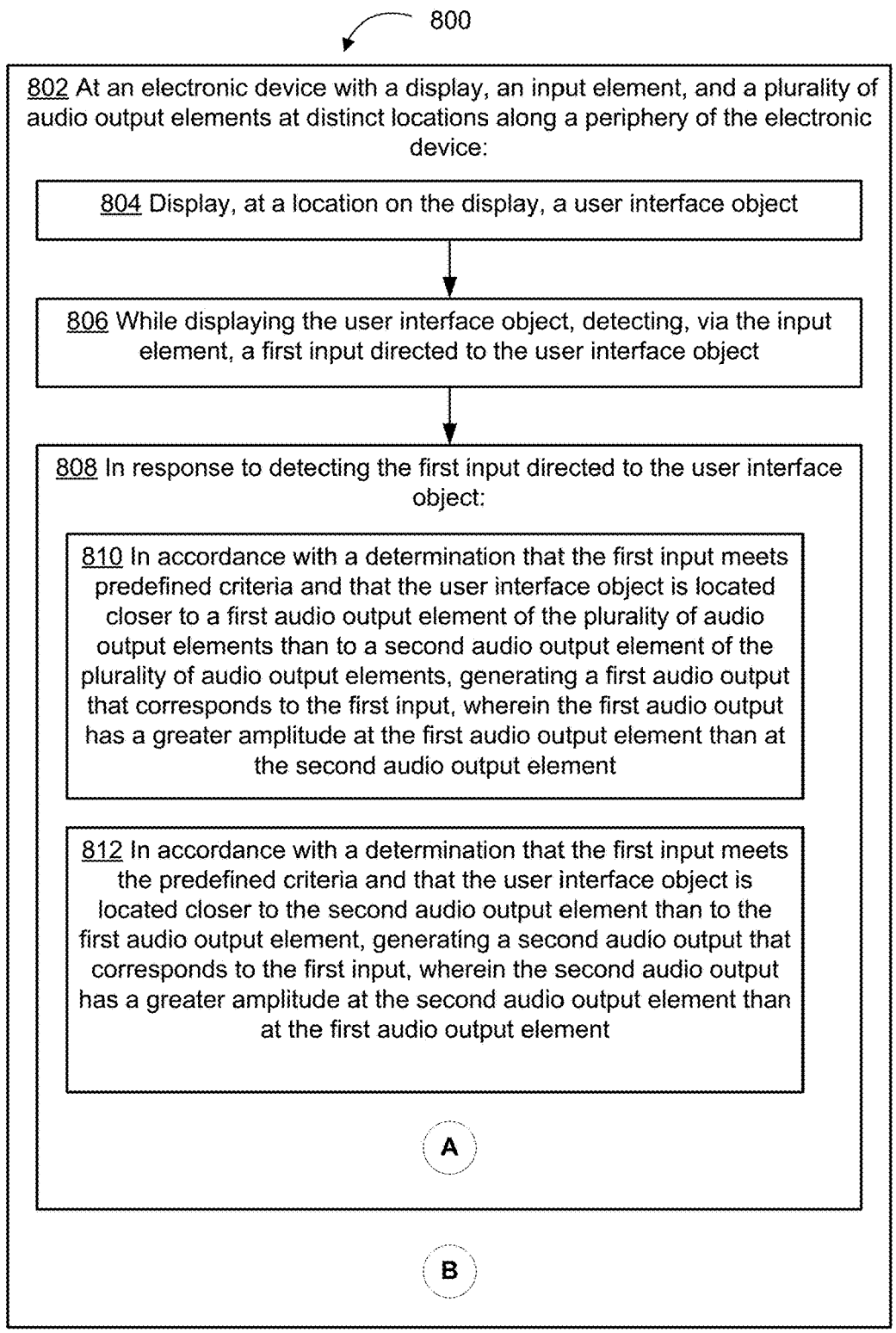
FIGS. 8A-8C are flow diagrams of a process for generating audio outputs in response to an input, in an electronic device having a plurality of audio output elements at distinct locations along a periphery of the electronic device, in accordance with some embodiments.
Figure 8B:
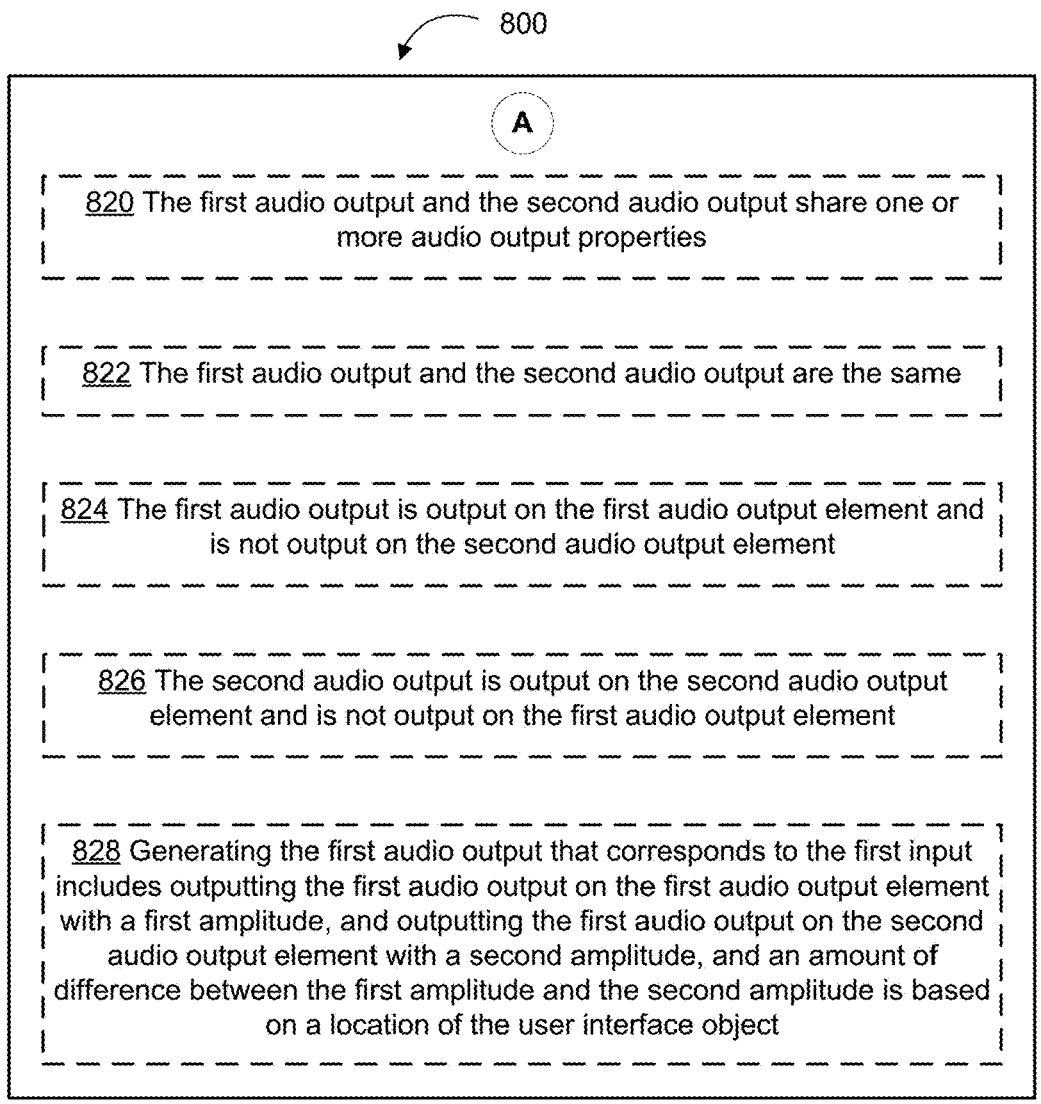

Below, FIGS. 1A-1C, 2, and 3 provide a description of example devices. FIGS. 4A-4B, 5A1-5A67, 5B1-5B6, 5C1-5C19, 5D1-5D30, and 5E1-5E4, illustrate example user interfaces and interaction models for manipulating user interface objects and providing feedback. Specifically, FIGS. 5A1-5A67, 5B1-5B6, 5C1-5C19 and 5D1-5D30 illustrate example user interfaces for interacting with user interface objects within user interfaces and providing feedback, in accordance with some embodiments. FIGS. 5E1-5E4 illustrate various example user interaction models for interacting with a user interface object, in accordance with some embodiments. FIGS. 6A-6D are flow diagrams of a process for interacting with a user interface object, in accordance with some embodiments. FIGS. 7A-7B are flow diagrams of a process for generating tactile outputs to provide haptic feedback for user interactions with a user interface object, in accordance with some embodiments. FIGS. 8A-8B are flow diagrams of a process for generating audio outputs in response to an input, in an electronic device having a plurality of audio output elements at distinct locations along a periphery of the electronic device, in accordance with some embodiments. FIGS. 9A-9G are flow diagrams of a process for interacting with a user interface object, in accordance with some embodiments. FIGS. 10A-10E are flow diagrams of a process for interacting with a preview corresponding to content and displaying a sharing user interface for sharing the content using various sharing mechanisms, in accordance with some embodiments. The user interfaces in FIGS. 5A1-5A67, 5B1-5B6, 5C1-5C19, and 5D1-5D30 are used to illustrate the processes in FIGS. 6A-6D, 7A-7B, 8A-8C, 9A-9G, and 10A-10E, and the interactions models shown in FIGS. 5E1-5E4.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

Figure 4A:
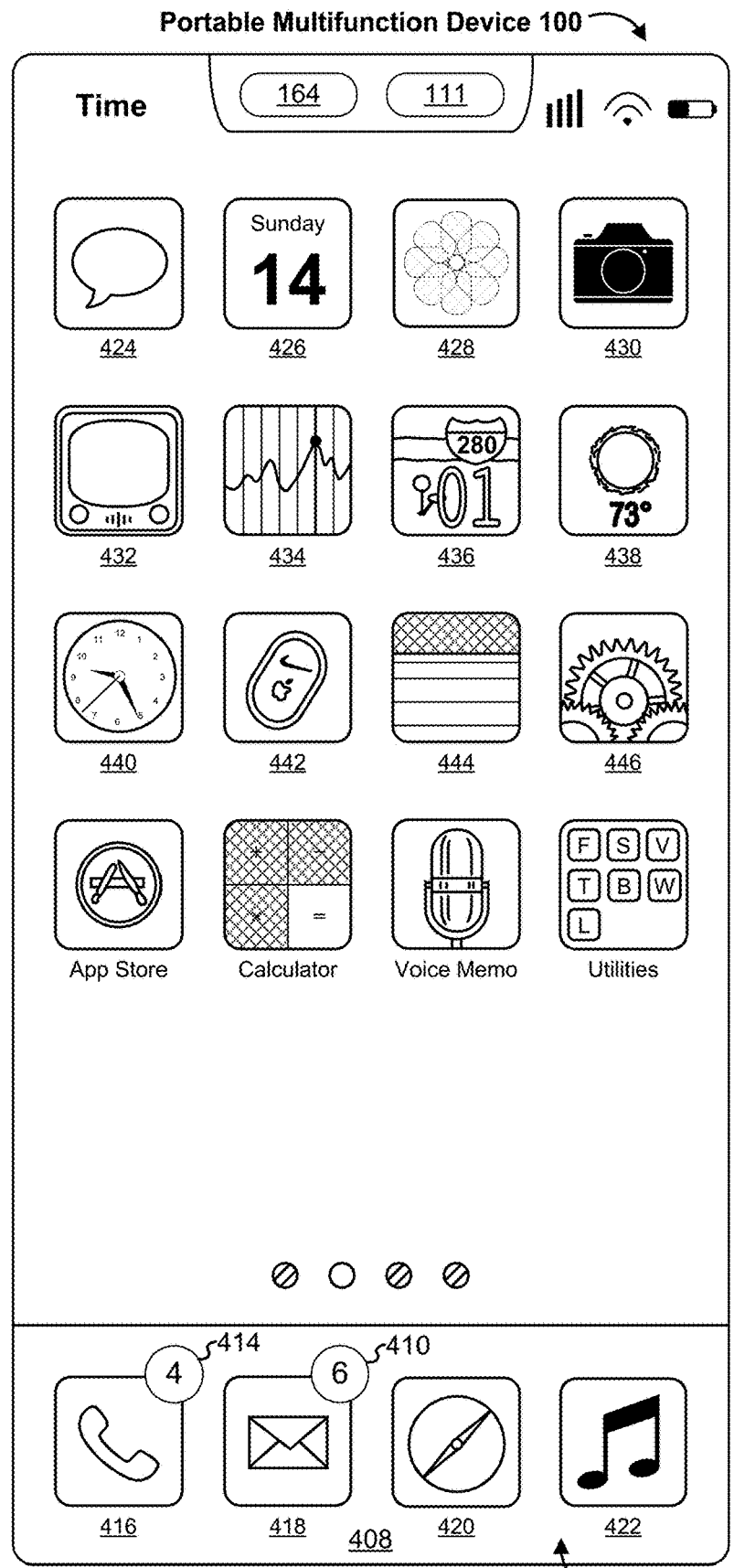
FIG. 4A illustrates an example user interface for a menu of applications on a portable multifunction device in accordance with some embodiments.
Figure 4C:
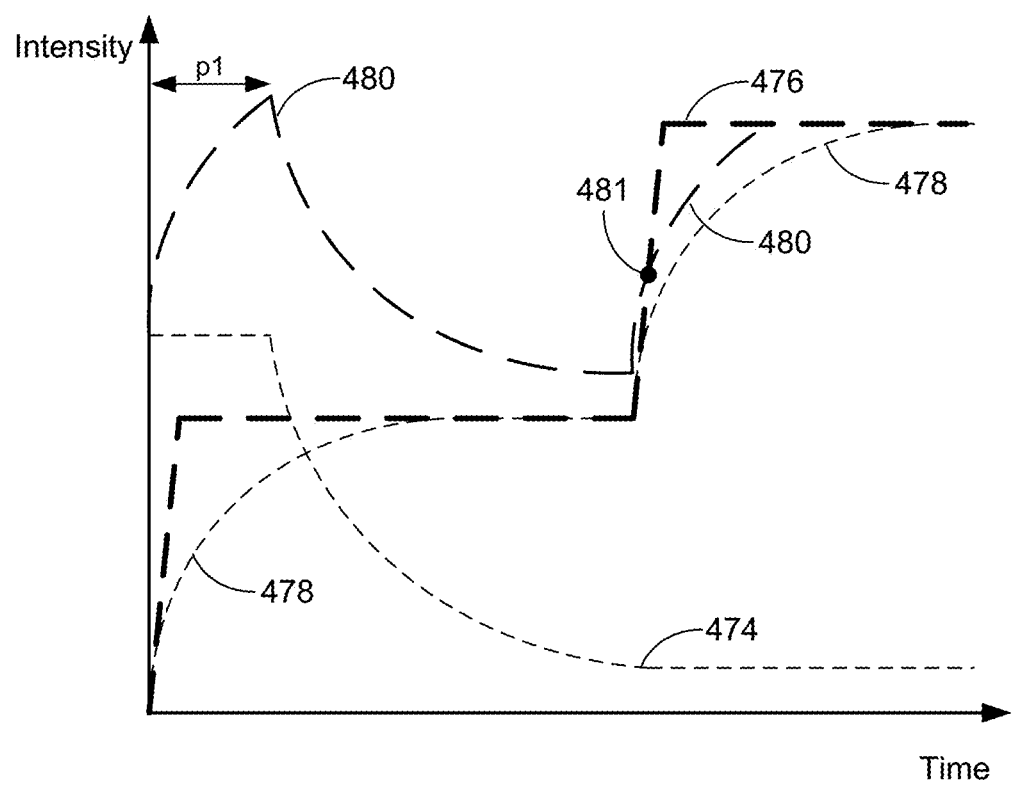
FIGS. 4C-4E illustrate examples of dynamic intensity thresholds in accordance with some embodiments.
Figure 4D:
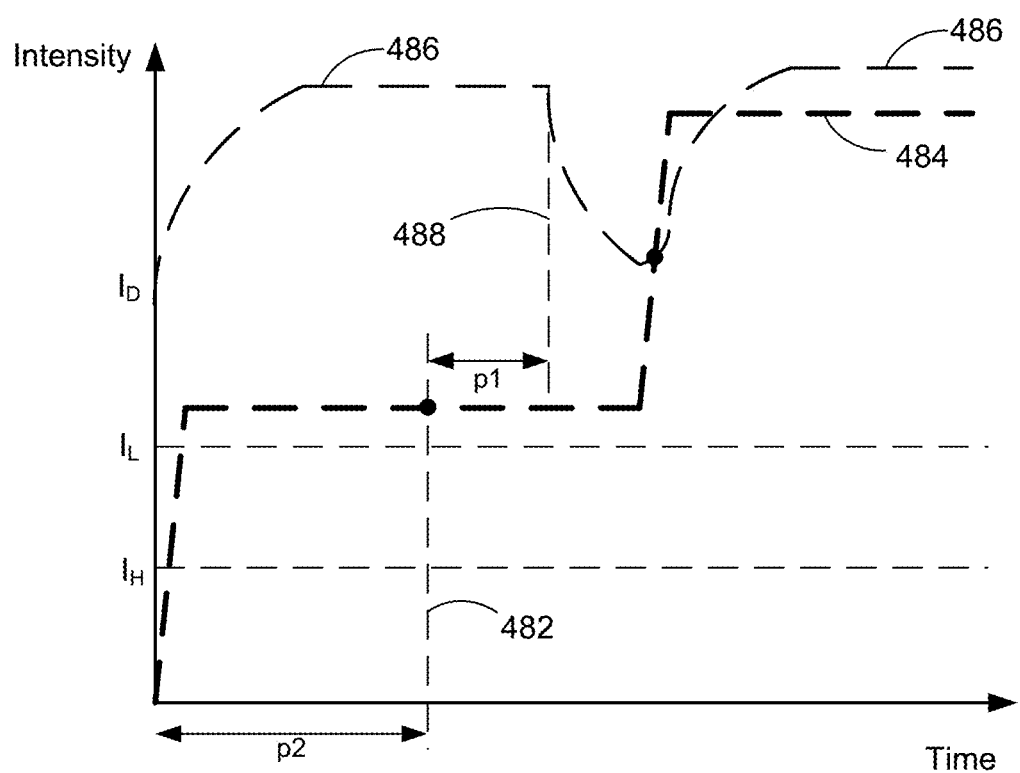
Figure 4E:
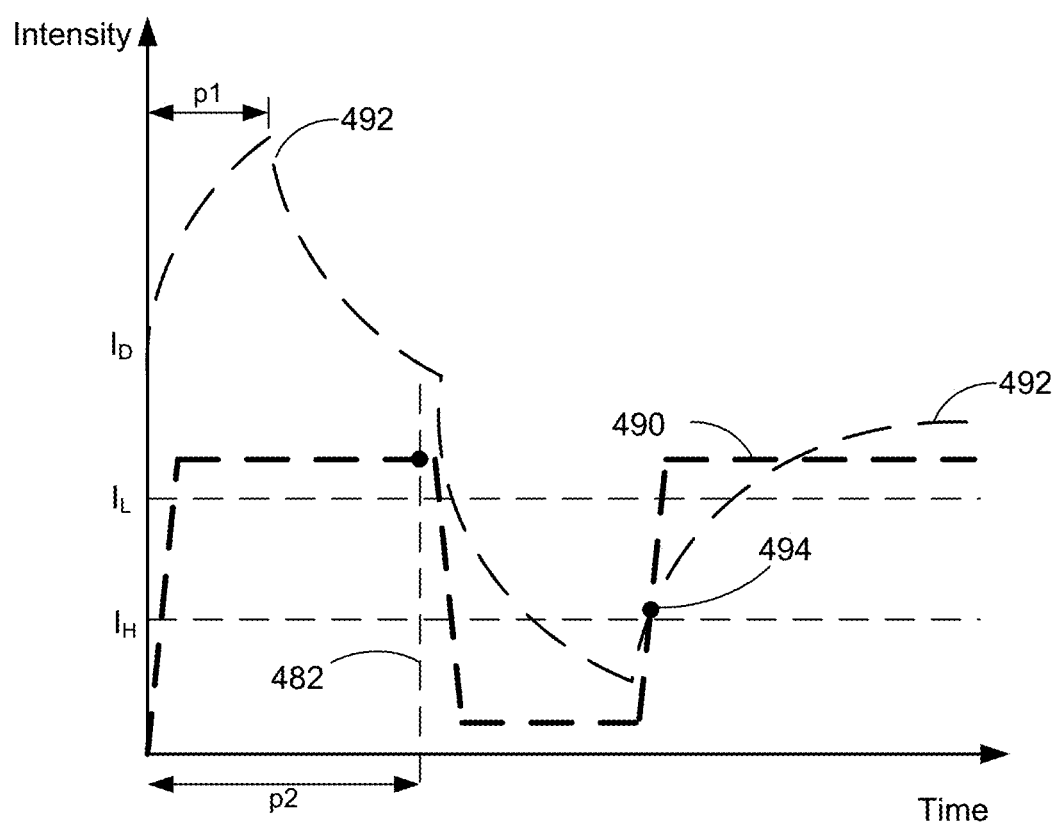
Figure 4F:
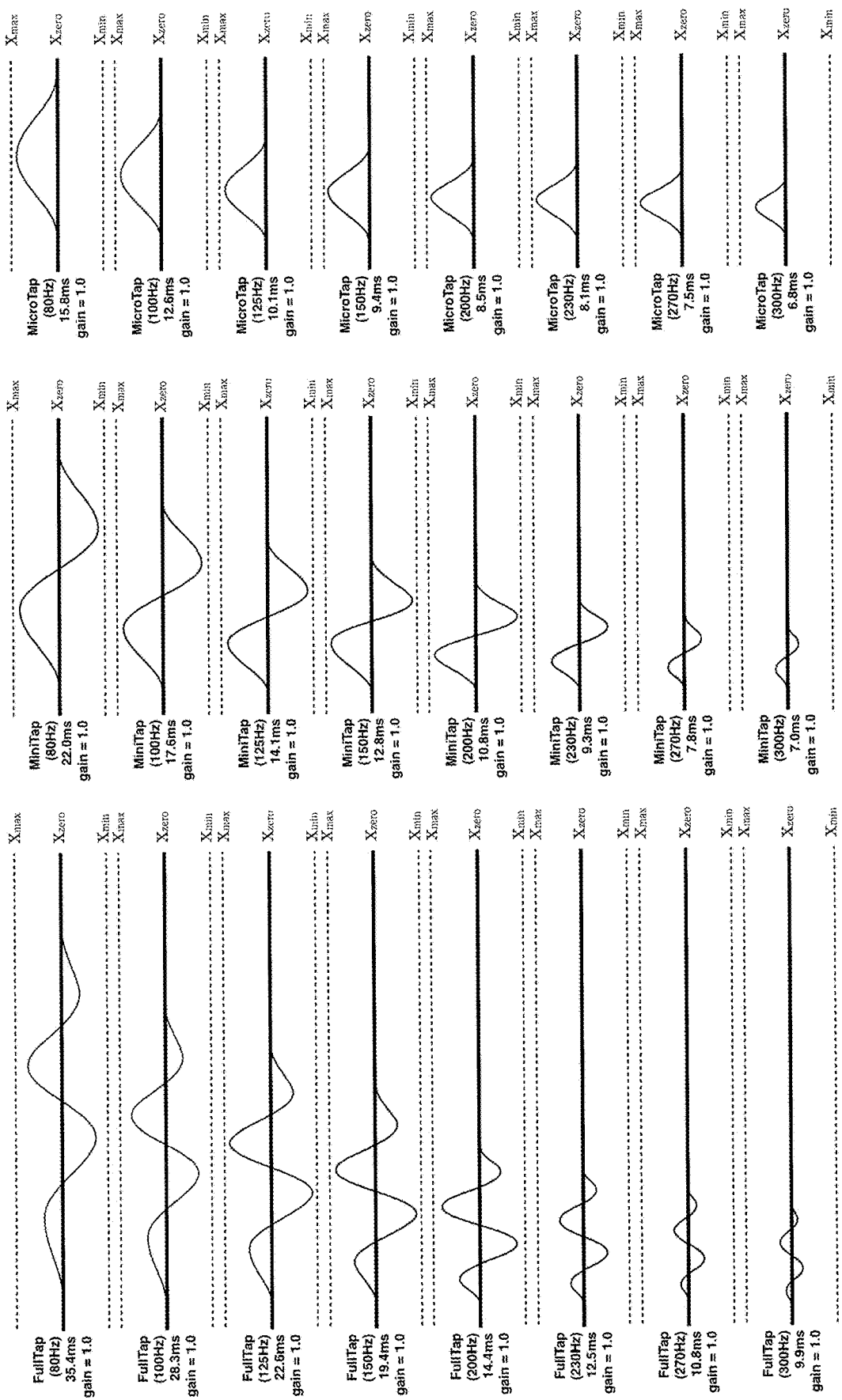
FIGS. 4F-4G illustrate a set of sample tactile output patterns in accordance with some embodiments.
Figure 4G:
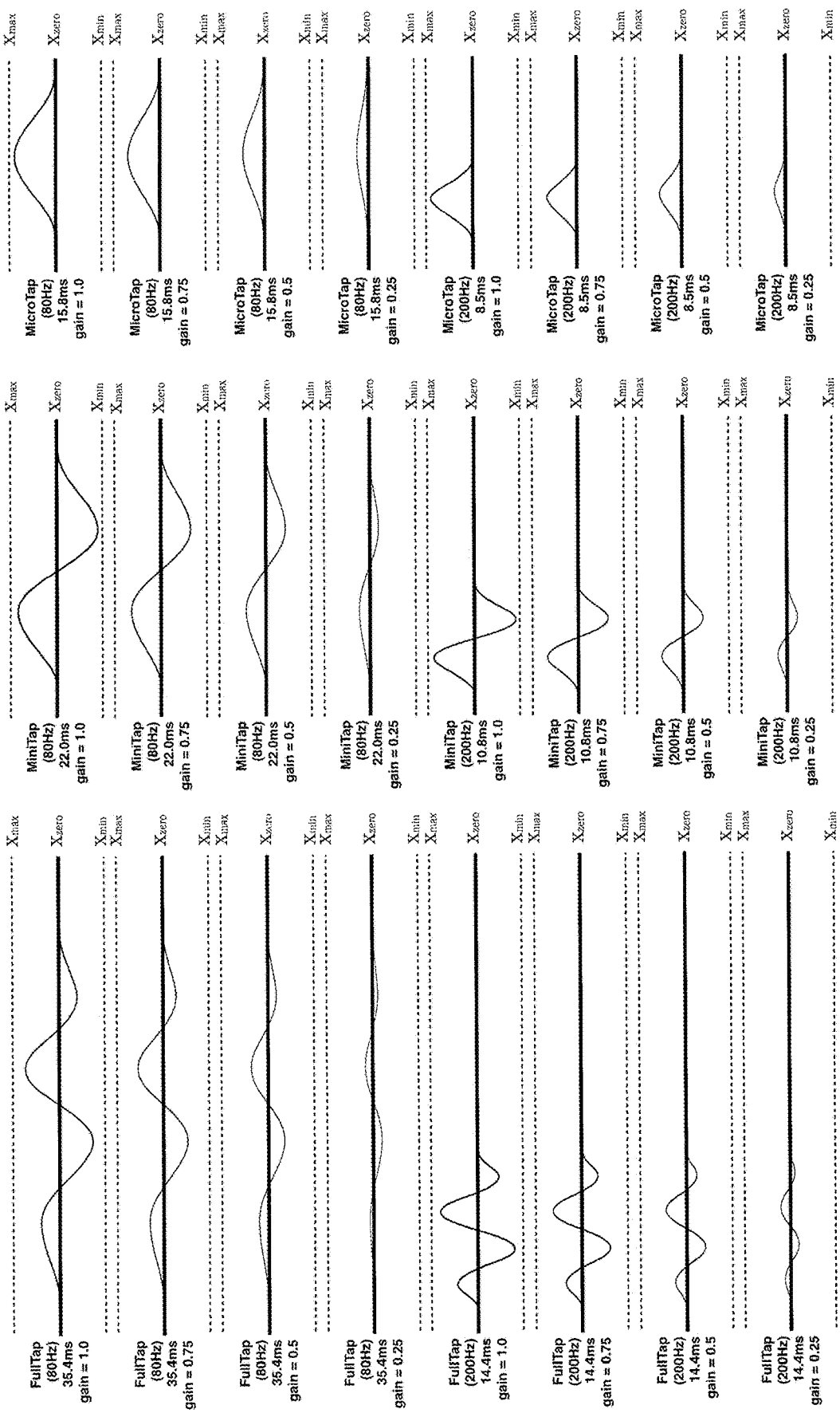

FIG. 4F provides a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in this figure, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIG. 4G, which are each shown with variants having a gain of 1.0, 0.75, 0.5, and 0.25. As shown in FIG. 4G, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Hz, and 200 Hz).

In FIG. 4F, each column shows tactile output patterns that have a particular waveform. The waveform of a tactile output pattern represents the pattern of physical displacements relative to a neutral position (e.g., $x_{zero}$) versus time that a moveable mass goes through to generate a tactile output with that tactile output pattern. For example, a first set of tactile output patterns shown in the left column in FIG. 4F (e.g., tactile output patterns of a "FullTap") each have a waveform that includes an oscillation with two complete cycles (e.g., an oscillation that starts and ends in a neutral position and crosses the neutral position three times). A second set of tactile output patterns shown in the middle column in FIG. 4F (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in the right column in FIG. 4F (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIG. 4F-4G include $x_{min}$ and $x_{max}$ values which represent the maximum and minimum extent of movement of the moveable mass. For larger electronic devices with larger moveable masses, there may be larger or smaller minimum and maximum extents of movement of the mass. The example shown in FIGS. 4F-4G describes movement of a mass in 1 dimension, however similar principles would also apply to movement of a moveable mass in two or three dimensions.

As shown in FIG. 4F, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIG. 4F, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 4F). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIG. 4F, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIG. 4F for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well. The tactile outputs illustrated in FIGS. 5A1-5A67 are generated in accordance with various tactile output patterns shown in FIG. 4F, in accordance with some embodiments.

FIGS. 4H-4J illustrate example haptic audio output patterns versus time that are used in conjunction with tactile outputs to simulate button clicks in accordance with some embodiments. The principles illustrated in FIGS. 4H-4J are applicable to non-visual outputs that are generated as feedback in conjunction with other user interactions with user interface objects, and are not limited to button interactions. Audio outputs that accompany tactile outputs to elicit haptic sensations in users are referred to as haptic audio outputs. In some embodiments, a respective non-visual output is a pure audio output (e.g., an audible vibration that is configured to elicit haptic sensations in users), without an accompanying tactile output that is generated at substantially the same time or with a preset time offset. In some embodiments, a respective non-visual output is a pure tactile output, without an accompanying haptic audio output that is generated at substantially the same time or with a preset time offset. In some embodiments, a respective non-visual output is a tactile output accompanied with a haptic audio output that is generated at substantially the same time or with a preset time offset. When generating different non-visual outputs to provide different types of alerts, the device varies (e.g., varying the base values or gain values, performing transformations, etc.) the tactile output pattern (e.g., amplitude, frequency, number of cycles, waveform) of the tactile output, the haptic audio output pattern (e.g., amplitude, frequency, number of cycles, waveform, time offset from tactile output) of the haptic audio output, or both (if both exist in the non-visual output), in accordance with some embodiments.

Figure 4K:
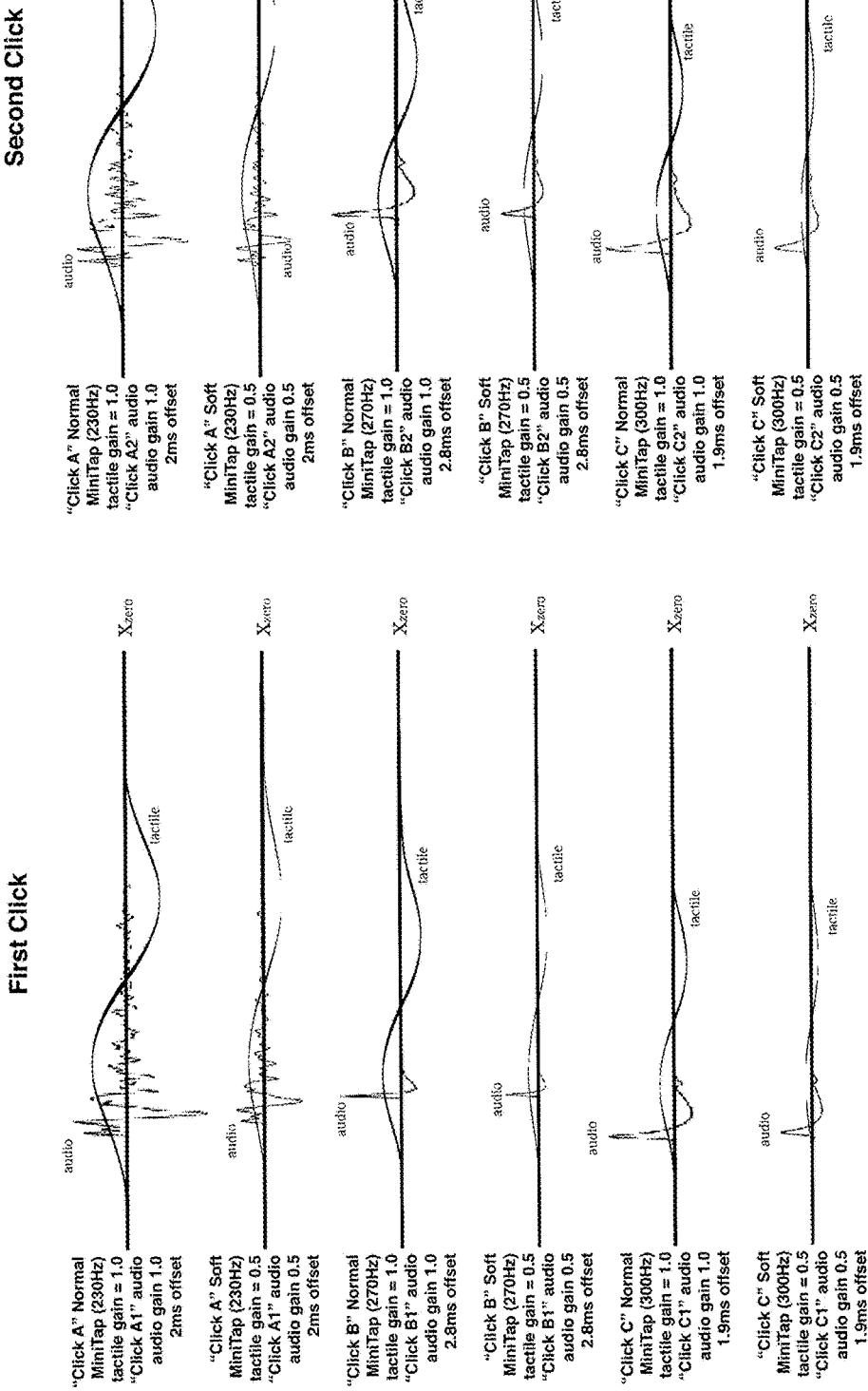
FIG. 4K illustrates example combinations of tactile output patterns and haptic audio output patterns versus time in accordance with some embodiments.

FIG. 4K illustrates example combinations of tactile output patterns and haptic audio output patterns versus time in accordance with some embodiments. FIGS. 4L-4Q enlarge the combinations shown in FIG. 4K for clarity.

Figure 4L:
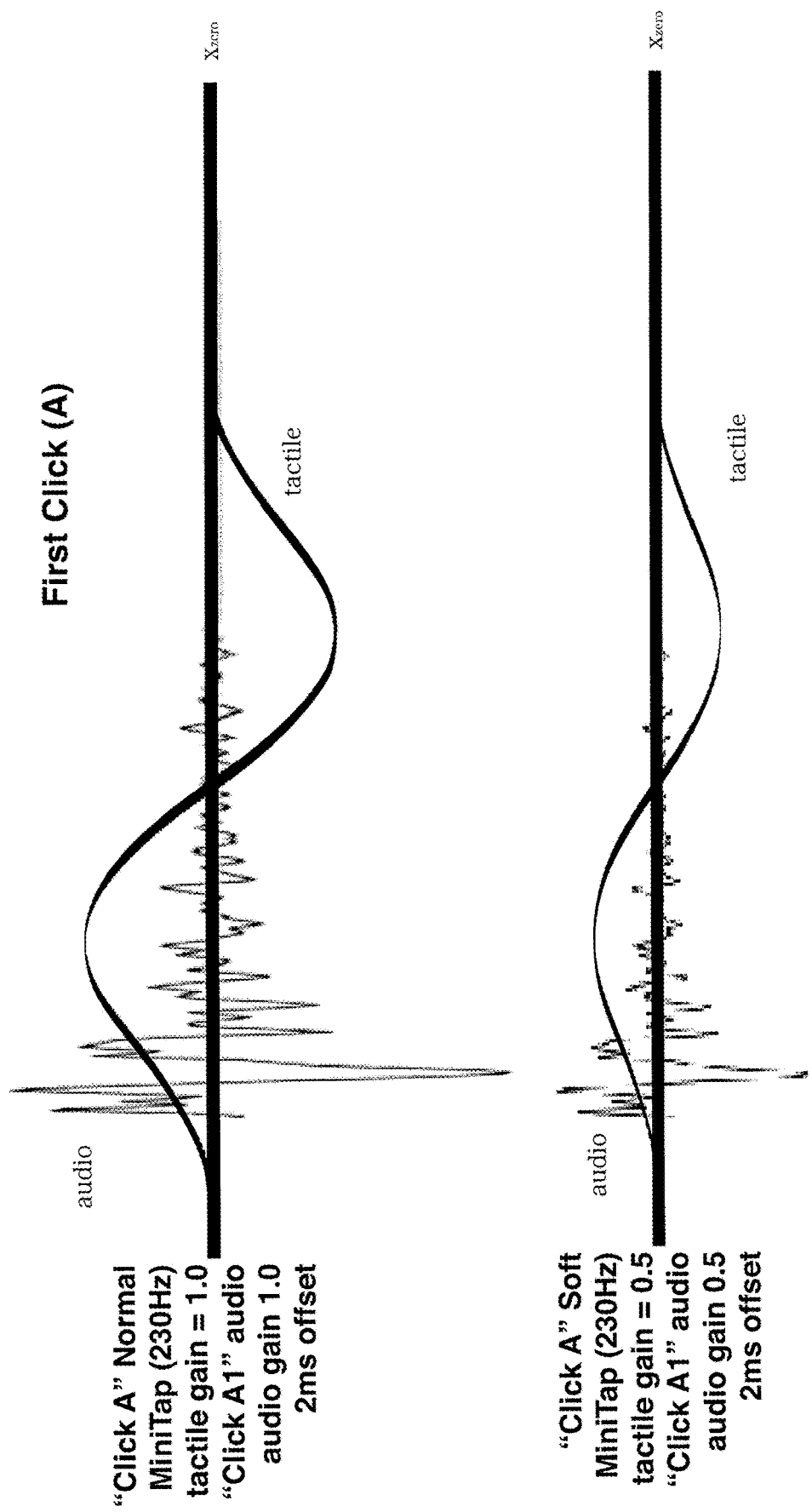
FIGS. 4L-4Q enlarge the combinations shown in FIG. 4K for clarity.

In FIG. 4H, the top haptic audio pattern "Click A1 audio" is audio output that is played conjunction with "Click A" Normal MiniTap (230 Hz) to simulate a first down-click in a "normal" first click, as shown in FIG. 4K (first row in the First Click column) and the upper portion of FIG. 4L, where the rate of change of intensity of a contact at a control activation threshold is above a threshold rate of change (e.g., the contact is making a "normal" hard/fast press). In this example, "Click A1 audio" is offset from the start of the "Click A" Normal MiniTap (230 Hz) tactile output by 2 ms. In some cases, the same "Click A1 audio" and "Click A" Normal MiniTap (230 Hz) are played to simulate the first up-click that follows the first down-click. In some cases, the gain of the "Click A1 audio" and/or "Click A" Normal MiniTap (230 Hz) are reduced (e.g., by 50%) in the up-click relative to the preceding down-click.

The top haptic audio pattern "Click A1 audio" is also played in conjunction with "Click A" Soft MiniTap (230 Hz) to simulate a first down-click in a "soft" first click, as shown in FIG. 4K (second row in the First Click column) and the lower portion of FIG. 4L, where the rate of change of intensity of a contact at a control activation threshold is below a threshold rate of change (e.g., the contact is making a "soft" and/or slow press). To simulate a "soft" down-click, the gain of the "Click A1 audio" and "Click A" Soft MiniTap (230 Hz) are reduced (e.g., by 50%) in the "soft" down-click relative to the "normal" down-click. In this example, "Click A1 audio" is offset from the start of the "Click A" Soft MiniTap (230 Hz) tactile output by 2 ms. In some cases, the same "Click A1 audio" and "Click A" Soft MiniTap (230 Hz) are played to simulate the first up-click that follows the first down-click. In some cases, the gain of the "Click A1 audio" and/or "Click A" Soft MiniTap (230 Hz) are reduced (e.g., by 50%) in the up-click relative to the preceding down-click.

Figure 4M:
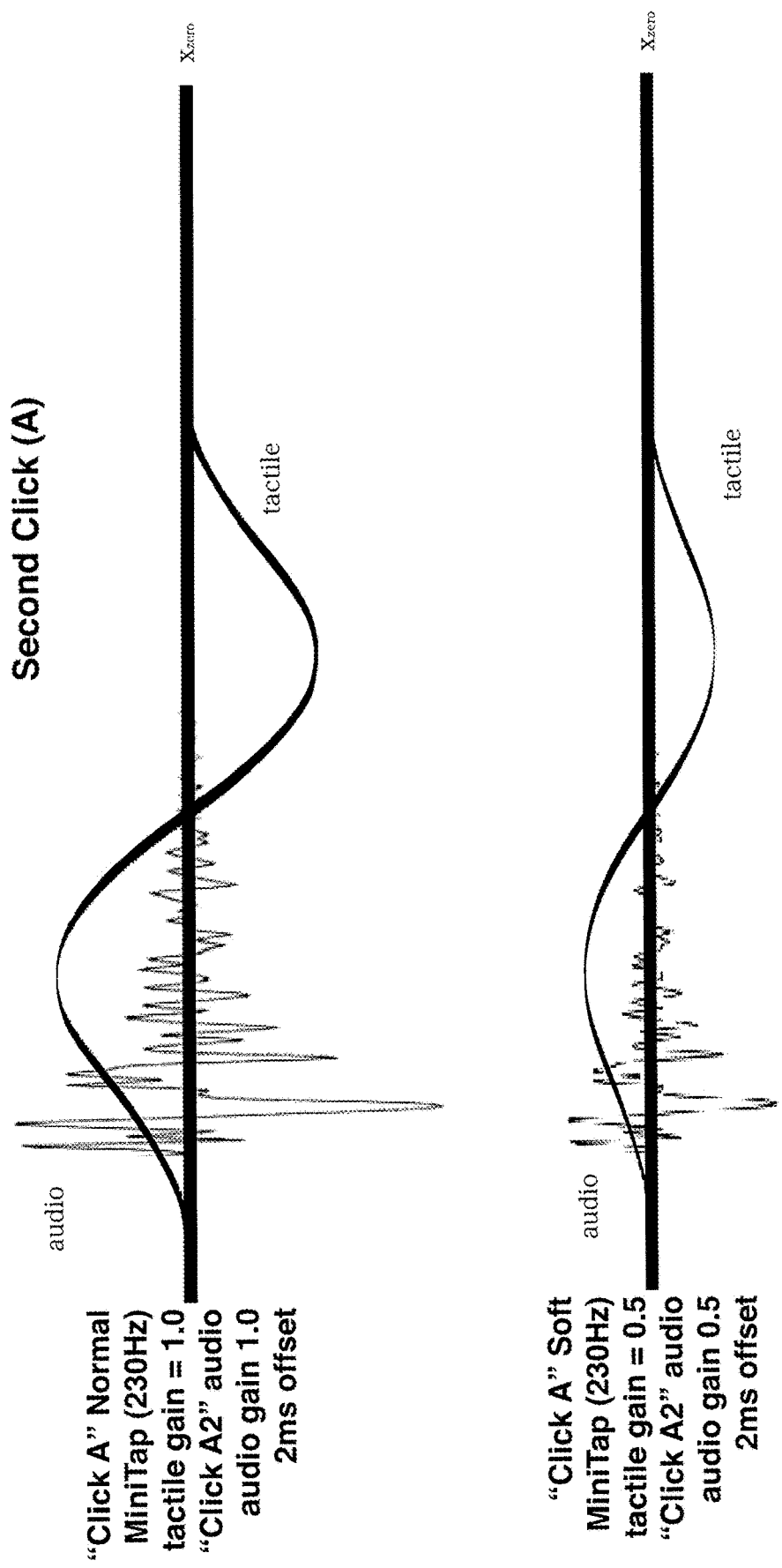

In FIG. 4H, the bottom haptic audio pattern "Click A2 audio" is audio output that is played conjunction with "Click A" Normal MiniTap (230 Hz) to simulate a second down-click in a "normal" second click that follows the first click within a predetermined period of time (e.g., as the second click in a double click input), as shown in FIG. 4K (first row in the Second Click column) and the upper portion of FIG. 4M, where the rate of change of intensity of a contact at a control activation threshold is above a threshold rate of change (e.g., the contact in the second click is making a "normal" hard/fast press). In this example, "Click A2 audio" is offset from the start of the "Click A" Normal MiniTap (230 Hz) tactile output by 2 ms. In some cases, the same "Click A2 audio" and "Click A" Normal MiniTap (230 Hz) are played to simulate the second up-click that follows the second down-click. In some cases, the gain of the "Click A2 audio" and/or "Click A" Normal MiniTap (230 Hz) are reduced (e.g., by 50%) in the second up-click relative to the preceding second down-click.

The bottom haptic audio pattern "Click A2 audio" is also played in conjunction with "Click A" Soft MiniTap (230 Hz) to simulate a second down-click in a "soft" second click that follows the first click within a predetermined period of time (e.g., as the second click in a double click input), as shown in FIG. 4K (second row in the Second Click column) and the lower portion of FIG. 4M, where the rate of change of intensity of a contact at a control activation threshold is below a threshold rate of change (e.g., the contact is making a "soft" and/or slow press). To simulate a "soft" down-click, the gain of the "Click A2 audio" and "Click A" Soft MiniTap (230 Hz) are reduced (e.g., by 50%) in the "soft" down-click relative to the "normal" down-click. In this example, "Click A2 audio" is offset from the start of the "Click A" Soft MiniTap (230 Hz) tactile output by 2 ms. In some cases, the same "Click A2 audio" and "Click A" Soft MiniTap (230 Hz) are played to simulate the second up-click that follows the second down-click. In some cases, the gain of the "Click A2 audio" and/or "Click A" Soft MiniTap (230 Hz) are reduced (e.g., by 50%) in the second up-click relative to the preceding second down-click.

Figure 4N:
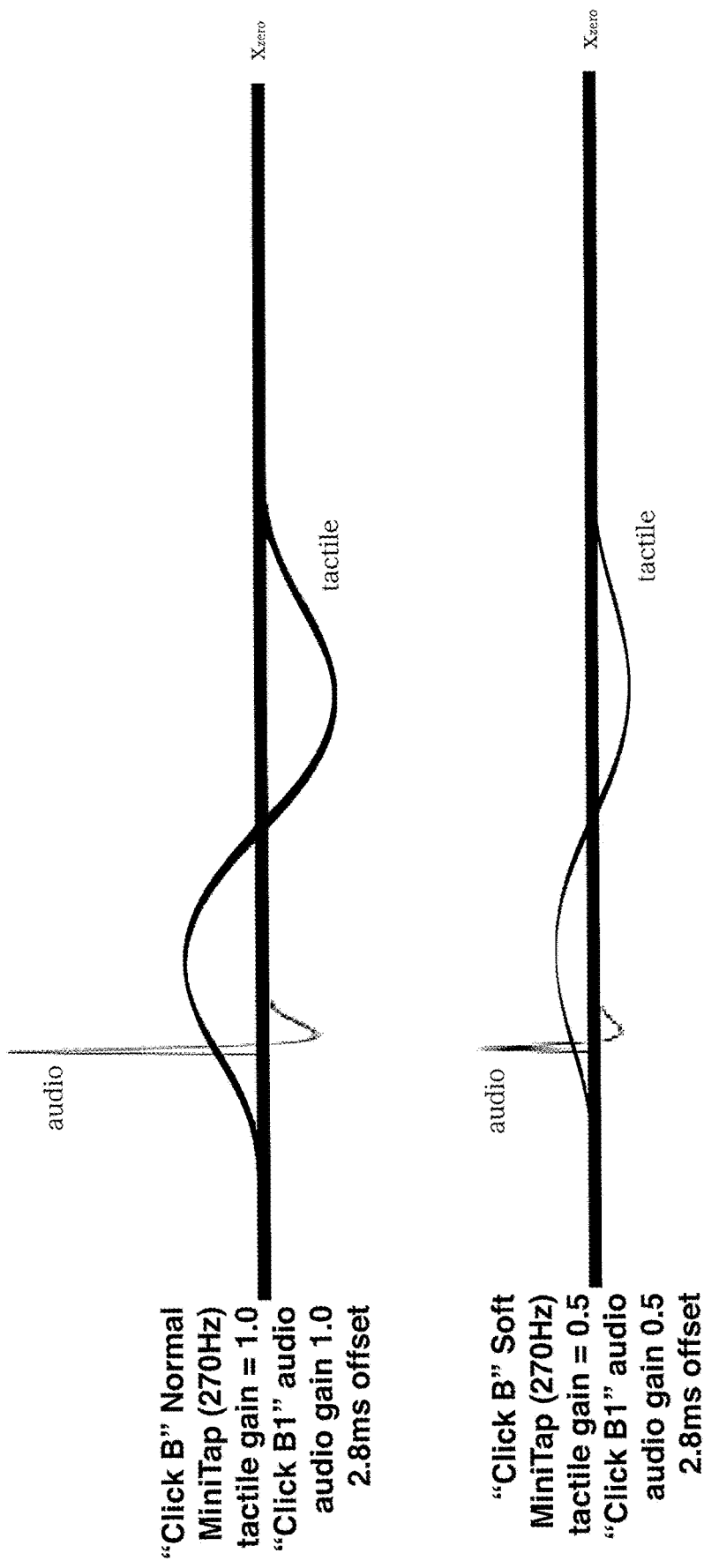

In FIG. 4I, the top haptic audio pattern "Click B1 audio" is audio output that is played conjunction with "Click B" Normal MiniTap (270 Hz) to simulate a first down-click in a "normal" first click, as shown in FIG. 4K (third row in the First Click column) and the upper portion of FIG. 4N, where the rate of change of intensity of a contact at a control activation threshold is above a threshold rate of change (e.g., the contact is making a "normal" hard/fast press). In this example, "Click B1 audio" is offset from the start of the "Click B" Normal MiniTap (270 Hz) tactile output by 2.8 ms. In some cases, the same "Click B1 audio" and "Click B" Normal MiniTap (270 Hz) are played to simulate the first up-click that follows the first down-click. In some cases, the gain of the "Click B1 audio" and/or "Click B" Normal MiniTap (270 Hz) are reduced (e.g., by 50%) in the up-click relative to the preceding down-click.

The top haptic audio pattern "Click B1 audio" is also played in conjunction with "Click B" Soft MiniTap (270 Hz) to simulate a first down-click in a "soft" first click, as shown in FIG. 4K (fourth row in the First Click column) and the lower portion of FIG. 4N, where the rate of change of intensity of a contact at a control activation threshold is below a threshold rate of change (e.g., the contact is making a "soft" and/or slow press). To simulate a "soft" down-click, the gain of the "Click B1 audio" and "Click B" Soft MiniTap (270 Hz) are reduced (e.g., by 50%) in the "soft" down-click relative to the "normal" down-click. In this example, "Click B1 audio" is offset from the start of the "Click B" Soft MiniTap (270 Hz) tactile output by 2.8 ms. In some cases, the same "Click B1 audio" and "Click B" Soft MiniTap (270

Hz) are played to simulate the first up-click that follows the first down-click. In some cases, the gain of the "Click B1 audio" and/or "Click B" Soft MiniTap (230 Hz) are reduced (e.g., by 50%) in the up-click relative to the preceding down-click.

Figure 4O:
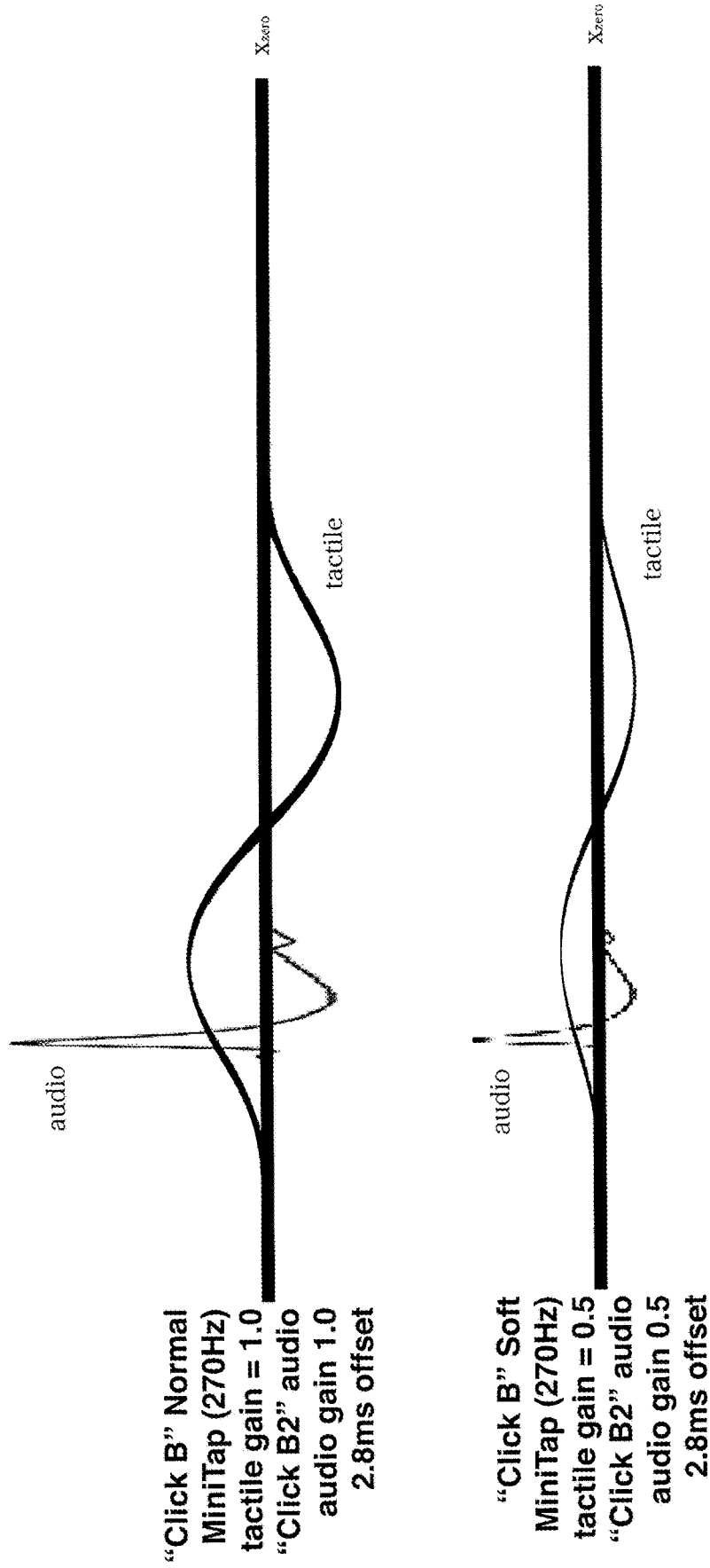

In FIG. 4I, the bottom haptic audio pattern "Click B2 audio" is audio output that is played conjunction with "Click B" Normal MiniTap (270 Hz) to simulate a second down-click in a "normal" second click that follows the first click within a predetermined period of time (e.g., as the second click in a double click input), as shown in FIG. 4K (third row in the Second Click column) and the upper portion of FIG. 4O, where the rate of change of intensity of a contact at a control activation threshold is above a threshold rate of change (e.g., the contact in the second click is making a "normal" hard/fast press). In this example, "Click B2 audio" is offset from the start of the "Click B" Normal MiniTap (270 Hz) tactile output by 2.8 ms. In some cases, the same "Click B2 audio" and "Click B" Normal MiniTap (230 Hz) are played to simulate the second up-click that follows the second down-click. In some cases, the gain of the "Click B2 audio" and/or "Click B" Normal MiniTap (270 Hz) are reduced (e.g., by 50%) in the second up-click relative to the preceding second down-click.

The bottom haptic audio pattern "Click B2 audio" is also played in conjunction with "Click B" Soft MiniTap (270 Hz) to simulate a second down-click in a "soft" second click that follows the first click within a predetermined period of time (e.g., as the second click in a double click input), as shown in FIG. 4K (fourth row in the Second Click column) and the lower portion of FIG. 4O, where the rate of change of intensity of a contact at a control activation threshold is below a threshold rate of change (e.g., the contact is making a "soft" and/or slow press). To simulate a "soft" down-click, the gain of the "Click B2 audio" and "Click B" Soft MiniTap (270 Hz) are reduced (e.g., by 50%) in the "soft" down-click relative to the "normal" down-click. In this example, "Click B2 audio" is offset from the start of the "Click B" Soft MiniTap (270 Hz) tactile output by 2.8 ms. In some cases, the same "Click B2 audio" and "Click B" Soft MiniTap (270 Hz) are played to simulate the second up-click that follows the second down-click. In some cases, the gain of the "Click B2 audio" and/or "Click B" Soft MiniTap (270 Hz) are reduced (e.g., by 50%) in the second up-click relative to the preceding second down-click.

Figure 4P:
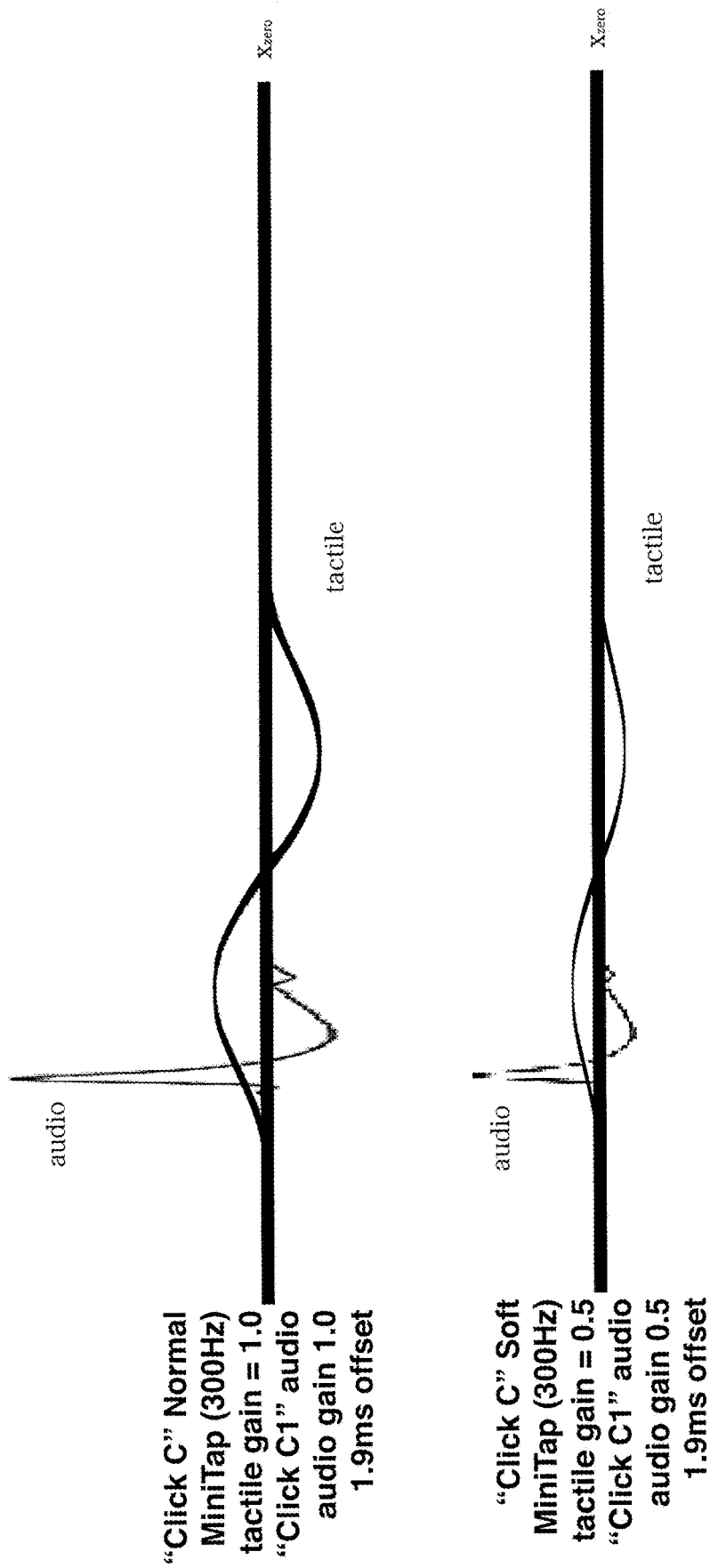

In FIG. 4J, the top haptic audio pattern "Click C1 audio" is audio output that is played conjunction with "Click C" Normal MiniTap (300 Hz) to simulate a first down-click in a "normal" first click, as shown in FIG. 4K (fifth row in the First Click column) and the upper portion of FIG. 4P, where the rate of change of intensity of a contact at a control activation threshold is above a threshold rate of change (e.g., the contact is making a "normal" hard/fast press). In this example, "Click C1 audio" is offset from the start of the "Click C" Normal MiniTap (300 Hz) tactile output by 1.9 ms. In some cases, the same "Click C1 audio" and "Click C" Normal MiniTap (300 Hz) are played to simulate the first up-click that follows the first down-click. In some cases, the gain of the "Click C1 audio" and/or "Click C" Normal MiniTap (300 Hz) are reduced (e.g., by 50%) in the up-click relative to the preceding down-click.

The top haptic audio pattern "Click C1 audio" is also played in conjunction with "Click C" Soft MiniTap (300 Hz) to simulate a first down-click in a "soft" first click, as shown in FIG. 4K (sixth row in the First Click column) and the lower portion of FIG. 4P, where the rate of change of intensity of a contact at a control activation threshold is below a threshold rate of change (e.g., the contact is making a "soft" and/or slow press). To simulate a "soft" down-click, the gain of the "Click C1 audio" and "Click C" Soft MiniTap (300 Hz) are reduced (e.g., by 50%) in the "soft" down-click relative to the "normal" down-click. In this example, "Click C1 audio" is offset from the start of the "Click C" Soft MiniTap (300 Hz) tactile output by 1.9 ms. In some cases, the same "Click C1 audio" and "Click C" Soft MiniTap (270 Hz) are played to simulate the first up-click that follows the first down-click. In some cases, the gain of the "Click C1 audio" and/or "Click C" Soft MiniTap (300 Hz) are reduced (e.g., by 50%) in the up-click relative to the preceding down-click.

Figure 4Q:
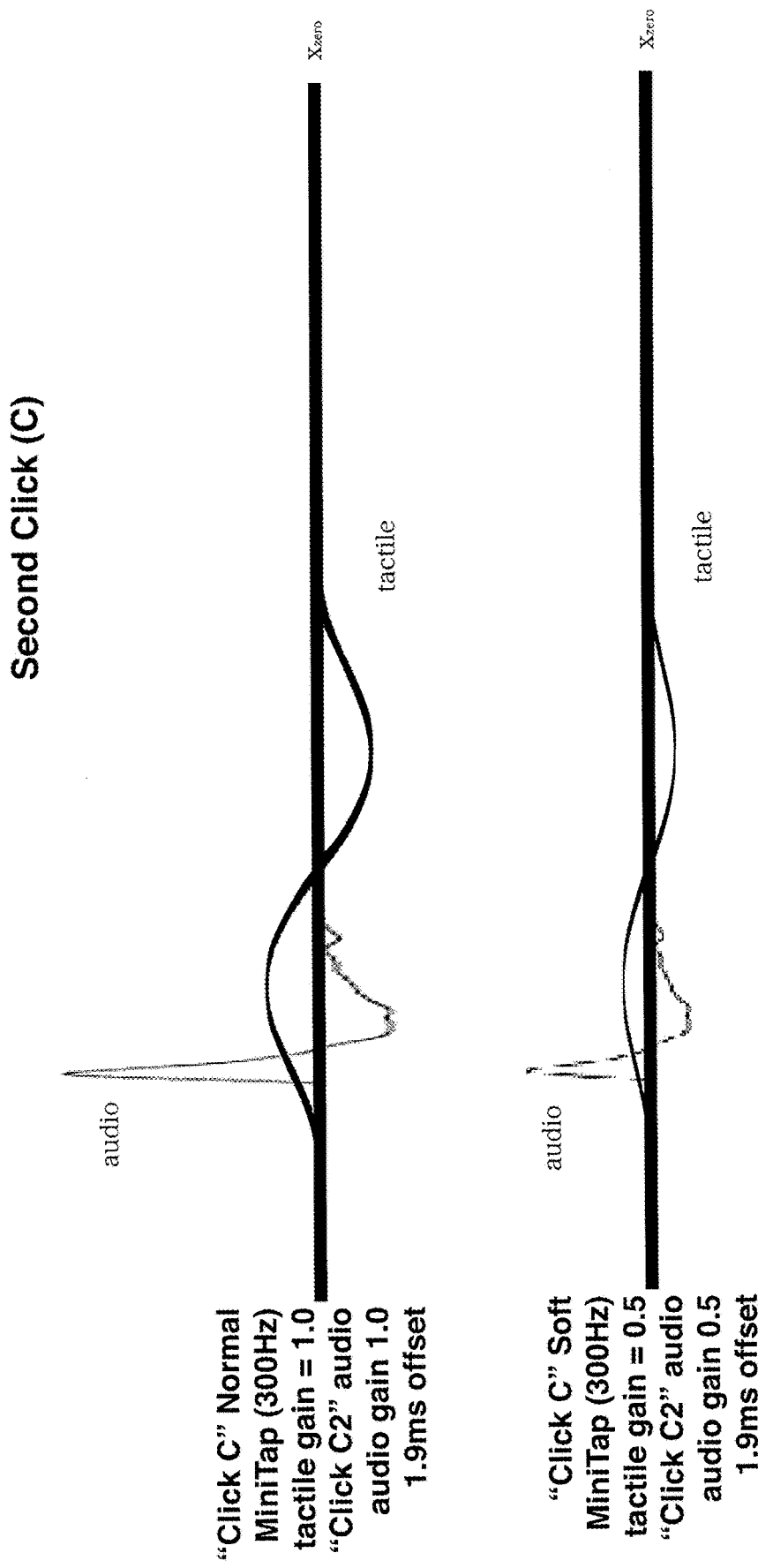

In FIG. 4J, the bottom haptic audio pattern "Click C2 audio" is audio output that is played conjunction with "Click C" Normal MiniTap (300 Hz) to simulate a second down-click in a "normal" second click that follows the first click within a predetermined period of time (e.g., as the second click in a double click input), as shown in FIG. 4K (fifth row in the Second Click column) and the upper portion of FIG. 4Q, where the rate of change of intensity of a contact at a control activation threshold is above a threshold rate of change (e.g., the contact in the second click is making a "normal" hard/fast press). In this example, "Click C2 audio" is offset from the start of the "Click C" Normal MiniTap (300 Hz) tactile output by 1.9 ms. In some cases, the same "Click C2 audio" and "Click C" Normal MiniTap (300 Hz) are played to simulate the second up-click that follows the second down-click. In some cases, the gain of the "Click C2 audio" and/or "Click C" Normal MiniTap (300 Hz) are reduced (e.g., by 50%) in the second up-click relative to the preceding second down-click.

The bottom haptic audio pattern "Click C2 audio" is also played in conjunction with "Click C" Soft MiniTap (300 Hz) to simulate a second down-click in a "soft" second click that follows the first click within a predetermined period of time (e.g., as the second click in a double click input), as shown in FIG. 4K (sixth row in the Second Click column) and the lower portion of FIG. 4Q, where the rate of change of intensity of a contact at a control activation threshold is below a threshold rate of change (e.g., the contact is making a "soft" and/or slow press). To simulate a "soft" down-click, the gain of the "Click C2 audio" and "Click C" Soft MiniTap (300 Hz) are reduced (e.g., by 50%) in the "soft" down-click relative to the "normal" down-click. In this example, "Click C2 audio" is offset from the start of the "Click C" Soft MiniTap (300 Hz) tactile output by 1.9 ms. In some cases, the same "Click C2 audio" and "Click C" Soft MiniTap (300 Hz) are played to simulate the second up-click that follows the second down-click. In some cases, the gain of the "Click C2 audio" and/or "Click C" Soft MiniTap (300 Hz) are reduced (e.g., by 50%) in the second up-click relative to the preceding second down-click.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSDPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2).

The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
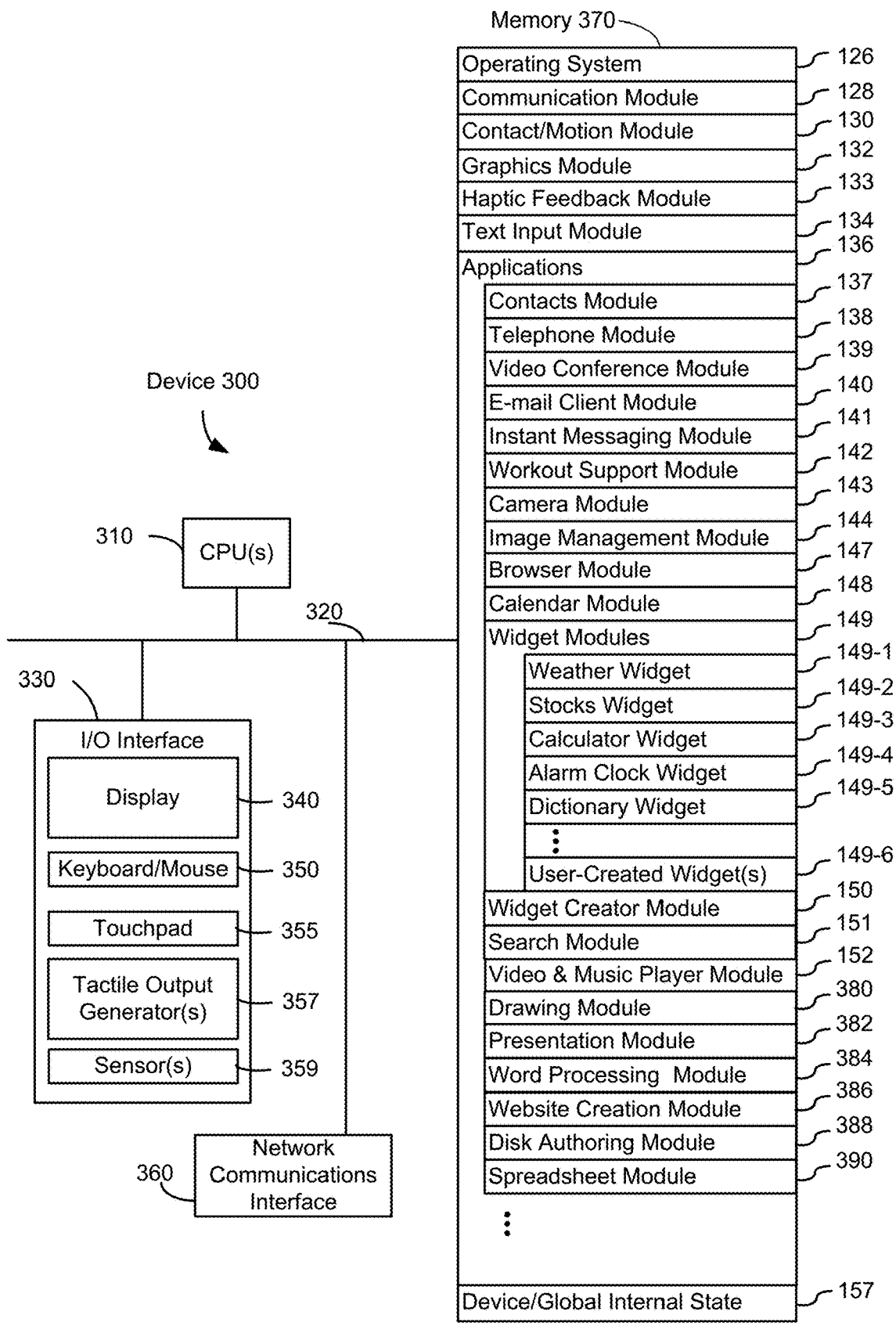
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by haptic feedback controller 161) and tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
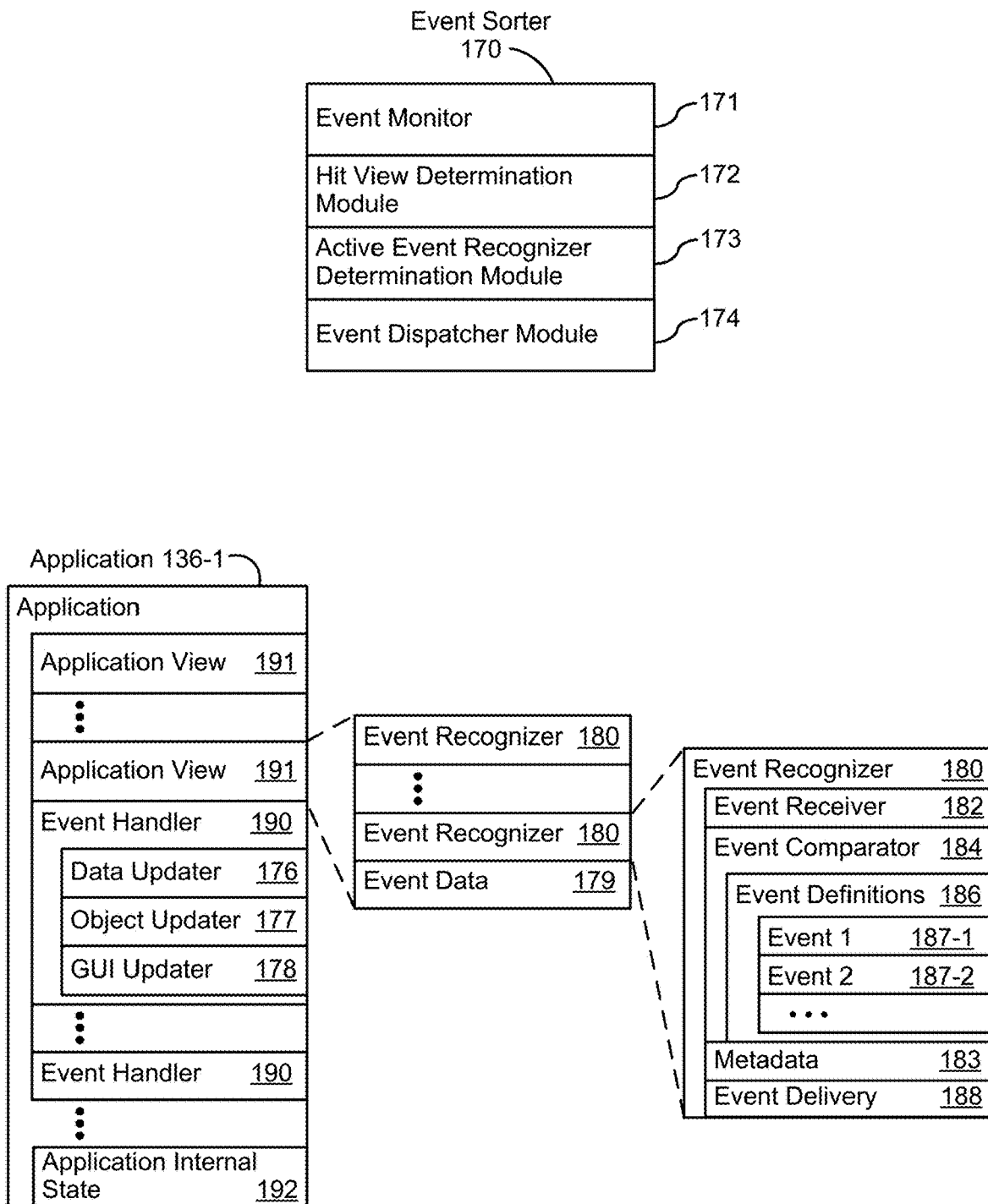
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
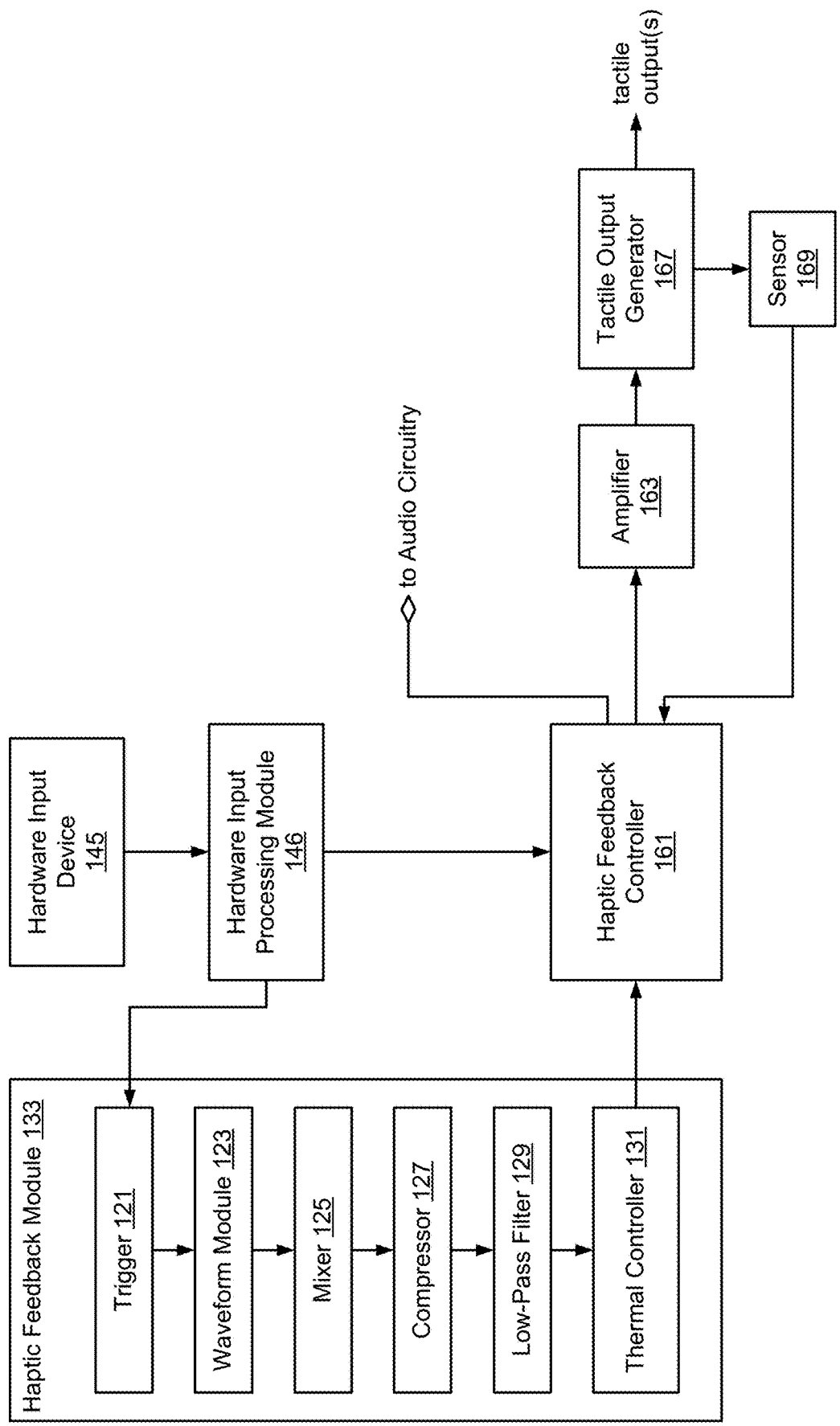
FIG. 1C is a block diagram illustrating a tactile output module in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 146 located outside haptic feedback module 133) and relays the trigger signals to other components within haptic feedback module 133 (e.g., waveform module 123) or software applications that trigger operations (e.g., with trigger module 121) based on activation of a user interface element (e.g., an application icon or an affordance within an application) or a hardware input device (e.g., a home button or an intensity-sensitive input surface, such as an intensity-sensitive touch screen). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123, such as the waveforms described in greater detail below with reference to FIGS. 4F-4G).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167).

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs may vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 146. In some embodiments, other input controller(s) 160 in FIG. 1A includes hardware input processing module 146. In some embodiments, hardware input processing module 146 receives inputs from hardware input device 145 (e.g., other input or control devices 116 in FIG. 1A, such as a home button or an intensity-sensitive input surface, such as an intensity-sensitive touch screen). In some embodiments, hardware input device 145 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive home button. In some embodiments, hardware input device 145 consists of an intensity-sensitive home button, and not touch-sensitive display system 112 (FIG. 1A), keyboard/mouse 350 (FIG. 3), or touchpad 355 (FIG. 3). In some embodiments, in response to inputs from hardware input device 145 (e.g., an intensity-sensitive home button or a touch screen), hardware input processing module 146 provides one or more trigger signals to haptic feedback module 133 to indicate that a user input satisfying predefined input criteria, such as an input corresponding to a "click" of a home button (e.g., a "down click" or an "up click"), has been detected. In some embodiments, haptic feedback module 133 provides waveforms that correspond to the "click" of a home button in response to the input corresponding to the "click" of a home button, simulating a haptic feedback of pressing a physical home button.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 145 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 145 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator 167 (e.g., any of tactile output generators 167 (FIG. 1A) or 357 (FIG. 3)). For example, amplifier 163 amplifies the received waveforms to signal levels that are in accordance with physical specifications of tactile output generator 167 (e.g., to a voltage and/or a current required by tactile output generator 167 for generating tactile outputs so that the signals sent to tactile output generator 167 produce tactile outputs that correspond to the waveforms received from haptic feedback controller 161) and sends the amplified waveforms to tactile output generator 167. In response, tactile output generator 167 generates tactile outputs (e.g., by shifting a moveable mass back and forth in one or more dimensions relative to a neutral position of the moveable mass).

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

Figure 2:
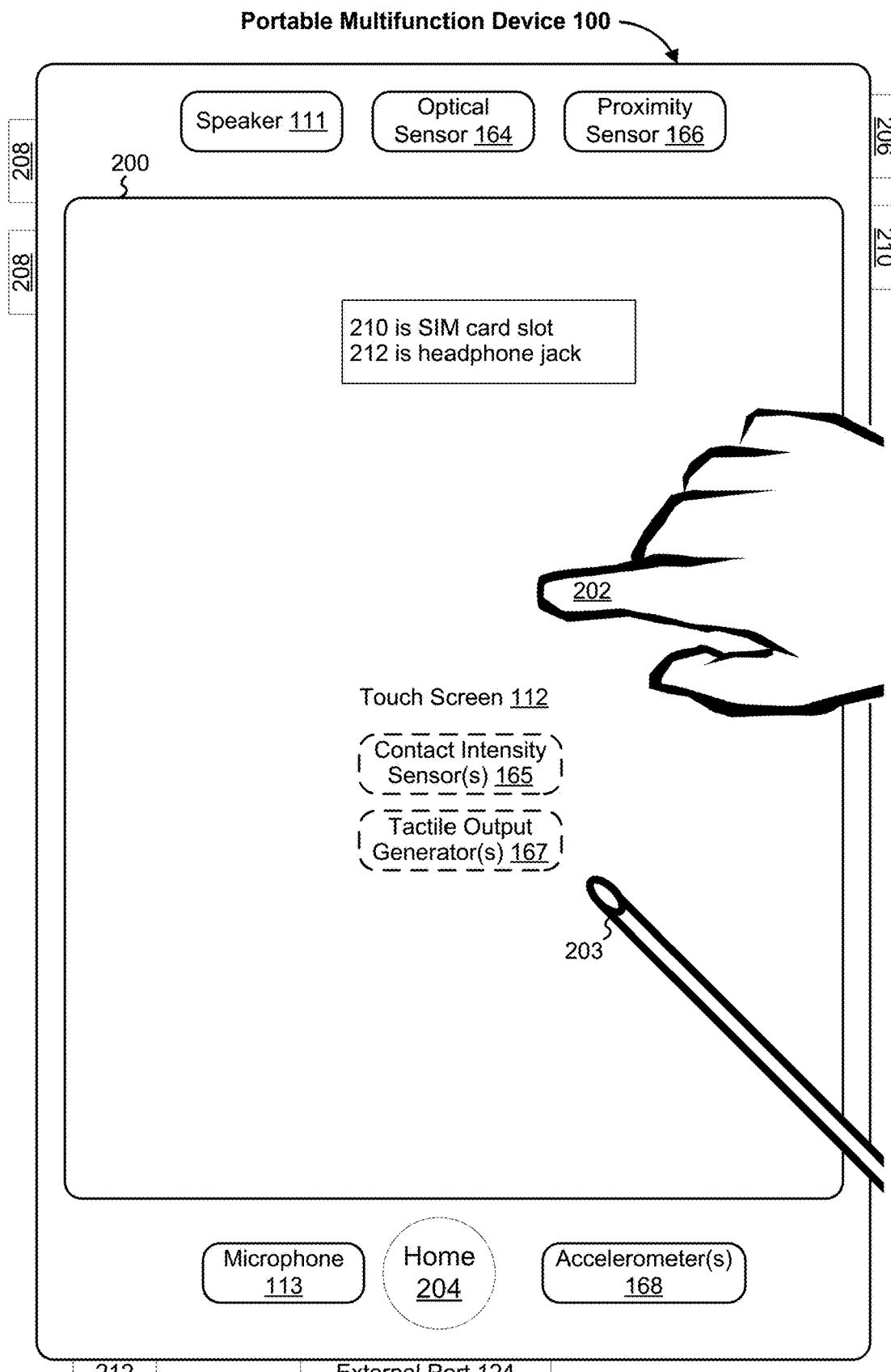
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch screen display.

In some embodiments, device 100 includes the touch screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface 400 for a menu of applications on portable multifunction device 100 in accordance with some embodiments. Similar user interfaces are, optionally, implemented on device 300. In some embodiments, user interface 400 includes the following elements, or a subset or superset thereof:
Signal strength indicator(s) for wireless communication(s), such as cellular and Wi-Fi signals;
Time;
a Bluetooth indicator;
a Battery status indicator;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, labeled "Music;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or the touch screen in FIG. 4A) that enables direct interaction with user interface elements on the touch screen display, a detected contact on the touch screen acts as a "focus selector," so that when an input (e.g., a press input by the contact) is detected on the touch screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds is determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

FIGS. 5A1-5A67 illustrate example user interfaces for interacting with user interface objects and providing non-visual feedback, in accordance with some embodiments. The user interfaces in these figures are used to illustrate the processes described below, including the processes in FIGS. 6A-6D, and 7A-7B. Various aspects of the processes shown in FIGS. 9A-9G and 10A-10E and the interactions models shown in FIGS. 5E1-5E4 are also illustrated in FIGS. 5A1-5A67 and accompanying descriptions, in accordance with some embodiments. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A1 to 5A4 illustrate activation of a display (e.g., touch-sensitive display 112) in response to changing an orientation of device 100. When the display has been activated, notifications that were received while the device was in a screen-off state are displayed. In some embodiments, the device uses one or more sensors (e.g., accelerometer, gyro, audio sensor, heat sensor, and/or light sensor) to determine whether an orientation of the device has changed. For example, the device determines whether the device has been rotated by more than a threshold angle (e.g., rotated along an axis of the device, such as tilted from a position in which the device is substantially horizontal to a position in which the device is substantially vertical). In FIG. 5A1, the device is in a screen-off state while it is held flat in a user's hand 5002, such that the device display is substantially horizontal. In FIG. 5A2, the device is tilted such that the display is more vertical than in FIG. 5A1. Because a tilt angle of the device has not increased above a threshold tilt angle in FIG. 5A2, the display is not activated. In FIG. 5A3, the device is tilted such that the display is more vertical than in FIG. 5A2. Because a tilt angle of the device has increased above a threshold tilt angle in FIG. 5A3, the display has transitioned from a screen-off state to a screen-on state and wake screen user interface 5004 (e.g., an initial user interface that is displayed when the device transitions from a screen-off state to a screen-on state) is displayed on touch screen 112. In FIG. 5A4, touch screen 112 is substantially vertical.

In FIG. 5A4, locked icon 5005 is shown in wake screen user interface 5004 to indicate that the device is currently locked. In FIG. 5A5, locked icon 5005 is replaced by unlocked icon 5007 to indicate that the device has been unlocked (e.g., in response to receiving user authentication information, such as biometric information for the user of the device or a passcode for the device). Wake screen user interface 5004 in the locked mode optionally displays less information (e.g., displays redacted versions of notifications, as shown in FIG. 5A4) than wake screen user interface 5004 displayed in the unlocked mode (e.g., displays un-redacted versions of notifications, as shown in FIG. 5A5).

In FIG. 5A5, wake screen user interface 5004 displays notifications 5006, 5008, 5010, and 5012 that correspond to events (e.g., events that occurred while device 100 was in a screen-off state) corresponding to different applications. For example, notification 5006 corresponds to an event generated by an application with the application title "Social Media," as indicated by application identifying information in the notification 5006. Notification 5006 also includes an icon (e.g., a graphic used for the application launch icon) that corresponds to the Social Media application and a received time indication (e.g., "now" or "x mins ago"). In some embodiments, the notifications are displayed on wake screen user interface 5004 in accordance with an order by which they are received at the device. In some embodiments, notifications that are related (e.g., by sender, by source, by conversation thread, by application, etc.) are optionally coalesced into a stack with the most recently received notification in the stack displayed on top.

In FIG. 5A6, a contact (e.g., contact 5024) is detected on touch-screen 112 at a location that corresponds to notification 5008 at time $T_0$. The detection of contact is triggered when an intensity of the contact exceeds a nominal contact detection intensity threshold $IT_0$, in accordance with some embodiments. In some embodiments, the device is capable of detecting a range of intensities above the nominal contact detection intensity threshold $IT_0$, and, optionally, compares the intensity of the contact against one or more additional intensity thresholds (e.g., $IT_L$ and $IT_D$) that are above the nominal contact detection intensity threshold $IT_0$. In some embodiments, the device is not capable of differentiating contact intensities above the nominal contact detection intensity threshold $IT_0$, and does not compare the intensity of the contact against additional intensity thresholds that are above nominal contact detection intensity threshold $IT_0$. In some embodiments, detection of the contact triggers monitoring of the movement of the contact and a duration in which the contact is maintained substantially stationary (e.g., with less than a threshold amount of movement within a given unit of time) on the touch screen after the detection of the contact. As shown in FIG. 5A5, in response to detecting contact 5024, visual feedback is provided to indicate a target of the input on wake screen user interface 5004 (e.g., notification 5008 is highlighted slightly, while other notifications concurrently displayed on wake screen user interface 5004 remain unchanged). In some embodiments, other visual changes (e.g., enlarging or animating notification 5008) is optionally used to call out the target of the input against other portions or components of wake screen user interface 5004. In some embodiments, the device forgoes providing any tactile output or audio alert at this time (e.g., for the detection of the contact or selection of the target for the input), before an input threshold is met by the input by contact 5024.

FIGS. 5A6-5A7 illustrate an example scenario in which, the input by contact 5024 is a tap input that includes less than a threshold amount of movement before liftoff of contact 5024, and that does not meet a predefined input threshold (e.g., a time-based threshold, an intensity-based threshold, or an input threshold that is based on time and the intensity of the input). In some embodiments, for a device that detects multiple levels of intensities of contact, the predefined input threshold is a duration threshold $T(I)$ that has a first value when the intensity of the input is above the nominal contact detection intensity threshold $IT_0$ but does not exceed a first intensity threshold (e.g., a light press intensity threshold $IT_L$) that is above the nominal contact detection intensity threshold $IT_0$. The duration threshold $T(I)$ has a second value that is smaller than the first value when the intensity of the input exceeds the first intensity threshold. The switching from the first value to the second value for the threshold duration $T(I)$ is triggered when the intensity of the contact exceeds the first intensity threshold for the first time after the detection of the contact, in accordance with some embodiments. In some embodiments, for a device that does not differentiate intensities of contact above the nominal contact detection intensity threshold, the predefined input threshold is a first threshold duration (e.g., the first value) that does not change during the input. In FIG. 5A7, in response detecting termination of the input (e.g., liftoff of contact 5024) and in accordance with a determination that the input is substantially stationary and that the input ended (e.g., by liftoff of the contact or reduction of the intensity of contact below a predefined intensity threshold (e.g., $IT_0$)) without having met the predefined input threshold (e.g., liftoff detected @ $T<T_0+T(I)$), the device launches the application corresponding to notification 5008 (e.g., the messages application) and replaces wake screen user interface 5004 with a user interface of the application (e.g., conversation user interface 5014 of the messages application) on touch-screen 112. In this example, conversation user interface 5014 of the messages application includes expanded content corresponding to notification 5008 (e.g., message 5018 include all text content shown in notification 5008 and media object icon 5022 that corresponds to an animated media object accompanying the text content of message 5018). User interface 5014 of the messages application also includes message presentation area 5016 that displays prior messages exchanged in the same conversation as well as message 5018. User interface 5014 further includes user interface objects for navigating within the messages application (e.g., a back button for navigating to a conversation listing user interface within the messages application) and providing input to the messages application (e.g., a message input box and virtual keyboard 5020 for composing a new message in the conversation).

FIG. 5A8 following FIG. 5A6 illustrates an alternative example scenario different from that shown in FIGS. 5A6-5A7. In the example scenario shown in FIGS. 5A6 and 5A8, the input has satisfied the predefined input threshold (e.g., contact 5024 is maintained on the touch screen and kept substantially stationary for more than the threshold duration T(I)) before an end of the input is detected. As shown in FIG. 5A8, when contact 5024 has been maintained at the same location over notification 5008 for at least the threshold amount of time T(I) after detection of the contact, the device provides a visual indication that the input threshold has been met (e.g., notification 5008 is reduced in size, while other notifications in the wake screen user interface remain unchanged). In conjunction with the visual feedback, the device generates a non-visual output, including a tactile output (e.g., tactile output 5028), to indicate that the input threshold has been met by the input. In some embodiments, tactile output 5028 has a first tactile output profile, including a tactile output with a first tactile output pattern (e.g., first amplitude, frequency, and wave pattern), and optionally, accompanied by a haptic audio output with a first haptic audio output pattern (e.g., first amplitude, frequency, wave pattern, and offset from the tactile output). In some embodiments, before the input threshold is met, the appearance of the user interface does not respond to continuous changes in the intensity of the contact, and for a device that is capable of detecting intensities relative to a first intensity threshold $IT_L$ above the nominal contact intensity detection threshold $IT_0$, the input threshold is adjusted from a first value to a second value (e.g., a value smaller than the first value) in accordance with a determination that the intensity of the contact has exceeded the first intensity threshold (e.g., $IT_L$).

FIG. 5A9 following FIG. 5A8 illustrates that, after the input threshold is met, the user interface is maintained in the same state as shown in FIG. 5A8 (e.g., the state entered when the input threshold was first met by the input) before the input ends (e.g., while contact is continuously maintained on the touch-screen 112 with at least a threshold amount of intensity (e.g., contact detection intensity $IT_0$)) and before more than a threshold amount of movement of the contact is detected (e.g., while contact 5024 is kept substantially stationary). This is a stable state in which the user is given time and opportunity to decide how to proceed (e.g., through the way that the input is continued and/or ended) to achieve a desired outcome. In this state, notification 5008 is displayed with a reduced size, while all other notifications and other components of the wake screen user interface 5004 remain unchanged and fully visible.

FIG. 5A10 continues from either FIG. 5A8 or FIG. 5A9 and illustrates an example scenario where the input ended without movement after the input threshold had been met. As shown in FIG. 5A10, in response to detecting liftoff of contact 5024 after the input threshold has been met (e.g., as shown in FIG. 5A8 or 5A9), the device displays a system user interface or a system user interface element that includes an expanded version of notification 5008 (e.g., expanded notification 5032), and optionally, one or more user interface objects corresponding to different operations that can be performed within the application and/or outside of the application with respect to notification 5008 (e.g., virtual keyboard 5020, message input field for a reply, "close" button 5034, etc.). In conjunction with displaying the system user interface (e.g., a user interface occupying an entirety of the touch-screen, or a system user interface element occupying less than all of the touch-screen and overlaid on a background user interface (e.g., a blurred and darkened version of the previous user interface)), the device generates a non-visual output, including a tactile output (e.g., tactile output 5031) to indicate that the end of the input has been detected and an expanded notification is displayed in response to the end of the input. In some embodiments, tactile output 5031 has a second tactile output profile, including a tactile output with a second tactile output pattern (e.g., second amplitude, frequency, and wave pattern), and optionally, accompanied by a haptic audio output with a second haptic audio output pattern (e.g., second amplitude, frequency, wave pattern, and offset from the tactile output). In some embodiments, tactile output 5031 provided at the end of the input has a different tactile output profile (e.g., with a different tactile output pattern for the tactile output, with both a different tactile output pattern for the tactile output and a different haptic audio output pattern for the accompanying haptic audio output, or with the same tactile output pattern for the tactile output but a different haptic audio output pattern for the accompanying haptic audio output) from tactile output 5025 provided when the input threshold is met. The different tactile output profiles of the tactile outputs for the end of the input and for the satisfaction of the input threshold alert the user of the different changes that have occurred to the internal state of the device. In some embodiments, the tactile output profiles of the tactile outputs for the end of the input and for the satisfaction of the input threshold are similar or identical, which contrasts with the tactile outputs that are provided when the input includes movement that drags the user interface object under the contact away from its location.

In this example, expanded notification 5032 is displayed over background 5030 (e.g., blurred and darkened version of the original wake screen user interface 5004). Virtual keyboard 5020 is displayed below expanded notification 5032. Expanded notification 5032 includes all text content shown in notification 5008 and media object icon 5022 that corresponds to the animated media object accompanying the text content of message 5018 shown in FIG. 5A7). Expanded notification 5032 differs from the user interface 5014 of the messages application in that expanded notification 5032 does not include prior messages exchanged in the same conversation as message 5018, and does not include user interface objects for navigating within the messages application (e.g., a back button for navigating to a conversation listing user interface within the messages application). In some embodiments, an input entered in the text input box of virtual keyboard 5020 is treated as input for a reply for message 5018. In some embodiments, a tap input on expanded notification 5032 causes the device to dismiss expanded notification 5032, launch the messages application, and display user interface 5014 of the message application shown in FIG. 5A6. In some embodiments, when a text input is provided in the text input box of virtual keyboard 5020 and a send input is provided (e.g., with a send button next to the message input box), expanded notification 5032 is cleared and the reply message is sent to the sender of message 5018. In some embodiments, if a tap input is detected on control 5034 (e.g., a "close" button) displayed concurrently with expanded notification 5032, the currently displayed system user interface or system user interface element (e.g., including expanded notification 5032, control 5034, and virtual keyboard 5020) is dismissed, and wake screen user interface 5004 is restored on the touch-screen with notification 5008 removed from wake screen user interface 5004. In some embodiments, when wake screen user interface 5004 is restored after notification 5008 is cleared, the device does not generate a non-visual output (e.g., a tactile output) to accompany the visual change in the user interface.

FIGS. 5A11-5A12 follow FIG. 5A10, and illustrate that, when a tap input (e.g., a tap input by contact 5036) is detected (e.g., at time Ti) outside of the system user interface (e.g., in a region on background 5030 that is outside expanded notification 5032 and any accompanying user interface objects (e.g., virtual keyboard 5020 and control 5034)), the device ceases to display the system user interface, and restores wake screen user interface 5004 with all the notifications (e.g., including notification 5008) intact (as shown in FIG. 5A12). In some embodiments, when wake screen user interface 5004 is redisplayed with notification 5008 at its original location, the device generates a non-visual output (e.g., tactile output 5038), e.g., to indicate settlement of notification 5008 into its original location in wake screen user interface 5004. In some embodiments, tactile output 5038 provided in conjunction with settlement of notification 5008 (e.g., as shown in 5A12) has a third tactile output profile that is different from that of tactile output 5031 provided in conjunction with presenting expanded notification 5032 (e.g., as shown in FIG. 5A10). In some embodiments, tactile output 5038 provided in conjunction with settlement of notification 5008 (e.g., as shown in 5A12) has the same tactile output profile or a similar tactile output as tactile output 5031 provided in conjunction with presenting expanded notification 5032 (e.g., as shown in FIG. 5A10), which contrasts with tactile output profiles of tactile outputs provided in conjunction with movement of a user interface object in response to a drag input.

FIG. 5A13 following FIG. 5A8 or 5A9 illustrates an example scenario in which more than a threshold amount of movement of contact 5024 (e.g., movement towards the right side of the display) is detected after the input threshold has been met. In some embodiments, as shown in FIG. 5A13, in response to movement of contact 5024, the input threshold is reset (e.g., the input threshold is no longer met by the input by contact 5024), and the appearance of notification 5008 is restored (e.g., back to the state shown in FIG. 5A5 or 5A6). In some embodiments, the device does not provide a non-visual output (e.g., a tactile output) in conjunction with resetting the input threshold in response to movement of the contact 5024 and restoration of the appearance of notification 5008.

FIGS. 5A14-5A16 following FIG. 5A8 or FIG. 5A9 illustrate an example scenario in which more than a threshold amount of movement of contact 5024 (e.g., movement towards the left side of the display) is detected after the input threshold has been met. In some embodiments, as shown in FIGS. 5A14-5A15, in response to movement of contact 5024, notification 5008 is dragged across wake screen user interface 5004 in accordance with the movement of contact 5024. As notification 5008 is dragged off the touch-screen, one or more user interface controls corresponding to different operations (e.g., control 5040 for displaying a configuration user interface, control 5042 for displaying expanded notification 5032, and control 5044 for clearing notification 5008) that can be performed with respect to notification 5008 are displayed next to notification 5008. FIG. 5A16 illustrates that, when movement of contact 5024 exceeds a position threshold, notification 5008 is cleared from wake screen user interface 5004 and other notifications on wake screen user interface 5004 are rearranged (e.g., the lower notifications are moved upward to fill the space vacated by notification 5008). In some embodiments, a non-visual output (e.g., a tactile output (e.g., tactile output 5048)) is generated by the device in conjunction with contact 5024 crossing the position threshold, removal of notification 5008 from wake screen user interface 5004, and/or repositioning of the lower notifications 5010 and 5012 in wake screen user interface 5004. In some embodiments, a leftward swipe input by a contact detected on notification 5008 also clears notification 5008 from the wake screen user interface (e.g., in the same manner shown in FIGS. 5A14-5A16), even if the input threshold has not been met prior to the movement of the contact.

FIGS. 5A17-5A18 following FIG. 5A6 illustrate an example scenario in which more than a threshold amount of movement of contact 5024 is detected after the input threshold has been met. In some embodiments, as shown in FIGS. 5A17-5A18, in response to movement of contact 5024, notifications (e.g., including notifications 5006, 5008, 5010, and 5012) on wake screen user interface 5004 are scrolled upwards in unison. As notifications existing on wake screen user interface 5004 are scrolled with the movement of contact 5024, in response to a determination that movement of contact 5024 exceeds a positional threshold or distance threshold, notification history including previously received notifications (e.g., notifications 5049 and 5050) that were not shown in wake screen user interface 5004 when contact 5024 was first detected are displayed and scrolled with existing notifications on wake screen user interface 5004. In some embodiments, a non-visual output (e.g., a tactile output) is generated by the device in conjunction with the contact crossing the position or distance threshold, and/or the display of the notification history. In some embodiments, an upward swipe input by a contact detected on notification 5008 also scrolls the notifications on the wake screen user interface and causes display of the notification history (e.g., in the same manner shown in FIGS. 5A17-5A18), even if the input threshold has not been met prior to the movement of the contact.

FIG. 5A19 starts a new example scenario that optionally continues from FIG. 5A7, or from a different process with an input triggering the display of user interface 5014 of the messages application from a different starting state. As shown in FIG. 5A19, a contact (e.g., contact 5052) is detected (e.g., at a time $T_3$) at a location on the touch-screen 112 that corresponds to media object icon 5022 that corresponds to an animated media object accompanying the text content of message 5018. In response to detecting contact 5052 on media object icon 5022, media object icon 5022 is optionally highlighted (e.g., outlined) to indicate its changed status as a target object for the input by contact 5052. Other portions of user interface 5014 of the messages application are not changed in response to the detection of contact 5052. The detection of contact 5052 is triggered when the intensity of the contact exceeds the nominal contact detection intensity threshold $IT_0$. In some embodiments, the device is capable of detecting a range of intensities above the nominal contact detection intensity threshold $IT_0$, and, optionally, compares the intensity of contact 5052 against one or more additional intensity thresholds (e.g., $IT_L$ and $IT_D$) that are above the nominal contact detection intensity threshold $IT_0$. In some embodiments, the device is not capable of differentiating contact intensities above the nominal contact detection intensity threshold $IT_0$, and does not compare the intensity of contact 5052 against additional intensity thresholds that are above nominal contact detection intensity threshold $IT_0$. In some embodiments, detection of contact 5052 triggers monitoring of the movement of contact 5052 and a duration in which contact 5052 is maintained substantially stationary (e.g., with less than a threshold amount of movement within a given unit of time) after detection of contact 5052. In some embodiments, the device forgoes providing any non-visual output (e.g., tactile output or audio alert) at this time (e.g., for the detection of the contact or selection of the target for the input), before an input threshold is met by the input by contact 5052.

FIGS. 5A19-5A20 illustrate an example scenario in which, the input by contact 5052 is a tap input that includes less than a threshold amount of movement before liftoff of contact 5052, and that does not meet the predefined input threshold (e.g., an intensity-independent threshold, or a duration-independent intensity threshold, or an intensity-based duration threshold). In some embodiments, for a device that detects multiple levels of intensities of contact, the predefined input threshold is a duration threshold T(I) that has a first value when the intensity of the input is above the nominal contact detection intensity threshold $IT_0$ and does not exceed a first intensity threshold (e.g., a light press intensity threshold $IT_L$) that is above the nominal contact detection intensity threshold $IT_0$. The duration threshold T(I) has a second value that is smaller than the first value when the intensity of the input exceeds the first intensity threshold. The switching from the first value to the second value for the threshold duration is triggered when the intensity of the contact exceeds the first intensity threshold for the first time after the detection of the contact, in accordance with some embodiments. In some embodiments, for a device that does not differentiate intensity of contact above the nominal contact detection intensity threshold $IT_0$, the predefined input threshold is a first threshold duration (e.g., the first value) that does not change during the input. In FIG. 5A20, in response detecting termination of the input (e.g., liftoff of contact 5052) and in accordance with a determination that the input is substantially stationary and that the input ended (e.g., by liftoff of the contact or reduction of the intensity of contact below a predefined intensity threshold (e.g., $IT_0$)) without having met the predefined input threshold (e.g., liftoff detected @ $T<T_3+T(I)$), the device launches the application corresponding to media object icon 5022 (e.g., an emoji media recording application) and replaces conversation user interface 5014 with a user interface of the emoji media recording application (e.g., user interface 5054) on touch-screen 112. In this example, user interface 5054 of the emoji media recording application includes media content corresponding to media object icon 5022 (e.g., an animated emoji video object) and user interface objects 5058 for navigating within the emoji media recording application (e.g., a done button for navigating to a media object listing user interface within the emoji media recording application or returning to the previous user interface (e.g., back to the messages application) outside of the emoji media recording application), and for providing input to the emoji media recording application (e.g., a share button for sharing the animated emoji video object, a pause button to stop playback of the animated emoji video object, and controls for displaying other options).

FIG. 5A21 following FIG. 5A19 illustrates an alternative scenario from that shown in FIGS. 5A19-5A20. In the example scenario shown in FIG. 5A19 followed by 5A21, the input has satisfied the predefined input threshold (e.g., the contact is kept substantially stationary for more than the threshold duration T(I)) before an end of the input is detected. As shown in FIG. 5A21, when contact 5052 has been maintained at the same location over media object icon 5022 for at least the threshold amount of time T(I) after the detection of the contact, the device provides a visual indication that the input threshold has been met (e.g., media object icon 5022 is reduced in size and displayed over a gray platter, while other portions of the messages user interface 5014 remain unchanged). In conjunction with the visual feedback, the device generates a non-visual output (e.g., a tactile output (e.g., tactile output 5060)) to indicate that the input threshold has been met by the input. In some embodiments, tactile output 5060 has a first tactile output profile, including a tactile output with a first tactile output pattern (e.g., first amplitude, frequency, and wave pattern), and optionally, accompanied by a haptic audio output with a first haptic audio output pattern (e.g., first amplitude, frequency, wave pattern, and offset from the tactile output). In some embodiments, before the input threshold is met, the appearance of the user interface does not respond to continuous changes in the intensity of the contact 5052, and for a device that is capable of detecting intensities relative to a first intensity threshold (e.g., $IT_L$) above the nominal contact intensity detection threshold (e.g., $IT_0$), the input threshold T(I) is adjusted from a first value to a second value (e.g., a value smaller than the first value) in accordance with a determination that the intensity of the contact has exceeded the first intensity threshold.

FIG. 5A22 following FIG. 5A21 illustrates that, after the input threshold has been met, the user interface is maintained in the same state as shown in FIG. 5A21 (e.g., the state entered when the input threshold was first met by the input) before the input ends (e.g., while contact 5052 is continuously maintained on the touch-screen 112 with at least a threshold amount of intensity (e.g., contact detection intensity $IT_0$)) and before more than a threshold amount of movement of the contact 5052 is detected (e.g., while contact 5052 is kept substantially stationary). This is a stable state in which the user is given time and opportunity to decide how to proceed (e.g., through the way that the input is continued and/or ended) to achieve a desired outcome. In this state, media object icon 5022 is displayed with a reduced size overlaid on a gray platter, while other portions of the messages user interface 5014 remain unchanged and fully visible.

FIG. 5A23 continues from either 5A21 or 5A22 and illustrates an example scenario where the input ended without movement after the input threshold had been met. As shown in FIG. 5A23, in response to detecting liftoff of contact 5052 after the input threshold has been met (e.g., as shown in FIG. 5A21 or 5A22), the device displays a system user interface or a system user interface element that includes an expanded version of media object icon 5022 (e.g., preview 5066 of the animated emoji video object represented by media object icon 5022), and optionally, one or more user interface objects corresponding to different operations that can be performed within the application and/or outside of the application with respect to the animated emoji video object represented by media object icon 5022. The one or more user interface objects corresponding to the different operations include, for example, copy button 5070 for making a copy of the animated emoji video object on a clipboard, save button 5072 for saving a copy of the animated emoji video object in a video library, forward button 5074 for sending a copy of the animated emoji video object via a communication application (e.g., an email or messaging application). In conjunction with displaying the system user interface (e.g., a user interface occupying an entirety of the touch-screen or a system user interface element occupying less than all of the touch-screen and overlaid on background user interface 5064 (e.g., a blurred and darkened version of the previous user interface 5014)), the device generates a non-visual output (e.g., a tactile output (e.g., tactile output 5062)) to indicate that the end of the input has been detected and a preview 5066 of the animated emoji video object corresponding to the media object icon 5022 is displayed in response to the end of the input. In some embodiments, the tactile output 5062 provided at the end of the input has a second tactile output profile that is different (e.g., with a different tactile output pattern for the tactile output, with both a different tactile output pattern for the tactile output and a different haptic audio output pattern for the accompanying haptic audio output, or with the same tactile output pattern for the tactile output but different haptic audio output pattern for the accompanying haptic audio output) from the first tactile output file of tactile output 5060 provided when the input threshold is met. The different tactile output profiles of the tactile outputs for the end of the input and for the satisfaction of the input threshold alert the user of the different changes that have occurred to the internal state of the device. In some embodiments, the tactile output profiles of the tactile outputs for the end of the input and for the satisfaction of the input threshold are similar or identical, which contrasts with the tactile outputs that are provided when the input includes movement that drags the user interface object (e.g., media object icon 5022) under the contact (e.g., contact 5052) away from its location.

In this example, preview 5066 is displayed over background 5064 (e.g., blurred and darkened version of the original messages user interface 5014). User interface objects 5070, 5072, and 5074 corresponding to different actions that can be performed with respect to the animated emoji video object (e.g., the respective actions will be performed when the objects are activated by a tap input (e.g., by a contact distinct from contact 5052), respectively) are displayed below preview 5066. Preview 5066 includes all or a portion of the content of the animated emoji video object that is more than what is shown by media object icon 5022). Preview 5066 differs from user interface 5054 of the media object recording application shown in FIG. 5A20 in that preview 5066 does not include all of the controls (e.g., controls 5058) present in user interface 5054, and does not include user interface objects (e.g., the "Done" button) for navigating within the media object recording application.

FIG. 5A24 illustrates that a tap input on various portions of the system user interface or outside of the system user interface shown in FIG. 5A23, causes the device to perform different operations. In some embodiments, a tap input (e.g., by contact 5080) detected on preview 5066 causes the device to dismiss preview 5066, launch the media object recording application, and display user interface 5054 of the media object recording application shown in FIG. 5A20. In some embodiments, a tap input (e.g., contact 5078) detected on control 5068 (e.g., a "close" button) displayed concurrently with preview 5066 causes the device to dismiss the currently displayed system user interface or system user interface element (e.g., including preview 5066 and associated controls), and restore the conversation user interface 5014 (e.g., as shown in FIG. 5A25). In some embodiments, an input (e.g., by contact 5076) detected on background 5064 outside the area occupied by the system user interface (e.g., outside of preview 5066 and associated controls) causes the device to dismiss the currently displayed system user interface or system user interface element (e.g., including preview 5066 and associated controls), and restore conversation user interface 5014 (e.g., as shown in FIG. 5A25). In some embodiments, when conversation user interface 5014 is restored, the device does not generate a non-visual output (e.g., a tactile output) to accompany the visual changes in the user interface. In some embodiments, when conversation user interface 5014 is restored, the device generates a non-visual output (e.g., a tactile output (e.g., tactile output 5084)) in conjunction with settlement of media object icon 5022 into its original location in conversation user interface 5014 after shrinking preview 5066 into media object icon 5022 (e.g., as shown in FIG. 5A25). In some embodiments, tactile output 5084 provided in conjunction with settlement of media object icon 5022 (e.g., as shown in 5A25) has a third tactile output profiled that is different from the tactile output profile of tactile output 5062 provided in conjunction with presenting preview 5066 (e.g., as shown in FIG. 5A23). In some embodiments, tactile output 5084 provided in conjunction with settlement of media object icon 5022 (e.g., as shown in 5A25) has the same tactile output profile or a similar tactile output profile as tactile output 5062 provided in conjunction with presenting the preview 5066 (e.g., as shown in FIG. 5A23), which contrasts with the tactile output profiles of tactile outputs provided in conjunction with movement of a user interface object in response to a drag input.

FIG. 5A26 following FIG. 5A21 or 5A22 illustrates an example scenario in which more than a threshold amount of movement of contact 5052 is detected after the input threshold has been met. In some embodiments, as shown in FIG. 5A26, in response to movement of contact 5052, a representation (e.g., a copy 5090) of the media object icon 5022 is dragged from the original location of media object icon 5022 in conversation user interface 5014 in accordance with movement of contact 5052. The device generates a non-visual output (e.g., a tactile output (e.g., tactile output 5086)) with a fourth tactile output profile that is distinct from the first tactile output profile of the tactile output (e.g., tactile output 5060 in FIG. 5A21) generated when the input threshold is met and/or from the second tactile output profile of the tactile output (e.g., tactile output 5062 in FIG. 5A23) generated when the input ended without movement after the input threshold has been met. In some embodiments, as shown in FIG. 5A26, while contact 5052 is maintained on the touch-screen, holding the copy 5090 of the media object icon 5022), media object icon 5022 displayed at its original location is grayed out.

FIGS. 5A27-5A29 following FIG. 5A26 illustrate that, while the copy 5090 of media object icon 5022 is held by contact 5052, the device detects one or more inputs that cause the device to navigate from conversation user interface 5014 to user interface 5100 of a note application, including an upward edge swipe input by contact 5092 detected on user interface 5014 in FIG. 5A27 which leads to the display of home screen user interface 5096, followed by a tap input by contact 5098 on an application icon 444 for the notes application on home screen user interface 5096 in FIG. 5A28. When contact 5052 is maintained on the touch-screen, the copy 5090 of media object icon 5022 moves with contact 5052, while user interface changes occur on the touch-screen in response to the one or more inputs. As shown in FIG. 5A29, user interface 5100 of the notes application includes content region 5102 which includes a permissible drop location 5104 for the animated emoji video object corresponding to media object icon 5022 or the copy 5090 thereof, and virtual keyboard 5020 for entering text input into content region 5102.

In FIG. 5A30, termination of the input by contact 5052 (e.g., liftoff of contact 5052) is detected, and in response to detecting the end of the input by contact 5052, a copy of the animated emoji video object 5108 is displayed at insertion location 5104 in content region 5102 of user interface 5100 of the notes application. In some embodiments, the device generates a non-visual output (e.g., a tactile output (e.g., tactile output 5106)) in conjunction with insertion and/or settlement of the copy of animated emoji video object 5108 into insertion location 5104. In some embodiments, a tactile output profile of a tactile output (e.g., tactile output 5106) generated in conjunction with insertion and/or settlement of a dropped object into an insertion location in a user interface (and detection of liftoff of the contact after movement of contact, with the movement being after the input threshold having been met) is distinct from the tactile output profile of a tactile output (e.g., tactile output 5060 in FIG. 5A21) provided in conjunction with satisfaction of an input threshold and/or the tactile output profile of a tactile output (e.g., tactile output 5062 in FIG. 5A23) provided in conjunction with displaying a preview (and detection of liftoff of the contact without movement of the contact, after the input threshold having been met).

FIGS. 5A31-5A34 illustrate interactions with a home screen user interface and application icons displayed on the home screen user interface. In FIG. 5A31, a plurality of application launch icons, including application launch icon 424 for a messages application, are displayed on a primary page of a home screen user interface (e.g., home screen user interface 5096). A contact (e.g., contact 5110) is detected on touch screen 112 at a location that corresponds to messages application icon 424 at time $T_0$. In some embodiments, in response to detecting contact 5110, visual feedback is provided to indicate a target of the input on home screen user interface 5096 (e.g., highlighting, enlarging, and/or animating application launch icon 424, while other application launch icons remain unchanged) that corresponds to the location of contact 5110 on the touch-screen. In some embodiments, the device forgoes providing any non-visual output (e.g., a tactile output or audio alert) at this time (e.g., for the detection of the contact or selection of the target for the input), before an input threshold (e.g., a duration threshold (e.g., a static duration threshold or a predefined intensity-based duration threshold T(I))) is met by the input by contact 5110.

FIGS. 5A31-5A32 illustrate an example in which the input by contact 5110 is a tap input that includes less than a threshold amount of movement before liftoff of contact 5110, and that does not meet the predefined input threshold (e.g., the input threshold as described herein with reference to FIGS. 5A6-5A7). In FIG. 5A32, in response to detecting termination of the input (e.g., liftoff of contact 5110) and in accordance with a determination that the input is (or was) substantially stationary and that the input ended without having met the predefined input threshold (e.g., liftoff occurred at time $T < T_0 + T(I)$), the device launches the application corresponding to messages application icon 424 (e.g., the messages application) and replaces home screen user interface 5096 with a user interface of the application (e.g., conversation user interface 5014 of the messages application) on touch screen 112.

FIGS. 5A33-5A35 illustrate an example scenario in which the input by contact 5110 includes more than a threshold amount of movement before the input threshold is met (e.g., the input is a leftward swipe gesture). In accordance with a determination that the input includes more than a threshold amount of movement of the contact before the input threshold is met (e.g., movement of the contact 5110 is detected at time $T < T_0 + T(I)$), the device scrolls the home screen user interface and replaces the primary page of the home screen user interface (e.g., home screen user interface 5096) with a secondary page of the home screen user interface (e.g., home screen user interface 5112). In some embodiments, the device forgoes generating a non-visual output (e.g., a tactile output or audio alert) in response to detecting the movement of contact 5110 and the liftoff of contact 5110, and/or in conjunction with the page switching of the home screen user interface.

FIGS. 5A36-5A37 illustrate an example scenario in which the input by contact 5110 meets the predefined input threshold and has less than a threshold amount of movement (e.g., is kept substantially stationary) before meeting the predefined input threshold. In FIG. 5A36, in response to detecting that the input threshold is met with less than a threshold amount of movement by contact 5110 (e.g., contact 5110 is kept substantially stationary for at least a threshold amount of time T(I)), the device displays information object 5116 (e.g., an educational tip that states "Release to preview" and "Drag to rearrange") and generates a non-visual output (e.g., a tactile output (e.g., tactile output 5114)) to indicate that the input threshold has been met and subsequent portions of the input will be used to determine which response of multiple possible responses will be provided. In some embodiments, tactile output 5114 has a first tactile output profile, including a tactile output with a first tactile output pattern (e.g., first amplitude, frequency, and wave pattern), and optionally, accompanied by a haptic audio output with a first haptic audio output pattern (e.g., first amplitude, frequency, wave pattern, and offset from the tactile output). In some embodiments, before the input threshold is met, the appearance of the user interface does not respond to continuous changes in the intensity of contact 5110; and for a device that is capable of detecting intensities relative to a first intensity threshold above the nominal contact intensity detection threshold, the input threshold is adjusted from a first value to a second value (e.g., a value smaller than the first value) in accordance with a determination that the intensity of the contact has exceeded the first intensity threshold.

FIGS. 5A38-5A41 follow FIG. 5A37 and illustrate an example scenario where liftoff of contact 5110 is detected after the input threshold is met.

In FIG. 5A38, after the input threshold is met, the user interface is maintained in the same state as shown in FIG. 5A37 (e.g., the state entered when the input threshold was first met by the input) before the input ends (e.g., while contact 5052 is continuously maintained on the touch-screen 112 with at least a threshold amount of intensity (e.g., contact detection intensity $IT_0$)) and before more than a threshold amount of movement of the contact 5052 is detected (e.g., while contact 5052 is kept substantially stationary). This is a stable state in which the user is given time and opportunity to decide how to proceed (e.g., through the way that the input is continued and/or ended) to achieve a desired outcome. In this state, application icon 424 is optionally displayed with a reduced size overlaid on a gray platter, while other portions of the home screen user interface 5096 remain unchanged and fully visible. In some embodiments, information object 5116 automatically fades out after a predefine period of time if no further input (e.g., liftoff of the contact or movement of the contact) is received from the user.

FIG. 5A39 continues from either 5A37 or 5A38 and illustrates an example scenario where the input ended without movement after the input threshold had been met. As shown in FIG. 5A39, in response to detecting liftoff of contact 5110 after the input threshold has been met (e.g., as shown in FIG. 5A37 or 5A38), the device displays a system user interface or a system user interface element that includes quick action menu 5120 (e.g., one or more selectable options that, when activated, causes an operation associated with the application (e.g., composing a new message, composing a message to "Mom", composing a message to "S. Ramanujan", composing a message to "G. Hardy") to be performed), and optionally, one or more mini application objects (e.g., widgets or mini applications, plug-ins, modules) associated with the target application icon (e.g., messages application icon 424). In conjunction with displaying the system user interface (e.g., a user interface occupying an entirety of the touch-screen or a system user interface element occupying less than all of the touch-screen and overlaid on background user interface 5118 (e.g., a blurred and darkened version of the previous user interface 5096)), the device generates a non-visual output (e.g., a tactile output (e.g., tactile output 5117)) to indicate that the end of the input has been detected and a quick action menu of the application corresponding to application icon 424 is displayed in response to the end of the input. In some embodiments, tactile output 5117 provided at the end of the input has a second tactile output profiled that is different from the first tactile output profile (e.g., with a different tactile output pattern for the tactile output, with both a different tactile output pattern for the tactile output and a different haptic audio output pattern for the accompanying haptic audio output, or with the same tactile output pattern for the tactile output but different haptic audio output pattern for the accompanying haptic audio output) of tactile output 5114 provided when the input threshold is met. The different tactile output profiles of the tactile output for the end of the input and the tactile output for the satisfaction of the input threshold alert the user of the different changes that have occurred to the internal state of the device. In some embodiments, the tactile output profiles of the tactile outputs for the end of the input and for the satisfaction of the input threshold are similar or identical, which contrasts with the tactile outputs that are provided when the input includes movement that drags the user interface object (e.g., application icon 424) under the contact (e.g., contact 5110) away from its location.

In this example, quick action menu 5120 is displayed over background 5118 (e.g., blurred and darkened version of home screen user interface 5096). Quick action menu 5120 includes selectable options that correspond to different actions associated with the messages application that can be performed directly from the home screen user interface (e.g., the respective actions will be performed when the selectable options are activated by a tap input (e.g., by a contact distinct from contact 5110), respectively), without first launching the application and then selecting the action from within the user interface of the application after the application is launched. In FIGS. 5A40-5A41, a tap input by contact 5122 is detected on an option in quick action menu 5120 for composing a new message (e.g., as shown in FIG. 5A40), and in response to detecting the input, the device launches the messages application and directly displays new message composition user interface 5132 (e.g., including message content region 5123 and virtual keyboard 5020), without requiring the user to go through the usual internal navigation within the messages application to get from a default start user interface to new message composition user interface 5132.

FIG. 5A42 illustrates an example scenario, where, if instead of messages application icon 424, the input by contact 5110 was on the photos application icon 426 in FIGS. 5A36-5A38, when liftoff of contact 5110 was detected with less than a threshold amount of movement after the input threshold had been met, the device displays quick action menu 5130 and mini application object 5128 that correspond to the photos application, and generates a non-visual output (e.g., a tactile output (e.g., tactile output 5124)) to indicate that the end of the input has been detected and a quick action menu and mini application object of the application corresponding to application icon 426 is displayed in response to the end of the input. In some embodiments, quick action menu 5130 for the photos application includes selectable options corresponding to displaying a folder for the most recently taken photos, displaying the favorites folder, displaying photos taken one year ago, and displaying a search interface for searching the media library of the photos application, respectively. In some embodiments, mini application object corresponding to the photos application includes a listing of folders corresponding to different date ranges, topics, and/or media types. The quick action menus and mini application object shown in FIGS. 5A39 and 5A42 are merely illustrative. Different applications have different quick action menu items in their quick action menus and have different mini application objects that correspond to different subsets (e.g., less than all) of functions and/or contents from the full applications. In some embodiments, a tap input on the mini application object causes the device to dismiss the current user interface and launch the application corresponding to the mini application object.

In some embodiments, a tap input detected on the background (e.g., background 5118 in FIG. 5A39 or background 5126 in FIG. 5A42) outside the area occupied by the system user interface (e.g., outside of the application icon, the quick action menu (e.g., quick action menu 5120 or 5130) and mini application object (e.g., mini application object 5128)) causes the device to dismiss the currently displayed system user interface or system user interface element (e.g., including the quick action menu and the mini application object), and restore home screen user interface 5096. In some embodiments, when the home screen user interface is restored, the device does not generate a non-visual output (e.g., a tactile output) to accompany the visual change in the user interface. In some embodiments, when the home screen user interface is restored, the device generates a non-visual output (e.g., a tactile output) in conjunction with settlement of application icon (e.g., 424 or 426) into its original location in the home screen user interface after shrinking the quick action menu and the mini application object into the application icon.

FIGS. 5A43-5A44 continue from FIG. 5A37 or FIG. 5A38 and illustrate an example scenario in which more than a threshold amount of movement of contact 5110 (e.g., movement towards the right side of the display) is detected after the input threshold has been met. In some embodiments, as shown in FIG. 5A43, in response to movement of contact 5110, application icon 424 is dragged from its original location in home screen user interface 5096 in accordance with movement of contact 5110. The device generates a non-visual output (e.g., a tactile output (e.g., tactile output 5134)) with a third tactile output profile that is distinct from the first tactile output profile of the tactile output (e.g., tactile output 5114 in FIG. 5A37) generated when the input threshold is met and/or from the second tactile output profile of the tactile output (e.g., tactile output 5117 in FIG. 5A39 and tactile output 5124 in FIG. 5A42) generated when the input ended without movement after the input threshold has been met. In FIG. 5A44, in addition to generating tactile output 5134, the device also provides visual feedback (e.g., animates all the application icons in home screen user interface 5096) to indicate that a user interface reconfiguration mode is activated, and the user can drag the target application icon to reposition it in the home screen user interface.

FIG. 5A45, termination of the input by contact 5110 (e.g., liftoff of contact 5110) is detected, and in response to detecting the end of the input by contact 5110, application icon 5424 is displayed at a nearest insertion location in the home screen user interface 5096. In some embodiments, the device generates a non-visual output (e.g., a tactile output (e.g., tactile output 5136)) in conjunction with insertion and/or settlement of the application icon into the insertion location (e.g., the original location of the application icon 424, because the movement of contact 5110 is small). As shown in FIG. 5A45, information object 5116 ceases to be displayed when movement of contact 5110 is detected. In some embodiments, a tactile output profile of a tactile output (e.g., tactile output 5136) generated in conjunction with insertion and/or settlement of a dropped object into an insertion location in a user interface (and detection of liftoff of the contact after movement of contact, with the movement being after the input threshold having been met) is distinct from the tactile output profile of a tactile output (e.g., tactile output 5114 in FIG. 5A37) provided in conjunction with satisfaction of an input threshold, distinct from the tactile output profile of a tactile output (e.g., tactile output 5117 in FIG. 5A39) provided in conjunction with displaying a quick action menu (and detection of liftoff of the contact without movement of the contact, after the input threshold having been met), and/or distinct from the tactile output profile of a tactile output (e.g., tactile output 5134 in FIG. 5A44) provided in conjunction with dragging the application icon away from its original location (and detection of movement the contact after the input threshold having been met).

FIGS. 5A46-5A49 illustrate an example process for triggering the user interface reconfiguration mode on the home screen user interface that is implemented in addition to or in lieu of the example process shown in FIGS. 5A36-5A37 followed by FIGS. 5A43-5A44, in some embodiments. In FIG. 5A46-5A47, contact 5110 has been maintained with less than a threshold amount of movement for at least a threshold amount of time T(I) since detection of the contact. In accordance with a determination that the input by contact 5110 has met the input threshold and has undergone less than a threshold amount of movement since detection of the contact (e.g., kept substantially stationary), the device generates a non-visual output (e.g., a tactile output (e.g., tactile output 5138)) to indicate that the input threshold has been met, with less than a threshold amount of movement by the contact 5110. In some embodiments, as shown in FIG. 5A47, the device does not display information object 5116 when the input threshold is met. FIGS. 5A48-5A49 illustrate that, if contact 5110 is maintained with less than a threshold amount of movement (e.g., kept substantially stationary) after the input threshold is met, for another threshold amount of time (e.g., $T_{th}$, the device activates the user interface reconfiguration mode without requiring movement of contact 5110. As shown in FIG. 5A48, before the input by contact 5110 meets the extended duration threshold (e.g., T(I)+$T_{th}$), the user interface is kept in the same state as that shown in FIG. 5A47. As shown in FIG. 5A49, in response to detecting that the extended duration threshold is met by the input, the device generates a non-visual output (e.g., a tactile output (e.g., tactile output 5140)) and animates the applications icons, to indicate that the extended duration threshold for entering the user interface reconfiguration mode has been met, and that the device has entered the user interface reconfiguration mode. In some embodiments, tactile output 5140 in FIG. 5A49 and tactile output 5134 in FIG. 5A44 have the same tactile output profile that corresponds to activation of the user interface reconfiguration mode. In some embodiments, tactile output 5140 in FIG. 5A49 and tactile output 5134 in FIG. 5A44 have different tactile output profiles to indicate the different manners (e.g., different input types) by which the user interface reconfiguration mode is activated.

FIG. 5A50-5A52 continue from either 5A44 or 5A49 and illustrate an example scenario where a greater movement of contact 5110 causes application icon 424 to be dragged and dropped into a different location in home screen user interface 5096, after the reconfiguration mode is started. In FIGS. 5A51-5A52, when application icon 524 is dragged to a different location in home screen user interface 5096, other application icons automatically shift and move into the positions vacated by application icon 524. In FIG. 5A52, when termination of the input is detected (e.g., liftoff of contact 5110 is detected), application icon 424 is inserted into the nearest insertion location in home screen user interface 5096, and home screen user interface 5096 is reconfigured. In some embodiments, in conjunction with settlement of application icon 424 (and detecting termination of the input by contact 5110), the device generates a non-visual output (e.g., a tactile output (e.g., tactile output 5142)). In some embodiments, tactile output 5142 in FIG. 5A52 has the same tactile output profile as tactile output 5136 in FIG. 5A45, to indicate the settlement of the application icon into an insertion location in home screen user interface. In some embodiments, tactile output 5142 in FIG. 5A52 has a different tactile output profile from tactile output 5136 in FIG. 5A45, to indicate the difference between a canceled reconfiguration operation and a successfully completed reconfiguration operation.

FIGS. 5A53-5A54 illustrate that, after the end of the input by contact 5110 is detected and application icon 424 is inserted into a new location, the user interface reconfiguration mode remains activated until another input is detected. In some embodiments, an upward edge swipe gesture by another contact (e.g., contact 5144 in FIG. 5A53) causes the device to deactivate the user interface reconfiguration mode, and display home screen user interface 5096 in a non-animated, newly configured state (e.g., as shown in FIG. 5A54).

FIGS. 5A55-5A67 illustrate example interactions with a user interface object in a web browser application. In Figure SASS, a user interface (e.g., user interface 5146) of the web browser application displays a webpage that includes one or more images, text, and hyperlinks (e.g., hyperlink 5148).

In FIG. 5A56, a contact (e.g., contact 5150) is detected on touch screen 112 at a location that corresponds to hyperlink 5148 at time $T_0$. In some embodiments, in response to detecting contact 5150, visual feedback is provided to indicate a target of the input on user interface 5146 (e.g., highlighting, enlarging, and/or animating hyperlink 5148), while other portions of the user interface is unchanged. In some embodiments, the device forgoes providing any non-visual output (e.g., a tactile output or an audio alert) at this time (e.g., for the detection of the contact or selection of the target for the input), before an input threshold (e.g., a duration threshold (e.g., a static duration threshold or a predefined intensity-based duration threshold T(I))) is met by the input by contact 5150.

FIGS. 5A56-5A57 illustrate an example scenario in which the input by contact 5150 is a tap input that includes less than a threshold amount of movement before liftoff of contact 5150, and that does not meet the predefined input threshold (e.g., the input threshold as described herein with reference to FIGS. 5A6-5A7). In FIG. 5A57, in response to detecting termination of the input (e.g., liftoff of contact 5150) and in accordance with a determination that the input is (or was) substantially stationary and that the input ended without having met the predefined input threshold (e.g., liftoff occurred at time $T<T_0+T(I)$), the device displays another user interface 5151 within the web browser application that displays the webpage corresponding to hyperlink 5148.

FIG. 5A58 follows FIG. 5A56 and illustrates an example scenario in which the input by contact 5150 meets the predefined input threshold and has less than a threshold amount of movement (e.g., is kept substantially stationary) before meeting the predefined input threshold. In FIG. 5A58, in response to detecting that the input threshold is met with less than a threshold amount of movement by contact 5150 (e.g., contact 5150 is kept substantially stationary for at least a threshold amount of time T(I)), the device generates a non-visual output (e.g., a tactile output (e.g., tactile output 5152)) to indicate that the input threshold has been met and subsequent portions of the input will be used to determine which response of multiple possible responses will be provided. In some embodiments, tactile output 5152 has a first tactile output profile, including a tactile output with a first tactile output pattern (e.g., first amplitude, frequency, and wave pattern), and optionally, accompanied by a haptic audio output with a first haptic audio output pattern (e.g., first amplitude, frequency, wave pattern, and offset from the tactile output). In some embodiments, before the input threshold is met, the appearance of the user interface does not respond to continuous changes in the intensity of the contact 5150; and for a device that is capable of detecting intensities relative to a first intensity threshold above the nominal contact intensity detection threshold, the input threshold is adjusted from a first value to a second value (e.g., a value smaller than the first value) in accordance with a determination that the intensity of the contact has exceeded the first intensity threshold. In FIG. 5A58, in response to detecting that the input threshold is met with less than a threshold amount of movement by contact 5150, the device changes the appearance of hyperlink 5148 (e.g., hyperlink 5148 is highlighted, and/or lifted off the webpage in user interface 5146) to indicate that the input threshold has been met, in conjunction with generating the non-visual output (e.g., a tactile output).

FIG. 5A60 follows FIG. 5A59 and illustrates an example scenario where liftoff of contact 5150 is detected after the input threshold is met. As shown in FIG. 5A60, in response to detecting liftoff of contact 5150 after the input threshold has been met (e.g., as shown in FIG. 5A59), the device displays a system user interface or a system user interface element that includes preview 5156 of the webpage corresponding to hyperlink 5148, and optionally, one or more control user interface objects for actions that can be performed with respect to the webpage (e.g., control 5160 for opening the webpage in a new tab, control 5162 for adding the webpage to the reading list, and control 5164 for copying the webpage or hyperlink). In conjunction with displaying the system user interface (e.g., a user interface occupying an entirety of the touch-screen or a system user interface element occupying less than all of the touch-screen and overlaid on background user interface 5158 (e.g., a blurred and darkened version of the previous user interface 5146)), the device generates a non-visual output (e.g., a tactile output (e.g., tactile output 5154)) to indicate that the end of the input has been detected and preview 5156 of the webpage corresponding to hyperlink 5148 is displayed in response to the end of the input. In some embodiments, tactile output 5154 provided at the end of the input has a different tactile output profile (e.g., with a different tactile output pattern for the tactile output, with both a different tactile output pattern for the tactile output and a different haptic audio output pattern for the accompanying haptic audio output, or with the same tactile output pattern for the tactile output but different haptic audio output pattern for the accompanying haptic audio output) from tactile output 5152 provided when the input threshold is met. The different tactile output profiles of the tactile output for the end of the input and the tactile output for the satisfaction of the input threshold alert the user of the different changes that have occurred to the internal state of the device. In some embodiments, the tactile output profiles of the tactile outputs for the end of the input and for the satisfaction of the input threshold are similar or identical, which contrasts with the tactile outputs that are provided when the input includes movement that drags the user interface object (e.g., hyperlink 5148) under the contact (e.g., contact 5150) away from its location.

In this example, preview 5156 is displayed over background user interface 5158 (e.g., blurred and darkened version of the previous user interface 5146) with one or more controls for triggering actions that is performed with respect to the webpage corresponding to hyperlink 5148 (e.g., the respective actions will be performed when the controls are activated by a tap input (e.g., by a contact distinct from contact 5150), respectively), without navigating to the webpage from the currently displayed webpage within the browser application (e.g., as shown in FIGS. 5A58-5A59). In some embodiments, a tap input detected at a location outside of the regions occupied by preview 5156 and controls 5160, 5162, and 5164, causes the device to dismiss the system user interface or system user interface element, and return to the previously displayed user interface 5146. In some embodiments, a tap input detected on preview 5156 causes the device to dismiss the system user interface or system user interface element, and navigate to user interface 5151 (e.g., as shown in FIG. 5A57) displaying the new webpage corresponding to hyperlink 5148.

FIGS. 5A61-5A62 continue from FIG. 5A58 and illustrate an example scenario in which more than a threshold amount of movement of contact 5150 (e.g., movement towards the right side of the display) is detected after the input threshold has been met. In some embodiments, as shown in FIG. 5A62, in response to movement of contact 5150, a copy 5166 of the hyperlink 5148 is dragged from its original location in the web browser user interface 5146 in accordance with movement of contact 5150. The device generates a non-visual output (e.g., a tactile output (e.g., tactile output 5168)) with a third tactile output profile that is distinct from the first tactile output profile of the tactile output (e.g., tactile output 5152 in FIG. 5A58) generated when the input threshold is met and/or from the second tactile output profile of the tactile output (e.g., tactile output 5154 in FIG. 5A60) generated when the input ended without movement after the input threshold has been met.

FIG. 5A63 follows FIG. 5A62, and illustrates an example scenario where liftoff of contact 5150 is detected when no permissible drop-off location for the copy 5166 of hyperlink 5148 is available on the user interface. In response to detecting termination of the input by contact 5150, the copy 5166 of hyperlink 5148 is dropped back to its original location (and merged with hyperlink 5148), and the device optionally generates a non-visual output (e.g., a tactile output (e.g., tactile output 5170)) to indicate settlement of the copy 5166 of hyperlink 5148 to its original location in user interface 5146. In some embodiments, the device forgoes generating a non-visual output (e.g., a tactile output) when no permissible drop-off location is available for the dragged object and the drag-drop operation is canceled.

FIGS. 5A64-5A67 follow FIG. 5A62 and illustrate an example scenario where the copy 5166 of hyperlink 5148 is dropped into a permissible drop-off location after the end of the input is detected. As shown in FIG. 5A64, while contact 5150 is maintained on the touch-screen holding the copy 5166 of hyperlink 5148, an upward edge swipe input by contact 5167 is detected near the bottom edge of touch screen 112. In FIG. 5A65, the device navigates from web browser user interface 5146 to home screen user interface 5096 in response to the upward edge swipe input by contact 5167, while contact 5150 is maintained on the touch-screen holding the copy 5166 of hyperlink 5148. While the home screen user interface 5096 is displayed and while contact 5150 is maintained on the touch screen and optionally dragging the copy 5166 of hyperlink 5148 across the display from one location to another location, a tap input by contact 5172 is detected on application icon 424 for the messages application. In FIG. 5A66, the device launches the messages application and displays conversation user interface 5014, in response to the tap input by contact 5172. Conversation user interface 5014 includes conversation presentation area 5016 that displays messages (e.g., message 5018) exchanged in a conversation. Conversation user interface 5014 also includes a message input box and virtual keyboard 5020. When contact 5150 moves to the message input box, the copy 5166 of hyperlink 5148 is dragged to a location over the message input box. In FIG. 5A67, liftoff of contact 5150 is detected while contact 5150 and the copy 5166 of hyperlink 5148 is dropped into the message input box (e.g., converted to hyperlink text 5176). In some embodiments, the device generates a non-visual output, (e.g., a tactile output (e.g., tactile output 5178)) to indicate that the hyperlink has been dropped in to the message input box.

Figure 6A:
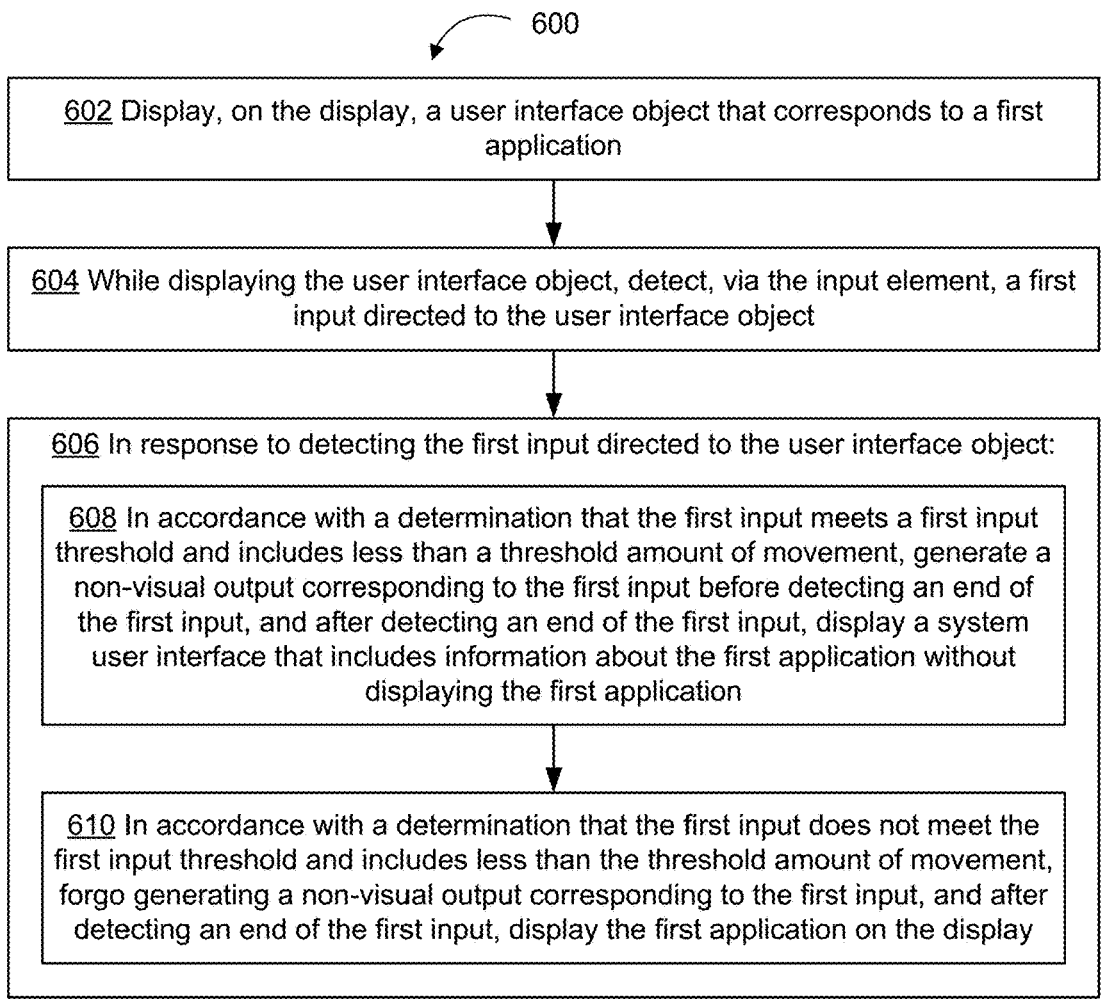

FIGS. 5B1-5B6 illustrate example user interfaces for interacting with user interface objects, in accordance with some embodiments. The user interfaces in these figures are used to illustrate the processes described below, including the processes in FIGS. 8A-8C. Various aspects of the processes shown in FIGS. 6A-6D, 7A-7B, 9A-9G and 10A-10E and the interactions models shown in FIGS. 5E1-5E4 are also illustrated in FIGS. 5B1-5B6 and accompanying descriptions, in accordance with some embodiments. For convenience of explanation, some of the embodiments will be discussed with reference to operations performed on a device, (e.g., see FIGS. 5B1-5B3), with a touch-sensitive display 112, an input element (e.g., a touch-sensitive surface on the display 112) and a plurality of audio output elements 111 (e.g., audio output elements, or speakers, 111a, 111b and 111c, FIGS. 5B1-5B3) at distinct locations along a periphery of the electronic device 100. In the example shown in FIGS. 5B1-5B3, the device 100 (e.g., a mobile telephone, sometimes called a cell phone or portable electronic device) has three audio output elements 111, including one (111c) near a top edge of the device (e.g., suitable for placement near a user's ear while conducting a telephone call), one (111a) at a location along the left side of a bottom edge (e.g., near a bottom-left corner) of the device, and one (111b) along the right side of the bottom edge (e.g., near a bottom-right corner) of the device. In other embodiments the number of audio output elements may be less (e.g., two) or more (e.g., four, or more than four), and/or placement of the audio output elements may differ (e.g., at different locations along the outer edges of the device than the ones shown in FIGS. 5B1-5B3.

FIGS. 5B1-5B3 illustrate interactions with a home screen user interface and application launch icons displayed on the home screen user interface. In FIG. 5B1, a plurality of application launch icons, including application launch icon 424 for a messages application, are displayed on a primary page of a home screen user interface (e.g., home screen user interface 5182). A first input, such as (or including) a contact (e.g., contact 5310, FIG. 5B2) is detected on touch screen 112 at a location that corresponds to messages application launch icon 424 at time $T_0$. In some embodiments, in response to detecting contact 5310, visual feedback is provided to indicate a target of the first input on home screen user interface 5182 (e.g., highlighting, enlarging, and/or animating application launch icon 424, while other application launch icons remain unchanged) that corresponds to the location of contact 5310 on touch screen 112. In some embodiments, the device forgoes providing any tactile output or audio alert at this time (e.g., for the detection of the contact or selection of the target for the first input), before an input threshold (e.g., a duration threshold (e.g., a static duration threshold or a predefined intensity-based duration threshold T(I))) is met by the first input by contact 5310.

FIGS. 5B2 and 5B3 illustrate an example scenario in which the first input, e.g., contact 5310, meets predefined criteria. In some embodiments, the predefined criteria include a time threshold criterion (e.g., a criterion a contact (e.g., contact 5310) of the first input remains on the touch-sensitive display for at least a threshold amount of time T(I)), and a movement criterion (e.g., a criterion that the contact of the input has less than a threshold amount of movement (e.g., is kept substantially stationary)). In some embodiments, the predefined criteria further include an input termination criterion (e.g., that the first input ends (e.g., by liftoff of contact 5310) with the first input moving less than the threshold amount of movement (e.g., is kept substantially stationary with respect to lateral directions, parallel to the touch-sensitive surface of the touch-sensitive display). In some embodiments, before the predefined criteria are met, the appearance of the user interface does not respond to continuous changes in the intensity of the contact 5110, and for a device that is capable of detecting intensities relative to a first intensity threshold above the nominal contact intensity detection threshold, a time threshold (e.g., the time criterion) included in the predefined criteria is optionally adjusted from a first value to a second value (e.g., a value smaller than the first value) in accordance with a determination that the intensity of the contact has exceeded the first intensity threshold.

FIG. 5B3 continues from FIG. 5B2. As shown in FIG. 5B3, in response to determining (e.g., a determination by electronic device 100) that the first input meets the predefined criteria, including the device detecting lift-off of contact 5310 after the time threshold criterion has been met (e.g., as shown in FIG. 5B3), the device displays a system user interface or a system user interface element that includes a quick action menu 5320 (e.g., one or more selectable options that, when activated, causes an operation associated with the application (e.g., composing a new message, composing a message to mom, composing a message to S. Ramanujan, composing a message to G. Hardy) to be performed), and optionally, one or more mini application objects (e.g., widgets or mini applications, plug-ins, modules) associated with the target application launch icon (e.g., messages application icon 424). In conjunction with displaying the system user interface (e.g., a user interface occupying an entirety of the touch-screen or a system user interface element occupying less than all of the touch-screen and overlaid on a background user interface 5182 (e.g., a blurred and darkened version of the previous user interface 5182)), the device generates an audio output (e.g., audio output 5330) to indicate that the end of the input has been detected and a quick action menu of the application corresponding to the application icon 424 is displayed in response to the end of the input.

In some embodiments, the audio output 5330 provided at the end of the first input is provided to one or more of the audio output elements 111, as follows. In accordance with a determination by the device 100 that the user interface object 424, to which the input (e.g., contact 5310) was directed, is located closer to a first audio output element (e.g., speaker 111*c*) of the plurality of audio output elements than to a second audio output element (e.g., speaker 111*a* or 111*b*) of the plurality of audio output elements, the device generates a first audio output (e.g., audio output 5330) that corresponds to the first input, wherein the first audio output has a greater amplitude at the first audio output element than at the second audio output element.

On the other hand, had the first input been directed to another user interface object (e.g., user interface object 416), for example in a lower left portion of the user interface 5182, and the first input meets the predefined criteria, a second audio output would be generated. In accordance with a determination by the device 100 that the user interface object (e.g., user interface object 416), to which the first input (e.g., contact 5310) was directed, is located closer to the second audio output element (e.g., speaker 111*a*) of the plurality of audio output elements than to the first audio output element (e.g., speaker 111*c*) of the plurality of audio output elements, the device generates a second audio output (not shown) that corresponds to the input, wherein the second audio output has a greater amplitude at the second audio output element than at the first audio output element.

In some embodiments, the first audio output and the second audio output share one or more audio output properties (e.g., volume, frequency, waveform, etc.). In some embodiments, the first audio output and the second audio output are the same.

In some embodiments, the first audio output is output on the first audio output element and is not output on the second audio output element. Similarly, in some embodiments, the second audio output is output on the second audio output element and is not output on the first audio output element. On the other hand, in some embodiments, generating the first audio output that corresponds to the first input includes outputting the first audio output on the first audio output element with a first amplitude, and outputting the first audio output on the second audio output element with a second amplitude, and an amount of difference between the first amplitude and the second amplitude is based on a location of the user interface object. For example, if the distance between the user interface object and a location associated with the first audio output element is one quarter of the distance between the user interface object and a location associated with the second audio output element, the amount of difference between the first amplitude and the second amplitude would be based on either the four to one ratio of those distances, or based on a size of the difference, as measured with respect to predefined units (e.g., pixels, or millimeters) of distance.

In some embodiments, the device 100 identifies, based on a location of the user interface object to which the first input (e.g., contact 5310) was directed, a subset of the plurality of audio output elements, comprising at least two but less than all of the plurality of audio output elements, and generating the first audio output includes outputting the first audio output at the identified subset of the plurality of audio output elements. For example, in FIG. 5B3, the first audio output 5330 is output at two (111*a* and 111*c*) of the three audio output elements, identified by the device based on the location of user interface object 424.

FIGS. 5B4 to 5B6 are similar to 5B1 to 5B3, except that the device 100 is a tablet computer having, in this example, four audio output elements 111*d*, 111*e*, 111*f* and 111*g*, located, in this example, near the four corners (along the periphery) of device 100. FIGS. 5B4 to 5B6 illustrate interactions with a home screen user interface and application launch icons, including application launch icon 5424 for a messages application, displayed on the home screen user interface 5400. A first input, such as (or including) a contact (e.g., contact 5450, FIG. 5B5) is detected on touch screen 112 at a location that corresponds to messages application launch icon 5424 at time T₀. In some embodiments, in response to detecting contact 5450, visual feedback is provided to indicate a target of the first input on home screen user interface 5400 (e.g., highlighting, enlarging, and/or animating application launch icon 5424, while other application launch icons remain unchanged) that corresponds to the location of contact 5450 on touch screen 112. In some embodiments, the device forgoes providing any tactile output or audio alert at this time (e.g., for the detection of the contact or selection of the target for the first input), before an input threshold (e.g., a duration threshold (e.g., a static duration threshold or a predefined intensity-based duration threshold T(I))) is met by the first input by contact 5450.

FIG. 5B6 illustrates an example scenario in which the first input, e.g., contact 5450, meets predefined criteria as described herein with reference to FIG. 5B3. As shown in FIG. 5B6, in response to determining (e.g., a determination by electronic device 100) that the input by contact 5450 meets the predefined criteria, including the device detecting lift-off of contact 5450 after a time threshold criterion is met (e.g., contact 5450 is maintained on touch screen 112 for at least the threshold amount of time T(I)), the device displays a system user interface that includes a quick action menu 5460 (e.g., one or more selectable options that, when activated, causes an operation associated with the application (e.g., composing a new message, composing a message to mom, composing a message to S. Ramanujan, composing a message to G. Hardy) to be performed), and optionally, one or more mini application objects (e.g., widgets or mini applications, plug-ins, modules) associated with the target application launch icon (e.g., messages application icon 424). In conjunction with displaying the system user interface, the device generates an audio output (e.g., audio output 5370) to indicate that the end of the input has been detected and a quick action menu of the application corresponding to the application icon 5424 is displayed in response to the end of the input.

In some embodiments, the audio output 5370 is provided to one or more of the audio output elements 111 based on a location of the user interface object 5424 to which the input (e.g., contact 5450) was directed. For example, as shown in FIG. 5B6, user interface object 5424 is located closer to speaker 111*f* than to speaker 111*d*, and located closer to speaker 111*d* than to speakers 111*e* and 111*g*. Accordingly, in the example shown in FIG. 5B6, the device generates an audio output (e.g., audio output 5370), where the audio output has a greater amplitude at speaker 111*f* than at speaker 111*d*, and the audio output is not generated at speakers 111*e* and 111*g*. On the other hand, had the input been directed to another user interface object, for example closer to speaker 111*d* than to any speaker 111*e*, and closer to speaker 111*e* than to speakers 111*f* or 111*g*, and the input meets the predefined criteria, a different audio output would be generated (e.g., an audio output having a given amplitude at speaker 111*d*, a lesser amplitude at speaker 111*e*, and even lesser amplitudes, if any, at speakers 111*f* and 111*g*, respectively).

In some embodiments, the audio outputs described herein with reference to FIGS. 5B1-5B6 are, or have the properties of, the non-visual outputs described herein with reference to FIGS. 5A1-5A67, 5C1-5C19, 5D1-5D30, and 5E1-5E4, and FIGS. 6A-6D, 7A-7B, 8A-8C, 9A-9G, and 10A-10E.

FIGS. 5C1-5C19 illustrate example user interfaces for interacting with a user interface object, in accordance with some embodiments.

In FIGS. 5C1-5C2, a tap input by contact 5402 is detected at a location on the touch-screen that corresponds to application launch icon 424 for the messages application shown on home screen user interface 5096. In response to the tap input by contact 5402, the device launches the message application and displays conversation user interface 5014 of the messages application. In some embodiments, to detect a tap input, the device detects liftoff of contact 5402 within a first threshold amount of time (e.g., the required amount of time for detecting a touch-hold input) of the touch-down of contact 5402, without detecting substantial movement of contact 5402 (e.g., contact is substantially stationary) since touch-down of the contact.

FIGS. 5C3-5C5 follow FIG. 5C1. In FIGS. 5C3-5C5, a swipe input by contact 5402 is detected after contact 5402 touched down at the location that corresponds to application launch icon 424 for the messages application. In some embodiments, the device detects the swipe input by contact 5402 when the device detects substantial movement (e.g., with more than a nominal amount of movement within a nominal threshold amount of time) after the touch-down of the contact, before the contact has been maintained substantially stationary for the first threshold amount of time T(I) (e.g., before a touch-hold input is detected). In FIGS. 5C4, home screen user interface 5096, including application launch icon 424 and other concurrently displayed application launch icons, moves in accordance with movement of contact 5402 to the left, and drags a previously undisplayed page of the home screen onto the display. In FIG. 5C5, in accordance with a determination that the movement of contact 5402 has exceeded a predefined threshold amount of movement (e.g., half of the display width) to complete the page navigation operation, a second page of the home screen user interface (e.g., home screen user interface 5112) is displayed after the end of the swipe input by contact 5402 is detected, replacing the previously displayed home screen user interface 5095.

In the example scenarios shown in FIGS. 5C1-5C5, the input by contact 5402 did not meet the requirement for keeping the contact substantially stationary (e.g., with less than a nominal amount of movement during a nominal amount of time) for at least the first threshold amount of time T(I) after touch-down of the contact on a user interface object. In the case where lift-off of the contact is detected before T(I) without substantial movement, an operation that corresponds to activation of the user interface object is performed (e.g., an application launch operation is performed, as shown in FIGS. 5C1-5C2). In the case where a substantial amount of movement of the contact is detected before T(I), an operation that corresponds to the whole user interface (e.g., as opposed to an operation specific to the user interface object) is performed. For example, a page navigation operation is performed on the whole user interface, without specifically selecting the user interface object as the subject of the operation, as shown in FIGS. 5C3-5C5. The relative timing between the movement and/or end of the input and the various input thresholds (e.g., time thresholds T(I), T(II) and T(III)) are indicated on the input timeline shown on the right side of the user interfaces. The solid triangle on the timeline indicates that the contact is detected or maintained on the touch-screen, and the hollow triangle on the timeline indicates liftoff of the contact. An arrow next to a solid triangle indicates movement of the contact on the touch-screen. The locations of the triangles on the timeline indicate the timing of touch-down, hold, movement, and/or liftoff of the contact relative to the various input thresholds (e.g., time thresholds T(I), (TII), and T(III), etc.). In some embodiments, input intensity requirements are optionally used in conjunction with time thresholds in criteria for triggering various user interface responses.

FIGS. 5C6-5C8 following FIG. 5C1 illustrate an example scenario in which contact 5402 has been kept substantially stationary for at least the first threshold amount of time T(I) after touch-down of contact 5402, without substantial movement (e.g., the contact is kept substantially stationary). In FIG. 5C6, in response to detecting that contact 5402 has been kept substantially stationary for the first threshold amount of time T(I), the device generates tactile output 5404 to indicate that the first time threshold has been met, and that contact 5402 has been kept substantially stationary since touch-down of the contact. In some embodiments, the appearance of application launch icon 424 is optionally changed to indicate selection of application launch icon 424 as the subject of subsequent operation(s) that are to be performed in response to the input(s) by contact 5402. In FIG. 5C7, before movement or lift-off of contact 5402 is detected after the first input threshold T(I) has been met, no additional visual or tactile output (e.g., visual and haptic feedback) is provided while contact 5402 is maintained at its touch-down location on application launch icon 424. In FIG. 5C8, liftoff of contact 5402 is detected after the first input threshold T(I) is met, but before the second input threshold T(II) is met. In response to detecting the liftoff of contact 5402 (without having detected any substantial movement of contact 5402), the device displays quick action menu 5120, overlaying background user interface 5118 (e.g., a blurred and darkened version of the previous user interface 5096). In some embodiments, the device also generates tactile output 5406 in conjunction with displaying quick action menu 5120 associated with the messages application.

FIG. 5C9 continues from 5C7. The sequence of FIGS. 5C6, 5C7, and 5C9 illustrate an example scenario in which contact 5402 is kept substantially stationary for at least the second threshold amount of time T(II), greater than T(I), after touch-down of the contact. In response to detecting that the contact has been kept substantially stationary for the second threshold amount of time T(II) since touch-down of the contact, the device automatically displays quick action menu 5120 overlaying background user interface 5118 without any additional input from the user (e.g., without requiring lift-off of the contact, and without requiring an increase in intensity of the contact above a light press intensity threshold above the nominal contact detection intensity threshold). In some embodiments, while contact 5402 is maintained on the touch-screen, quick action menu 5120 is slightly enlarged than its final steady state shown in FIG.

5C8. In some embodiments, quick action menu 5120 has the same appearance as its final steady state shown in FIG. 5C8. In some embodiments, the device generates a tactile output in conjunction with automatically displaying the quick action menu when the second time threshold T(II) is met. In some embodiments, the device forgoes generating the tactile output when displaying the quick action menu in response to the second time threshold T(II) being met without liftoff of the contact. In some embodiments, display of the quick action menu is maintained for as long as the contact is maintained at the touch-down location of the contact without substantial movement (e.g., as long as the contact is kept substantially stationary). In some embodiments, display of the quick action menu is maintained for as long as the contact is kept substantially stationary at the touch-down location of the contact, up to the third time threshold T(III); and then the device automatically performs another operation (e.g., ceasing to display the quick action menu and starting reconfiguration mode for the user interface) without requiring additional input from the user.

In FIG. 5C10, liftoff of contact 5402 is detected after the contact has been kept substantially stationary for at least the second threshold amount of time T(II) but less than the third threshold amount of time T(III) and while slightly enlarged quick action menu 5120 is displayed overlaying background user interface 5118. In response to detecting the liftoff of contact 5402, the device displays a transition of quick action menu 5120 from the slightly expanded state to the final steady state that was shown in FIG. 5C8 (e.g., the state displayed when liftoff of the contact was detected after T(I) but before T(II)). In some embodiments, the device generates tactile output 5408 in conjunction with display of quick action menu 5120 in its final steady state overlaying background user interface 5118.

FIGS. 5C11-5C12 continue from FIG. 5C9 and illustrate an example scenario in which substantial movement of contact 5402 is detected after the second time threshold T(II) has been met (e.g., shown in FIG. 5C9) and before the third time threshold T(III) is met (e.g., met with a substantially stationary contact). After contact 5402 moves to one of the selectable options in quick action menu 5120, liftoff of contact 5420 is detected while contact is over a selectable option for creating a new message. In response to detecting liftoff of contact 5420, the device ceases to display quick action menu 5120 and background user interface 5118, and launches the messages application. In FIG. 5C12, the device displays new message composition user interface 5132 (e.g., including message content region 5123 and virtual keyboard 5020), without requiring the user to go through the usual internal navigation within the messages application to get from a default start user interface to new message composition user interface 5132. In some embodiments, if liftoff of contact 5402 was detected without substantial movement of contact 5402, quick action menu 5120 is displayed in the steady state, as shown in FIG. 5C10. In some embodiments, a subsequent input (e.g., a tap input) on a selectable option in the steady state quick action menu by another contact cause the device to perform an operation that corresponds to the selectable option (e.g., launching the messages application to show new message composition user interface 5132, as shown in FIG. 5C12).

FIGS. 5C13-5C14 following FIG. 5C9 illustrate an example scenario in which substantial movement of contact 5402 is detected after the second time threshold T(II) has been met (e.g., as shown in FIG. 5C9) and before the third time threshold T(III) is met. In FIG. 5C13, contact 5402 moves into an area outside of the region occupied by quick action menu 5120 (e.g., moves horizontally to the right). In response to detecting that contact 5402 has made substantial movement into areas outside of quick action menu 5120, the device ceases to display quick action menu 5120 and starts a reconfiguration mode for user interface 5096. In some embodiments, application icons shown in user interface 5096 are animated to indicate that the reconfiguration mode of the user interface has been started. In some embodiments, application icon 5402 is dragged from its original location to a new location on user interface 5096 in accordance with movement of contact 5402. In some embodiments, the device generates tactile output 5500 to indicate that the user interface reconfiguration mode has been started. This feature allows the user to start the user interface reconfiguration mode and move an application icon simultaneously with the same input, rather than starting the reconfiguration mode with one input, and then subsequently select and move an application icon. This improves the interaction efficiency if the user already knows which icon needs to be relocated in the user interface and starts the input directly on that icon, without waiting for the third threshold amount of time T(III) to expire.

FIG. 5C15 following FIG. 5C9 illustrates an example scenario in which contact 5402 has been kept substantially stationary for the third threshold amount of time T(III) since touch-down of contact 5402. In response to detecting that contact 5402 has been kept substantially stationary on application icon 424 for at least the third threshold amount of time T(III), the device automatically ceases to display quick action menu 5120 and starts the user interface reconfiguration mode for the home screen user interface, as shown in FIG. 5C15. In this case, application icon is maintained at its original location after the user interface reconfiguration mode is started, and subsequent movement may be started on the application icon 424, or any of the other application icons shown on the user interface. This feature allows the user to start the user interface reconfiguration mode by interacting with any of the application icons, and then decide which application icon is to be moved after the reconfiguration mode is started. This allows the user to enter reconfiguration mode without having made a decision about which icon to relocate, and avoid accidentally moving an icon and changing the user interface configuration. In addition, providing two alternative paths to trigger user interface reconfiguration mode allow the user to choose the path that is most efficient for his/her particular needs, and improves user interaction efficiency of the user interface and reduces user mistakes when interacting with the device.

FIGS. 5C16-5C17 continue from either FIG. 5C14 or FIG. 5C15, and illustrate that application icon 424 is dragged by contact 5402 from its original location to another location in user interface 5096, while other application icons in user interface 5096 are repositioned accordingly. FIGS. 5C18 and 5C19 continue from FIG. 5C17, and illustrate that a tap input by another contact 5506 in user interface 5596 at a location that is not occupied by an application icon during the user interface reconfiguration mode causes the device to stop the user interface reconfiguration mode. In FIG. 5C19, user interface 5096 is shown in a final, reconfigured state (e.g., with positions of the first row of application icons altered from that shown in FIG. 5C1).

The example interactions scenarios shown in FIGS. 5C1-5C19 are used to illustrate various branches of an interaction model shown in FIG. 5E1, in accordance with some embodiments. In the interaction model shown in FIG. 5E1, there are three time thresholds (e.g., T(I), T(II) and T(III)) against which movement and/or liftoff of the contact is evaluated, in accordance with some embodiments.

FIGS. 5D1-5D30 illustrate example user interfaces for interacting with a preview corresponding to content (e.g., hyperlinks, file icons for documents with long file names, media files with metadata (e.g., lyrics, album, author, composer, and performer information, location and time of capture information), etc.) and displaying a sharing user interface for sharing the content using various sharing protocols, in accordance with some embodiments. FIGS. 5D1-5D30 illustrate example interaction scenarios that correspond to different branches of an interaction model shown in FIG. 5E3, in accordance with some embodiments. The interaction model shown in FIG. 5E3 includes three time thresholds (e.g., T(i), T(I), and T(II)) against which movement and/or liftoff of the contact are evaluated, in accordance with some embodiments. In some embodiments, the user interface responses corresponding to time threshold T(i) is optional for some user interface objects, and the resulting interaction model is illustrated in FIG. 5E2, with two time thresholds (e.g., T(I) and T(II)). In various embodiments, the different time thresholds corresponding to different types of user interface objects are customized and are not uniform across different types of user interface objects. In some embodiments, the different time thresholds corresponding to two or more types of user interface objects are uniformed defined, and the same respective values for T(i), T(I), T(II), and/or T(III) are used for the interaction models for each of those two or more types of user interface objects.

FIGS. 5D1-5D2 illustrate an example scenario in which a tap input by contact 5508 is detected at a location that corresponds to hyperlink 5148 in user interface 5146 of a web browser application. In accordance with a determination that the input by contact 5508 is a tap input that includes less than a nominal amount of movement before liftoff of contact 5508 and that does not meet a first time threshold T(i) (e.g., a quick view time threshold) that is smaller than a second time threshold T(I), the device displays another user interface 5151 within the web browser application that displays the webpage corresponding to hyperlink 5148.

FIG. 5D3 following FIG. 5D1 illustrates an example scenario in which substantial movement of contact 5508 is detected after the touch-down of contact 5508 on hyperlink 5148. In response to detecting the movement of contact 5508 before the quick view time threshold T(i) is met, the device performs an operation that is applied to the whole user interface (e.g., the device scrolls user interface 5146), without specifically selecting hyperlink 5148 as the subject for the operation.

FIG. 5D4 following FIG. 5D1 illustrates an example scenario in which contact 5508 has been kept substantially stationary for the first threshold amount of time T(i) since touch-down of contact 5508. In response to detecting that contact 5508 has been kept substantially stationary for the first threshold amount of time T(i), the device displays a visual indication to indicate that hyperlink 5148 is selected. In some embodiments, the device generates tactile output 5510 in conjunction with selection of hyperlink 5148 to indicate that the first time threshold T(i) is met and that subsequent operation will be performed with respect to the selected hyperlink 5148. In some embodiments, the device forgoes generating the tactile output at this time.

In FIG. 5D5, following FIG. 5D4, liftoff of contact 5508 is detected after contact 5508 has been kept substantially stationary at the location of hyperlink 5148 for at least the first threshold amount of time T(i). In response to detecting liftoff of contact 5508, the device displays a first version of a preview (e.g., preview 5514) that corresponds to hyperlink 5148, overlaying background user interface 5158 (e.g., a blurred and darkened version of the previous user interface 5146). As shown in FIG. 5D5, in some embodiments, the first version of the preview (e.g., preview 5514) displays metadata that corresponds to the user interface object that is the subject of the input (e.g., universal resource locator or web address that corresponds hyperlink 5148). The first version of the preview is distinct from a second version of the preview that displays some of the content of the user interface object (e.g., images or excerpts from the webpage that corresponds to hyperlink 5148). This feature allows the user to easily review the metadata associated with the user interface object, before the user interface object is activated to perform a corresponding operation (e.g., to initiate a navigation operation or executing a script associated with the user interface object). This improves security of the device and avoids unintentional operations to be performed without sufficient oversight by the user. Other types of user interface objects that implement and benefit from this type of previews include user interface object corresponds to metadata that a user frequently may wish to review before opening the content corresponding to the user interface object (e.g., file icons for files with long file names, images with location and timestamps, media files with lyrics, synopsis, author, composer, album, and performer information, file attachments in emails and messages with originator and security certification information, file download links with download source identification information, etc.)). In some embodiments, controls (e.g., control 5160) associated with additional operations that can be performed with respect to hyperlink 5148 or webpage corresponding to the hyperlink are displayed concurrently with the first version of the preview (e.g., preview 5514). In some embodiments, the first version of the preview is scrollable in response to a subsequent swipe input on the first version of the preview (e.g., for the user to review additional information that is not fully revealed initially in the first version of the preview).

FIG. 5D6 illustrates a number of possible inputs on the first version of preview 5514, including a swipe input by contact 5516, a tap input by contact 5518, and a light press input by contact 5520, in accordance with some embodiments. In some embodiments, these inputs are detected at the same location on the first version of the preview 5514, and the device determines which operation to perform in response to the inputs based on evaluations of the inputs against different criteria (e.g., criteria based on location, movement, duration, and intensity of the contact compared against predefined movement, duration, and/or intensity thresholds). In some embodiments, a downward swipe input by contact 5516 causes the device to cease to display the first version of the preview 5514, and initiates a drag operation on hyperlink 5516 or a copy thereof in accordance with movement of contact 5516, in accordance with some embodiments. In some embodiments, after the drag operation on the hyperlink is initiated, the user optionally provide additional navigation inputs to navigate to different user interfaces and drops the hyperlink to permissible insertion locations on other user interfaces (e.g., after movement and then liftoff of contact 5516) (e.g., analogous to the process shown in FIGS. 5D9-5D15). In some embodiments, in response to detecting a light press input (or a touch-hold input, in some embodiments) by contact 5520, the device displays the second version of the preview 5156 showing a preview of the webpage corresponding to hyperlink 5148. In some embodiments, controls (e.g., controls 5160, 5164) associated with additional operations that can be performed with respect to hyperlink 5148 or webpage corresponding to the hyperlink are displayed concurrently with the second version of the preview (e.g., preview 5156 in FIG. 5D8). In some embodiments, the device generates tactile output in conjunction with display of the second version of the preview 5156. In some embodiments, the second version of the preview is displayed in response to liftoff of contact 5520 after the intensity threshold (or duration threshold) for displaying the second version of the preview is met by the input by contact 5520. In some embodiments, the second version of the preview (e.g., preview 5534 in FIG. 5D16) is displayed without requiring liftoff of contact 5502. For example, in some embodiments, after the second version of the preview (e.g., preview 5534 in FIG. 5D16) is displayed while contact 5520 is maintained on the touch-screen, an upward swipe input causes a sharing user interface (e.g., shown in FIGS. 5D23-5D24) corresponding to hyperlink 5148 to be displayed. In some embodiments, in response to detecting a tap input by contact 5518, the device ceases to display the first version of the preview and displays webpage 5151 (e.g., shown in FIG. 5D2) that corresponds to hyperlink 5148 (e.g., performs a navigation operation corresponding to the hyperlink 5148).

FIG. 5D7 following FIG. 5D4 illustrates an example scenario in which contact 5516 is kept substantially stationary for at least the second threshold amount of time T(I) greater than T(i) after touch-down of contact 5516. In response to detecting that the second time threshold T(I) has been met by contact 5516, the device generates tactile output 5536 to indicate that the second time threshold T(I) has been met. In some embodiments, the device displays visual indication showing that hyperlink 5148 is selected and is now the subject of subsequent operations that are performed in response to subsequent input by contact 5516. In some embodiments, if substantial movement of contact 5508 is detected after the contact has been kept substantially stationary for more than the second threshold amount of time T(I), a drag operation is initiated on hyperlink 5148 or a copy thereof, in accordance with the movement of contact 5508, e.g., as shown in FIGS. 5D9-5D15.

FIG. 5D8 follows either FIG. 5D6 or 5D7. The sequence of FIGS. 5D6 and 5D8 illustrate that a light press input or a touch-hold input by contact 5520 on the first version of the preview 5514 causes the device to switch from displaying the first version of the preview 5514 to displaying the second version of the preview 5156, in accordance with some embodiments. FIGS. 5D7 and 5D8 illustrate that, after the second time threshold T(I) has been met by a substantially stationary contact 5516, the second version of the preview 5156 is displayed in response to liftoff of contact 5516. In some embodiments, the device generates tactile output 5522 in conjunction with display of the second version of the preview 5156. In some embodiments, controls (e.g., controls 5160, 5164) associated with additional operations that can be performed with respect to hyperlink 5148 or webpage corresponding to the hyperlink are displayed concurrently with the second version of the preview (e.g., preview 5156 in FIG. 5D8).

FIGS. 5D9-5D11 following FIG. 5D4 illustrate an example scenario in which substantial movement of contact 5508 is detected after the first time threshold T(i) is met, and before the second time threshold T(I) is met. In response to detecting movement of contact 5508, a drag operation is performed on hyperlink 5148 or a copy thereof in accordance with the movement of contact 5508. In some embodiments, as shown in FIGS. 5D9-5D11, an acceptable insertion location for hyperlink 5148 is not available on webpage 5146, and when an end of the input (e.g., liftoff of contact 5508) is detected, the drag operation is canceled and hyperlink 5148 is not moved or copied to a different location. In some embodiments, the device generates tactile output 5524 to indicate resettlement of hyperlink 5146 into its original location in webpage 5146.

FIGS. 5D12-5D15 following FIG. 5D9 illustrate an example scenario in which substantial movement of contact 5508 is detected after the first time threshold T(i) has been met, and before the second time threshold T(I) is met. In response to detecting the movement of contact 5508, a drag operation is performed on hyperlink 5148 or a copy thereof in accordance with movement of contact 5508. In some embodiments, as shown in FIGS. 5D12-5D13, an upward edge swipe input by contact 5526 is detected at the bottom of user interface 5146, causing navigation to home screen user interface 5096, while a copy of hyperlink 5148 is dragged by contact 5508. In FIGS. 5D13-5D14, a tap input by contact 5528 on application icon 424 causes the device to launch the messages application and displays user interface 5014 with an input field of a message to a message recipient. When contact 5508 drags hyperlink 5148 over to an insertion point 5174 in the input field and liftoff while over the insertion point 5147, the content and/or meta data (e.g., URL text 5530) corresponding to hyperlink 5148 is inserted into the input field at insertion point 5147, as shown in FIGS. 5D14-5D15. In some embodiments, the device generates tactile output 5532 in conjunction with inserting the content and/or meta data corresponding to hyperlink 5148 into the input field.

In some embodiments, the interactions shown in FIGS. 5D5-5D6 are optional, and the time threshold T(i) is merged with the time threshold T(I) (e.g., with T(i) increased to T(I)), which means that the interactions described above (e.g., in FIGS. 5D1-5D4 and 5D7-5D15) with respect to a time window ending in T(i) are valid for a time window ending in T(I), but only a single version of the preview (e.g., preview of content, or preview of metadata) is shown.

FIG. 5D16 following FIG. 5D7 illustrates an example scenario in which contact 5508 has been kept substantially stationary for a third threshold amount of time T(II), greater than the first and second thresholds amount of time (e.g., T(i) and T(I)). In response to detecting that contact 5508 has been kept substantially stationary for the third threshold amount of time T(II), the device displays a slightly expanded second version of the preview 5534, including content of webpage 5151 shown in FIG. 5D2. The slightly expanded version of the second version of the preview is displayed while contact 5508 is maintained on the touch-screen at its original touch-down location.

FIG. 5D17 following FIG. 5D16 illustrates that liftoff of contact 5508 is detected after the contact has been kept substantially stationary for at least the third threshold amount of time T(II), without substantial movement before liftoff of the contact. In response to detecting the liftoff of contact 5508 after the contact has been kept substantially stationary for at least the third threshold amount of time T(II), the device displays the steady state second version of the preview 5156 overlaying background user interface 5158. In some embodiments, the device generates tactile output 5528 in conjunction with the display of the steady state second version of the preview 5156. In some embodiments, controls (e.g., control 5160) associated with operations that can be performed with respect to the webpage shown in the preview are concurrently displayed with the preview.

FIG. 5D18 continues from FIG. 5D16 and illustrates that, after the slightly enlarged second version of the preview 5534 is displayed, movement of contact 5508 is detected. Alternatively, FIG. 5D18 continues from FIG. 5D17 and illustrates that a subsequent swipe input by contact 5540 on the steady state second version of the preview 5156 is detected. FIGS. 5D19-5D21 following FIG. 5D18 illustrate that, in response to detecting movement of contact 5540 in a first predefined direction (e.g., downward), a drag operation is initiated that drags hyperlink 5148 or a copy 5540 thereof in accordance with the subsequent movement of contact 5508 or contact 5540. In FIG. 5D19, in accordance with a determination that a drag operation has been initiated, the device displays a transition showing preview 5156 or 5534 transforming into the copy 5166 of the hyperlink 5148 across restored user interface 5146 (e.g., with intermediate states 5534' and 5542). In FIG. 5D21, liftoff of contact 5540 is detected while a permissible insertion location for the dragged hyperlink is not available, and the drag operation is canceled and hyperlink 5148 is restored at its original location after the end of the drag input by contact 5540. In some embodiments, if a permissible insertion location is available (e.g., after additional input to navigate to another user interface) during the drag operation (e.g., as shown in FIGS. 5D12-5D15), the copy of the hyperlink is inserted at the permissible insertion location after the end of the drag input by contact 5508 or contact 5540.

FIG. 5D22 following FIG. 5D16 illustrates that, after the slightly enlarged second version of the preview 5534 is displayed, movement of contact 5508 is detected. Alternatively, FIG. 5D22 optionally continues from FIG. 5D17 and illustrates that a subsequent swipe input by another contact on the steady state second version of the preview 5156 is detected. FIGS. 5D23-5D24 continue from FIG. 5D22, where movement of the contact (e.g., contact 5508 or a subsequently detected contact on preview 5156) is detected after the second version of the preview (e.g., preview 5534 or preview 5156) is displayed. In accordance with a determination that the movement direction is a second predefined direction (e.g., upward), the device displays an indicator (e.g., indicator 5544) near the bottom edge of the display to indicate that additional upward movement of the contact (e.g., contact 5508 or a subsequently detected contact detected on preview 5156) may trigger additional operations. FIG. 5D23 illustrates that, as movement of the contact on the second version of the preview (e.g., preview 5534 or preview 5156) exceeds a predefined movement threshold, another indicator (e.g., indicator 5546) is displayed to indicate that an operation for displaying a sharing user interface is initiated. In some embodiments, indicator 5546 is displayed concurrently with the second version of the preview. In some embodiments, the second version of the preview is transformed into a reduced scale version of the preview 5554 (e.g., including a reduced set of content items from the second version of the preview 5156) in accordance with upward movement of the contact (e.g., contact 5508 or a subsequently detected contact on the preview 5156).

FIG. 5D24 follows FIG. 5D23 and illustrates that after more than a threshold amount of movement of the contact in the second direction is detected, liftoff of the contact (e.g., contact 5508 or a subsequently detected contact on the preview 5156) is detected. In response to detecting the end of the input by the contact, the device displays sharing user interface 5548 that corresponds to hyperlink 5148. As shown in FIG. 5D24, the sharing user interface 5548 includes a reduced scale version 5554 of the second version of the preview. The reduced scale version 5554 includes an image from webpage 5151 (e.g., shown in FIG. 5D2) or the preview 5156 (e.g., shown in FIG. 5D8), in accordance with some embodiments. In some embodiments, sharing user interface 5548 includes a background that is a blurred and/or darkened user interface 5146 (shown in FIG. 5D1). In some embodiments, sharing user interface 5548 includes a plurality of selectable options 5550 that correspond to a plurality of recipients for sharing the hyperlink 5146 or the webpage corresponding to the hyperlink, as well as a plurality of selectable options 5552 that correspond to a plurality of transmission protocols for sharing the hyperlink 5146 or the webpage corresponding to the hyperlink. For example, the plurality of selectable options 5550 represent a plurality of users selected from one or more applications with various sharing protocols, such as an address book application, an instant messaging application, an email application, a social network application, a file sharing application, a cloud storage application, a teleconference application, a peer-to-peer file transfer application, etc., and selection of a respective selectable option 5550 cause the device to initiate a sharing operation with the user corresponding to the selected option using a respective sharing protocol (e.g., a default sharing protocol corresponding to the selected user or the user interface object). In some embodiments, the plurality of selectable options 5550 represent a plurality of users that are available to receipt the shared content using a preset sharing protocol (e.g., direct peer-to-peer connection) (e.g., the users that are within a physical vicinity of the device and that permits the request for content sharing). In some embodiments, the plurality of selectable options 5552 represent a plurality of sharing protocols, including sharing using different applications (e.g., an instant messaging application, an email application, a social network application, a file sharing application, a cloud storage application, a teleconference application, a peer-to-peer file transfer application), or other communication protocols provided by the operating system of the device. In some embodiments, during the movement of the contact, before sharing user interface 5548 is fully revealed, reduced preview 5554 and the first and second pluralities of selectable options (e.g., including selectable options 5550 and 5552) moves upward together in accordance with movement of the contact, and optionally after liftoff of the contact (e.g., after the threshold amount of upward movement has been made by the contact).

FIG. 5D25 illustrates various inputs detected on sharing user interface 5548 after sharing user interface is displayed in FIG. 5D24. The various inputs include a downward swipe input by contact 5562 on the reduced scale version 5554 of the preview, a tap input by contact 5551 on a selectable option corresponding to a first recipient user (e.g., Ursula) among the plurality of potential recipients. In some embodiments, the plurality of recipients shown in the sharing user interface are dynamically updated in accordance with various criteria (e.g., physical proximity of users who are capable with receiving files using a preset sharing protocol (e.g., an ad hoc peer-to-peer direct transmission protocol based on a preset wireless communication protocol (e.g., Bluetooth, WiFi, etc.)), mutual permissions of users for sending to and receiving files from each other, users who communicated with the user of the device within a preset time window, etc.). The various inputs also include a tap input by contact 5558 on a second selectable option from the plurality of selectable options 5552, that corresponds to a first sharing protocol (e.g., sharing by direct peer-to-peer transmission); a tap input by contact 5556 on a third selectable option from the plurality of selectable options 5552 that corresponds to a second sharing protocol (e.g., sharing by instant messages); and a tap input by contact 5560 on a fourth selectable option from the plurality of selectable options 5552 that corresponds to a third sharing option (e.g., sharing by an email message). In some embodiments, a tap input on sharing user interface 5548 outside of regions occupied by the preview and the selectable options causes the device to dismiss the sharing user interface and restores display of the preview 5156 overlaying background user interface 5158, or restores display of browser user interface 5146 including hyperlink 5148.

FIG. 5D26 continues from FIG. 5D25 and illustrates that, in response to a downward swipe input by contact 5562 on the reduced scale version 5554 of the preview (or, optionally, a downward swipe input by a contact anywhere on sharing user interface 5548), the device cease to display the sharing user interface and restores display of the second version of the preview 5156, in accordance with some embodiments.

FIG. 5D27 continues from FIG. 5D25 and illustrates that, in response to a tap input by contact 5551 on the selectable option corresponding to the recipient "Ursula" among the plurality of selectable options 5552, transmission of the webpage or URL corresponding to hyperlink 5148 using a default sharing protocol (e.g., direct peer-to-peer transmission) is automatically started. In some embodiments, sharing user interface is updated (e.g., shown as user interface 5563) to show the reduced scale version 5554 of the preview, concurrently with an avatar 5564 of the selected recipient of the webpage or URL and a transmission progress indicator.

FIG. 5D28 continues from FIG. 5D25 and illustrates that, in response to a tap input by contact 5558 on a selectable option (e.g., "Transmit") corresponding to a sharing protocol for direct peer-to-peer transmission, the device updates the sharing user interface (e.g., shown as user interface 5566) to show a recipient selection panel 5568 that corresponds to the selected sharing protocol. Once the user selects a recipient from those shown in the recipient selection panel 5568, transmission of the webpage or URL to the selected recipient using the selected sharing protocol will start, e.g., in a manner analogous to that shown in FIG. 5D27.

FIG. 5D29 continues from FIG. 5D25 and illustrates that, in response to a tap input by contact 5560 on a selectable option (e.g., "Mail") corresponding to sharing using an email application, the device updates the sharing user interface (e.g., shown as user interface 5570) to show a draft email message 5572 with the webpage or URL embedded as an attachment or content of the email message. The user can enter a recipient address for the draft email message 5572, and activate the "send" button on the draft email message window to send the message with the shared content, in accordance with some embodiments. In some embodiments, the user can tap outside of the email message 5572 or on the "cancel" button on the draft email message window to return to the sharing user interface 5548, or return to browser user interface 5146 showing the webpage including the hyperlink 5146.

FIG. 5D30 continues from FIG. 5D25 and illustrates that, in response to a tap input by contact 5556 on a selectable option (e.g., "Messages") corresponding to sharing using an instant messaging application, the device updates the sharing user interface (e.g., shown as user interface 5574) to show a draft instant message 5576 with the webpage or URL embedded as an attachment 5578 or content of the instant message. The user can enter a recipient address for the draft instant message 5576, and activate the "send" button 5580 on the draft message window to send the instant message with the shared content, in accordance with some embodiments. In some embodiments, the user can tap outside of the instant message 5576 or on the "cancel" button on the message window to return to the sharing user interface 5548, or return to browser user interface 5146 showing the webpage including the hyperlink 5146.

FIGS. 5E1-5E4 illustrate various example user interaction models for interacting with a user interface object, in accordance with some embodiments.

In FIG. 5E1, an example of the user interface object is an application icon that is displayed on a home screen user interface. The operations that are integrated into the same interaction model includes launching an application corresponding to the application icon, navigating to a different page of the home screen user interface, displaying a quick action menu corresponding to the application icon, performing an operation that correspond to a selectable option on the quick action menu, starting a user interface reconfiguration mode for the home screen user interface, dragging the application icon to a different location on the home screen user interface, dragging and dropping the application icon to a different user interface (e.g., a different page of the home screen user interface or some other system or application user interfaces that are distinct from the home screen), and so on. Feedback including visual output, audio output, and/or tactile output are provided at various points of the interactions to indicate which operations are to be performed, the subject of the operations or upcoming operations, and the current state of the input gesture (e.g., current location, current movement state, movement and location history, timing and duration of current location and movement, timing and duration of past location and movement, timing and manner of termination of the input, etc.) as compared to various input thresholds and criteria corresponding to different operations. Although an application icon is used as a representative example user interface object in this interaction model, this interaction model is applicable to other types of user interface objects, such as user interface objects representing content items, notifications, and/or user interface controls, etc., displayed in other system user interfaces or application user interfaces. The corresponding operations for another type of user interface object include: activation of the user interface object, navigating within the user interface displaying the user interface object, displaying a quick action menu or preview corresponding to the user interface object, performing an operation that correspond to a selectable option on the quick action menu or preview, starting a user interface reconfiguration mode for the user interface, dragging the user interface object to a different location on the user interface, dragging and dropping the user interface object to a different user interface (e.g., a different user interface in the same application or a system user interface or user interface of a different application), and so on. Feedback including visual output, audio output and/or tactile output are similarly provided for different points during the interactions with these other types of user interface objects as well.

In FIG. 5E1, a contact is detected (5602) on a user interface object shown on a user interface (e.g., application icon shown on a home screen user interface (5623)), the device provides visual feedback (e.g., expanding the application icon) indicating detection of the contact on the user interface object. In accordance with a determination that the contact is kept substantially stationary and liftoff of the contact is detected (5603) before a first time threshold T(I) is reached, the device determines that the input is a tap input on the user interface object and activates the user interface object to perform a primary operation of the user interface object (e.g., launching an application (5604) corresponding to the application icon). In accordance with a determination that the contact is not kept substantially stationary before the first time threshold T(I) is reached (e.g., the contact moved (5605) by more than a nominal amount of movement), the device performs an operation within the user interface that is not specific to the user interface object in accordance with the movement of the contact (e.g., navigating (5606) to a different page of the home screen). In accordance with a determination that the contact has been kept substantially stationary and the first time threshold T(I) has been met, the device generates (5608) visual output (e.g., visual feedback such as reducing the size of the application icon) and/or tactile output (e.g., haptic feedback such as generating a haptic A) to indicate that the first time threshold has been met without substantial movement by the contact. In accordance with a determination that the contact moves by more than a nominal amount of movement after the contact has been kept substantially stationary for the first threshold amount of time T(I), the device optionally starts the user interface reconfiguration mode (5624) (e.g., dragging (5622) the application icon and starting (5620) the user interface reconfiguration mode simultaneously). If termination of the input (e.g., liftoff of the contact) is detected after the reconfiguration mode and the dragging of the user interface object (e.g., application icon) are started, the user interface object (e.g., application icon) is dropped (5626) into a new location (if available) or its original location (if a new location not available). In accordance with a determination that the input terminated (e.g., liftoff of the contact is detected) without substantial prior movement of the contact, after the first time threshold T(I) has been met (e.g., met with a substantially stationary contact) but before the second time threshold T(II) is met, the device determines that menu-display criteria are met and displays (5612) a steady state quick action menu corresponding to the user interface object (e.g., displaying a quick action menu for the application icon). In some embodiments, the device generates tactile output (e.g., haptic feedback) (5610) in conjunction with display of the steady state quick action menu. Subsequent inputs directed to the quick action menu or surrounding regions of the quick action menu causes performance of additional operations in the quick action menu or dismissal of the quick action menu. In accordance with a determination that the contact has been kept substantially stationary for the second threshold amount of time T(II), the device displays (5614) the quick action menu (e.g., slightly expanded quick action menu 5616) without requiring termination of the input (e.g., liftoff of the contact). Subsequent input selecting a menu option in the quick action menu can be performed by movement of the contact to the menu option and then liftoff of the contact. If termination of the input (e.g., liftoff of the contact) is detected (5613) after the contact has been kept substantially stationary for at least the second threshold amount of time T(II) but before the contact has been kept substantially stationary for the third threshold amount of time T(III) (e.g., subsequent movement of the contact after T(II) outside of the menu is permitted), the device transforms the slightly expanded quick action menu to the steady state quick action menu (5612), and generates (5610) tactile output (e.g., haptic feedback such as haptic B) in conjunction with the display of the steady state quick action menu. In accordance with a determination that the contact has been kept substantially stationary for the second threshold amount of time T(II), and then there is substantial movement of the contact after the second time threshold T(II) has been met but before the third time threshold T(III) is met, the device ceases to display (5618) the slightly expanded version of the quick action menu, starts (5620) user interface reconfiguration mode, and starts dragging (5622) the user interface object in accordance with the movement (5619) of the contact, simultaneously. When liftoff of the contact is subsequently detected, the user interface object is dropped at a new location (if available) or restored to its original location (if new location is not available), and the user interface remains in the reconfiguration mode. In accordance with a determination that the contact has been kept substantially stationary for the third threshold amount of time T(III), the device ceases to display (5618) the slightly expanded version of the quick action menu and starts (5620) the user interface reconfiguration mode, without requiring movement of the contact or termination of the input. If subsequent movement of the contact is detected, the user interface object is dragged in accordance with the movement of the contact during the user interface reconfiguration mode. If termination of the input is detected without substantial prior movement of the contact, the device remains in the user interface reconfiguration mode and the user interface object remains at its original location. A subsequent drag input on another user interface object moves the location of said other user interface object during the user interface reconfiguration mode. Other details of the interaction model shown in FIG. 5E1 are describe with respect to FIGS. 5C1-5C19 and FIGS. 9A-9G, and accompanying descriptions. Some aspects of the interaction model shown in FIG. 5E1 are described with respect to FIGS. 5A1-5A67, FIGS. 5B1-5B6, FIGS. 5D1-5D30, FIGS. 6A-6D, 7A-7B, 8A-8C, and 10A-10E, and accompanying descriptions.

In FIG. 5E2, an example of the user interface object is an icon representing a media item (e.g., an animated image) that is displayed on an application user interface of a first application. The operations that are integrated into the same interaction model include launching an application corresponding to the media item and playing the media item, scrolling the application user interface, displaying a preview of the media item, displaying an expanded preview of the media item, dragging the icon or the media item to a different location on the user interface, dragging and dropping the icon or media item into a different user interface (e.g., a different user interface in the same application or a user interface of a different application), displaying a sharing user interface for sharing the media item, and so on. Feedback including visual output, audio output, and/or tactile outputs are provided at various points of the interactions to indicate the operations that are to be performed, the subject of the operations or upcoming operations, and the current states of the input gesture (e.g., current location, current movement state, movement and location history, timing and duration of current location and movement, timing and duration of past location and movement, timing and manner of termination of the input, etc.) as compared to various input thresholds and criteria corresponding to different operations. Although an icon representing a media item is used as a representative example user interface object in this interaction model, this interaction model is applicable to other types of user interface objects, such as user interface objects representing other types of content items, notifications, application icons, and/or user interface controls, etc., displayed in system user interfaces or other application user interfaces, in accordance with various embodiments. The corresponding operations for another type of user interface object include: activation of the user interface object, navigating within the user interface and displaying the user interface object, displaying a quick action menu or preview corresponding to the user interface object, performing an operation that correspond to a selectable option on the quick action menu or preview, dragging the user interface object to a different location on the user interface, dragging and dropping the user interface object into a different user interface (e.g., a different user interface in the same application or a system user interface or user interface of a different application), displaying a sharing user interface for sharing the user interface object or content corresponding to the user interface object, and so on. Feedback including visual output, audio output, and/or tactile output are similarly provided for different points during the interactions with these other types of user interface objects as well.

In FIG. 5E2, a contact is detected (5702) on a user interface object shown on a first user interface (e.g., icon shown on a first application user interface), and the device provides visual feedback (e.g., expanding the icon) indicating detection of the contact on the user interface object. In accordance with a determination that the contact is kept substantially stationary and liftoff of the contact is detected (5703) before a first time threshold T(I) is reached, the device determines that the input is a tap input on the user interface object and activates the user interface object to perform a primary operation of the user interface object (e.g., opening (5704) the media item by launching an application corresponding to the media item). In accordance with a determination that the contact is not kept substantially stationary before the first time threshold T(I) is reached (e.g., the contact moved (5705) by more than the nominal amount of movement), the device performs an operation within the user interface that is not specific to the user interface object in accordance with the movement of the contact (e.g., scrolling (5706) the first user interface). In accordance with a determination that the contact has been kept substantially stationary and the first time threshold T(I) is met (e.g., met with the substantially stationary contact), the device generates (5708) visual feedback (e.g., reducing the size of the icon) and/or haptic feedback (e.g., generating a haptic A) to indicate that the first time threshold has been met without substantial movement of the contact. In accordance with a determination that the contact moves (5723) by more than the nominal amount of movement after the contact has been kept substantially stationary for the first threshold amount of time T(I), the device initiates (5724) a drag operation on the icon or a copy thereof. In accordance with subsequent movement (5725) of the contact, the icon or a copy thereof is dragged (5728) to a new location. If termination of the input (e.g., liftoff of the contact (5727)) is detected after the dragging of the user interface object (e.g., the icon) is started, the user interface object (e.g., the icon) is dropped (5730) into a new location (if available) or its original location (if a new location not available). In accordance with a determination that the input terminated (e.g., liftoff of the contact is detected (5707)) without substantial prior movement of the contact, after the first time threshold T(I) has been met but before the second time threshold T(II) is met (e.g., met with the substantially stationary contact), the device determines that preview-display criteria are met and displays a steady state preview (5712) corresponding to the user interface object (e.g., displaying a preview of the media item). In some embodiments, the device generates a tactile output (e.g., as haptic feedback) (5710) in conjunction with display of the steady state preview (5712). Subsequent inputs directed to the preview or surrounding regions of the preview causes performance of additional operations in the preview or dismissal of the preview. In accordance with a determination that the contact has been kept substantially stationary (5718) for the second threshold amount of time T(II), the device displays (5714) the preview (e.g., slightly expanded preview 5716) without requiring termination of the input (e.g., liftoff of the contact). Subsequent input selecting a control concurrently displayed with the preview can be performed by movement of the contact to the control and then liftoff of the contact. If termination of the input (e.g., liftoff of the contact) is detected (5721) after the contact has been kept substantially stationary for at least the second threshold amount of time T(II) (e.g., subsequent movement of the contact after T(II) and outside of the menu is permitted), the device transforms the slightly expanded preview (5716) to the steady state preview (5712), and generates (5710) a tactile output (e.g., as haptic feedback (e.g., haptic B)) in conjunction with the display of the steady state preview. In accordance with a determination that the contact has been kept substantially stationary for the second threshold amount of time T(II), and then there is substantial movement of the contact (5719) in a first predefined direction (e.g., downward) after the second time threshold T(II) is met (e.g., met by the substantially stationary contact), the device ceases to display (5726) the slightly expanded version of the preview and starts (5724) a dragging operation on the user interface object and continues to drag (5728) the user interface object in accordance with the movement (5725) of the contact. When liftoff of the contact (5727) is subsequently detected, the user interface object is dropped at a new location (if available) or restored to its original location (if a new location is not available). In accordance with a determination that termination of the input (e.g., liftoff of the contact) is detected (5721) after the contact has been kept substantially stationary for at least the second threshold amount of time T(II), and there is no substantial movement of the contact before termination of the input, the device displays the steady state preview (5712) and generates a tactile output (e.g., as haptic feedback) (5710) in conjunction with displaying the steady state preview, without requiring termination of the input (and without requiring an increase in intensity of the contact above a light press intensity threshold). In some embodiments, a subsequent downward swipe input on the steady state preview also causes the device to cease to display the steady state preview (5726) and initiates a drag operation (5724) on the user interface object. After the drag operation is initiated, subsequent movement (5725) of the input drags (5728) the user interface object, and termination of the input drops (5730) the user interface object to a new location or to its original location (e.g., depending on whether a permissible drop location is available). In addition, a tap input on the steady state preview 5712 (e.g., outside of the controls concurrently displayed with the preview of the media item) also causes the operation to open the media item (5704) in accordance with some embodiments. In some embodiments, a subsequent upward swipe input on the steady state preview causes the device to display a sharing user interface (5732) for sharing the user interface object or content corresponding to the user interface object. The sharing user interface includes a reduced preview (5736) of the media item, and a plurality of selectable options (5734) corresponding to different recipients and different sharing protocols. A sharing operation is performed in response to a selection input on the sharing user interface. A downward swipe on the sharing user interface restores the stead state preview or the first user interface, in accordance with various embodiments. In some embodiments, a downward swipe initiates a drag operation on the user interface object or a copy thereof after the sharing user interface is dismissed. In accordance with a determination that the contact has been kept substantially stationary for the second threshold amount of time T(II), and then there is substantial movement of the input (5731) in a second predefined direction (e.g., upward) after the second time threshold T(II) is met, the device transforms the slightly expanded version of the preview into the sharing user interface (5732) for sharing the user interface object or content corresponding to the user interface object. A sharing operation is performed in response to a selection input on the sharing user interface by the same contact or a subsequent input by a different contact. A downward swipe (e.g., by the same contact or a subsequent input by a different contact) on the sharing user interface restores the stead state preview or the first user interface, in accordance with various embodiments. In some embodiments, a downward swipe (e.g., by the same contact or a subsequent input by a different contact) initiates a drag operation on the user interface object or a copy thereof after the sharing user interface is dismissed. Other details of the interaction model shown in FIG. 5E2 are describe with respect to FIGS. 5D1-5D30 and FIGS. 9A-9G and 10A-10E, and accompanying descriptions. Some aspects of the interaction model shown in FIG. 5E2 are described with respect to FIGS. 5A1-5A67, FIGS. 5B1-5B6, 5C1-5C19, FIGS. 6A-6D, 7A-7B and 8A-8C, and accompanying descriptions.

In FIG. 5E3, an example of the user interface object is a hyperlink representing a webpage that is displayed on an application user interface of a first application (e.g., a browser). The operations that are integrated into the same interaction model includes navigating to the webpage corresponding to the hyperlink and displaying the webpage, scrolling the webpage in the browser user interface, displaying a first version of a preview of the webpage (e.g., including the URL text of the hyperlink), displaying a second version of the preview of the webpage (e.g., displaying a image or excerpts of the webpage), dragging the hyperlink or webpage to a different location on the user interface, dragging and dropping the hyperlink or webpage to a different user interface (e.g., a different user interface in the same application or a user interface of a different application), displaying a sharing user interface for sharing the hyperlink or webpage, and so on. Feedback including visual output, audio output, and/or tactile output are provided at various points of the interactions to indicate the operations that are to be performed, the subject of the operations or upcoming operations, and the current states of the input gesture (e.g., current location, current movement state, movement and location history, timing and duration of current location and movement, timing and duration of past location and movement, timing and manner of termination of the input, etc.) as compared to various input thresholds and criteria corresponding to different operations. Although a hyperlink representing a webpage is used as a representative example user interface object in this interaction model, this interaction model is applicable to other types of user interface objects, such as user interface objects representing other types of content items, notifications, application icons, and/or user interface controls, etc., displayed in system user interfaces or other application user interfaces. The corresponding operations for another type of user interface object include: activation of the user interface object, navigation within the user interface and displaying the user interface object, displaying a first version of a preview corresponding to the user interface object that includes metadata of the user interface object, displaying a second version of the preview corresponding to the user interface object that includes excerpts of content corresponding to the user interface object, performing an operation that correspond to a selectable option on preview, navigating to the application corresponding to the content item from the previews or navigating between different versions of the previews, dragging the user interface object to a different location on the user interface, dragging and dropping the user interface object into a different user interface (e.g., a different user interface in the same application or a system user interface or user interface of a different application), displaying a sharing user interface for sharing the user interface object or content corresponding to the user interface object, and so on. Feedback including visual output, audio output and/or tactile output are similarly provided for different points during the interactions with these other types of user interface objects as well.

In FIG. 5E3, a contact is detected (5802) on a user interface object shown on a first user interface (e.g., hyperlink shown on a browser user interface), and the device provides visual feedback (e.g., highlighting the hyperlink) indicating detection of the contact on the user interface object. In accordance with a determination that the contact is kept substantially stationary and liftoff of the contact is detected (5803) before a first time threshold T(i) is reached, the device determines that the input is a tap input on the user interface object and activates the user interface object to perform a primary operation of the user interface object (e.g., opening (5804) the webpage by navigating to the webpage in the current browser window or open a new browser window). In accordance with a determination that the contact is not kept substantially stationary before the first time threshold T(i) is reached (e.g., the contact moved (5805) by more than a nominal amount of movement), the device performs an operation within the user interface that is not specific to the user interface object in accordance with the movement of the contact (e.g., scrolling (5806) the first user interface). In accordance with a determination that the contact has been kept substantially stationary and the first time threshold T(i) is met, the device optionally generates (5808) visual feedback (e.g., raising the hyperlink off the first user interface) and/or haptic feedback (e.g., generating a haptic A) to indicate that the first time threshold has been met without substantial movement by the contact. In accordance with a determination that the input terminated (e.g., liftoff of the contact is detected (5807)) without substantial prior movement of the contact after the first time threshold T(i) has been met but before the second time threshold T(I) is met, the device determines that first preview-display criteria are met and displays a steady state first version of the preview (5810) corresponding to the user interface object (e.g., displaying a preview showing metadata (e.g., URL text) of the hyperlink). In some embodiments, the device generates a tactile output (e.g., haptic feedback) in conjunction with display of the steady state first version of the preview. Subsequent inputs directed to the preview or surrounding regions of the preview causes performance of additional operations in the preview or dismissal of the preview. For example, another touch-hold input or light press input (e.g., by the same contact or a subsequent by another contact) on the first version of the preview (5809) causes the first version of the preview to transform to a slightly expanded second version of the preview (5812). Subsequent movement in a first direction (e.g., downward movement) of the contact on the slightly expanded second version of the preview causes the device to cease to display (5824) the preview and initiates (5822) a drag operation on the hyperlink or a copy thereof. Additional subsequent movement (5827) of the contact continues to drag (5826) the hyperlink and termination of the drag input (e.g., liftoff of the contact (5828)) drops (5829) the hyperlink (5818) or webpage corresponding to the hyperlink to a new location or its original location (if new location is not available). Alternatively, subsequent movement in a second direction (e.g., upward movement) of the contact on the slightly expanded second version of the preview causes the device to display a sharing user interface (5820) for sharing the hyperlink or the webpage corresponding to the hyperlink. In accordance with a determination that the contact moves (5821) by more than the nominal amount of movement after the contact has been kept substantially stationary for the first threshold amount of time T(i) but not for the second threshold amount of time T(I), the device initiates (5822) a drag operation on the hyperlink or a copy thereof. In accordance with subsequent movement (5827) of the contact, the hyperlink or a copy thereof is dragged (5826) to a new location. If termination of the input (e.g., liftoff of the contact (5828)) is detected after the dragging of the user interface object (e.g., the hyperlink) is started, the user interface object (e.g., the hyperlink (5818)) is dropped (5829) into a new location (if available) or its original location (if a new location not available). In accordance with a determination that the contact has been kept substantially stationary for the second threshold amount of time T(I), the device generates visual output (e.g., visual feedback such as lifting the hyperlink off the browser user interface) and tactile output (e.g., haptic feedback such as haptic A) to indicate that the second time threshold T(I) has been met with a substantially stationary contact. In accordance with a determination that the contact moves (5823) by more than a nominal amount of movement after the contact has been kept substantially stationary for the second threshold amount of time T(I) but not for the third threshold amount of time T(II), the device initiates (5822) a drag operation on the hyperlink or a copy thereof. In accordance with subsequent movement (5827) of the contact, the hyperlink or a copy thereof is dragged (5826) to a new location. If termination of the input (e.g., liftoff of the contact (5828)) is detected after the dragging of the user interface object (e.g., the hyperlink) is started, the user interface object (e.g., the hyperlink (5818)) is dropped (5829) into a new location (if available) or its original location (if a new location not available). In accordance with a determination that the input terminated (e.g., liftoff of the contact is detected (5811)) without substantial prior movement of the contact, after the second time threshold T(I) has been met but before the third time threshold T(II) is met (e.g., met with the substantially stationary contact), the device determines that second preview-display criteria are met and displays a steady state second version of the preview (5814) corresponding to the user interface object (e.g., displaying a preview of the webpage content). In some embodiments, the device generates a tactile output (e.g., haptic feedback) in conjunction with display of the steady state second version of the preview (5814). Subsequent inputs directed to the preview or surrounding regions of the preview causes performance of additional operations in the preview or dismissal of the preview. In some embodiments, a subsequent downward swipe input on the steady state second version of the preview (5814) also causes the device to cease to display the steady state second version of the preview (5824) and initiates a drag operation (5822) on the user interface object. After the drag operation is initiated, subsequent movement (5827) of the input drags (5826) the user interface object, and termination of the input drops (5829) the user interface object to a new location or to its original location (e.g., depending on whether a permissible drop location is available). In addition, a tap input on the steady state second version of the preview 5814 (e.g., outside of the controls concurrently displayed with the preview of the webpage) also causes the operation to open the webpage in accordance with some embodiments. In some embodiments, a subsequent upward swipe input on the steady state second version of the preview (5814) causes the device to display a sharing user interface (5820) for sharing the user interface object or content corresponding to the user interface object. The sharing user interface includes a reduced preview of the webpage, and a plurality of selectable options corresponding to different recipients and different sharing protocols. A sharing operation is performed in response to a selection input on the sharing user interface. A downward swipe on the sharing user interface restores the stead state second version of the preview or the first user interface, in accordance with various embodiments. In some embodiments, a downward swipe initiates a drag operation on the user interface object (e.g., the hyperlink) or a copy thereof after the sharing user interface is dismissed. In accordance with a determination that the contact has been kept substantially stationary (5813) for the third threshold amount of time T(II), the device displays (5714) the second version of the preview (e.g., slightly expanded second version of the preview 5812) without requiring termination of the input (e.g., liftoff of the contact) or increase in intensity of the contact. Subsequent input selecting a control concurrently displayed with the preview can be performed by movement of the contact to the control and then liftoff of the contact. If termination of the input (e.g., liftoff of the contact) is detected (5815) after the contact has been kept substantially stationary for at least the third threshold amount of time T(II), the device transforms the slightly expanded second version of the preview (5812) to the steady state second version of the preview (5814), and generates a tactile output (e.g., haptic feedback) in conjunction with the display of the steady state second version of the preview. In accordance with a determination that the contact has been kept substantially stationary for the third threshold amount of time T(II), and then there is more than a nominal amount of movement (5825) in a first predefined direction (e.g., downward) after the third time threshold T(II) is met, the device ceases to display (5824) the slightly expanded second version of the preview and starts (5822) a dragging operation on the user interface object and continues to drag (5826) the user interface object in accordance with the movement (5827) of the contact. When liftoff of the contact (5828) is subsequently detected, the user interface object is dropped at a new location (if available) or restored to its original location (if new location is not available). In accordance with a determination that termination of the input (e.g., liftoff of the contact) is detected (5817) after the contact has been kept substantially stationary for at least the third threshold amount of time T(II), and there is no more than the nominal amount of movement before termination of the input, the device displays the steady state second version of the preview (5814) and generates a tactile output (e.g., haptic feedback) in conjunction with displaying the steady state second version of the preview. In accordance with a determination that the contact has been kept substantially stationary for the third threshold amount of time T(II), and then there is more than a nominal amount of movement (5819) in a second predefined direction (e.g., upward) after the third time threshold T(II) is met, the device transforms the slightly expanded second version of the preview into the sharing user interface (5820) for sharing the user interface object or content corresponding to the user interface object. A sharing operation is performed in response to a selection input on the sharing user interface by the same contact or a subsequent input by a different contact. A downward swipe (e.g., by the same contact or a subsequent input by a different contact) on the sharing user interface restores the stead state second version of the preview or the first user interface, in accordance with various embodiments. In some embodiments, a downward swipe (e.g., by the same contact or a subsequent input by a different contact) initiates a drag operation on the hyperlink or a copy thereof after the sharing user interface is dismissed. Other details of the interaction model shown in FIG. 5E3 are describe with respect to FIGS. 5D1-5D30 and FIGS. 9A-9G and 10A-10E, and accompanying descriptions. Some aspects of the interaction model shown in FIG. 5E3 are described with respect to FIGS. 5A1-5A67, FIGS. 5B1-5B6, 5C1-5C19, FIGS. 6A-6D, 7A-7B and 8A-8C, and accompanying descriptions.

In FIG. 5E4, an example of the user interface object is a control that is displayed on a control user interface including various controls. The operations that are integrated into the same interaction model includes switching between different modes of the control, scrolling the control user interface, adjusting a current value of the control, displaying an expanded version of the control or displaying a control model that includes the control and other controls, and so on. Feedback including visual output, audio output, and/or tactile output are provided at various points of the interactions to indicate the operations that are to be performed, the subject of the operations or upcoming operations, and the current states of the input gesture (e.g., current location, current movement state, movement and location history, timing and duration of current location and movement, timing and duration of past location and movement, timing and manner of termination of the input, etc.) as compared to various input thresholds and criteria corresponding to different operations. Although a control on a control user interface is used as a representative example user interface object in this interaction model, this interaction model is applicable to other types of user interface objects, such as user interface objects representing content items, notifications, and/or user interface controls, etc., displayed in other system user interfaces or application user interfaces, in accordance with various embodiments. The corresponding operations for another type of user interface object include: activation of the user interface object, navigating within the user interface displaying the user interface object, displaying an expanded version or enhanced version of the user interface object, adjusting a value of the user interface object, and so on. Feedback including visual output, audio output, and/or tactile output are similarly provided for different points during the interactions with these other types of user interface objects as well.

In FIG. 5E4, a contact is detected (5902) on a user interface object (e.g., a screen brightness control, a flashlight control, a volume control, a network connectivity control, etc.) shown on a user interface (e.g., a system level control user interface for controlling various functions of the device), and the device provides visual feedback (e.g., expanding the control icon slightly) indicating detection of the contact on the user interface object. In accordance with a determination that the contact is kept substantially stationary and liftoff of the contact is detected (5903) before a first time threshold T(I) is reached, the device determines that the input is a tap input on the user interface object and switches to a different mode of the control (e.g., toggling to a different mode from the current mode of the control (e.g., turning ON/OFF a device function (e.g., nightshift mode, flashlight, ringer, airplane mode, etc.) that corresponds to the control)). In accordance with a determination that the contact is not kept substantially stationary before the first time threshold T(I) is reached (e.g., the contact moved (5905) by more than a nominal amount of movement), the device performs an operation within the control user interface that is not specific to the user interface object in accordance with the movement of the contact (e.g., scrolling (5906) the control user interface). In some embodiments, the device optionally adjusts a value of the control if the control is a slider control and the direction of movement is along the direction of the slider control. In accordance with a determination that the contact has been kept substantially stationary and the first time threshold T(I) is met, the device generates a tactile output (e.g., haptic feedback such as haptic A) (5908)) to indicate that the first time threshold has been met with no more than a nominal amount of movement by the contact. In addition, the device displays an expanded version of the control (5910) or an expanded control module that includes the control and one or more additional controls that were not initially displayed on the control user interface, without requiring termination of the input and without requiring an increase in intensity of the contact above a light press intensity threshold. In accordance with a determination that the contact moves by more than the nominal amount of movement after the contact has been kept substantially stationary for the first threshold amount of time T(I), the device adjusts (5912) the value of the control and displays the adjustment of the control in the expanded version of the control or in the control shown in the expanded control model. If termination of the input (e.g., liftoff of the contact) is detected (5917) or (5913) after the expanded control or expanded control module is displayed (e.g., with or without movement of the contact after the first time threshold is met), the device maintains display of the expanded control or expanded control module (e.g., a steady state version 5916 that is slightly reduced in size as compared to the version of control 5910). In some embodiments, the device generates a tactile output (e.g., haptic feedback such as haptic B (5918)) in conjunction with lift-off of the contact. Other details of the interaction model shown in FIG. 5E4 are describe with respect to FIGS. 5A1-5A67, FIGS. 5B1-5B6, FIGS. 5C1-5C19, FIGS. 5D1-5D30, FIGS. 6A-6D, 7A-7B, 8A-8C, 9A-9G, and 10A-10E, and accompanying descriptions.

Although many operations, criteria, thresholds are described in the examples in FIGS. 5E1-5E4, it is appreciated that, in accordance with various embodiments, not all features described in FIGS. 5E1-5E4 need to be implemented or implemented in the exact order as described, and additional features described in this disclosure may be combined with the features described in FIGS. 5E1-5E4, in accordance with various embodiments.

FIGS. 6A-6D are flow diagrams illustrating method 600 of interacting with user interface objects, in accordance with some embodiments. Method 600 is performed at an electronic device (e.g., portable multifunction device 100, FIG. 1A, or device 300, FIG. 3) with a display (e.g., touch screen 112, FIG. 1A, or display 340, FIG. 3) and an input element (e.g., a touch-sensitive surface such as touch screen 112, FIG. 1A, or touch pad 355, FIG. 3, or another type of input device such as keyboard/mouse 350, FIG. 3, or other input device 116, FIG. 1A). In some embodiments, the device includes one or more output devices, such as one or more tactile output generators (e.g., tactile output generator(s) 167, FIG. 1A, or tactile output generator(s) 357, FIG. 3)

and/or one or more audio output generators (e.g., speaker 111 optionally in combination with audio circuitry 110, FIG. 1A). Some operations in method 600 are, optionally, combined and/or the order of some operations is, optionally, changed.

As described below, method 600 provides intuitive and easy ways for a user to interact with applications while providing improved non-visual feedback about operations that will be performed in response to the interactions. Generating tactile outputs for inputs that meet certain criteria indicates to the user that a particular operation or type of operation associated with meeting the criteria will be performed, whereas forgoing generating the tactile outputs for inputs that do not meet the criteria indicates that the particular operation or type of operation will not be performed (and, optionally, indicates that a different operation or type of operation will be performed). Generally, providing feedback that is non-visual also assists users when they are not looking at the display and users who are visually-impaired. In addition, method 600 enables a user to access many different features for an application simply through varying properties, such as timing, pressure, and/or movement, of inputs directed to the application, rather than requiring users to provide numerous inputs and navigate through complex control menus. Providing improved feedback while reducing the number of inputs needed to perform an operation and while providing additional control options without cluttering the user interface with additional displayed controls enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

The device displays (602), on the display, a user interface object (e.g., a link, content item, notification, application icon, or the like) that corresponds to a first application (e.g., in a system user interface such as a wake screen, notification display region, home screen, or the like that includes user interface objects corresponding to a plurality of different applications or to a different application that is not the first application).

While displaying the user interface object, the device detects (604), via the input element, a first input directed to the user interface object.

In response to detecting the first input directed to the user interface object (606), in accordance with a determination that the first input meets a first input threshold and includes less than a threshold amount of movement, the device generates (608) a non-visual output (e.g., tactile and/or audio output) corresponding to the first input before detecting an end of the first input (e.g., when the input meets the first input threshold), and, after detecting an end of the first input (e.g., liftoff of the touch or a decrease in intensity of the input below an intensity threshold), the device displays a system user interface (e.g., a menu with actions corresponding to the application and/or a preview of content corresponding to the application) that includes information about the first application without displaying the first application. In some embodiments, the system user interface is not displayed before the input meets the first input threshold. In some embodiments, the system user interface is not displayed before the end of the input.

For example, as described herein with reference to FIG. 5A8, in response to detecting contact 5024 directed to notification 5008 in wake screen user interface 5004, in accordance with a determination that contact 5024 is maintained for at least the threshold amount of time T(I) and includes less than a threshold amount of movement, tactile output 5028 is generated. After liftoff of contact 5024, as shown in FIG. 5A10, a system user interface that includes expanded notification 5032 is displayed. In another example, FIGS. 5A21-5A23 illustrate tactile output 5060 generated in response to contact 5052 meeting the input threshold, and preview 5066 displayed in response to detecting liftoff of contact 5052. Additional examples are given in FIGS. 5A37-5A39 with respect to a home screen user interface and application launch icons, and in FIGS. 5A58-5A60 with respect to a user interface of a web browser application.

In response to detecting the first input directed to the user interface object (606), in accordance with a determination that the first input does not meet the first input threshold and includes less than the threshold amount of movement, the device forgoes (610) generating a non-visual output (e.g., tactile and/or audio output) corresponding to the first input, and, after detecting an end of the first input, the device displays the first application on the display (e.g., replacing display of the user interface in which the user interface object was displayed with the user interface for the first application). For example, as described herein with reference to FIGS. 5A6-5A7, in response to detecting contact 5024 directed to notification 5008 in wake screen user interface 5004, in accordance with a determination that contact 5024 is not maintained for the threshold amount of time T(I) and that contact 5024 includes less than the threshold amount of movement, no tactile or audio output is generated. After liftoff of contact 5024, as shown in FIG. 5A7, user interface 5014 of a messages application corresponding to notification 5008 is displayed, and replaces display of wake screen user interface 5004.

In another example, FIGS. 5A19-5A20 illustrate that no tactile or audio output is generated in response to detecting contact 5052 and in accordance with a determination that contact 5052 is not maintained for the threshold amount of time T(I) and that contact 5052 includes less than the threshold amount of movement. After liftoff of contact 5052, as shown in FIG. 5A20, user interface 5054 of an emoji media recording application is displayed, and replaces display of user interface 5014 of the messages application. Additional examples are given in FIGS. 5A31-5A32 with respect to the home screen user interface and application launch icons, and in FIGS. 5A56-5A57 with respect to the user interface of the web browser application.

In some embodiments, in response to detecting the first input directed to the user interface object, in accordance with a determination that the first input does not meet the first input threshold and includes more than the threshold amount of movement (e.g., a determination that the input moves more than the threshold amount before meeting the first input threshold), the device performs (612) an operation corresponding to the first input (e.g., dismissing a notification, navigating to a next page of application icons, scrolling through content) without displaying additional information associated with the application (e.g., without displaying the information about the first application, such as a menu with actions corresponding to the application or the preview of content corresponding to the application, and without displaying the application). For example, as described herein with reference to FIGS. 5A33-5A35, in accordance with a determination that the input by contact 5110 includes more than the threshold amount of movement before contact 5110 has been maintained for the threshold amount of time T(I), the home screen user interface is scrolled to a different page without displaying additional information associated with an application (such as a system user interface including quick action menu 5120 associated with the messaging application, FIG. 5A39, or the quick actions menu 5130 and mini application object 5128 associated with the photos application, FIG. 5A42).

Performing an operation other than displaying additional information associated with the application for inputs that include movement before a particular input threshold is met, as compared to operations performed for inputs with relatively little movement or with movement after meeting the threshold, enables the user to access additional features of a device by adjusting the timing and movement of the input without requiring display of additional user interface controls or additional inputs. Providing the user with additional control options without cluttering the user interface with additional controls, and reducing the number of inputs needed to perform an operation, enhance the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, in response to detecting the first input directed to the user interface object, in accordance with a determination that the first input meets the first input threshold and includes more than the threshold amount of movement (e.g., after meeting the first input threshold), the device drags (or moves) (614) the user interface object relative to one or more user interface objects displayed on the display (e.g., one or more user interface objects other than the user interface object to which the first input is directed). In some embodiments, the user interface object is dragged in accordance with the magnitude and/or direction of a touch input moving on a touch-sensitive surface (e.g., touch-sensitive display) of the device. For example, as described herein with reference to FIG. 5A26, in accordance with a determination that contact 5052 moves by at least the threshold amount after being maintained for the threshold amount of time T(I), a copy 5090 of media object icon 5022 is dragged across messages user interface 5014 in accordance with movement of contact 5052. In another example, as described herein with reference to FIGS. 5A43-5A44, in accordance with a determination that contact 5110 is maintained for the threshold amount of time T(I) and includes more than the threshold amount of movement, application icon 424 is dragged across home screen user interface 5096 in accordance with movement of contact 5110. Additional examples are given in FIGS. 5A61-5A67 with respect to the user interface of the web browser application.

Dragging a user interface object relative to other displayed user interface objects in response to detecting movement of an input after a particular input threshold is met, as compared to operations performed for inputs with relatively little movement or for inputs where movement occurs before the threshold is met, enables the user to access additional features of a device by adjusting the timing and movement of the input without requiring display of additional user interface controls or additional inputs. Providing the user with additional control options without cluttering the user interface with additional controls, and reducing the number of inputs needed to perform an operation, enhance the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, in response to detecting that the first input includes more than the threshold amount of movement (e.g., after meeting the first input threshold), the device generates (616) a non-visual output (e.g., tactile and/or audio output) that indicates that the first input includes more than the threshold amount of movement (e.g., tactile output 5086, FIG. 5A26; tactile output 5134, FIG. 5A33; tactile output 5168, FIG. 5A62). In some embodiments, the user interface object does not start to be dragged out of its current position until the input includes more than the threshold amount of movement. Generating a non-visual output, such as a tactile and/or an audio output, when an input moves by more than a threshold amount, provides non-visual feedback to the user that a movement-related operation will be performed rather than an operation associated with relatively little input movement. Providing improved feedback enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, in response to detecting the first input directed to the user interface object, in accordance with a determination that the first input includes more than the threshold amount of movement (e.g., without regard to whether or not the input meets the first input threshold), the device forgoes (618) displaying additional information associated with the application (e.g., by cancelling display of the application preview, an expanded notification view, the quick action menu, or the application user interface). For example, movement of contact 5024 as shown in FIGS. 5A13, 5A14-5A15, and 5A17-5A18 cancels display of expanded notification 5032 (as shown in FIG. 5A10). In some embodiments, in addition to forgoing displaying the additional information, the device also navigates through the user interface (e.g., by scrolling in one or two dimensions) in accordance with the amount of movement of the input (e.g., as shown in FIGS. 5A17-5A18). Canceling performance of an operation that is about to be performed in response to the user moving the input away from its initial location allows the user to quickly cancel impending operations using an intuitive gesture. Providing additional control options without cluttering the user interface with additional displayed controls, and allowing the user to avoid inadvertent or unintended operations being performed, enhance the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, the system user interface includes (620) a plurality of user-selectable actions associated with the first application. For example, as described herein with reference to FIG. 5A23, the system user interface includes preview 5066 and user interface objects corresponding to different operations, such as copy button 5070, save button 5072, and forward button 5074. Additional examples are given in FIGS. 5A39 and 5A42 with respect to the home screen user interface (e.g., quick action menu 5120 includes selectable options for composing a new message or composing a message to a particular suggested contact), and in FIG. 5A60 with respect to the user interface of the web browser application (e.g., preview 5156 of the webpage corresponding to hyperlink 5148 is displayed with controls 5160, 5162, and 5164). In some embodiments, the plurality of actions is displayed along with a preview of content associated with the first application. In some embodiments, user selection of one of the actions causes the device to perform the action associated with the first application. In some embodiments, the plurality of actions and/or the preview of the content associated with the first application are not displayed until the first input threshold is met. In some embodiments, the plurality of actions and/or the preview of the content associated with the first application are not displayed until the end of the input (e.g., a reduction in intensity of the input below a threshold intensity, or liftoff of a touch from the touch-sensitive surface). Presenting a plurality of actions associated with the first application in response to an input that meets a particular input threshold and includes relatively little movement enables the user quickly access relevant actions for the application by requesting display of those actions through an intuitive gesture, without preemptively displaying controls before they are requested. Providing additional control options without cluttering the user interface with additional displayed controls enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, while displaying the system user interface, the device detects (622) an input corresponding to a request to dismiss the system user interface and, in response to detecting the input corresponding to the request to dismiss the system user interface, dismisses the system user interface and generates a non-visual output (e.g., tactile and/or audio output) corresponding to dismissal of the system user interface. For example, as described herein with reference to FIGS. 5A11-5A12, tap input by contact 5036 requesting dismissal of the system user interface that includes expanded notification 5032, and, in response, the device ceases to display the system user interface and restores wake screen user interface 5004, and generates tactile output 5038. In some embodiments, selection of the system user interface (e.g., a tap gesture at or corresponding to a location within the displayed system user interface) causes the device to dismiss the system user interface. In some embodiments, selection outside of the system user interface (e.g., a tap gesture at or corresponding to a location on the display that is outside of the displayed system user interface) causes the device to dismiss the system user interface. In some embodiments, selection of the system user interface causes the device to display the first application, and selection outside of the system user interface causes the device to dismiss the system user interface. Generating a non-visual output, such as a tactile and/or an audio output, when dismissing a system user interface in response to a request to dismiss the system user interface provides feedback to the user indicating that the requested operation has been acknowledged and is being performed. Providing improved feedback enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, while displaying the system user interface, the device detects (624) an input directed to the system user interface. In some embodiments, in response to detecting the input directed to the system user interface: in accordance with a determination that the input directed to the system user interface corresponds to a request to dismiss the system user interface, the device dismisses the system user interface and generates a non-visual output (e.g., tactile and/or audio output) corresponding to dismissal of the system user interface; and, in accordance with a determination that the input directed to the system user interface corresponds to a request to select an action corresponding to the first application, the device performs the action corresponding to the first application without generating a non-visual output (e.g., tactile and/or audio output) corresponding to performing the action. For example, in accordance with a determination that an input directed to the system user interface expanded notification 5032 (FIG. 5A11) corresponds to a request to dismiss the system user interface (e.g., a tap input on expanded notification 5032 or on control 5034), the system user interface is dismissed and tactile output 5038 is generated. On the other hand, for example, in accordance with a determination that an input by contact 5122 (FIG. 5A40) directed to the system user interface that includes quick actions menu 5120 corresponds to a request to select an action (e.g., composing a new message), the device launches the associated application and displays the new message composition user interface 5123 without generating a tactile or audio output. Generating a non-visual output, such as a tactile and/or an audio output, when dismissing a system user interface in response to a request to dismiss the system user interface provides feedback to the user indicating that the requested dismissal of the system user interface has been acknowledged and is being performed. On the other hand, the absence of a non-visual output when performing an application-related action (e.g., selected from the system user interface) provides feedback to the user that a different operation is being performed instead of or in addition to dismissing the system user interface. Providing improved feedback enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, the first input includes (626) a touch input on a touch-sensitive surface of the device, and the device detects liftoff of the touch input from the touch-sensitive surface while displaying the system user interface, and, after detecting liftoff of the touch input, maintains display of the system user interface on the display. In some embodiments where the system user interface is displayed in response to reduction in intensity of the input (rather than liftoff of the input), display of the system user interface is maintained when liftoff of the input is later detected while displaying the system user interface. For example, in embodiments where the system user interface that includes expanded notification 5032 (FIG. 5A11) is displayed in response to detecting reduction in intensity of the input by contact 5024 (FIG. 5A9), the system user interface that includes expanded notification continues to be displayed after detecting liftoff of contact 5024. Maintaining display of the system user interface after liftoff of the touch input in response to which the system user interface was displayed allows the user to continue viewing the information presented in the system user interface (e.g., the additional information about the application) without requiring the user to repeat the touch input or open and navigate through the application to access the same information. Reducing the number of inputs needed to perform an operation enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, in response to determining that the first input meets the first input threshold, the device changes (628) a size of the user interface object (e.g., before displaying the system user interface or allowing the user interface object to be dragged). For example, in response to contact 5024 meeting the input threshold, notification 5008 is reduced in size (FIG. 5A8). Additional examples are given with respect to media object icon 5022 (FIG. 5A21) and application launch icon 424, (FIG. 5A37). Changing a size of the user interface object in response to the input meeting a particular input threshold provides the user with feedback that the threshold has been met and indicates that operations associated with the input threshold being met may be performed in response to one or more subsequent portions of the input. Providing improved feedback enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, the first input threshold includes (630) one or more of a time-based threshold and an intensity-based threshold. In some embodiments, the input threshold is a time threshold (e.g., duration threshold T(I), described herein with reference to FIGS. 5A7-5A67). In some embodiments, the input threshold is an intensity threshold (e.g., an intensity threshold that is above a nominal contact detection threshold). In some embodiments, the input threshold is a time threshold that decreases if (e.g., after or while) the input meets an intensity threshold. Using an intensity-based input threshold, or accelerating a time-based input threshold based on intensity, enables users to perform operations more quickly without needing to wait for the full time-based threshold to be met (e.g., without needing to wait for a full threshold amount of time to elapse). Using an input threshold based on time rather than intensity enables the same or similar threshold-based behavior to be implemented even on devices that lack sensors for determining intensities of inputs. Providing consistency across a user's multiple devices by making behaviors more widely available, while allowing users to perform operations more quickly on devices with greater hardware functionality, enhance the operability of the devices and makes the user-device interface more efficient (e.g., by helping the user to achieve intended results and reducing user mistakes when operating/interacting with the devices), which additionally, reduces power usage and improves battery life of the devices by enabling the user to use the devices more quickly and efficiently.

In some embodiments, the system user interface is (632) displayed over an obscured (e.g., blurred, darkened, faded) representation of a user interface that includes the user interface object. For example, as described herein with reference to FIG. 5A10, expanded notification 5032 is overlaid on a blurred and darkened version of the previously-displayed user interface, wake screen user interface 5004. Additional examples are described herein with reference to FIGS. 5A23, 5A39, and 5A60. Obscuring the representation of the user interface over which the system user interface is displayed allows the user to better focus on the information presented in the system user interface and reduces distraction from the underlying user interface. Providing improved visual feedback to the user enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, the device detects (634) an end of the first input, and, after detecting the end of the first input, generates a non-visual output (e.g., a tactile and/or audio output) that corresponds to detecting the end of the first input. In some embodiments, detecting the end of the input includes detecting a decrease in intensity of the contact below an intensity threshold. In some embodiments, detecting the end of the input includes detecting liftoff of the contact from the touch-sensitive surface. For example, as described herein with reference to FIGS. 5A9-5A10, in response to detecting the end of the input by contact 5024, the device generates tactile output 5031 (e.g., to indicate that the end of the input has been detected and expanded notification 5032 is displayed in response). Generating a non-visual output, such as a tactile and/or an audio output, after detecting the end of an input provides the user with feedback that the end of the input has been detected, and, where applicable, that an associated operation is being performed. Providing improved feedback enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, the user interface object is (636) a notification that includes a subset of information about an event corresponding to the first application; the system user interface is an expanded view of the notification that includes the subset of information about the event and additional information about the event; and displaying the first application includes displaying a view of the first application that corresponds to the event (e.g., an email message, calendar event, text message, social media post that was the subject of the notification). A notification-related example is described herein with reference to FIGS. 5A5-5A18. In some embodiments, different views of the first application are displayed in response to different notifications being selected (e.g., a view of a first message is displayed when a notification of the first message is selected, whereas a view of a second message is displayed when a notification of the second message is selected). Providing a user with the ability to view additional information about a detected event or to view the application corresponding to the detected event based on whether an input directed to a notification for the event meets a particular input threshold or not (and includes relatively little movement) enables the user to access additional information about the notification in a desired format through an intuitive gesture, and without preemptively displaying the additional information before it is requested. Providing additional control options without cluttering the user interface with additional displayed controls and information enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, the user interface object is (638) a representation of content (e.g., media content, such as a thumbnail image/video or a hyperlink); the system user interface includes a preview of the content (e.g., an enlarged preview of the image/video or a snapshot of a webpage corresponding to the hyperlink); and displaying the first application includes displaying the content in the first application (e.g., displaying the image in an image viewer, displaying the video in a video viewer, displaying the website in a web browser). A media content-related example is described herein with reference to FIGS. 5A19-5A30. Providing a user with the ability to preview content of an application or to view the content in the application based on whether an input directed to a representation of the content meets a particular input threshold or not (and includes relatively little movement) enables the user to access the content in a desired format through an intuitive gesture without preemptively displaying the content before it is requested. Providing additional control options without cluttering the user interface with additional displayed controls enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, the user interface object is (640) an application icon for the first application (e.g., application launch icon 424 for a messages application); and the system user interface includes a plurality of actions (e.g., user-selectable actions) associated with the first application (e.g., quick action menu 5120 includes selectable options for operations associated with the messages application, such as composing a new message or composing a message to a particular suggested contact). Presenting a plurality of actions associated with the first application in response to an input that meets a particular input threshold and includes relatively little movement enables the user quickly access relevant actions for the application by requesting display of those actions through an intuitive gesture, without preemptively displaying controls before they are requested. Providing additional control options without cluttering the user interface with additional displayed controls enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, in response to determining that the first input meets the first input threshold (or in some embodiments a second input threshold, where the second input threshold includes a time duration threshold that is different from (e.g., longer than, or subsequent to) a time duration threshold of the first input threshold), the device displays (642) a visual indication that a user interface that includes the user interface object is in a reconfiguration mode (e.g., oscillating, moving, fading, or otherwise changing an appearance of one or more other icons displayed along with the application icon). For example, as described herein with reference to FIG. 5A49, if contact 5110 is maintained with less than a threshold amount of movement after the input threshold T(I) is met, and until another threshold amount of time is met, the user interface reconfiguration mode is activated. Displaying a visual indication that the user interface is in a reconfiguration mode in response to determining that an input meets a particular input threshold provides the user with visual feedback that the option to reconfigure the user interface is available, for example through subsequent movement of the selected user interface object. Providing improved feedback enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, in response to determining that the first input meets the first input threshold, the device displays (644) a visual indication of further action that can be taken to enter a reconfiguration mode (e.g., a text pop up describing that the application icon can be moved around the home screen in response to an input with more than the threshold amount of movement, such as information object 5116, FIG. 5A37). In some embodiments, when the device enters the reconfiguration mode, the device displays a visual indication that the user interface is in the reconfiguration mode (e.g., oscillating, moving, fading, or otherwise changing an appearance of one or more other icons displayed along with the application icon). Displaying a visual indication that further action that can be taken to enter a user interface reconfiguration mode in response to determining that an input meets a particular input threshold provides the user with visual feedback that the option to enter the reconfiguration mode is available, for example through providing subsequent input (e.g., a subsequent portion of the input) for entry into the reconfiguration mode. Providing improved feedback enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, in accordance with a determination that the first input meets the first input threshold and includes more than the threshold amount of movement (e.g., after meeting the first input threshold), the device displays (646) a visual indication that a user interface that includes the user interface object is in a reconfiguration mode (e.g., oscillating, moving, fading, or otherwise changing an appearance of one or more other icons displayed along with the application icon). For example, as described herein with reference to FIG. 5A43-5A44, in response to movement of contact 5110 after meeting the input threshold T(I), the device provides visual feedback by animating (e.g., oscillating) the application icons in the home screen user interface 5096 to indicate that a user interface reconfiguration mode is activated. Displaying a visual indication that the user interface is in a reconfiguration mode after the input has met a particular input threshold and then moved more than a threshold amount prevents the device from entering the reconfiguration mode until the user has indicated, through the movement of the input, that the user intends to invoke the reconfiguration mode, and provides the user with visual feedback that the reconfiguration mode has been invoked in response to the movement of the input. Avoiding inadvertently performing operations, and providing improved feedback when the operations are properly performed, enhance the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

It should be understood that the particular order in which the operations in FIGS. 6A-6D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, and 1000) are also applicable in an analogous manner to method 600 described above with respect to FIGS. 6A-6D. For example, the devices, or components thereof, user interface objects, user interfaces, thresholds, applications, tactile and/or audio outputs, and actions/operations described above with reference to method 600 optionally have one or more of the characteristics of the devices, or components thereof, user interface objects, user interfaces, thresholds, applications, tactile and/or audio outputs, and actions/operations described herein with reference to other methods described herein (e.g., methods 700, 800, 900, and 1000). For brevity, these details are not repeated here.

FIGS. 7A-7B are flow diagrams illustrating method 700 of generating tactile outputs to provide haptic feedback for user interactions with a user interface object, in accordance with some embodiments. Method 700 is performed at an electronic device (e.g., portable multifunction device 100, FIG. 1A, or device 300, FIG. 3) with a display (e.g., touch screen 112, FIG. 1A, or display 340, FIG. 3) and an input element (e.g., a touch-sensitive surface such as touch screen 112, FIG. 1A, or touch pad 355, FIG. 3, or another type of input device such as keyboard/mouse 350, FIG. 3, or other input device 116, FIG. 1A). In some embodiments, the device includes one or more output devices, such as one or more tactile output generators (e.g., tactile output generator(s) 167, FIG. 1A, or tactile output generator(s) 357, FIG. 3) and/or one or more audio output generators (e.g., speaker 111 optionally in combination with audio circuitry 110, FIG. 1A). Some operations in method 700 are, optionally, combined and/or the order of some operations is, optionally, changed.

As described below, method 700 provides different tactile outputs in response to inputs with different properties to indicate to the user which operation is being performed, or will be performed, in response to detecting the end of a particular input based on the properties of the input. Generally, providing tactile feedback, or other feedback that is non-visual such as audio feedback, also assists users when they are not looking at the display and users who are visually impaired. Providing improved non-visual feedback enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

The device displays (702), on the display, a user interface object (e.g., a link, content item, notification, application icon, or the like) that corresponds to a first application (e.g., in a system user interface such as a wake screen, notification display region, home screen, or the like that includes user interface objects corresponding to a plurality of different applications or a different application that is not the first application).

While displaying the user interface object, the device detects (704), via the input element, a first input directed to the user interface object.

In response to detecting the first input directed to the user interface object (706), in accordance with a determination that the first input meets an input threshold and includes more than a threshold amount of movement after meeting the input threshold, the device generates (708) a first tactile output in response to detecting an end of the first input (e.g., liftoff of a touch from the touch-sensitive surface). In some embodiments, an audio output is generated instead of or in addition to a tactile output. More generally, in some embodiments a non-visual output (e.g., tactile and/or audio output) is generated. For example, as described herein with reference to FIGS. 5A26-5A30, in accordance with a determination that the input by contact 5052 is maintained for at least the duration threshold T(I) and includes more than the threshold amount of movement after meeting the threshold, the device generates tactile output 5106 (FIG. 5A30) in response to detecting liftoff of contact 5052. In another example, as described herein with reference to FIGS. 5A43-5A45, in accordance with a determination that the input by contact 5110 is maintained for at least the duration threshold T(I) and includes more than the threshold amount of movement after meeting the threshold, the device generates tactile output 5136 (FIG. 5A45) in response to detecting liftoff of contact 5110. In yet another example, as described herein with reference to FIGS. 5A61-5A63, in accordance with a determination that the input by contact 5150 is maintained for at least the duration threshold T(I) and includes more than the threshold amount of movement after meeting the threshold, the device generates tactile output 5170 (FIG. 5A63) in response to detecting liftoff of contact 5150.

In response to detecting the first input directed to the user interface object (706), in accordance with a determination that the first input meets the input threshold and includes less than the threshold amount of movement after meeting the input threshold, the device generates (710) a second tactile output in response to detecting an end of the first input. The second tactile output is different from the first tactile output. For example, as described herein with reference to FIGS. 5A22-5A23, in accordance with a determination that the input by contact 5052 is maintained for at least the duration threshold T(I) and includes less than the threshold amount of movement after meeting the threshold, the device generates tactile output 5062 (FIG. 5A23) in response to detecting liftoff of contact 5052. Additional examples are given in FIGS. 5A9-5A10 with respect to the wake screen user interface 5004 (e.g., tactile output 5028, FIG. 5A8), in FIGS. 5A38-5A39 with respect to the home screen user interface (e.g., tactile output 5117, FIG. 5A39), and in FIGS. 5A59-5A60 with respect to the user interface of the web browser application (e.g., tactile output 5154, FIG. 5A60).

In some embodiments, the second tactile output differs from the first tactile output in one or more tactile output properties such as frequency, amplitude (sometimes called volume), tactile output pattern, and/or number of discrete tactile outputs (e.g., number of cycles or repetitions of a given tactile output). Various examples of tactile outputs and tactile output properties are described in more detail herein with reference to FIGS. 4F-4K. For example, a FullTap (FIG. 4F) has a different tactile output pattern from a MiniTap (FIG. 4G) and from a MicroTap (FIG. 4H). In another example, a FullTap (80 Hz) has a different frequency from a FullTap (100 Hz) (FIG. 4F). In yet another example, a FullTap (80 Hz, gain=1.0) has the same frequency and pattern as a FullTap (80 Hz, gain=0.75) and a different amplitude. In yet another example, a given tactile output may be selected as a base and repeated two or more times to generate a different tactile output from the base tactile output. One of ordinary skill will readily appreciate that different tactile outputs may be selected (e.g., from the examples presented in FIGS. 4F-4K) so as to select tactile outputs that vary from each other in a desired number of the above-described tactile output properties.

In response to detecting the first input directed to the user interface object (706), in accordance with a determination that the first input does not meet the input threshold, the device performs (712) an operation without generating the first tactile output and without generating the second tactile output in response to detecting an end of the first input. For example, as described herein with reference to FIGS. 5A19-5A20, no tactile output (and no audio output) is generated in response to detecting liftoff of contact 5052 in accordance with a determination that contact 5052 is not maintained for the duration threshold T(I).

In some embodiments, the first input includes (714) a touch input on a touch-sensitive surface of the device, and detecting the end of the first input includes detecting a reduction in intensity of the first input below a threshold intensity (e.g., a threshold intensity that is above a nominal contact detection threshold). Performing operations associated with the end of a touch input in response to detecting a reduction in intensity of the input below a threshold (e.g., rather than liftoff of the touch input) enables the device to recognize the end of the input more quickly (e.g., before liftoff occurs). Improving the responsiveness of the device enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, the first input includes (716) a touch input on a touch-sensitive surface of the device, and detecting the end of the first input includes detecting liftoff of the touch input from the touch-sensitive surface (e.g., liftoff of contact 5052, FIGS. 5A19-5A23, FIGS. 5A29-5A30). Performing operations associated with the end of a touch input in response to detecting liftoff of the touch input (e.g., rather than reduction in intensity of the touch input) reduces the chance that inconsistent touch input intensity (e.g., due to a user's hand being unsteady) will inadvertently trigger performance of the operations. Avoiding inadvertently performing operations enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, in accordance with a determination that the first input meets the input threshold (e.g., without regard to whether the first input includes more or less than the threshold amount of movement after meeting the input threshold), the device generates (718) a third tactile output before detecting the end of the first input. For example, as described herein with reference to FIG. 5A21, in accordance with a determination that the input by contact 5052 meets the duration threshold T(I) (e.g., without regard to any subsequent transitions from the user interface state as shown in FIG. 5A21), the device generates tactile output 5060 to indicate that the threshold has been met by the input. Additional examples are given in FIG. 5A8 (e.g., tactile output 5028) with respect to the wake screen user interface, in FIG. 5A37 (e.g., tactile output 5114) with respect to the home screen user interface and application launch icons, and in FIG. 5A58 (e.g., tactile output 5152) with respect to the user interface of the web browser application.

In some embodiments, the third tactile output is different from the second tactile output. In some embodiments, the third tactile output differs from the second tactile output in one or more tactile output properties such as frequency, amplitude (sometimes called volume), tactile output pattern, and/or number of discrete tactile outputs (e.g., number of cycles or repetitions of a given tactile output). Variations in tactile output properties are described herein in more detail with reference to operation 710. Generating a tactile output when an input meets a particular threshold before the input ends provides feedback to the user indicating recognition that the threshold has been met and, where applicable, that the option to perform an operation associated with meeting the threshold is available. Generating different tactile outputs for the input meeting first criteria before the input ends as compared to the input then meeting second criteria after meeting the first criteria provides feedback to the user indicating which criteria have been met. Providing improved feedback enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, in accordance with a determination that the first input includes more than the threshold amount of movement after meeting the input threshold, the device generates (720) a fourth tactile output before detecting the end of the first input. For example, as described herein with reference to FIG. 5A26, in accordance with a determination that the input by contact 5052 moves more than the threshold amount after meeting the duration threshold T(I), the device generates tactile output 5086 before detecting the end of the input by contact 5052. Additional examples are given in FIG. 5A44 (e.g., tactile output 5134) with respect to the home screen user interface and application launch icons, and in FIG. 5A62 (e.g., tactile output 5168) with respect to the user interface of the web browser application.

In some embodiments, the fourth tactile output is different from the third tactile output. In some embodiments, the fourth tactile output differs from the third tactile output in one or more tactile output properties such as frequency, amplitude (sometimes called volume), tactile output pattern, and/or number of discrete tactile outputs (e.g., number of cycles or repetitions of a tactile output). In some embodiments, the fourth tactile output is different from the first tactile output, and in some such embodiments the fourth tactile output differs from the first tactile output in one or more tactile output properties such as frequency, amplitude (sometimes called volume), tactile output pattern, and/or number of discrete tactile outputs (e.g., number of cycles or repetitions of a given tactile output). Variations in tactile output properties are described herein in more detail with reference to operation 710. Generating different tactile outputs based on the input meeting different criteria before the input ends provides feedback to the user indicating which criteria have been met, and which associated operation is being performed in response. Providing improved feedback enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, the third tactile output is (722) similar in at least a respective tactile output property to the second tactile output (e.g., the second tactile output and the third tactile output differ in less than a predefined number of tactile output properties such as frequency, amplitude, pattern, and/or number); and the fourth tactile output is similar in at the least the respective tactile output property to the first tactile output (e.g., the fourth tactile output and the first tactile output differ in less than a predefined number of tactile output properties such as frequency, amplitude, pattern, and/or number). In some embodiments, the respective tactile output property is more similar between the third tactile output and the second tactile output than between the third tactile output and the first tactile output or between the third tactile output and the fourth tactile output; and/or the respective tactile output property is more similar between the fourth tactile output and the first tactile output than between the fourth tactile output and the third tactile output or between the fourth tactile output and the second tactile output).

For example, the third tactile output (e.g., tactile output 5060, FIG. 5A21) and the second tactile output (e.g., tactile output 5062, FIG. 5A23) are similar in at least tactile output pattern (e.g., the second and third tactile outputs are both FullTaps); and the fourth tactile output (e.g., tactile output 5086, FIG. 5A26) and the first tactile output (e.g., tactile output 5106, FIG. 5A30) are similar in at least tactile output pattern (e.g., the first and fourth tactile outputs are both MicroTaps). In this example, the first and fourth tactile outputs differ in tactile output pattern from the second and third tactile outputs. In another example, the third tactile output (e.g., tactile output 5060, FIG. 5A21) and the second tactile output (e.g., tactile output 5062, FIG. 5A23) are similar in frequency (e.g., the second tactile output has a frequency of 125 Hz and the third tactile output has a frequency of 80 Hz); and the fourth tactile output (e.g., tactile output 5086, FIG. 5A26) and the first tactile output (e.g., tactile output 5106, FIG. 5A30) are similar in frequency (e.g., the first tactile output has a frequency of 230 Hz and the fourth tactile output has a frequency of 300 Hz). In this example, the frequency is more similar between the third tactile output (e.g., 80 Hz) and the second tactile output (e.g., 125 Hz) than between the third tactile output and either the first or fourth tactile outputs (e.g., 230 Hz or 300 Hz). In addition, the frequency is more similar between the fourth tactile output (e.g., 300 Hz) and the first tactile output (e.g., 230 Hz) than between the fourth tactile output and either the second or third tactile outputs (e.g., 125 Hz or 80 Hz).

In some embodiments, the similarities between the different tactile outputs correspond to a plurality of tactile output properties and/or audio output properties. In some embodiments, despite the similarities between the first and fourth tactile outputs, there are differences between one or more tactile output properties of the first and fourth tactile outputs that enable the first and fourth tactile outputs to be distinguished from each other. Similarly, in some embodiments, despite the similarities between the second and third tactile outputs, there are differences between one or more tactile output properties of the second and third tactile outputs that enable the second and third tactile outputs to be distinguished from each other. In some embodiments, the one or more tactile output properties that are different between the second and third tactile outputs are the same as (or include one or more of the same) tactile output properties that are different between the first and fourth tactile outputs.

Generating different tactile outputs based on the input meeting different criteria before the input ends, and using a first pair of tactile outputs that are similar to each other when an input meets first criteria and a second pair of tactile outputs that are similar to each other and different from the first pair when an input meets second criteria provides feedback to the user that helps the user distinguish which criteria have been met, and which associated operation is being performed in response. Using similar but different tactile outputs for related operations is helpful in clearly indicating that the operations are related while still distinguishing between the tactile outputs for the two different operations. Providing improved feedback enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

In some embodiments, the device (724): generates a first audio output in conjunction with generating the first tactile output; generates a second audio output in conjunction with generating the second tactile output, where the second audio output is different from the first audio output; generates a third audio output in conjunction with generating the third tactile output; and generates a fourth audio output in conjunction with generating the fourth tactile output, where the fourth audio output is different from the third audio output. In some examples, a respective audio output is generated in conjunction with (or, in some embodiments, instead of) generating each of the first, second, third, and/or fourth tactile outputs (e.g., tactile output 5106, FIG. 5A30, tactile output 5062, FIG. 5A23, tactile output 5060, FIG. 5A21, and/or tactile output 5086, FIG. 5A26).

In some embodiments, the third audio output is similar in at least a respective audio output property to the second audio output (e.g., the second audio output and the third audio output differ in less than a predefined number of audio output properties such as frequency, amplitude, and pattern). In some embodiments, the fourth audio output is similar in at the least the respective audio output property to the first audio output (e.g., the fourth audio output and the first audio output differ in less than a predefined number of audio output properties such as frequency, amplitude, and pattern). In some embodiments, the respective audio output property is more similar between the third audio output and the second audio output than between the third audio output and the first audio output or between the third audio output and the fourth audio output; and/or the respective audio output property is more similar between the fourth audio output and the first audio output than between the fourth audio output and the third audio output or between the fourth audio output and the second audio output. One of ordinary skill in the art will readily recognize that variations in audio output properties may be implemented in a manner similar to the variations in tactile output properties described herein in more detail with reference to operations 710 and 722.

In some embodiments, the similarities between the different audio outputs correspond to a plurality of tactile output properties and/or audio properties. In some embodiments, despite the similarities between the first and fourth audio outputs, there are differences between one or more audio output properties of the first and fourth audio outputs that enable the first and fourth audio outputs to be distinguished from each other. Similarly, in some embodiments, despite the similarities between the second and third audio outputs, there are differences between one or more audio output properties of the second and third audio outputs that enable the second and third audio outputs to be distinguished from each other. In some embodiments, the one or more audio output properties that are different between the second and third audio outputs are the same as (or include one or more of the same) audio output properties that are different between the first and fourth audio outputs.

Generating different audio outputs based on the input meeting different criteria before the input ends, and using a first pair of audio outputs that are similar to each other for an input that meets first criteria and a second pair of audio outputs that are similar to each other and different from the first pair for an input that meets second criteria provides feedback to the user that helps the user distinguish which criteria have been met, and which associated operation is being performed in response. Using similar but different audio outputs for related operations is helpful in clearly indicating that the operations are related while still distinguishing between the audio outputs for the two different operations. Providing improved feedback enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

It should be understood that the particular order in which the operations in FIGS. 7A-7B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 900, and 1000) are also applicable in an analogous manner to method 700 described above with respect to FIGS. 7A-7B. For example, the devices, or components thereof, user interface objects, user interfaces, thresholds, applications, tactile and/or audio outputs, and actions/operations described above with reference to method 700 optionally have one or more of the characteristics of the devices, or components thereof, user interface objects, user interfaces, thresholds, applications, tactile and/or audio outputs, and actions/operations described herein with reference to other methods described herein (e.g., methods 600, 800, 900, and 1000). For brevity, these details are not repeated here.

Figure 8C:
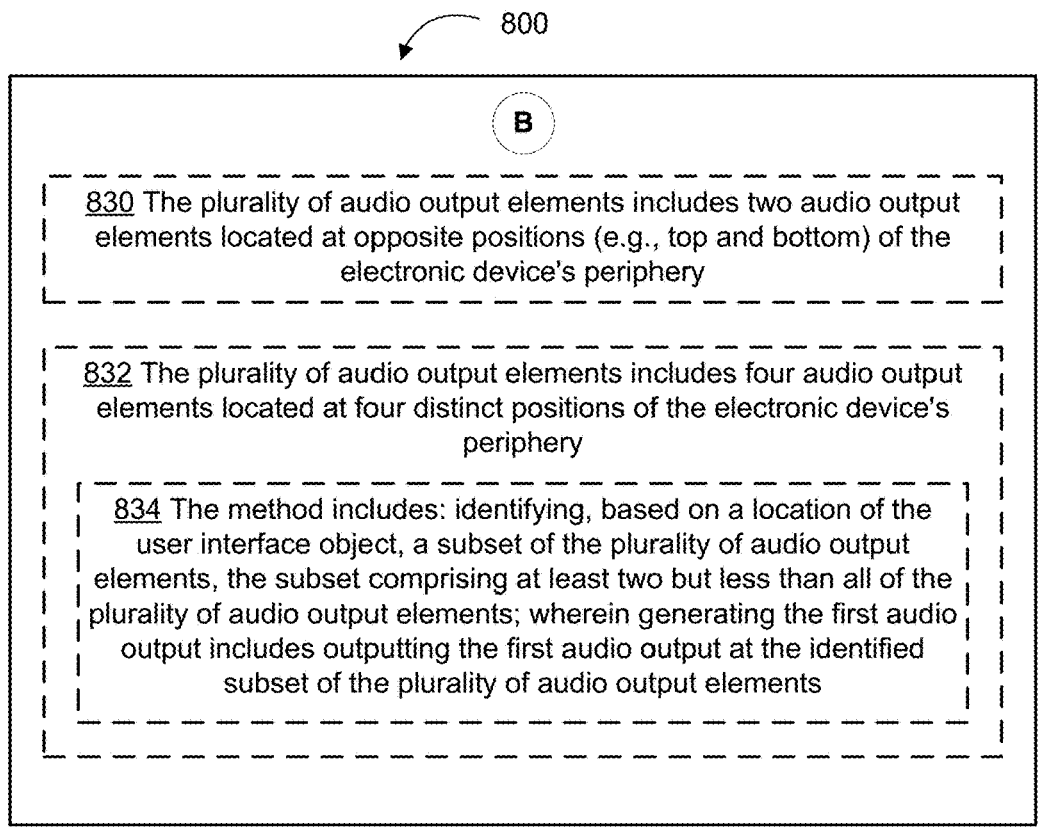
Figure 9A:
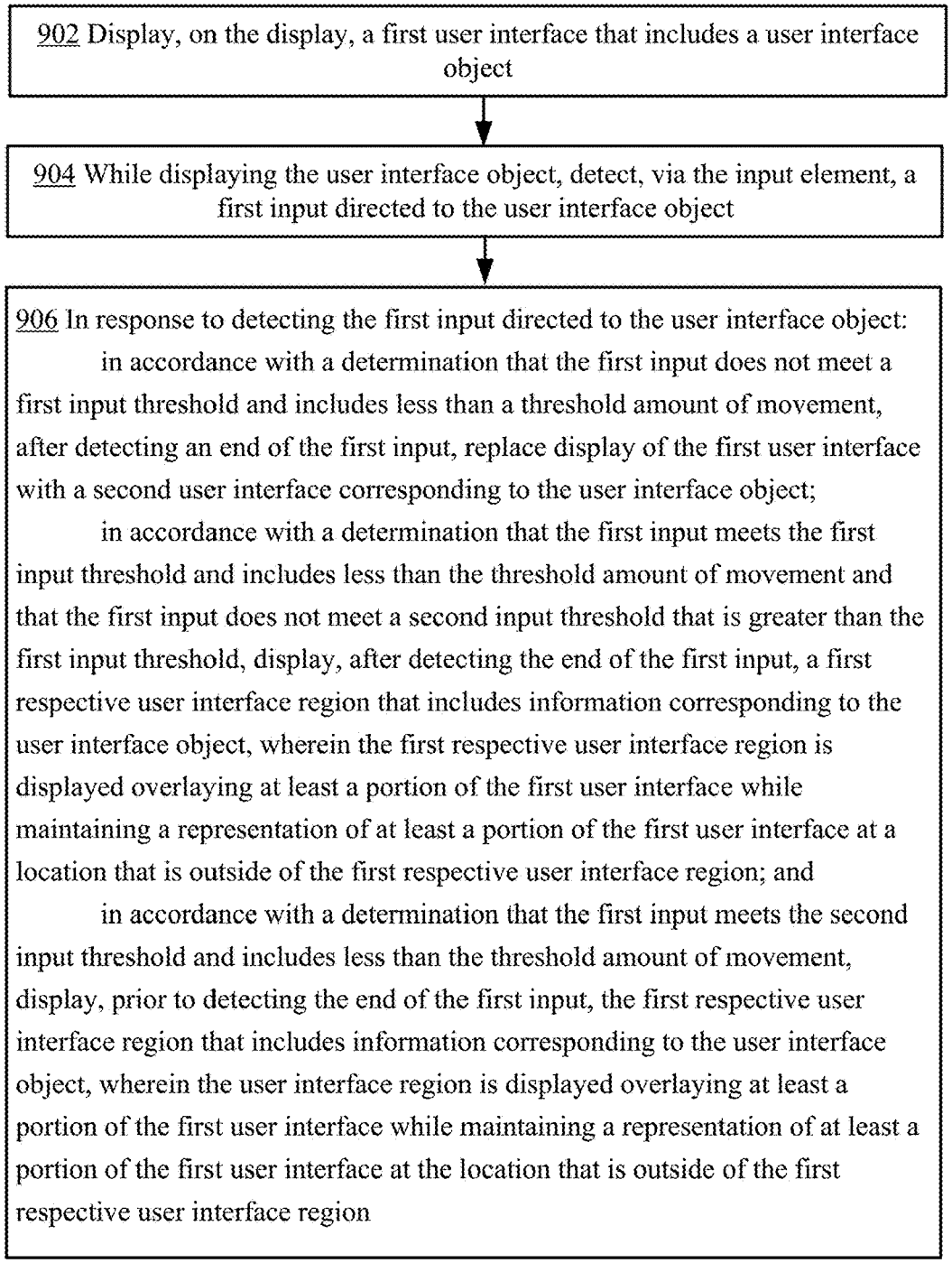
Figure 9G:
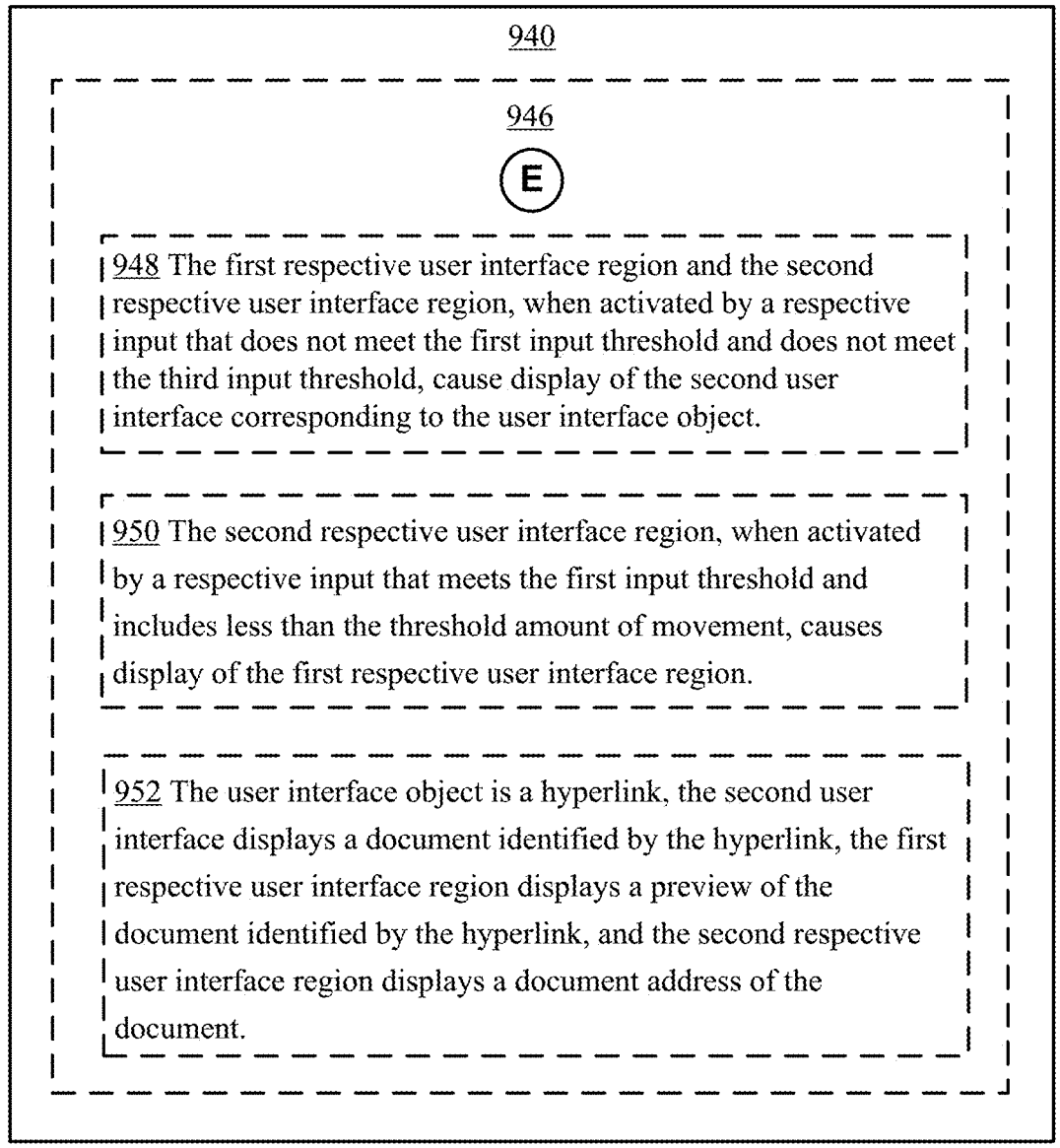
Figure 10E:
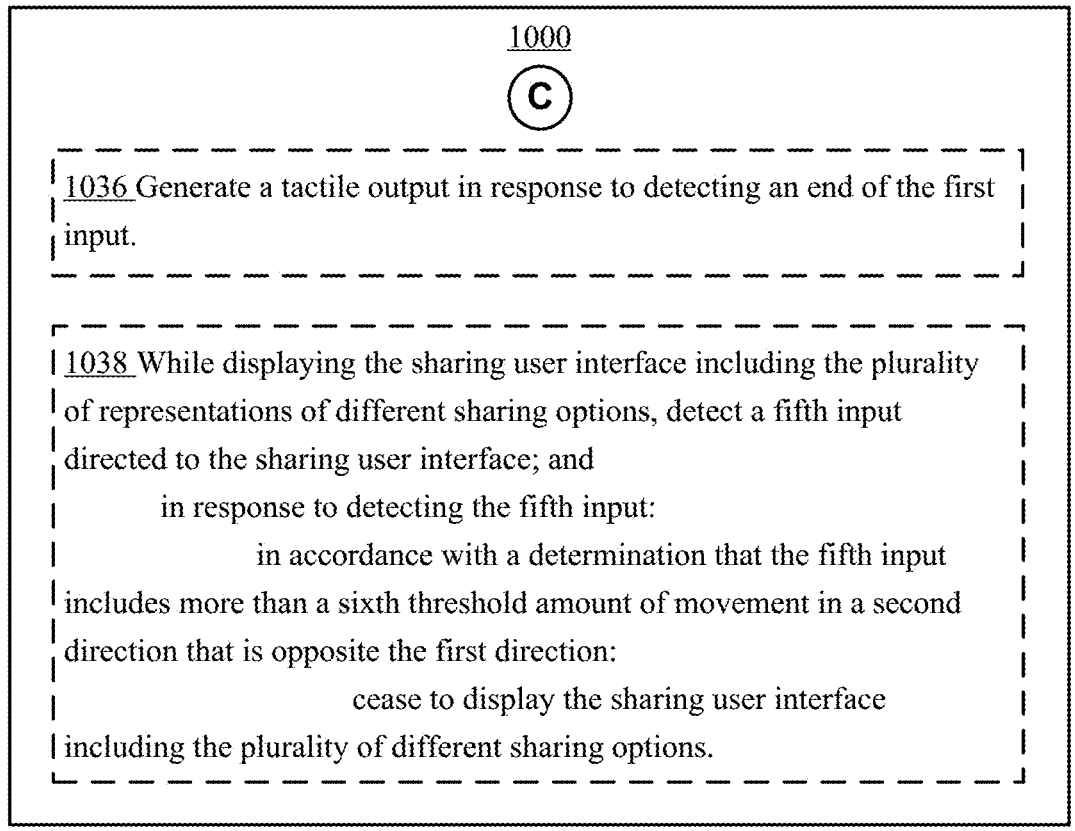

FIGS. 8A-8C are flow diagrams illustrating method 800 of interacting with user interface objects, in accordance with some embodiments. Method 800 is performed (802) at an electronic device (e.g., portable multifunction device 100, FIG. 1A, or device 300, FIG. 3) with a display (e.g., touch screen 112, FIG. 1A, or display 340, FIG. 3), an input element (e.g., a touch-sensitive surface such as touch screen 112, FIG. 1A, or touch pad 355, FIG. 3, or another type of input device such as keyboard/mouse 350, FIG. 3, or other input device 116, FIG. 1A), and a plurality of audio output elements at distinct locations along a periphery of the electronic device (e.g., speaker 111 optionally in combination with audio circuitry 110, FIG. 1A). Some operations in method 800 are, optionally, combined and/or the order of some operations is, optionally, changed.

As described below, method 800 provides intuitive and easy ways for a user to interact with applications while providing improved non-visual feedback about operations that will be performed in response to the interactions. Generating audio outputs for inputs that meet certain criteria indicates to the user that a particular operation or type of operation associated with meeting the criteria will be performed. In addition, generating audio outputs in response to inputs using speakers that are closer to the locations on the device at which the inputs are detected provides the user with improved feedback about where the inputs have been detected. Generally, providing feedback that is non-visual also assists users when they are not looking at the display and users who are visually-impaired, and enables users to avoid or reduce the number of user mistakes and thereby reduce the number of inputs needed to perform an operation. Providing improved feedback while reducing the number of inputs needed to perform an operation enhances the operability of the device and makes the user-device interface more efficient (e.g., by helping the user to achieve intended results and reducing user mistakes when operating/interacting with the device), which additionally, reduces power usage and improves battery life of the device by enabling the user to use the device more quickly and efficiently.

The device displays (804), at a location on the display, a user interface object (e.g., a link, content item, notification, application icon, or the like).

While displaying the user interface object, the device detects (806), via the input element (e.g., the touch-sensitive surface), a first input directed to the user interface object.

In response to detecting the first input directed to the user interface object (808), in accordance with a determination that the first input meets predefined criteria and that the user interface object is located closer to a first audio output element of the plurality of audio output elements than to a second audio output element of the plurality of audio output elements, the device generates (810) a first audio output that corresponds to the first input. The first audio output has a greater amplitude at the first audio output element than at the second audio output element. In some embodiments, the device forgoes generating an audio output corresponding to the first input at any of the other audio output elements of the plurality of audio output elements).

For example, as described herein with reference to FIGS. 5B2-5B3, in accordance with a determination that the input by contact 5310 (FIG. 5B2) meets predefined criteria (e.g., is maintained for at least a duration threshold T(I) and includes less than a threshold amount of movement) and that application launch icon 424, to which the input by contact 5310 is directed, is located closer to speaker 111c than to speaker 111a, the device generates audio output 5330 (FIG. 5B3) with a greater amplitude at speaker 111c than at speaker 111a. In another example, as described herein with reference to FIGS. 5B5-5B6, in accordance with a determination that the input by contact 5450 (FIG. 5B5) meets the predefined criteria and that application launch icon 5424 is located closer to speaker 111f than to speaker 111d, the device generates audio output 5370 (FIG. 5B6) with a greater amplitude at speaker 111f than at 111d.

In response to detecting the first input directed to the user interface object (808), in accordance with a determination that the first input meets the predefined criteria and that the user interface object is located closer to the second audio output element than to the first audio output element, the device generates (812) a second audio output that corresponds to the first input. The second audio output has a greater amplitude at the second audio output element than at the first audio output element. For example, as described herein with reference to FIGS. 5B2-5B3, had the input by contact 5310 (FIG. 5B2) been directed to another user interface object that was closer to a different speaker, a different audio output, with greater amplitude at the different speaker, would be generated.

In some embodiments, the first audio output and the second audio output share (820) one or more audio output properties (e.g., volume, frequency, waveform, etc.). In some embodiments, the first audio output and the second audio output share audio output properties in a manner similar to the way in which tactile outputs may share tactile output properties, as described herein with reference to method 700.

In some embodiments, the first audio output and the second audio output are (822) the same.

In some embodiments, the first audio output is (824) output on the first audio output element and is not output on the second audio output element. For example, as shown in FIG. 5B3, audio output 5330 is output on speaker 111*c* and not output on speaker 111*b*. In another example, as shown in FIG. 5B6, audio output 5370 is output on speaker 111*f* and not output on speaker 111*g*.

In some embodiments, the second audio output is (826) output on the second audio output element and is not output on the first audio output element.

In some embodiments, generating the first audio output that corresponds to the first input includes (828) outputting the first audio output on the first audio output element with a first amplitude (e.g., outputting audio output 5330 on speaker 111*c* with a first amplitude, FIG. 5B3), and outputting the first audio output on the second audio output element with a second amplitude (e.g., outputting audio output 5330 on speaker 111*a* with a second amplitude, FIG. 5B3), and an amount of difference between the first amplitude and the second amplitude is based on a location of the user interface object (e.g., the closer the location is to the first audio output element, or the second audio element, the greater the difference in amplitude between the audio output on the first and second audio output elements, and the closer the location is to being halfway between first audio output element and the second audio output element, the smaller the difference in amplitude between the audio output on the first and second audio output elements).

In some embodiments, the plurality of audio output elements includes (830) two audio output elements located at opposite positions (e.g., top and bottom) of the electronic device's periphery.

In some embodiments, the plurality of audio output elements includes (832) four audio output elements located at four distinct positions of the electronic device's periphery (e.g., at or near (e.g., within a predefined number of inches of) or adjacent four corners). For example, FIG. 5B4 shows device 100 with four speakers 111*d*, 111*e*, 111*f*, and 111*g* located at four distinct positions (e.g., the corners) of the periphery of device 100.

In some embodiments, the device identifies (834), based on a location of the user interface object, a subset of the plurality of audio output elements, the subset comprising at least two but less than all of the plurality of audio output elements; wherein generating the first audio output includes outputting the first audio output at the identified subset of the plurality of audio output elements. For example, as described herein with reference to FIGS. 5B5-5B6, audio output 5370 is output at speakers 111*f* and 111*d* (e.g., a subset of at least two but less than all of the four speakers 111*d*, 111*e*, 111*f*, and 111*g* of device 100), and not output at speakers 111*e* and 111*g*.

It should be understood that the particular order in which the operations in FIGS. 8A-8C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 900, and 1000) are also applicable in an analogous manner to method 800 described above with respect to FIGS. 8A-8C. For example, the devices, or components thereof, such as audio output elements, user interface objects, user interfaces, thresholds, audio outputs, and actions/operations described above with reference to method 800 optionally have one or more of the characteristics of the devices, or components thereof, such as audio output elements, user interface objects, user interfaces, thresholds, audio outputs, and actions/operations described herein with reference to other methods described herein (e.g., methods 600, 700, 900, and 1000). For brevity, these details are not repeated here.

FIGS. 9A-9G are flow diagrams illustrating method 900 of interacting with user interface objects, in accordance with some embodiments. Method 900 is performed at an electronic device (e.g., portable multifunction device 100, FIG. 1A, or device 300, FIG. 3) with a display (e.g., touch screen 112, FIG. 1A, or display 340, FIG. 3), an input element (e.g., a touch-sensitive surface such as touch screen 112, FIG. 1A, or touch pad 355, FIG. 3, or another type of input device such as keyboard/mouse 350, FIG. 3, or other input device 116, FIG. 1A), and a plurality of audio output elements at distinct locations along a periphery of the electronic device (e.g., speaker 111 optionally in combination with audio circuitry 110, FIG. 1A). Some operations in method 900 are, optionally, combined and/or the order of some operations is, optionally, changed.

In some embodiments, method 900 is performed at an electronic device with a display and an input element (e.g., a touch-sensitive surface such as a track pad or a touch-sensitive display, a camera, a remote controller, a mouse, a joystick, etc.). In method 900, the device displays (902), on the display, a first user interface that includes a user interface object (e.g., a link, content item, notification, application icon, or the like). For example, the first user interface is an application user interface of a first application that corresponds to the user interface object, an application user interface of a second application that is distinct from the first application, a system user interface such as a wake screen, notification display region, home screen, or the like that includes user interface objects corresponding to a plurality of different applications including the first application and at least a second application that is not the first application. While displaying the user interface object, the device detects (904), via the input element (e.g., the touch-sensitive surface, a remote controller, a camera, etc.), a first input directed to the user interface object (e.g., a touch input by a contact on a touch-sensitive surface, a gaze input directed toward the display, a gesture input, a click input, a combination of one or more of the above, etc.). In response to detecting the first input directed to the user interface object (e.g., the location of the input corresponds to the location of the user interface object on the display) (906): in accordance with a determination that the first input (e.g., an entirety of the first input from a start to an end of the first input) does not meet a first input threshold (e.g., a first threshold amount of time for detecting a touch-hold input) and includes less than a threshold amount of movement (e.g., the first input is a tap input with a liftoff of the contact detected before the contact is kept substantially stationary (e.g., with less than the threshold amount of movement during a given amount of time) on the touch-sensitive surface for more than the first threshold amount of time), after detecting an end of the first input (e.g., in response to detecting the end of the first input (e.g., liftoff of the touch or a decrease in intensity of the input below an intensity threshold (e.g., a contact detection intensity threshold or a light press intensity threshold))), the device replaces display of the first user interface with a second user interface corresponding to the user interface object (e.g., performing a respective operation that launches the first application that corresponds to the user interface object (e.g., replacing display of the first user interface that displays the user interface object with the user interface for the first application)) or performing an operation within the first application that replaces the currently displayed user interface of the first application with another user interface corresponding to the user interface object without exiting the first application). In some embodiments, replacing display of the currently displayed user interface with another user interface corresponding to the user interface object is a context-switching navigation operation, and the newly displayed user interface occupies the same display area as the first user interface, and completely replaces the first user interface on the display. In response to detecting the first input directed to the user interface object (e.g., the location of the input corresponds to the location of the user interface object on the display) (906): in accordance with a determination that the first input (e.g., an entirety of the first input from a start to an end of the first input; or an initial portion of the first input that includes the start of the first input and a first portion of the first input, and does not include the end of the first input) meets the first input threshold (e.g., the first threshold amount of time for detecting a touch-hold input) and includes less than the threshold amount of movement (e.g., the first input is kept substantially stationary for at least the first threshold amount of time) and that the first input does not meet a second input threshold (e.g., a second threshold amount of time for detecting an extended touch-hold input) that is greater than the first input threshold (e.g., the first input is not kept stationary for at least a second threshold amount of time that is longer than the first threshold amount of time, e.g., due to lift-off or movement after the first threshold amount of time and before the second threshold amount of time has elapsed since the start of the first input (e.g., touch-down of the contact)), the device displays, after detecting the end of the first input (e.g., in response to detecting the end of the first input (e.g., liftoff of the touch or a decrease in intensity of the input below an intensity threshold (e.g., the contact detection intensity threshold or a light press intensity threshold))), a first respective user interface region that includes information corresponding to the user interface object, wherein the first respective user interface region is displayed overlaying at least a portion (e.g., a first portion, less than all) of the first user interface (e.g., the first respective user interface region is a menu with actions corresponding to a first application corresponding to the user interface object and/or a preview of content corresponding to the first application corresponding to the user interface object) while maintaining a representation of at least a portion (e.g., a second portion, less than all) of the first user interface at a location that is outside of the first respective user interface region (e.g., the first respective user interface region is displayed without completely replacing display of the first user interface with a new user interface that corresponds to the user interface object). In some embodiments, the first respective user interface region is not displayed before the first input meets the first input threshold, or is not displayed before the end of the first input. In some embodiments, the first respective user interface region and its surrounding regions on the display retain information of the user interface that displayed the user interface object and are easily restored to the user interface that displayed the user interface object. For example, the first respective user interface region can be dismissed and the user interface that displayed the user interface object is restored by a tap input detected in a region of the display outside of the respective display region. In response to detecting the first input directed to the user interface object (e.g., the location of the input corresponds to the location of the user interface object on the display) (906): in accordance with a determination that the first input (e.g., an initial portion of the first input that includes the start of the first input and a first portion of the first input, and does not include the end of the first input) meets the second input threshold and includes less than the threshold amount of movement (e.g., the first input is kept substantially stationary for at least the second threshold amount of time that is longer than the first threshold amount of time), the device displays, prior to detecting the end of the first input (e.g., in response to detecting the second input threshold being met by the first input, without detecting the end of the first input (e.g., liftoff of the touch or a decrease in intensity of the input below an intensity threshold)), the first respective user interface region that includes information corresponding to the user interface object, wherein the user interface region is displayed overlaying at least a portion (e.g., the first portion, less than all) of the first user interface (e.g., the first respective user interface region is a menu with actions corresponding to the first application and/or a preview of content corresponding to the first application) while maintaining a representation of at least a portion (e.g., the second portion, less than all) of the first user interface at the location that is outside of the first respective user interface region (e.g., the first respective user interface region is displayed without completely replacing display of the first user interface with a new user interface that corresponds to the user interface object). In some embodiments, the first respective user interface region is not displayed before the first input meets the second input threshold. In some embodiments, the first respective user interface region and surrounding regions as shown on the display in response to an input (e.g., the first input or another input that is detected on the user interface object) meeting the second input threshold with less than the threshold amount of movement prior to the end of the input have an identical appearance to the first respective user interface region and surrounding regions as shown in response to the end of the input after the input having met the first input threshold and not having met the second input threshold. These features are illustrated in FIGS. 5C1-5C2, 5C7-5C8, and 5C9-5C10 (e.g., a tap input on an application icon launches the application, a touch-hold input followed by liftoff of the contact causes display of a quick action menu, and an extended touch-hold input without liftoff causes display of the quick action menu), FIGS. 5D1-5D2, 5D7-5D8, and 5D16 (e.g., a tap input on a user interface object (e.g., hyperlink) causes navigation to another user interface (e.g., the linked webpage), a touch-hold input followed by liftoff of the contact causes display of a preview of content corresponding to the user interface object (e.g., preview of the linked webpage), and an extended touch-hold input without liftoff causes display of the preview as well), FIGS. 5E1 (e.g., actions and responses 5603, 5604, 5611, 5612, 5616, and 5614), 5E2 (e.g., actions and responses 5703, 5704, 5707, 5712, 5718, 5716, and 5714), and 5E3 (e.g., actions and responses 5803, 5804, 5811, 5814, 5813, and 5812), and accompanying descriptions, for example. This method relates to detecting an input directed to a user interface object of a user interface on a display. In response to the input, the device uses criteria to determine whether and when to display a user interface region that includes information corresponding to the user interface object. Using criteria to determine whether and when to display a user interface region that includes information corresponding to the user interface object enables the performance of multiple different types of operations in response to an input. Allowing the user to achieve the same outcome by meeting different criteria enables more experienced users to achieve a desired outcome more quickly without waiting for the system to respond (e.g., improving interaction efficiency of the device) and helps less experienced users to achieve a desired outcome without remembering complex gestures and feeling confused (e.g., reducing user mistakes when interacting with the device). Enabling the performance of multiple different types of operations in response to an input (e.g., displaying the user interface region either after detecting the end of the input or prior to detecting the end of the input) increases efficiency with which the user is able to perform these operations, thereby enhancing the operability of the device, which, additionally, reduces power usage and improves battery life of the device by enabling the user to use the device more quickly and efficiently.

In some embodiments, after detecting the end of the first input, the device maintains (914) display of the first respective user interface region and the representation of at least the portion (e.g., the second portion, less than all) of the first user interface at the location that is outside of the first respective user interface region. While maintaining display of the first respective user interface region and the representation of at least the portion of the first user interface at the location that is outside of the first respective user interface region, the device detects a second input (e.g., a tap input) directed to a location that is outside of the first respective user interface region (e.g., directed to a portion of the representation of at least the portion of the first user interface that is outside of the first respective user interface region). In response to detecting the second input directed to a location that is outside of the first respective user interface region, the device ceases to display the first respective user interface region; and the device restores display of the first user interface. In some embodiments, the device restores display of the portion of the first user interface face that was obscured by the first respective user interface region by ceasing to display the first respective user interface region, and restores display of the portion of the first user interface that is outside of the first respective user interface region from the representation of the portion of the first user interface that is outside of the first respective user interface region (e.g., un-blurs the blurred portion of the first user interface underlying the first respective user interface region)). Ceasing to display the user interface region and restoring the display of the user interface in response to detecting an input directed to a location that is outside of the user interface region reduces the number of inputs needed to perform an operation (e.g., to remove the user interface region and exit back to the user interface). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, displaying, after detecting the end of the first input, the first respective user interface region that includes information corresponding to the user interface object includes (916): in response to detecting the end of the first input, displaying the first respective user interface region with a first size; and changing a displayed size of the first respective user interface region from the first size to a second size that is different from the first size (e.g., reducing the size of the respective user interface from an initial expanded size to a final size that is smaller than the first size). In some embodiments, the electronic device generates a tactile output in conjunction with the first respective user interface region reaching the second size. These features are illustrated in FIGS. 5D16-5D17 (e.g., preview 5534 becomes preview 5156 upon liftoff of contact 5508) and accompanying descriptions, for example. Changing the displayed size of the user interface region in response to detecting the end of the input provides improved visual feedback to the user (e.g., indicating to the user the location of the user interface region and that the input has ended). Providing improved visual feedback enhances the operability of the device and makes the user-device interface more efficient, which, additionally, reduces power usage and improves battery life of the device by enabling the user to use the device more quickly and efficiently.

In some embodiments, displaying, prior to detecting the end of the first input, the first respective user interface region that includes information corresponding to the user interface object includes (918): in response to detecting the first input meeting the second input threshold prior to detecting the end of the first input, displaying the first respective user interface region with the second size. In some embodiments, the electronic device generates a tactile output in conjunction with the first respective user interface region is displayed with the second size. Displaying the user interface region with a different size prior to the end of the input in response to detecting the input meeting an input threshold provides improved visual feedback to the user (e.g., indicating to the user the location of the user interface region and that the input has not ended). Providing improved visual feedback enhances the operability of the device and makes the user-device interface more efficient, which, additionally, reduces power usage and improves battery life of the device by enabling the user to use the device more quickly and efficiently.

In some embodiments, in response to detecting the first input directed to the user interface object (e.g., the location of the input corresponds to the location of the user interface object on the display): in accordance with a determination that the first input includes more than the threshold amount of movement before the first input threshold is met by the first input (e.g., the first input is a drag input with more than a nominal threshold amount of movement detected within a threshold amount of time (e.g., not a substantially stationary input), before the first threshold amount of time has elapsed since the start of the first input), the device moves (920) at least a portion of (e.g., the entirety of) the first user interface in accordance with movement of the first input (e.g., scrolling or shifting the first user interface on the display as a whole, as opposed to dragging the user interface object relative to the rest of the first user interface). In some embodiments, the first respective user interface region is not displayed after the end of the first input, when the first input includes more than the nominal threshold amount of movement prior to the end of the first input. These features are illustrated in FIGS. 5C3-5C5 (e.g., a swipe input before T(I) causes navigation to a different page of the home screen) and 5D3 following 5D1 (e.g., a swipe input before T(i) causes scrolling of the webpage), and FIGS. 5E1 (e.g., action and response 5605 and 5606), 5E2 (e.g., action and response 5705 and 5706) and 5E2 (e.g., action and response 5805 and 5806) and accompanying descriptions, for example. Moving at least a portion of the user interface in accordance with movement of the input and in accordance with the determination that the input includes more than the threshold amount of movement before the input threshold is met provides additional control options (e.g., allowing the user to scroll or shift the first user interface on the display as a whole) without cluttering the UI with additional displayed controls enhances the operability of the device, which, additionally, reduces power usage and improves battery life of the device by enabling the user to use the device more quickly and efficiently.

In some embodiments, in response to detecting the first input directed to the user interface object (e.g., the location of the input corresponds to the location of the user interface object on the display): in accordance with a determination that the first input includes more than the threshold amount of movement after meeting the first input threshold (e.g., the first input threshold was met by an initial portion of the first input that has less than the threshold amount of movement) and before meeting the second input threshold (e.g., the first input is a drag input with more than a nominal threshold amount of movement detected within a threshold amount of time (e.g., not a substantially stationary input), after the first input is kept substantially stationary for the first threshold amount of time since the start of the first input, and before the first input is kept substantially stationary for the second threshold amount of time since the start of the first input), the device moves (922) the user interface object relative to the first user interface in accordance with movement of the first input (e.g., starting a drag and drop operation on the user interface object). In some embodiments, the first respective user interface region is not displayed after the end of the first input, in accordance with a determination that the first input includes more than the threshold amount of movement prior to the end of the input (e.g., after the first input meeting the first input threshold and before meeting the second input threshold). These features are illustrated in FIGS. 5D9-5D15 following FIG. 5D4 (e.g., link 5148 is dragged without display of preview 5156) and FIGS. 5E2 (e.g., actions and responses 5723, 5724, 5725, 5728, 5727, and 5730) and 5E3 (e.g., actions and responses 5821, 5823, 5822, 5827, 5826, 5828, and 5829) and accompanying descriptions, for example. Moving the user interface object relative to the first user interface in accordance with movement of the input and in accordance with the determination that the input includes more than the threshold amount of movement after the a first input threshold is met and before a second input threshold is met provides additional control options (e.g., allowing the user to drag and drop user interface objects) without cluttering the UI with additional displayed controls enhances the operability of the device, which, additionally, reduces power usage and improves battery life of the device by enabling the user to use the device more quickly and efficiently.

In some embodiments, in response to detecting the first input (924): in accordance with a determination that the first input includes more than the threshold amount of movement after meeting the second input threshold (e.g., the first input includes more than the nominal threshold amount of movement within a threshold amount of time (e.g., not kept substantially stationary), after the first input has been kept substantially stationary for at least the second threshold amount of time since the start of the first input), the device initiates a drag operation that moves the user interface object. In some embodiments, the user interface object or a copy thereof, or content corresponding to the user interface object is dropped at a respective location on the display upon termination of the first input (e.g., at a location corresponding to the lift-off location of the contact, in response to the lift-off of the contact, after movement of the contact has dragged the user interface object across the display, or after the underlying user interface has changed in response to other concurrent input). In some embodiments, if an acceptable drop-off location is not available on the user interface, the drag operation is canceled and the user interface object is restored at its original location. These features are illustrated in FIGS. 5D18-5D21 following 5D16 (e.g., a copy of the link 5166 is dragged when movement of contact 5508 moves after display of preview 5534), and FIG. 5E2 (e.g., actions and responses 5719, 5726, 5724, 5725, 5727, 5728, and 5730) and 5E3 (e.g., actions and responses 5824, 5825, 5822, 5827, 5826, 5828, and 5829) and accompanying descriptions, for example. Initiating the drag operation that moves the user interface object in accordance with a determination that the input includes more than the threshold amount of movement after meeting the second threshold provides additional control options without cluttering the UI with additional displayed controls enhances the operability of the device, which, additionally, reduces power usage and improves battery life of the device by enabling the user to use the device more quickly and efficiently.

In some embodiments, initiating the drag and drop operation that moves the user interface object includes (926): replacing display of the first respective user interface region with a representation of the user interface object (e.g., shrinking the first respective user interface region into the user interface object or a copy thereof); and moving the representation of the user interface object in accordance with the movement of the first input. In some embodiments, after detecting the end of the first input, the user interface object is displayed at a new location that corresponds to the location of the representation of the user interface object at the time when the end of the first input was detected (e.g., the drop-off location of the user interface object). These features are illustrated in FIGS. 5D18-5D21 following 5D16 (e.g., a copy of the link 5166 is dragged when movement of contact 5508 moves after display of preview 5534), and FIG. 5E2 (e.g., actions and responses 5719, 5726, 5724, 5725, 5727, 5728, and 5730) and 5E3 (e.g., actions and responses 5824, 5825, 5822, 5827, 5826, 5828, and 5829) and accompanying descriptions, for example. Replacing the display of the user interface region with the representation of the user interface object and moving the representation of the user interface object in accordance with the movement of the input provides improved visual feedback to the user (e.g., shrinking the user interface region into the user interface object). Providing improved visual feedback enhances the operability of the device and makes the user-device interface more efficient (e.g., allowing the user to move the user interface region at a new location), which, additionally, reduces power usage and improves battery life of the device by enabling the user to use the device more quickly and efficiently.

In some embodiments, in response to detecting the first input: in accordance with a determination that the first input includes more than the threshold amount of movement after meeting the second input threshold (e.g., the first input includes more than the nominal threshold amount of movement within a threshold amount of time (e.g., not kept substantially stationary), after the first input has been kept substantially stationary for at least the second threshold amount of time since the start of the first input), the device initiates (928) a user interface reconfiguration mode of the first user interface, wherein, in the user interface reconfiguration mode of the first user interface, a plurality of user interface objects in the first user interface are movable relative to the first user interface by a respective input that includes more than the threshold amount of movement, without the respective input having met the first input threshold (e.g., without an initial portion of the respective input having met the first input threshold with less than the threshold amount of movement (e.g., without the respective input having been kept substantially stationary for at least the first threshold amount of time)). This is illustrated in FIG. 5C13-5C17 (e.g., movement of contact 5402 after time threshold T(II) causes the device to simultaneously start reconfiguration mode and dragging icon 424) and FIG. 5E1 (e.g. action and response 5617, 5618, 5620, 5619, 5622, 5621, and 5626) and accompanying descriptions, for example. Initiating the user interface reconfiguration mode of the first user interface in accordance with the determination that the input includes more than the threshold amount of movement after meeting the second input threshold provides additional control options without cluttering the UI with additional displayed controls enhances the operability of the device, which, additionally, reduces power usage and improves battery life of the device by enabling the user to use the device more quickly and efficiently.

In some embodiments, in response to detecting the first input (930): in accordance with a determination that the first input includes more than the threshold amount of movement after meeting the second input threshold (e.g., the first input includes more than the nominal threshold amount of movement within a threshold amount of time (e.g., not kept substantially stationary), after the first input has been kept substantially stationary for at least the second threshold amount of time since the start of the first input): in accordance with a determination that the first input includes movement in a first direction relative to the first respective user interface region (e.g., along a longitudinal direction of the first respective user interface region within the first respective user interface region (e.g., a direction of a listing of selectable options corresponding to different operations of the first application)), the device performs a first operation corresponding to a location within the first respective user interface region (e.g., performing the operation that corresponds to a selectable option displayed at the end location of the first input); and in accordance with a determination that the first input includes movement in a second direction, distinct from the first direction, relative to the first respective user interface region (e.g., along a lateral direction of the first respective user interface region away from the first respective user interface region), the device initiates a drag and drop operation that moves the user interface object. These features are illustrated in FIGS. 5C11 and 5C12 following 5C9 (e.g., downward swipe along menu followed by liftoff selects a menu option) and FIGS. 5C13-5C14 following 5C9 (e.g., horizontal swipe starts reconfiguration mode and drags icon) and accompanying descriptions, for example. Whether performing an operation corresponding to the location within the user interface region or initiating the drag and drop operation that moves the user interface object, in accordance with the determination that the input includes movement in the first or the second directions, provides additional control options (e.g., drag and drop operation or selecting an item within the user interface region) without cluttering the UI with additional displayed controls enhances the operability of the device, which, additionally, reduces power usage and improves battery life of the device by enabling the user to use the device more quickly and efficiently.

In some embodiments, initiating the drag operation that moves the user interface object includes (932) ceasing display of the first respective user interface region; and moving the user interface object in accordance with the movement of the first input. This is illustrated in FIGS. 5C13-5C14, for example. In some embodiments, the user interface object is displayed with a reduced visual prominence, size, and/or clarity while the first respective user interface region is displayed, and initiating the drag and drop operation includes restoring original visual prominence, size, and/or clarity of the user interface object. In some embodiments, the device displays an animated transition transforming the first respective user interface region into the user interface object or a copy thereof that is dragged by the first input. Ceasing the display of the user interface region and moving the user interface object in accordance with the movement of the input as part of initiating the drag operation that moves the user interface object provide improved visual feedback to the user. Providing improved visual feedback enhances the operability of the device and makes the user-device interface more efficient (e.g., allowing the user to move the user interface object to different locations on the display), which, additionally, reduces power usage and improves battery life of the device by enabling the user to use the device more quickly and efficiently.

In some embodiments, after detecting the end of the first input and while maintaining display of the first respective user interface region on the display, the device detects (934) a second input directed to a first portion of the first respective user interface region, wherein the first portion of the first respective user interface region corresponds to a first operation. In response to detecting the second input directed to the first portion of the first respective user interface region, in accordance with a determination that the second input meets first criteria (e.g., the second input does not meet the first input threshold and includes less than the threshold amount of movement (e.g., the second input meets criteria for detecting a tap input)), the device performs the first operation. In some embodiments, performing the first operation includes ceasing to display the first respective user interface region, and replacing display of the first user interface with a second user interface that corresponds to performance of the first operation (e.g., displaying the user interface of an application that corresponds to the first operation). Performing the first operation in response to detecting the second input directed to the first portion of the user interface region, in accordance with a determination that the second input meets input criteria, performs an operation when a set of conditions has been met (e.g., the second input meets input criteria) without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, after detecting the end of the first input and while maintaining display of the first respective user interface region on the display, the device detects (936) a third input directed to the first respective user interface region. In response to detecting the third input directed to the first respective user interface region, in accordance with a determination that the third input includes more than the threshold amount of movement (e.g., the third input is a drag input that is not kept substantially stationary before the first input threshold is met, and includes more than the threshold amount of movement before the first input threshold is met), the device initiates a drag operation that moves the user interface object. In some embodiments, initiating the drag and drop operation that moves the user interface object includes: replacing display of the first respective user interface region with a representation of the user interface object (e.g., shrinking the first respective user interface region into the user interface object or a copy thereof); and moving the representation of the user interface object in accordance with the movement of the third input. In some embodiments, after detecting the end of the third input, the user interface object is displayed at a new location that corresponds to the location of the representation of the user interface object at the time when the end of the third input was detected (e.g., the drop-off location of the user interface object). These features are illustrated in FIGS. 5D6 (e.g., swipe input by contact 5516 on preview 5514 initiates a drag operation on the hyperlink 5184), 5D18-5D20 (e.g., swipe input by contact 5540 on preview 5534' initiates a drag operation on a copy of the hyperlink 5184) and accompanying descriptions. Initiating a drag operation that moves the user interface object in response to detecting the third input directed to the first respective user interface region, and in accordance with the determination that the third input includes more than the threshold amount of movement, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, in response to detecting the first input directed to the user interface object (e.g., the location of the input corresponds to the location of the user interface object on the display): in accordance with a determination that the first input meets a third input threshold that is greater than the second input threshold, and includes less than the threshold amount of movement (e.g., the first input is kept substantially stationary for at least a third threshold amount of time that is longer than the second threshold amount of time), the device initiates (938), before detecting the end of the first input, a user interface reconfiguration mode of the first user interface, wherein, in the user interface reconfiguration mode of the first user interface, a plurality of user interface objects in the first user interface are movable relative to the first user interface by a respective input that includes more than the threshold amount of movement, without the respective input having met the first input threshold (e.g., without the respective input having met the first input threshold with less than the threshold amount of movement (e.g., without the respective movement input having been kept substantially stationary for at least the first threshold amount of time)). In some embodiments, when entering the user interface reconfiguration mode, the electronic device also ceases to display the first respective user interface region. These features are illustrated in FIGS. 5C15 following 5C9 (e.g., device enters reconfiguration mode when the contact is kept substantially stationary for T(III) before liftoff of the input) and FIG. 5E1 (e.g., action and response 5620) and accompanying descriptions, for example. Initiating the user interface reconfiguration mode of the first user interface before detecting the end of the first input, in accordance with the determination that the first input meets the third input threshold, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, during the user interface reconfiguration mode of the first user interface, the device detects (940) a fourth input (e.g., a tap or swipe input) directed to a first location in the first user interface. In response to detecting the fourth input directed to the first location in the first user interface: in accordance with a determination that the first location is unoccupied by a user interface object, the device terminates the user interface reconfiguration mode of the first user interface; and in accordance with a determination that the first location is occupied by a user interface object, the device maintains the user interface reconfiguration mode of the first user interface. Whether terminating the user interface reconfiguration mode or maintaining the user interface reconfiguration mode, in accordance with the determination that the first location is unoccupied or occupied by the user interface object, reduces the number of inputs needed to perform an operation (e.g., the operation to terminate or maintain the user interface reconfiguration mode). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, in response to detecting the first input directed to the user interface object: in accordance with a determination that the first input meets the first input threshold and includes less than the threshold amount of movement (e.g., the first input is kept substantially stationary for at least the first threshold amount of time) and that the first input does not meet the second input threshold that is greater than the first input threshold (e.g., the first input is not kept stationary for at least the second threshold amount of time that is longer than the first threshold amount of time, e.g., due to lift-off or movement after the first threshold amount of time and before the second threshold amount of time has elapsed since the start of the first input (e.g., touch-down of the contact)), the device provides (942) a visual indication that the first input threshold has been met with less than the threshold amount of movement (e.g., increasing or decreasing the size of the user interface object, or applying a visual effect on the user interface object (e.g., dimming or highlighting the user interface object relative to other user interface objects on the first user interface)). Providing the visual indication that the first input threshold has been met with less than the threshold amount of movement provides improved visual feedback to the user. Providing improved visual feedback enhances the operability of the device and makes the user-device interface more efficient (e.g., allowing the user to determine the status of the first input), which, additionally, reduces power usage and improves battery life of the device by enabling the user to use the device more quickly and efficiently.

In some embodiments, in response to detecting the first input directed to the user interface object: in accordance with a determination that the first input meets the first input threshold and includes less than the threshold amount of movement (e.g., the first input is kept substantially stationary for at least the first threshold amount of time) and that the first input does not meet the second input threshold that is greater than the first input threshold (e.g., the first input is not kept stationary for at least a second threshold amount of time that is longer than the first threshold amount of time, e.g., due to lift-off or movement after the first threshold amount of time and before the second threshold amount of time has elapsed since the start of the first input (e.g., touch-down of the contact)), the device provides (944) a non-visual indication that the first input threshold has been met with less than the threshold amount of movement (e.g., generating a tactile output or audio output in response to detecting the first input threshold being met with less than the threshold amount of movement). Providing non-visual indication that the first input threshold has been met with less than the threshold amount of movement provides improved non-visual feedback to the user (e.g., haptic feedback). Providing improved non-visual feedback enhances the operability of the device and makes the user-device interface more efficient (e.g., allowing the user to determine the status of the first input), which, additionally, reduces power usage and improves battery life of the device by enabling the user to use the device more quickly and efficiently.

In some embodiments, in response to detecting the first input directed to the user interface object: in accordance with a determination that the first input meets a third input threshold (e.g., an input threshold (e.g., a third time threshold, or a third intensity threshold, etc.) that is less than the first input threshold (e.g., a first time threshold, a first intensity threshold, etc.)) and includes less than the threshold amount of movement (e.g., the first input is kept substantially stationary for at least the third threshold amount of time that is less than the first threshold amount of time) and that the first input does not meet the first input threshold or the second input threshold that are greater than the third input threshold (e.g., the first input is not kept stationary for at least the first and the second threshold amount of time, e.g., due to lift-off or movement after the third threshold amount of time and before the first or the second threshold amounts of time have elapsed since the start of the first input (e.g., touch-down of the contact)), the device displays (946), after detecting the end of the first input (e.g., in response to detecting the end of the first input (e.g., liftoff of the touch or a decrease in intensity of the input below an intensity threshold (e.g., the contact detection intensity threshold or a light press intensity threshold))), a second respective user interface region that includes information corresponding to the user interface object, wherein the second respective user interface region is distinct from the first respective user interface region, and wherein the second respective user interface region is displayed overlaying at least a portion (e.g., a first portion, less than all) of the first user interface (e.g., the second respective user interface region is a preview of content corresponding to the first application corresponding to the user interface object) while maintaining a representation of at least a portion (e.g., a second portion, less than all) of the first user interface at a location that is outside of the second respective user interface region (e.g., the second respective user interface region is displayed without completely replacing display of the first user interface with a new user interface that corresponds to the user interface object). In some embodiments, the second respective user interface region is not displayed before the first input meets the first input threshold, or is not displayed before the end of the first input. In some embodiments, the second respective user interface region and its surrounding regions on the display retain information of the user interface that displayed the user interface object, and are easily restored to the user interface that displayed the user interface object. For example, the second respective user interface region can be dismissed and the user interface that displayed the user interface object is restored by a tap input detected in a region of the display outside of the respective display region. These features are illustrated in FIGS. 5D4-5D5 (e.g., a first version of preview 5514 is displayed after a first time threshold T(i) is met) and 5D7-5D8 (e.g., a second version of preview 5156 is displayed after a second time threshold T(I) is met) and FIG. 5E3 (e.g., actions and responses 5807, 5810, 5811, and 5814) and accompanying descriptions, for example. Displaying the second user interface region that includes information corresponding to the user interface object while maintaining the representation of at least a portion of the first user interface in accordance with the determination that the first input meets the third input threshold, performs an operation when a set of conditions has been met without requiring further user input (e.g., the conditions that the first input meets the third input threshold). Performing an operation when a set of conditions has been met without requiring further user input controls enhances the operability of the device, which, additionally, reduces power usage and improves battery life of the device by enabling the user to use the device more quickly and efficiently.

In some embodiments, the first respective user interface region and the second respective user interface region, when activated by a respective input that does not meet the first input threshold and does not meet the third input threshold, causes (948) display of the second user interface corresponding to the user interface object. Displaying the second user interface corresponding to the user interface object when the first user interface region and the second user interface region are activated by an input that does not meet the first input threshold and does not meet the third input threshold, provides additional control options without cluttering the UI with additional displayed controls enhances the operability of the device, which, additionally, reduces power usage and improves battery life of the device by enabling the user to use the device more quickly and efficiently.

In some embodiments, the second respective user interface region, when activated by a respective input that meets the first input threshold and includes less than the threshold amount of movement, causes (950) display of the first respective user interface region. Displaying the first user interface region when the second user interface region is activated by an input that meets the first input threshold and includes less than the threshold amount of movement, provides additional control options without cluttering the UI with additional displayed controls enhances the operability of the device, which, additionally, reduces power usage and improves battery life of the device by enabling the user to use the device more quickly and efficiently.

In some embodiments, the user interface object is a hyperlink, the second user interface displays a document (e.g., a webpage) identified by the hyperlink, the first respective user interface region displays (952) a preview of the document identified by the hyperlink, and the second respective user interface region displays a document address (e.g., web address) of the document. Having the user interface object as a hyperlink, the second user interface displaying a document identified by the hyperlink, and the first user interface region displaying a preview of the documented identified by the hyperlink provides improved visual feedback to the user (e.g., allowing the user to preview and manipulate a document on the user interface). Providing improved visual feedback to the user enhances the operability of the device, and makes the user-device interface more efficient, which, additionally, reduces power usage and improves battery life of the device by enabling the user to use the device more quickly and efficiently.

It should be understood that the particular order in which the operations in FIGS. 9A-9G have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, and 1000) are also applicable in an analogous manner to method 900 described above with respect to FIGS. 9A-9G. For example, the devices, or components thereof, such as audio output elements, user interface objects, user interfaces, thresholds, audio outputs, and actions/operations described above with reference to method 900 optionally have one or more of the characteristics of the devices, or components thereof, such as audio output elements, user interface objects, user interfaces, thresholds, audio outputs, and actions/operations described herein with reference to other methods described herein (e.g., methods 600, 700, 800, and 1000). For brevity, these details are not repeated here.

FIGS. 10A-10E are flow diagrams illustrating method 1000 of interacting with a sharing user interface, in accordance with some embodiments. Method 1000 is performed at an electronic device (e.g., portable multifunction device 100, FIG. 1A, or device 300, FIG. 3) with a display (e.g., touch screen 112, FIG. 1A, or display 340, FIG. 3), an input element (e.g., a touch-sensitive surface such as touch screen 112, FIG. 1A, or touch pad 355, FIG. 3, or another type of input device such as keyboard/mouse 350, FIG. 3, or other input device 116, FIG. 1A), and a plurality of audio output elements at distinct locations along a periphery of the electronic device (e.g., speaker 111 optionally in combination with audio circuitry 110, FIG. 1A). Some operations in method 1000 are, optionally, combined and/or the order of some operations is, optionally, changed.

In some embodiments, method 1000 is performed at an electronic device with a display and an input element. In method 1000, the device displays (1002), on the display, a first user interface object (e.g., a link, content item, notification, application icon, or the like) that corresponds to first content (e.g., a webpage, a file, a message, an email, an application, etc.). In some embodiments, the first user interface object is displayed in an application user interface of a first application corresponding to the first content, in an application user interface of a second application that is distinct from the first application, in a system user interface such as a wake screen, notification display region, home screen, or the like that includes user interface objects corresponding to a plurality of different applications or a different application that is not the first application. While displaying the first user interface object, the device detects (1004), via the input element (e.g., the touch-sensitive surface, a remote controller, a camera, etc.), a first input directed to the first user interface object. In response to detecting the first input (1006): in accordance with a determination that the first input includes more than a first threshold amount of movement (e.g., this is a greater movement threshold than the nominal threshold amount of movement used to determine whether the input is substantially stationary) in a first direction (e.g., the movement exceeds a predefined threshold distance in the first direction) after first criteria (e.g., the first criteria correspond to criteria for activating display of a preview of the first content by an input (e.g., the first input or a second input that ended before the first input was detected) directed to the first user interface object) have been met, the device displays a sharing user interface for the first content (e.g., displaying the sharing user interface with a preview of the first content). Displaying the sharing user interface includes concurrently displaying a plurality of representations of different sharing options, including a first sharing option associated with a first sharing protocol and a second sharing option associated with a second sharing protocol that is different from the first sharing protocol. In response to detecting the first input (1006): in accordance with a determination that the first input includes less than the first threshold amount of movement after the first criteria have been met (e.g., the first criteria are optionally met by an initial portion of the first input, or by another input that has ended; the first input is a light press input, a touch-hold input with lift-off, or an extended touch-hold input without lift-off on the first user interface object, or a continuation of the light press input, the touch-hold input, or the extended touch-hold input, that does not include more than the first threshold amount of movement, or another input (e.g., a short swipe or a stationary input) that is detected after the light press input, the touch-hold input, or the extended touch-hold input and that does not include more than the first threshold amount of movement), the device displays (e.g., after detecting an end of the first input, or after the first input has met second criteria with a greater input threshold than that required by the first criteria, with less than a nominal threshold amount of movement), a representation of the first content (e.g., displaying a preview of the first content) without displaying the plurality of representations of different sharing options (e.g., displaying the preview of the first content without concurrently displaying the sharing user interface for the first content). In some embodiments, displaying the representation of the first content is distinct from displaying the first content, in that the representation of the first content is displayed overlaying a portion of the display and concurrently with an obscured (e.g., blurred and/or darkened) version of the current user interface in areas surrounding the representation of the first content, while displaying the first content involves completely replacing the current user interface with the display of the first content. These features are illustrated in FIGS. 5D16 following 5D7 (e.g., touch-hold input that meets time threshold T(II) causes display of preview 5534 without liftoff of the contact), FIGS. 5D22-5D24 following FIG. 5D16 (e.g., swiping up after a touch-hold input to show preview 5534 causes display of sharing user interface 5548), and FIGS. 5E2 (e.g., action and response 5718, 5716, 5714 and 5731, 5732, 5734, and 5736) and 5E3 (e.g., action and response 5813, 5812, 5819 and 5820) and accompanying descriptions, for example. Displaying the representation of the first content without displaying the plurality of representations of different sharing options, or displaying the sharing user interface for the first content, in accordance with the determination whether the first input includes less than the first threshold amount of movement or not, reduces the number of inputs needed to perform an operation (e.g., the number of inputs to cause to display different user interface objects). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, while displaying the first user interface object (e.g., after detecting the first input, and after detecting another input that dismisses the display of the sharing user interface and the representation of the first content and restores the display of the first user interface object), the device detects (1008) a second input directed to the first user interface object. In response to detecting the second input: in accordance with a determination that the second input meets second criteria (e.g., the second input is a tap input, and the second criteria require the second input to include less than a nominal threshold amount of movement within a threshold amount of time (e.g., the second input is substantially stationary) and to not meet the first criteria) that are distinct from the first criteria, the device displays the first content (e.g., without displaying the plurality of representations of the different sharing options). In some embodiments, the representation of the first content (e.g., the preview of the first content) and the first user interface object both respond to an input that does not meet the first criteria and includes less than the nominal threshold amount of movement (e.g., a tap input) by displaying the first content (e.g., opening the first content in its native application). This is illustrated in FIGS. 5D1-5D2 (e.g., tapping on hyperlink 5148 opens webpage 5151) and accompanying descriptions, for example. This is also illustrated in FIGS. 5E2 and 5E3 (e.g., actions and responses 5703, 5704, 5803, and 5804) and accompanying descriptions, for example. Displaying the first content in accordance with the determination that the second input meets second criteria that are distinct from the first criteria performs an operation when a set of conditions has been met (e.g., that the second input meets the second criteria) without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, while displaying the representation of the first content (e.g., after the first input having met the first criteria and before the movement of the first input is started, or after another input on the first user interface object that meets the first criteria causes the redisplay of the representation of the first content), the device detects (1010), via the input element, a third input directed to the representation of the first user interface object. In response to detecting the third input: in accordance with a determination that the third input meets the second criteria (e.g., the second input is a tap input), ceasing display of the representation of the first content and displaying the first content (e.g., a tap on the preview of the first content causes display of the first content in a new user interface). Ceasing the display of the representation of the first content and displaying the first content in accordance with the determination that the third input meets the second criteria performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the first user interface object was (1012) part of a first user interface at a time when the first input was detected on the first user interface object. The representation of the first content (e.g., preview 5156) is displayed (1014) overlaying a first portion (e.g., less than all) of the first user interface, concurrently with a representation of at least a second portion (e.g., less than all) of the first user interface at a location that is outside of the representation of the first user interface object (e.g., overlaying background user interface 5158, which is a blurred version of user interface 5146 in FIG. 5D8). In some embodiments, when the representation of the first user interface object and/or the first user interface object is activated by an input that includes less than the nominal threshold amount of movement and does not meet the first criteria (e.g., the input is a tap input), the electronic device displays the first content in a second user interface without displaying a representation of at least a portion of the first user interface. Displaying the representation of the first content overlaying the first portion of the first user interface concurrently with the representation of at least the second portion of the first user interface at the location outside of the representation of the first user interface object provides improved visual feedback to the user (e.g., concurrently displaying the representation of the first content and the representation of at least the second portion of the first user interface). Providing improved visual feedback enhances the operability of the device and makes the user-device interface more efficient (e.g., allowing the user to interact with the device more efficiently), which, additionally, reduces power usage and improves battery life of the device by enabling the user to use the device more quickly and efficiently.

In some embodiments, the first sharing option associated with the first sharing protocol, when activated, initiates (1016) a first operation to share the first content using a first application (e.g., a first instant messaging application, a first electronic mail application, a first social networking application, a first content publishing application, a first electronic transmission application, etc.), and the second sharing option associated with the second sharing protocol, when activated, initiates (1018) a second operation to share the first content using a second application distinct from the first application (e.g., a second instant messaging application, a second electronic mail application, a second social networking application, a second content publishing application, a second electronic transmission application, etc.). These features are illustrated in FIGS. 5D24, 5D25, 5D27, 5D28, 5D29, and 5D30 (e.g., options for sharing through direct peer-to-peer transmission, email, and instant messages) and accompanying descriptions. Initiating the first operation to share the first content using the first application, and initiating the second operation to share the first content using the second application, depending on whether the first or the second sharing option is activated, provides additional control options without cluttering the UI with additional displayed controls enhances the operability of the device, which, additionally, reduces power usage and improves battery life of the device by enabling the user to use the device more quickly and efficiently.

In some embodiments, the plurality of representations of different sharing options include (1020) a third sharing option associated with a first recipient user, and a fourth sharing option associated with a second recipient user, and wherein the third sharing option associated with the first recipient user, when activated, initiates a third operation to share the first content with the first recipient user (e.g., a first contact in an address book application, an instant messaging application, an electronic mail application, a social networking application, a content publishing application, an electronic transmission application, etc.), and the fourth sharing option associated with the second recipient user, when activated, initiates a fourth operation to share the first content with the second recipient user distinct from the first recipient user (e.g., a second contact in the address book application, the instant messaging application, the electronic mail application, the social networking application, the content publishing application, the electronic transmission application, etc.). In some embodiments, the third operation and the fourth operation invokes different applications. In some embodiments, the third operation and the fourth operation include displaying a plurality of options to select an application used to share the first content with the respective recipient user. These features are illustrated in FIGS. 5D25 and 5D27 and accompanying descriptions, for example. Initiating a third operation to share the first content with the first recipient user, or initiating the fourth operation to share the first content with the second recipient user, depending on whether the third or the fourth sharing options have been activated, provides additional control options without cluttering the UI with additional displayed controls enhances the operability of the device, which, additionally, reduces power usage and improves battery life of the device by enabling the user to use the device more quickly and efficiently.

In some embodiments, before the first threshold amount of movement is detected in the first input, the device displays (1022) the representation of the first content (e.g., the representation of the first content is displayed when an initial portion of the first input has met the first criteria with less than the nominal threshold amount of movement). This is illustrated in FIG. 5D22-5D24 following 5D16 (e.g., preview 5534 is displayed prior to display of the sharing user interface 5548 in response to movement of contact 5508) and accompanying descriptions, for example. Displaying the representation of the first content before the first threshold amount of movement is detected in the first input provides improved visual feedback to the user (e.g., allowing the user to determine that the first threshold amount of movement has not been detected by displaying the representation of the first content). Providing improved visual feedback enhances the operability of the device and makes the user-device interface more efficient, which, additionally, reduces power usage and improves battery life of the device by enabling the user to use the device more quickly and efficiently.

In some embodiments, in accordance with a determination that the first input includes more than the first threshold amount of movement in the first direction while the representation of the first content is displayed (e.g., while the representation of the first content is displayed in accordance with a determination that an initial portion of the first input includes less than the nominal threshold amount of movement and meets the first criteria), the device shrinks (1024) the representation of the first content while moving the representation of the first content in accordance with movement of the first input in the first direction. In some embodiments, at the end of the movement of the first input, a reduced representation of the first content is displayed concurrently with the plurality of sharing options in the sharing user interface. These features are illustrated in FIGS. 5D22-5D24 following 5D16 (e.g., preview 5534 is reduced in size and transformed to preview 5554 during movement of contact 5508) and accompanying descriptions, for example. Shrinking the representation of the first content while moving the representation of the first content in accordance with the movement of the first input in the first direction, in accordance with the determination that the first input includes more than the first threshold amount of movement in the first direction while the representation of the first content is displayed, provides improved visual feedback to the user (e.g., allowing the user to determine that the first input includes more than the threshold amount of movement by visually shrinking the representation of the first content). Providing improved visual feedback enhances the operability of the device and makes the user-device interface more efficient, which, additionally, reduces power usage and improves battery life of the device by enabling the user to use the device more quickly and efficiently.

In some embodiments, in accordance with a determination that the first input includes more than a second threshold amount of movement (e.g., this is optionally the nominal threshold amount of movement, or a threshold amount of movement that is greater than the nominal threshold amount of movement) in a second direction distinct from the first direction (e.g., opposite the first direction) while the representation of the first content is displayed (e.g., while the representation of the first content is displayed in accordance with a determination that an initial portion of the first input includes less than the nominal threshold amount of movement and meets the first criteria), the device ceases (1026) display of the representation of the first content. In some embodiments, the user interface displaying the first user interface object is restored after the representation of the first content is removed from the display. Ceasing display of the representation of the first content in accordance with the determination that the first input includes more than the second threshold amount of movement in the second direction distinct from the first direction reduces the number of inputs needed to perform an operation (e.g., ceasing to display the representation of the first content based on the direction and movement of the input). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, in response to detecting the first input: in accordance with a determination that the first input includes more than a third threshold amount of movement (e.g., a nominal threshold amount of movement, or the first threshold amount of movement) (e.g., in the first direction) before the first criteria (e.g., the first criteria correspond to criteria for activating display of a preview of the first content by an input (e.g., the first input or another input that ended before the first input was detected) directed to the first user interface object) are met, the device scrolls (1028) a first user interface on which the first user interface object is displayed, in accordance with movement of the first input. This is illustrated in FIGS. 5D3 following 5D1 and accompanying descriptions, for example. Scrolling the first user interface in accordance with the movement of the first input and in accordance with the determination that the first input includes more than the third threshold amount of movement before the first criteria are met, provides additional control options (e.g., allowing the user to scroll the first user interface with movement of the first input) without cluttering the UI with additional displayed controls enhances the operability of the device, which, additionally, reduces power usage and improves battery life of the device by enabling the user to use the device more quickly and efficiently.

In some embodiments, display of the representation of the first content is maintained (1030) after detecting an end of the first input. While maintaining display of the representation of the first content, the device detects a fourth input (e.g., the fourth input is detected after an end of the first input) directed to the representation of the first content. In response to detecting the fourth input, and in accordance with a determination that the fourth input includes more than a fourth threshold amount of movement (e.g., the nominal threshold amount of movement, or the first threshold amount of movement) (e.g., without the first criteria being met by the fourth input): the device moves the representation of the first content in accordance with movement of the fourth input; and the device displays the sharing user interface for the first content (e.g., displaying the sharing user interface with the preview of the first content). This is illustrated in FIGS. 5D23-5D24 following FIG. 5D17 (e.g., an upward swipe on preview 5156 also causes display of sharing user interface 5548) and accompanying descriptions, for example. Moving the representation of the first content and displaying the sharing user interface for the first content in accordance with the determination that the fourth input includes more than the fourth threshold amount of movement, provides additional control options (e.g., allowing the user to view the sharing user interface and move the representation of the first content) without cluttering the UI with additional displayed controls enhances the operability of the device, which, additionally, reduces power usage and improves battery life of the device by enabling the user to use the device more quickly and efficiently.

In some embodiments, a first portion of the first input includes (1032) less than the first threshold amount of movement (e.g., and also less than the nominal threshold amount of movement) and the first portion of the first input meets the first criteria. A second portion of the first input detected after the first portion of the first input and before an end of the first input includes more than the first threshold amount of movement in the first direction after the first portion of the first input has met the first criteria. The representation of the first content is displayed in accordance with a determination that the first portion of the first input includes less than the first threshold amount of movement (and less than the nominal threshold amount of movement) after the first criteria have been met by the first portion of the first input. The sharing user interface is displayed in accordance with a determination that the second portion of the first input includes more than the first threshold amount of movement after the first criteria have been met by the first portion of the first input. These features are illustrated in FIGS. 5D18-5D24 following 5D16 (e.g., contact 5508 is maintained substantially stationary for T(II) to cause display of preview 5534, subsequent movement of contact 5508 cause display of the sharing user interface 5548) and FIGS. 5E2 (e.g., actions and responses 5718, 5716, 5714, 5731, 5732, 5734, and 5726) and 5E3 (e.g., actions and responses) and accompanying descriptions, for example. Displaying the sharing user interface in accordance with the determination that the second portion of the first input includes more than the first threshold amount of movement after the first criteria have been met by the first portion of the first input, and displaying the representation of the first content in accordance with the determination that the first portion of the first input includes less than the first threshold amount of movement provides additional control options without cluttering the UI with additional displayed controls enhances the operability of the device, which, additionally, reduces power usage and improves battery life of the device by enabling the user to use the device more quickly and efficiently.

In some embodiments, in response to detecting the first input, in accordance with the determination that the first input includes more than the first threshold amount of movement in the first direction after the first criteria have been met, displaying the sharing user interface for the first content includes (1034): providing an indication (e.g., a visual indication, or a tactile output, or an audio output) that the first threshold amount of movement in the first direction has been detected; and moving the plurality of representations of different sharing options in the first direction to a predefined location on the display, after detecting an end of the first input. Providing the indication that the first threshold amount of movement in the first direction has been detected and moving the plurality of representations of different sharing options in the first direction to the predefined location on the display after detecting the end of the first input provides improved visual feedback to the user. Providing improved visual feedback enhances the operability of the device and makes the user-device interface more efficient, which, additionally, reduces power usage and improves battery life of the device by enabling the user to use the device more quickly and efficiently.

In some embodiments, the device generates (1036) a tactile output in response to detecting an end of the first input. Generating the tactile output in response to detecting the end of the first input provides improved haptic feedback to the user. Providing improved visual feedback enhances the operability of the device and makes the user-device interface more efficient, which, additionally, reduces power usage and improves battery life of the device by enabling the user to use the device more quickly and efficiently.

In some embodiments, while displaying the sharing user interface including the plurality of representations of different sharing options (e.g., after detecting an end of the first input), the device detects (1038) a fifth input directed to the sharing user interface. In response to detecting the fifth input: in accordance with a determination that the fifth input includes more than a sixth threshold amount of movement (e.g., a nominal threshold amount of movement, or the first threshold amount of movement) in a second direction that is opposite the first direction: the device ceases to display the sharing user interface including the plurality of different sharing options. In some embodiments, the electronic device also restores display of the representation of the first content (e.g., expanding the reduced representation of the first content that is concurrently displayed with the plurality of different sharing options). In some embodiments, if more than a seventh threshold amount of movement in the second direction is detected, the electronic device ceases to display the sharing user interface and the respective representation of the first content, and restores display of the user interface including the first user interface object. Ceasing to display the sharing user interface in accordance with the determination that the fifth input includes more than the sixth threshold amount of movement in the second direction that is opposite the first direction performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

It should be understood that the particular order in which the operations in FIGS. 10A-10E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, and 900) are also applicable in an analogous manner to method 1000 described above with respect to FIGS. 10A-10E. For example, the devices, or components thereof, such as audio output elements, user interface objects, user interfaces, thresholds, audio outputs, and actions/operations described above with reference to method 1000 optionally have one or more of the characteristics of the devices, or components thereof, such as audio output elements, user interface objects, user interfaces, thresholds, audio outputs, and actions/operations described herein with reference to other methods described herein (e.g., methods 600, 700, 800, and 900). For brevity, these details are not repeated here.

The operations described above with reference to FIGS. 6A-6D, 7A-7B, 8A-8C, 9A-9G, and 10A-10D are, optionally, implemented by components depicted in FIGS. 1A-1B. For example, detection operations 604, 622, 624, 626, 634, 704, 806, 904, 934, 936, 940, 1004, 1012, 1014, and 1038; display operations 602, 608, 610, 642, 644, 646, 804, 902, 906, 946, 1002, 1006, 1012, and 1022; generating operations 608, 616, 622, 624, 634, 706, 710, 718, 720, 724, 810, 812, and 1036; forgoing operations 610 and 618; perform operation 612, 624, 712, 930, and 934, dragging operation 614; and dismiss operation 622 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at an electronic device with a display and an input element:
   displaying, on the display, a first user interface that includes a user interface object;
   while displaying the user interface object, detecting, via the input element, a first input directed to the user interface object; and
   in response to detecting the first input directed to the user interface object:
   in accordance with a determination that the first input does not meet a first input threshold and includes less than a threshold amount of movement, after detecting an end of the first input, replacing display of the first user interface with a second user interface corresponding to the user interface object;
   in accordance with a determination that the first input meets the first input threshold and includes less than the threshold amount of movement and that the first input does not meet a second input threshold that is greater than the first input threshold, displaying, after detecting the end of the first input, a first respective user interface region that includes information corresponding to the user interface object, wherein the first respective user interface region is displayed overlaying at least a portion of the first user interface while maintaining a representation of at least a portion of the first user interface at a location that is outside of the first respective user interface region; and
   in accordance with a determination that the first input meets the second input threshold and includes less than the threshold amount of movement, displaying, prior to detecting the end of the first input, the first respective user interface region that includes information corresponding to the user interface object, wherein the first respective user interface region is displayed overlaying at least a portion of the first user interface while maintaining a representation of at least a portion of the first user interface at the location that is outside of the first respective user interface region.

2. The method of claim 1, including:
   after detecting the end of the first input, maintaining display of the first respective user interface region and the representation of at least the portion of the first user interface at the location that is outside of the first respective user interface region;
   while maintaining display of the first respective user interface region and the representation of at least the portion of the first user interface at the location that is outside of the first respective user interface region, detecting a second input directed to a location that is outside of the first respective user interface region; and
   in response to detecting the second input directed to a location that is outside of the first respective user interface region:
   ceasing to display the first respective user interface region; and
   restoring display of the first user interface.

3. The method of claim 1, wherein displaying, after detecting the end of the first input, the first respective user interface region that includes information corresponding to the user interface object includes:
   in response to detecting the end of the first input, displaying the first respective user interface region with a first size; and changing a displayed size of the first respective user interface region from the first size to a second size that is different from the first size.

4. The method of claim 3, wherein displaying, prior to detecting the end of the first input, the first respective user interface region that includes information corresponding to the user interface object includes:
in response to detecting the first input meeting the second input threshold prior to detecting the end of the first input, displaying the first respective user interface region with the second size.

5. The method of claim 1, including:
in response to detecting the first input directed to the user interface object:
in accordance with a determination that the first input includes more than the threshold amount of movement before the first input threshold is met by the first input, moving at least a portion of the first user interface in accordance with movement of the first input.

6. The method of claim 1, including:
in response to detecting the first input directed to the user interface object:
in accordance with a determination that the first input includes more than the threshold amount of movement after meeting the first input threshold and before meeting the second input threshold, moving the user interface object relative to the first user interface in accordance with movement of the first input.

7. The method of claim 1, including, in response to detecting the first input:
in accordance with a determination that the first input includes more than the threshold amount of movement after meeting the second input threshold, initiating a drag operation that moves the user interface object.

8. The method of claim 7, wherein initiating the drag operation that moves the user interface object includes:
replacing display of the first respective user interface region with display of a representation of the user interface object; and
moving the representation of the user interface object in accordance with the movement of the first input.

9. The method of claim 7, including, in response to detecting the first input:
in accordance with a determination that the first input includes more than the threshold amount of movement after meeting the second input threshold, initiating a user interface reconfiguration mode of the first user interface, wherein, in the user interface reconfiguration mode of the first user interface, a plurality of user interface objects in the first user interface are movable relative to the first user interface by a respective input that includes more than the threshold amount of movement, without the respective input having met the first input threshold.

10. The method of claim 7, including, in response to detecting the first input:
in accordance with a determination that the first input includes more than the threshold amount of movement after meeting the second input threshold:
in accordance with a determination that the first input includes movement in a first direction relative to the first respective user interface region, performing a first operation corresponding to a location within the first respective user interface region; and
in accordance with a determination that the first input includes movement in a second direction, distinct from the first direction, relative to the first respective user interface region, initiating a drag and drop operation that moves the user interface object.

11. The method of claim 10, wherein initiating the drag operation that moves the user interface object includes:
ceasing display of the first respective user interface region; and
moving the user interface object in accordance with the movement of the first input.

12. The method of claim 1, including:
after detecting the end of the first input and while maintaining display of the first respective user interface region on the display, detecting a second input directed to a first portion of the first respective user interface region, wherein the first portion of the first respective user interface region corresponds to a first operation; and
in response to detecting the second input directed to the first portion of the first respective user interface region, in accordance with a determination that the second input meets first criteria, performing the first operation.

13. The method of claim 1, including:
after detecting the end of the first input and while maintaining display of the first respective user interface region on the display, detecting a third input directed to the first respective user interface region; and
in response to detecting the third input directed to the first respective user interface region, in accordance with a determination that the third input includes more than the threshold amount of movement, initiating a drag operation that moves the user interface object.

14. The method of claim 1, including:
in response to detecting the first input directed to the user interface object:
in accordance with a determination that the first input meets a third input threshold that is greater than the second input threshold, and includes less than the threshold amount of movement, initiating, before detecting the end of the first input, a user interface reconfiguration mode of the first user interface, wherein, in the user interface reconfiguration mode of the first user interface, a plurality of user interface objects in the first user interface are movable relative to the first user interface by a respective input that includes more than the threshold amount of movement, without the respective input having met the first input threshold.

15. The method of claim 14, including:
during the user interface reconfiguration mode of the first user interface, detecting a fourth input directed to a first location in the first user interface; and
in response to detecting the fourth input directed to the first location in the first user interface:
in accordance with a determination that the first location is unoccupied by a user interface object, terminating the user interface reconfiguration mode of the first user interface; and
in accordance with a determination that the first location is occupied by a user interface object, maintaining the user interface reconfiguration mode of the first user interface.

16. The method of claim 1, including:
in response to detecting the first input directed to the user interface object:

in accordance with a determination that the first input meets the first input threshold and includes less than the threshold amount of movement and that the first input does not meet the second input threshold that is greater than the first input threshold, providing a visual indication that the first input threshold has been met with less than the threshold amount of movement.

17. The method of claim 1, including:
in response to detecting the first input directed to the user interface object:
in accordance with a determination that the first input meets the first input threshold and includes less than the threshold amount of movement and that the first input does not meet the second input threshold that is greater than the first input threshold, providing a non-visual indication that the first input threshold has been met with less than the threshold amount of movement.

18. The method of claim 1, including:
in response to detecting the first input directed to the user interface object:
in accordance with a determination that the first input meets a third input threshold and includes less than the threshold amount of movement and that the first input does not meet the first input threshold or the second input threshold that are greater than the third input threshold, displaying, after detecting the end of the first input, a second respective user interface region that includes information corresponding to the user interface object, wherein the second respective user interface region is distinct from the first respective user interface region, and wherein the second respective user interface region is displayed overlaying at least a portion of the first user interface while maintaining a representation of at least a portion of the first user interface at a location that is outside of the second respective user interface region.

19. The method of claim 18, wherein the first respective user interface region and the second respective user interface region, when activated by a respective input that does not meet the first input threshold and does not meet the third input threshold, cause display of the second user interface corresponding to the user interface object.

20. The method of claim 18, wherein the second respective user interface region, when activated by a respective input that meets the first input threshold and includes less than the threshold amount of movement, causes display of the first respective user interface region.

21. The method of claim 18, wherein the user interface object is a hyperlink, the second user interface displays a document identified by the hyperlink, the first respective user interface region displays a preview of the document identified by the hyperlink, and the second respective user interface region displays a document address of the document.

22. A non-transitory electronic device, comprising:
a display;
an input element;
one or more processors; and
memory storing one or more programs, wherein the one or more programs are configured to be executed by the one or more processors, the one or more programs including instructions for performing operations including:
displaying, on the display, a first user interface that includes a user interface object;
while displaying the user interface object, detecting, via the input element, a first input directed to the user interface object; and
in response to detecting the first input directed to the user interface object:
in accordance with a determination that the first input does not meet a first input threshold and includes less than a threshold amount of movement, after detecting an end of the first input, replacing display of the first user interface with a second user interface corresponding to the user interface object;
in accordance with a determination that the first input meets the first input threshold and includes less than the threshold amount of movement and that the first input does not meet a second input threshold that is greater than the first input threshold, displaying, after detecting the end of the first input, a first respective user interface region that includes information corresponding to the user interface object, wherein the first respective user interface region is displayed overlaying at least a portion of the first user interface while maintaining a representation of at least a portion of the first user interface at a location that is outside of the first respective user interface region; and
in accordance with a determination that the first input meets the second input threshold and includes less than the threshold amount of movement, displaying, prior to detecting the end of the first input, the first respective user interface region that includes information corresponding to the user interface object, wherein the first respective user interface region is displayed overlaying at least a portion of the first user interface while maintaining a representation of at least a portion of the first user interface at the location that is outside of the first respective user interface region.

23. A non-transitory computer readable storage medium storing one or more programs, the one or more programs comprising instructions, which, when executed by an electronic device with a display and an input element, cause the electronic device to perform operations comprising:
displaying, on the display, a first user interface that includes a user interface object;
while displaying the user interface object, detecting, via the input element, a first input directed to the user interface object; and
in response to detecting the first input directed to the user interface object:
in accordance with a determination that the first input does not meet a first input threshold and includes less than a threshold amount of movement, after detecting an end of the first input, replacing display of the first user interface with a second user interface corresponding to the user interface object;
in accordance with a determination that the first input meets the first input threshold and includes less than the threshold amount of movement and that the first input does not meet a second input threshold that is greater than the first input threshold, displaying, after detecting the end of the first input, a first respective user interface region that includes information corresponding to the user interface object, wherein the first respective user interface region is displayed overlaying at least a portion of the first user interface while maintaining a representation of at least a portion of the first user interface at a location that is outside of the first respective user interface region; and in accordance with a determination that the first input meets the second input threshold and includes less than the threshold amount of movement, displaying, prior to detecting the end of the first input, the first respective user interface region that includes information corresponding to the user interface object, wherein the first respective user interface region is displayed overlaying at least a portion of the first user interface while maintaining a representation of at least a portion of the first user interface at the location that is outside of the first respective user interface region.

24. The electronic device of claim 22, wherein the operations include:

after detecting the end of the first input, maintaining display of the first respective user interface region and the representation of at least the portion of the first user interface at the location that is outside of the first respective user interface region;

while maintaining display of the first respective user interface region and the representation of at least the portion of the first user interface at the location that is outside of the first respective user interface region, detecting a second input directed to a location that is outside of the first respective user interface region; and in response to detecting the second input directed to a location that is outside of the first respective user interface region:
ceasing to display the first respective user interface region; and
restoring display of the first user interface.

25. The electronic device of claim 22, wherein displaying after detecting the end of the first input, the first respective user interface region that includes information corresponding to the user interface object includes:

in response to detecting the end of the first input, displaying the first respective user interface region with a first size; and changing a displayed size of the first respective user interface region from the first size to a second size that is different from the first size.

26. The electronic device of claim 25, wherein displaying, prior to detecting the end of the first input, the first respective user interface region that includes information corresponding to the user interface object includes:

in response to detecting the first input meeting the second input threshold prior to detecting the end of the first input, displaying the first respective user interface region with the second size.

27. The electronic device of claim 22, wherein the operations include:

in response to detecting the first input directed to the user interface object:
in accordance with a determination that the first input includes more than the threshold amount of before the first input threshold is met by the first input, moving at least a portion of the first user interface in accordance with movement of the first input.

28. The electronic device of claim 22, wherein the operations include:

in response to detecting the first input directed to the user interface object:

in accordance with a determination that the first input includes More than the threshold amount of movement alter meeting the first input threshold and before meeting the second input threshold, moving the user interface object relative to the first user interface accordance with movement of the first input.

29. The electronic device of claim 22, wherein the operations include, in response to detecting the first input:

in accordance with a determination that the first input includes more than the threshold amount of movement after meeting the second input threshold, initiating a drag operation that moves the user interface object.

30. The electronic device of claim 29, wherein initiating the drag operation that moves the user interface object includes:

replacing display of the first respective user interface region with display of a representation of the user interface object; and moving the representation of the user interface object in accordance with the movement of the first input.

31. The electronic device of claim 29, wherein the operations include, in response to detecting the first input:

in accordance with a determination that the first input includes more than the threshold amount of movement after meeting the second input threshold, initiating a user interface reconfiguration mode of the first user interface, wherein, in the user interface reconfiguration mode of the first user interface, a plurality of user interface objects in the first user interface are movable relative to the first user interface by a respective input that includes more than the threshold amount of movement, without the respective input having met the first input threshold.

32. The electronic device of claim 29, wherein the operations include, in response to detecting the first input:

in accordance with a determination that the first input includes more than the threshold amount of movement after meeting the second input threshold:
in accordance with a determination that the first input includes movement in a first direction relative to the first respective user interface region, performing a first operation corresponding to a location within the first respective user interface region; and
in accordance with a determination that the first input includes movement in a second direction, distinct from the first direction, relative to the first respective user interface region, initiating a drag and drop operation that moves the user interface object.

33. The electronic device of claim 32, wherein initiating the operation that moves the user interface object includes:

ceasing display of the first respective user interface region; and moving the user interface object in accordance with the movement of the first input.

34. The elecironic device of claim 22, wherein the operations include:

after detecting the end of the first input and while maintaining display of the first respective user interface region on the display, detecting a second input directed to a first portion of the first respective user interface region, wherein the first portion of the first respective user interface region corresponds to a first operation; and in response to detecting the second input directed to the first portion of the first respective user interface region, in accordance with a determination that the second input meets first criteria, performing the first operation.

35. The electronic device of claim 22, wherein the operations include:
after detecting the end of the first input and while maintaining display of the first respective user interface region on the display, detecting a third input directed to the first respective user interface region; and in response to detecting the third input directed to the first respective user interface region, in accordance with a determination that the third input includes more than the threshold amount of movement, initiating a drag operation that moves the user interface object.

36. The electronic device of claim 22, wherein the operations include:
in response to detecting first input directed to the user interface object:
in accordance with a determination that the first input meets a third input threshold that is greater than the second input threshold, and includes less than the threshold amount of movement, initiating, before detecting the end of the first input, a user interface reconfiguration mode of the first user interface, wherein, in the user interface reconfiguration mode of the first user interface, a plurality of user interface objects in the first user interface are movable relative to the first user interface by a respective input that includes more than the threshold amount of movement, without the respective input having met the first input threshold.

37. The electronic device of claim 36, wherein. the operations include:
during the user interface reconfiguration mode of the first user interface, detecting a fourth input directed to a first location in the first user interface; and
in response to detecting the fourth input directed to the first location in the first user interface:
in accordance with a determination that the first location is unoccupied by a user interface object, terminating the user interface reconfiguration mode of the first user interface; and
in accordance with a determination that the first location is occupied by a user interface object, maintaining the user interface reconfiguration mode of the first user interface.

38. The electronic device of claim 22, wherein the operations include:
in response to detecting the first input directed to the user interface object:
in accordance with a determination that the first input meets the first input threshold and includes less than the threshold amount of movement and that the first input does not meet the second input threshold that is greater than the first input threshold, providing a visual indication that the first input threshold has been met with less than the threshold amount of movement.

39. The electronic device of claim 22, wherein the operations include:
in response to detecting the first input directed to the user interface object:
in accordance with a determination that the that input meets the first input threshold and includes less than the threshold amount of movement and that the first input does not meet the second input threshold that is greater than the first input threshold, providing a non-visual indication that the first input threshold has been met with less than the threshold amount of movement.

40. The electronic device of claim 22, wherein the operations include:
in response to detecting the first input directed to the user interface object:
in accordance with a determination that the first input meets a third input threshold and includes less than the threshold amount of movement and that the first input does not meet the first input threshold or the second input threshold that are greater than the third input threshold, displaying, after detecting the end of the first input, a second respective user interface region that includes information corresponding to the user interface object, wherein the second respective user interface region is distinct front the first respective user interface region, and wherein the second respective user interface region is displayed overlaying at least a portion of the first user interface while maintaining a representation of at least a portion of the first user interface at a location that is outside of the second respective user internee region.

41. The electronic device of claim 40, wherein the first respective user interface region and the second respective user interface region, when activated by a respective input that does not meet the first input threshold and does not meet the third input threshold, cause display of the second user interface corresponding to the user interface object.

42. The electronic device of claim 40, wherein the second respective user interface region when activated by a respective input that meets the first input threshold and includes less than the threshold amount of movement, causes display of the first respective user interface region.

43. The electronic device of claim 40, wherein the user interface object is a hyperlink, the second user interface displays a document identified by the hyperlink, the first respective user interface region displays a preview of the document identified by the hyperlink, and the second respective user interface region displays a document address of the document.

44. The non-transitory computer readable medium of claim 23, wherein the operations include:
after detecting the end of the first input, maintaining display of the first respective user interface region and the representation of at least the portion of the first user interface at the location that is outside of the first respective user interface region;
while maintaining display of the first respective user interface region and the representation of at least the portion of the first user Interface at the location that is outside of the first respective user interface region, detecting a second input directed to a location that is outside of the first respective user interface region; and
in response to detecting the second input directed to location that is outside of the first respective user interface region:
ceasing to display the first respective user interface region; and
restoring display of the first user interface.

45. The non-transitory computer readable storage medium of claim 23, wherein displaying, after detecting the end of the first input, the first respective user interface region that includes information corresponding to the user interface object includes:

in response to detecting the end of the first input, displaying the first respective user interface region with a first size; and
changing a displayed size of the first respective user interface region from the first size to a second size that is different from the first size.

46. The non-transitory computer readable storage medium of claim 45, wherein displaying, prior to detecting the end of the first input, the first respective user interface region that includes information corresponding to the user interface object includes:
in response to detecting the first input meeting the second input threshold prior to detecting the end of the first input, displaying the first respective user interface region with the second size.

47. The non-transitory computer readable storage medium of claim 23, wherein the operations include:
in response to detecting the first input directed to the user interface object:
in accordance with a determination that the first input includes more than the threshold amount of movement before the first input threshold is met by the first input, moving at least a portion of the first user interface m accordance with movement of the first input.

48. The non-transitory computer readable storage medium of claim 23, wherein the operations include:
in response to detecting the first input directed to the user interface object:
in accordance with a determination that the first input includes more than the threshold amount of movement after meeting the first input threshold and before meeting the second input threshold, moving the user interface object relative to the first user interface in accordance with movement of the first input.

49. The non-transitory computer readable storage medium of claim 23, wherein the operations include, in response to detecting the first input:
in accordance with a determination that the first input includes more than the threshold amount of movement after meeting the second input threshold, initiating a drag operation that moves the user interface object.

50. The non-transitory computer readable storage medium of claim 49, wherein initiating the drag operation that moves the user interface object includes:
replacing display of the first respective user interface region with a display of a representation of the user interface object, and
moving the representation of the user interface object in accordance with the movement of the first input.

51. The non-transitory computer readable storage medium of claim 49, wherein the operations include, in response to detecting the first input:
in accordance with a determination that the first input includes more than the threshold amount of movement after meeting the second input threshold, initiating a user interface reconfiguration mode of the first user interface, wherein, the user interface reconfiguration mode of the first user interface, a plurality of user interface objects in the first user interface are movable relative to the first use; interface by a respective input that includes more than the threshold amount of movement, without the respective input having met the first input threshold.

52. The non-transitory computer readable storage medium of claim 49, wherein the operations include, in response to detecting the first input:
in accordance with a determination that the first input includes more than the threshold amount of movement after meeting the second input threshold:
in accordance with a determination that the first input includes movement in a first direction relative to the first respective user interface region, performing a first operation corresponding to a location within the first respective user interface region; and
in accordance with a determination that the first input includes movement in a second direction, distinct from the first direction, relative to the first respective user interface region, initiating a drag and drop operation that moves the user interface object.

53. The non-transitory computer readable storage medium of claim 52, wherein initiating the drag operation that moves the user interface object includes:
ceasing display of the first respective user interface region; and
moving the user interface object in accordance with the movement of the first input.

54. The non-transitory computer readable storage medium of claim 23, wherein the operations include:
after detecting the end of the first input and while maintaining display of the first respective user interface region on the display, detecting a second input directed to a first portion of the first respective user interface region, wherein the first portion of the first respective User interface region corresponds to a first operation; and
in response to detecting the second input directed to the first portion of first respective user interface region, in accordance with a determination that the second input meets first criteria, performing the first operation.

55. The non-transitory computer readable storage medium of claim 23, wherein the operations include:
after detecting the end of the first input and while maintaining display of the first respective user interface region on the display, detecting a third input directed to the first respective user interface region; and
in response to detecting the third input directed to the first respective user interface region, in accordance with determination that the third input includes more than the threshold amount of movement, initiating a drag operation that moves the user interface object.

56. The non-transitory computer readable storage medium of claim 23, wherein the operations include:
in response to detecting the first input directed to the user interface object:
in accordance with a determination that the first input meets a third input threshold that is greater than the second input threshold, and includes less than the threshold amount of movement, initiating, before detecting the end of the first input, a user interface reconfiguration mode of the first user interface, wherein, the user interface reconfiguration mode of the first user interface, a plurality of user interface objects in the first user interface are movable relative to the first user interface by a respective input that includes more than the threshold amount of movement, without the respective input having met the first input threshold.

57. The non-transitory computer readable storage medium of claim 56, wherein the operations include:
during the user interface reconfiguration node of the first user interface, detecting a fourth input directed to a first location in the first user interface; and in response to detecting the fourth input directed to the first location in the first user interface:
  in accordance with a determination that the first location is unoccupied by a user interface object, terminating the user interface reconfiguration mode of the first user interface; and
  in accordance with a determination that the first location is occupied by a user interface object, maintaining the user interface reconfiguration mode of the first user interface.

58. The non-transitory computer readable storage medium of claim 23, wherein the operations include:
  in response to detecting the first input directed to the user interface object:
    in accordance with a determination that the first input meets the first input threshold and includes less than the threshold amount of movement and that the first input does not meet the second input threshold that is greater than the first input threshold, providing a visual indication that the first input threshold has been met with less than the threshold amount of movement.

59. The non-transitory computer readable storage medium of claim 23, wherein the operations include:
  in response to detecting the first input directed to the user interface object:
    in accordance with a determination that the first input meets the first input threshold and includes less than the threshold amount of movement and that the first input does not meet the second input threshold that is greater than the first input threshold, providing a non-visual indication that the first input threshold has been met with less than the threshold amount of movement.

60. The non-transitory computer readable storage medium of claim 23, wherein the operations include:
  in response to detecting the first input directed to the user interface object:
    in accordance with a determination that the first input meets a third input threshold and includes less than the threshold amount of movement and that the first input does not meet the first input threshold or the second input threshold that are greater than the third input threshold, displaying, after detecting the end of the first input, a second respective user interface region that includes information corresponding to the user interface object, wherein the second respective user interface region is distinct from the first respective user interface region, and wherein the second respective user interface region is displayed overlaying at least a portion of the first user interface while maintaining a representation of at least a portion of the first user interface at a location that is outside of the second respective user interface region.

61. The non-transitory computer readable storage medium of claim 60, wherein the first respective user interface region and the second respective user interface region, when activated by a respective input that does not meet the first input threshold and does not meet the third input threshold, cause display of the second user interface corresponding to the user interface object.

62. The non-transitory computer readable storage medium of claim 60, wherein the second respective user interface region, when activated by a respective input that meets the first input threshold and includes less than the threshold amount of movement, causes display of the first respective user interface region.

63. The non-transitory computer readable storage medium of claim 60, wherein the user interface object is a hyperlink, the second user interface displays a document identified by the hyperlink, the first respective user interface displays a preview of the document identified by the hyperlink, and the second respective user interface region displays a document address of the document.

* * * * *

UNITED STATES PATENT AND TRADEMARK OFFICE
CERTIFICATE OF CORRECTION

| | | |
|---|---|---|
| PATENT NO. | : 11,360,644 B2 | |
| APPLICATION NO. | : 17/138629 | |
| DATED | : June 14, 2022 | |
| INVENTOR(S) | : Karunamuni et al. | |

It is certified that error appears in the above-identified patent and that said Letters Patent is hereby corrected as shown below:

In the Claims

Claim 22, Column 135, Line 58, please delete "A non-transitory electronic device," and insert --An electronic device,--;

Claim 28, Column 138, Line 2, please delete "includes More" and insert --includes more--;

Claim 54, Column 142, Line 28, please delete "User interface" and insert --user interface--.

Signed and Sealed this
Sixth Day of September, 2022

Katherine Kelly Vidal
*Director of the United States Patent and Trademark Office*